(12) United States Patent
Balthaser

(10) Patent No.: US 7,000,180 B2
(45) Date of Patent: Feb. 14, 2006

(54) METHODS, SYSTEMS, AND PROCESSES FOR THE DESIGN AND CREATION OF RICH-MEDIA APPLICATIONS VIA THE INTERNET

(75) Inventor: Neil Balthaser, San Francisco, CA (US)

(73) Assignee: Balthaser Online, Inc., Lafayette, CA (US)

( * ) Notice: Subject to any disclaimer, the term of this patent is extended or adjusted under 35 U.S.C. 154(b) by 979 days.

(21) Appl. No.: 09/779,831

(22) Filed: Feb. 9, 2001

(65) Prior Publication Data
US 2002/0004755 A1    Jan. 10, 2002

Related U.S. Application Data

(63) Continuation-in-part of application No. 09/716,460, filed on Nov. 21, 2000, now abandoned.

(60) Provisional application No. 60/215,121, filed on Jun. 29, 2000, provisional application No. 60/232,078, filed on Sep. 7, 2000, provisional application No. 60/243,399, filed on Oct. 27, 2000.

(51) Int. Cl.
*G06F 17/00* (2006.01)
(52) U.S. Cl. ................................. 715/500.1; 707/102
(58) Field of Classification Search ............ 715/500.1, 715/501.1, 530; 707/102
See application file for complete search history.

(56) References Cited

U.S. PATENT DOCUMENTS

| | | | |
|---|---|---|---|
| 6,356,921 B1 * | 3/2002 | Kumar et al. ............. | 715/501.1 |
| 6,448,980 B1 * | 9/2002 | Kumar et al. ................ | 715/745 |
| 6,694,482 B1 * | 2/2004 | Arellano et al. ......... | 715/500.1 |
| 6,769,127 B1 * | 7/2004 | Bonomi et al. ................ | 725/39 |

* cited by examiner

*Primary Examiner*—Sanjiv Shah
(74) *Attorney, Agent, or Firm*—Preston Gates Ellis & Rouvelas Meeds LLP

(57) ABSTRACT

Rich-media applications are designed and created via the Internet. A host computer system, containing processes for creating rich-media applications, is accessed from a remote user computer system via an Internet connection. User account information and rich-media component specifications are uploaded via the established Internet connection for a specific user account. Rich-media applications are created, deleted, or modified in a user account via the established Internet connection. Rich-media components are added to, modified in, or deleted from scenes of a rich-media application based on information contained in user requests. After creation, the rich-media application is viewed or saved on the host computer system, or downloaded to the user computer system via the established Internet connection. In addition, the host process monitors the available computer and network resources and determines the particular component, scene, and application versions, if multiple versions exist, that most closely match the available resources.

83 Claims, 127 Drawing Sheets

370

10

30

150

160

170

200

210

310

320

330

340

350

360

370

400

440

480

490

500

510

530

540

590

600

610

| 618 | Asset Image Upload | | | | | | | | | | |
|---|---|---|---|---|---|---|---|---|---|---|---|
| C1 | Enter | ✓ | | | | | | | | | |
| C2 | Has an intro been selected? | | Yes | No | | | | | | | |
| C3 | Has a loop been selected? | | | | Yes | No | | | | | |
| C4 | Which loop type? | | | | A* | B* | C* | | | | |
| C5 | Is loop count finished? | | | | | | | Yes | No | | |
| C6 | Has an outro been selected? | | | | | | | | | Yes | No |
| A1 | Set position, scale, rotation and alpha | ✓ | | | | | | | | | |
| A2 | Play selected intro | | | | ✓ | | | | | | |
| A3 | Play selected loop | | | | | ✓ | ✓ | ✓ | | | |
| A4 | Check loop count | | | | | | | ✓ | | | |
| A5 | Decrement loop count | | | | | | | ✓ | | | |
| A6 | Play outro | | | | | | | | | ✓ | |
| A7 | Go to Rest frame | | | | | | | | | | ✓ |
| | DISPOSITION | C2 | C3 | C3 | C6 | C4 | C6 | C6 | C4 | C6 | Done | Done |

Fig. 31 – Asset Image Upload Component 618

620

| 628 | Navigation Bar | | | | | | | | |
|---|---|---|---|---|---|---|---|---|---|
| C1 | Enter | X | | | | | | | |
| C2 | Is number of buttons equal to number requested? | | No | Yes | | | | | |
| A1 | Set position, scale, rotation, and alpha | X | | | | | | | |
| A2 | Receive button specific variables | X | | | | | | | |
| A3 | Duplicate and position button | | X | | | | | | |
| A4 | Select icon | | X | | | | | | |
| A5 | Generate text field | | X | | | | | | |
| A6 | Calculate size | | X | | | | | | |
| A7 | Scale and position hit area | | X | | | | | | |
| | DISPOSITION | | C2 | C2 | Done | | | | |

Fig. 33 – Navigation Bar Component 628

630

640

644

650

660

670

680

690

760

770

780

790

800

810

820

830

840

| 870 | Component Browser | | | | | | | | | | | |
|---|---|---|---|---|---|---|---|---|---|---|---|---|
| C1 | Is a Component Folder selected? | Yes | No | | | | | | | | | |
| C2 | Does the Selected Folder contain other Folders? | | | Yes | No | | | | | | | |
| C3 | Does the Selected Folder contain Components? | | | | | Yes | No | | | | | |
| C4 | Is a Component selected? | | | | | | | Yes | No | | | |
| C5 | Is the selected Component dropped over the Workspace? | | | | | | | | | Yes | No | |
| C6 | Is a previous Header selected? | | | | | | | | | | | Yes | No |
| A1 | Add Header | X | | | | | | | | | | |
| A2 | Remove selected Header | | | | | | | | | | | X | |
| A3 | Display selected Folder Name in Header | X | | | | | | | | | | |
| A4 | Hide previous List contents | X | | | | | | | | | | X | |
| A5 | Show selected List contents | X | | | | | | | | | | X | |
| A6 | Display Folder Icon with List entry(s) | | | | X | | | | | | | |
| A6 | Display Draggable Icon with List entry(s) | | | | | | X | | | | | |
| A7 | Display Component Dragger bullseye | | | | | | | | X | | | |
| A8 | Load Component into Project | | | | | | | | X | | | |
| | Disposition | C2 | C6 | C3 | C3 | C4 | C1 | C5 | C4 | Done | C1 | C1 | C1 |

Fig. 52 – Component Browser 870

| 871 | Edit Size | | | | | | | | | | | |
|---|---|---|---|---|---|---|---|---|---|---|---|---|
| C1 | Is a Preset Size selected? | Yes | No | | | | | | | | | |
| C2 | Is Size selected with the Slider? | | | Yes | No | | | | | | | |
| C3 | Is Size value entered in the textfield? | | | | | Yes | No | | | | | |
| C4 | Is the Return key pressed? | | | | | | | Yes | No | | | |
| A1 | Set user-defined Size | X | | X | | | | X | | | | |
| A2 | Set default Size | | X | | X | | X | | | | | |
| | Disposition | Done | C2 | Done | C3 | C4 | Done | Done | C1 | | | |

Fig. 53 – Edit Size 871

| 872 | Edit Transparency | | | | | | | | | | | |
|---|---|---|---|---|---|---|---|---|---|---|---|---|
| C1 | Is a Preset Transparency selected? | Yes | No | | | | | | | | | |
| C2 | Is Transparency selected with the Slider? | | | Yes | No | | | | | | | |
| C3 | Is Transparency value entered in the textfield? | | | | | Yes | No | | | | | |
| C4 | Is the Return key pressed? | | | | | | | Yes | No | | | |
| A1 | Set user-defined Transparency | X | | X | | | | X | | | | |
| A2 | Set default Transparency | | X | | X | | X | | | | | |
| | Disposition | Done | C2 | Done | C3 | C4 | Done | Done | C1 | | | |

Fig. 54 – Edit Transparency 872

| 873 | Edit Rotation | | | | | | | | | | | | |
|---|---|---|---|---|---|---|---|---|---|---|---|---|
| C1 | Is a Preset Rotation selected? | Yes | No | | | | | | | | | |
| C2 | Is Rotation selected with the Slider? | | | Yes | No | | | | | | | |
| C3 | Is Rotation value entered in the textfield? | | | | | Yes | No | | | | | |
| C4 | Is the Return key pressed? | | | | | | | Yes | No | | | |
| A1 | Set user-defined Rotation | X | | X | | | | X | | | | |
| A2 | Set default Rotation | | X | | X | | | | | | | |
| | Disposition | Done | C2 | Done | C3 | C4 | Done | Done | C1 | | | |

Fig. 55 – Edit Rotation 873

| 874 | Edit Position | | | | | | | | | | | | |
|---|---|---|---|---|---|---|---|---|---|---|---|---|
| C1 | Is default Position button pressed? | Yes | No | | | | | | | | | |
| C2 | Is Position changed with the draggable icon? | | | Yes | No | | | | | | | |
| C3 | Is Position changed with the arrow keys? | | | | | Yes | No | | | | | |
| C4 | Are Position values entered in the textfields? | | | | | | | Yes | No | | | |
| C5 | Is Return/Enter pressed? | | | | | | | | | Yes | No | |
| A1 | Set user-defined Position | | | X | | X | | | | X | | |
| A2 | Set default Position | X | | | X | | X | | X | | | |
| | Disposition | Done | C2 | Done | C3 | Done | C4 | C5 | Done | Done | C1 | |

Fig. 56 – Edit Position 874

| 875 | Edit Color | | | | | | | | | | | | | |
|---|---|---|---|---|---|---|---|---|---|---|---|---|---|---|
| C1 | Is a Color swatch selected? | Yes | No | | | | | | | | | | | |
| C2 | Is Brightness selected with the Slider? | | | Yes | No | | | | | | | | | |
| C3 | Is Brightness value entered in the textfield? | | | | | Yes | No | | | | | | | |
| C4 | Is the Return key pressed? | | | | | | | Yes | No | | | | | |
| A1 | Set user-defined Color | X | | | | | | | | | | | | |
| A2 | Set default Color | | X | | | | | | | | | | | |
| A3 | Set user-defined Brightness | | | X | | | | X | | | | | | |
| A3 | Set default Brightness | | | | X | | X | | | | | | | |
| | Disposition | C2 | C2 | C3 | C3 | C4 | Done | Done | C1 | | | | | |

Fig. 57 – Edit Color 875

| 876 | Edit Selection | | | | | | | | | | | | | |
|---|---|---|---|---|---|---|---|---|---|---|---|---|---|---|
| C1 | Is Selection selected? | Yes | No | | | | | | | | | | | |
| C2 | Is Next/Previous arrow pressed? | | | Next | Prev | None | | | | | | | | |
| A1 | Set user-defined Selection | X | | | | | | | | | | | | |
| A2 | Set default Selection | | | | X | | | | | | | | | | |
| A3 | Show next Selection | | | X | | | | | | | | | | |
| A4 | Show previous Selection | | | | X | | | | | | | | | |
| | Disposition | Done | C2 | C1 | C1 | Done | | | | | | | | |

Fig. 58 – Edit Selection 876

| 877 | Edit Content (for Paragraph component) | | | | | | | | | | | | | |
|---|---|---|---|---|---|---|---|---|---|---|---|---|---|---|
| C1 | Is Textfield content set? | | Yes | No | | | | | | | | | | |
| C2 | Is Font selected? | | | | Yes | No | | | | | | | | |
| C3 | Is Size selected? | | | | | | Yes | No | | | | | | |
| C4 | Is Align selected? | | | | | | | | Yes | No | | | | |
| C5 | Is Shape selected? | | | | | | | | | | Yes | No | | |
| C6 | Is Apply pressed? | | | | | | | | | | | | Yes | No |
| A1 | Set user-defined Textfield content | | X | | | | | | | | | | | |
| A2 | Set default Textfield content | | | X | | | | | | | | | | |
| A3 | Set selected Font | | | | X | | | | | | | | | |
| A4 | Set default Font | | | | | X | | | | | | | | |
| A5 | Set selected Size | | | | | | X | | | | | | | |
| A6 | Set default Size | | | | | | | X | | | | | | |
| A7 | Set selected Alignment | | | | | | | | X | | | | | |
| A8 | Set default Alignment | | | | | | | | | X | | | | |
| A9 | Set selected Shape | | | | | | | | | | X | | | |
| A1 | Set default Shape | | | | | | | | | | | X | | |
| A11 | Set attributes | | | | | | | | | | | | X | |
| | Disposition | | C2 | C2 | C3 | C3 | C4 | C4 | C5 | C5 | C6 | C6 | Done | C1 |

Fig. 59 – Edit Content (for Paragraph components) 877

| 878 | Edit QuickLink (for Button component) | | | | | | | | | | | | |
|---|---|---|---|---|---|---|---|---|---|---|---|---|---|
| C1 | Is QuickLink or URL selected? | | QL | URL | | | | | | | | | |
| C2 | Is a URL entered in the Textfield? | | | | Yes | No | | | | | | | |
| C3 | Is a Scene selected? | | | | | | Yes | No | | | | | |
| C4 | Is a Window selected? | | | | | | | | New | Same | | | |
| C5 | Is Accept pressed? | | | | | | | | | | Yes | No | |
| A1 | Set selected Scene | | | | | | X | | | | | | |
| A2 | Set New Window | | | | | | | | X | | | | |
| A3 | Set Same Window | | | | | | | | | X | | | |
| A4 | Apply and save settings | | | | | | | | | | X | | |
| | Disposition | | C3 | C2 | C4 | C1 | C5 | C1 | C5 | C5 | Done | C1 | |

Fig. 60 – Edit QuickLink (for Button components) 878

| 879 | Edit Selection (for Button component) | | | | | | | | |
|---|---|---|---|---|---|---|---|---|---|
| C1 | Is a variation selected? | Yes | No | | | | | | |
| C2 | Is Button Label entered? | | | Yes | No | | | | |
| C3 | Is Accept pressed? | | | | | Yes | No | | |
| A1 | Set user-defined selection | X | | | | | | | |
| A2 | Set default selection | | X | | | | | | |
| A3 | Set user-defined Button Label content | | | X | | | | | |
| A4 | Set default Button Label content | | | | X | | | | |
| | Disposition | C2 | C2 | C3 | Done | Done | C1 | | |

Fig. 61 – Edit Selection (for Button components) 879

| 880 | Edit Content (for Line Effects components) | | | | | | | | | | | |
|---|---|---|---|---|---|---|---|---|---|---|---|---|
| C1 | Is Textfield content set? | Yes | No | | | | | | | | | |
| C2 | Is Font selected? | | | Yes | No | | | | | | | |
| C3 | Is Apply pressed? | | | | | Yes | No | | | | | |
| A1 | Set user-defined Textfield content | X | | | | | | | | | | |
| A2 | Set default textfield content | | X | | | | | | | | | |
| A3 | Set selected Font | | | X | | | | | | | | |
| A4 | Set default Font | | | | X | | | | | | | |
| A5 | Set attributes | | | | | X | | | | | | |
| | Disposition | C2 | C2 | C3 | C3 | Done | C1 | | | | | |

Fig. 62 – Edit Content (for Line Effects components) 880

| 881 | Edit Soundtrack | | | | | | | | |
|---|---|---|---|---|---|---|---|---|---|
| C1 | Is Soundtrack selected? | Yes | No | | | | | | |
| C2 | Is Volume level set? | | | Yes | No | | | | |
| C3 | Volume On/Off? | | | | | On | Off | | |
| A1 | Set default Soundtrack | | X | | | | | | |
| A2 | Set Selected Soundtrack | X | | | | | | | |
| A3 | Set default Volume level | | | | X | | | | |
| A4 | Set selected Volume level | | | X | | | | | |
| A5 | Play Soundtrack | | | | | X | | | |
| A6 | Stop All Sounds | | | | | | X | | |
| | Disposition | C2 | C2 | C3 | C3 | Done | Done | | |

Fig. 63 – Edit Soundtrack 881

| 882 | Edit User Assets | | | | | | | |
|---|---|---|---|---|---|---|---|---|
| C1 | Is a User Asset selected? | Yes | No | | | | | |
| C2 | Is Asset Data selected? | | | Yes | No | | | |
| C3 | Is Remove selected? | | | | Yes | No | | |
| C4 | Is Upload selected? | | | | | Yes | No | |
| C5 | Is Refresh selected? | | | | | | Yes | No |
| C6 | Is Accept selected | | | | | | | Yes | No |
| | | | | | | | | |
| A1 | Display icon of selected User Asset | X | | | | | | |
| A2 | Display icon of first User Asset | | X | | | | | |
| A3 | Show/Hide Asset Data | | | X | | | | |
| A4 | Remove selected User Asset | | | | X | | | |
| A5 | Launch Upload Assets pop-up window | | | | | X | | |
| A6 | Reload User Asset information | | | | | | X | |
| A7 | Set selected User Asset | | | | | | | X |
| | | | | | | | | |
| | Disposition | C2 | C2 | C3 | Done | C1 | C1 | Done | C1 |

Fig. 64 – Edit User Assets 882

| 883 | Edit Content (for Character Effects component) | | | | | | |
|---|---|---|---|---|---|---|---|
| C1 | Is Textfield Content set? | Yes | No | | | | |
| C2 | Is Font Selected? | | | Yes | No | | |
| C3 | Is Apply button pressed? | | | | | Yes | No |
| | | | | | | | |
| A1 | Set Textfield content | X | | | | | |
| A2 | Set default Textfield content | | X | | | | |
| A3 | Set selected Font | | | X | | | |
| A4 | Set default Font | | | | X | | |
| A5 | Apply settings | | | | | X | |
| | | | | | | | |
| | Disposition | C2 | C2 | C3 | C3 | Done | C1 |

Fig. 65 – Edit Content (for Character Effects components) 883

| 884 | Edit Content (for Movie components) | | | | | | | | | | | | | |
|---|---|---|---|---|---|---|---|---|---|---|---|---|---|---|
| C1 | Is Movie selected? | Yes | No | | | | | | | | | | | |
| C2 | Is Play ON? | | | Yes | No | | | | | | | | | |
| C3 | Is Search Speed set? | | | | | Yes | No | | | | | | | |
| C4 | Rewind / Fast Forward pressed? | | | | | | | Rewind | FFwd | None | | | | |
| C5 | Are Textfield contents entered? | | | | | | | | | | Yes | No | | |
| C6 | Is Apply pressed? | | | | | | | | | | | | Yes | No |
| A2 | Set default Movie | | X | | | | | | | | | | | |
| A2 | Set Selected Movie | X | | | | | | | | | | | | |
| A3 | Play Movie | | | X | | | | | | | | | | |
| A4 | Stop Movie | | | | X | | | | | | | | | |
| A5 | Set default Search Speed | | | | | | X | | | | | | | |
| A6 | Set selected Search Speed | | | | | X | | | | | | | | |
| A7 | Rewind Movie | | | | | | | X | | | | | | |
| A8 | Fast Forward Movie | | | | | | | | X | | | | | |
| A9 | Set default Textfield contents | | | | | | | | | | | X | | |
| A1 | Set selected Textfield contents | | | | | | | | | | | | X | |
| | Disposition | C2 | C2 | C3 | C3 | C4 | C4 | C5 | C5 | C5 | C6 | Done | Done | C1 |

Fig. 66 – Edit Content (for Movie components) 884

| 885 | Edit Content (for Window components) | | | | | | | | | | | | |
|---|---|---|---|---|---|---|---|---|---|---|---|---|---|
| C1 | Is Window Title content set? | | Yes | No | | | | | | | | | |
| C2 | Is Textfield content set? | | | | Yes | No | | | | | | | |
| C3 | Is Apply pressed? | | | | | | Yes | No | | | | | |
| A1 | Set user-defined Window Title content | | X | | | | | | | | | | |
| A2 | Set default Window title content | | | X | | | | | | | | | |
| A3 | Set user-defined textfield content | | | | X | | | | | | | | |
| A4 | Set default textfield content | | | | | X | | | | | | | |
| A6 | Save and display settings | | | | | | X | | | | | | |
| | Disposition | | C2 | C2 | C3 | C3 | Done | C1 | | | | | |

Fig. 67 – Edit Content (for Window components) 885

| 886 | Edit Content (for Header component) | | | | | | | | | | | | |
|---|---|---|---|---|---|---|---|---|---|---|---|---|---|
| C1 | Is Textfield content set? | | Yes | No | | | | | | | | | |
| C2 | Is Font selected? | | | | Yes | No | | | | | | | |
| C3 | Is Size selected? | | | | | | Yes | No | | | | | |
| C4 | Is Apply pressed? | | | | | | | | Yes | No | | | |
| A1 | Set user-defined textfield content | | X | | | | | | | | | | |
| A2 | Set default textfield content | | | X | | | | | | | | | |
| A3 | Set selected Font | | | | X | | | | | | | | |
| A4 | Set default Font | | | | | X | | | | | | | |
| A5 | Set selected Size | | | | | | X | | | | | | |
| A6 | Set default Size | | | | | | | X | | | | | |
| A7 | Set attributes | | | | | | | | X | | | | |
| | Disposition | | C2 | C2 | C3 | C3 | C4 | C4 | Done | C1 | | | |

Fig. 68 – Edit Content (for Header components) 886

| 887 | Scale/Position Handles | | | | | | | | | | | | |
|---|---|---|---|---|---|---|---|---|---|---|---|---|---|
| C1 | Is a component selected in the Layers Browser? | Yes | No | | | | | | | | | | |
| C2 | Is the hit area selected? | | | Yes | No | | | | | | | | |
| C3 | Is a corner handle selected? | | | | | Yes | No | | | | | | |
| C4 | Is the left or right handle selected? | | | | | | | Yes | No | | | | |
| C5 | Is the top or bottom handle selected? | | | | | | | | | Yes | No | | |
| C6 | Is the component QuickLinkable? | | | | | | | | | | | Yes | No |
| | | | | | | | | | | | | | |
| A1 | Set user-defined component | X | | | | | | | | | | | |
| A2 | Set default component (Layer 1 component) | | X | | | | | | | | | | |
| A3 | Reposition component | | | | X | | | | | | | | |
| A4 | Resize X-scale of component | | | | | | | X | X | | | | |
| A5 | Resize Y-scale of component | | | | | | | X | | | X | | |
| A6 | Show QuickLink information | | | | | | | | | | | X | |
| A7 | Hide QuickLink information | | | | | | | | | | | | X |
| | Disposition | C2 | C2 | C3 | C3 | C6 | C4 | C6 | C5 | C6 | C6 | Done | Done |

Fig. 69 – Scale/Position Handles 887

| 888 | Start Depth Browser<br>Depth Browser | | | | | | |
|---|---|---|---|---|---|---|---|
| C1 | Is Depth Browser open? | No | Yes | | | | |
| C2 | Open tab clicked? | No | Yes | | | | |
| A1 | Open Depth Browser | | ✓ | | | | |
| A2 | Load component list from current scene | | ✓ | | | | |
| A3 | Display components in top to bottom (front to back) order | | ✓ | ✓ | | | |
| A4 | Wait for user input 889 | | ✓ | ✓ | | | |
| | DISPOSITION | C1 | C1 | Done | | | |

Fig. 70 – Start Depth Browser 888

| 889 | Wait User Input Depth Browser | | | | | | |
|---|---|---|---|---|---|---|---|
| C1 | User Input? | Drag In New Comp | Drag Comp | Vis Btn | Lock Btn | Sel Comp | Cls Tab |
| A1 | Place new component on top | ✓ | | | | | |
| A2 | Change depth of component being dragged (cannot drag a locked component) | | ✓ | | | | |
| A3 | Toggle component's visibility | | | ✓ | | | |
| A4 | Toggle component lock | | | | ✓ | | |
| A5 | Apply Unified GUI interfaces to selected component (871 to 887 as applicable) | | | | | ✓ | |
| A6 | Reload component list from current scene | ✓ | ✓ | | | | |
| A7 | Redisplay components in top to bottom (front to back) order | ✓ | ✓ | ✓ | | | |
| A8 | Close Depth Browser Panel | | | | | | ✓ |
| | D I S P O S I T I O N | C1 | C1 | C1 | C1 | C1 | Done |

Fig. 71 – Wait User Input 889

| 890 | Layers Window Opening and Closing | | | | | | | | | |
|---|---|---|---|---|---|---|---|---|---|---|
| C1 | Is window being opened? | Y | N | | | | | | | |
| C2 | Is (new) scene selected? | | | Y | N | | | | | |
| C3 | Is window being closed? | | | | | Y | N | | | |
| C4 | Is mouse over the window? | | | | | | | Y | N | |
| A1 | Open Window | ✓ | | | | | | | | |
| A2 | Load objects from scene | | | ✓ | | | | | | |
| A3 | Close Window | | | | | ✓ | | | | |
| A4 | Select Object (891) | | | | | | | ✓ | | |
| | D I S P O S I T I O N | C2 | C1 | C3 | C3 | C1 | C4 | C2 | C2 | |

Fig. 72 – Layers Window Opening and Closing 890

| 891 | Layers Window Select Object | | | | | | | | | |
|---|---|---|---|---|---|---|---|---|---|---|
| C1 | Is mouse over an unselected, unlocked object? | Y | N | | | | | | | |
| C2 | Was mouse clicked? | | | Y | N | | | | | |
| C3 | Is mouse over a selected, unlocked object? | | | | | Y | N | | | |
| C4 | Was mouse clicked? | | | | | | | Y | N | |
| A1 | Highlight object line in orange | ✓ | | | | | | | | |
| A2 | Unselect previously selected object, if any Unhighlight object back to gray Remove arrows from life bar | | | ✓ | | | | | | |
| A3 | Select new object, Highlight object line in green, Place arrows on life bar | | | ✓ | | | | | | |
| A4 | Edit Object (893) | | | ✓ | | | | ✓ | | |
| A5 | Select Scene Time (892) | | | | | | | ✓ | ✓ | |
| | D I S P O S I T I O N | C2 | C3 | D | C3 | C4 | D | D | D | |

Fig. 73 – Select Object 891

| 892 | Layers Window Select Scene Time | | | | | | | | |
|---|---|---|---|---|---|---|---|---|---|
| C1 | Is mouse over total scene time? | Y | N | | | | | | |
| C2 | Was mouse clicked? | | | Y | N | | | | |
| C3 | Was valid time entered? | | | | | Y | N | | |
| A1 | Pop up Scene Time entry window | ✓ | | | | | | | |
| A2 | Accept user typein of scene time | | | ✓ | | | ✓ | | |
| A3 | Process new scene time<br>  Repaint tickmarks in window header<br>  Repaint object life bars | | | | | ✓ | | | |
| A4 | Remove Scene Time entry window | | | ✓ | ✓ | | | | |
| | D I S P O S I T I O N | C2 | D | C3 | D | D | C3 | | |

Fig. 74 – Select Scene Time 892

| 893 | Layers Window Edit Object | | | | | | | | |
|---|---|---|---|---|---|---|---|---|---|
| C1 | Was mouse clicked? | Y | N | | | | | | |
| C2 | Is drag being performed? | | | Y | N | | | | |
| C3 | Was visibility button clicked? | | | | | Y | N | | |
| C4 | Was lock button clicked? | | | | | | | Y | N |
| A1 | Process Drag (894) | | | ✓ | | | | | |
| A2 | Process Vis Button (895) | | | | | ✓ | | | |
| A3 | Process Lock Button (896) | | | | | | | ✓ | |
| | D I S P O S I T I O N | C2 | D | D | C3 | D | C4 | D | D |

Fig. 75 – Edit Object 893

| 894 | Layers Window Process Drag | | | | | | | | | |
|---|---|---|---|---|---|---|---|---|---|---|
| C1 | Is object being dragged vertically? | Y | N | | | | | | | |
| C2 | Is object life bar left arrow being dragged? | | | Y | | N | | | | |
| C3 | Is object life bar right arrow being dragged? | | | | | Y | | N | | |
| C4 | Is object life bar as a whole being dragged? | | | | | | | Y | N | |
| A1 | Move object to new front to back display position | ✓ | | | | | | | | |
| A2 | Redisplay scene in correct order | ✓ | | | | | | | | |
| A3 | Change object start time and duration Resize life bar accordingly | | | | ✓ | | | | | |
| A4 | Change object end time and duration Resize life bar accordingly | | | | | | ✓ | | | |
| A5 | Move object start and end times in tandem Duration remains unchanged Reposition life bar accordingly | | | | | | | ✓ | | |
| | DISPOSITION | D | D | D | D | D | D | | | |

Fig. 76 – Process Drag 894

| 895 | Layers Window Process Vis Button | | | | | | | | | |
|---|---|---|---|---|---|---|---|---|---|---|
| C1 | Was object visible? | Y | N | | | | | | | |
| A1 | Make object invisible | ✓ | | | | | | | | |
| A2 | Gray out button | ✓ | | | | | | | | |
| A3 | Make object visible | | ✓ | | | | | | | |
| A4 | Turn button green | | ✓ | | | | | | | |
| | DISPOSITION | D | D | | | | | | | |

Fig. 77 – Process Visibility Button 895

| 896 | Layers Window Process Lock Button | | | | | | | | | |
|---|---|---|---|---|---|---|---|---|---|---|
| C1 | Was object locked? | Y | N | | | | | | | |
| A1 | Unlock object | ✓ | | | | | | | | |
| A2 | Set gray dot for button | ✓ | | | | | | | | |
| A3 | Lock object | | ✓ | | | | | | | |
| A4 | Set gray lock icon for button | | ✓ | | | | | | | |
| | DISPOSITION | D | D | | | | | | | |

Fig. 78 – Process Lock Button 896

| 900 | Asset Manager | | | | | | | |
|---|---|---|---|---|---|---|---|---|
| C1 | Enter | Yes | | | | | | |
| A1 | Load Asset Manager Components (1100) | ✓ | | | | | | |
| A2 | Init all Asset Manager Components | ✓ | | | | | | |
| A3 | Start Idle Loop (901) | ✓ | | | | | | |
| | D I S P O S I T I O N | Done | | | | | | |

Fig. 79 – Asset Manager 900

| 901 | Idle Loop | | | | | | | |
|---|---|---|---|---|---|---|---|---|
| C1 | Enter at frame 1 | Yes | | | | | | |
| C2 | Does frame number equal control variable? | | No | Yes | | | | |
| C3 | Is this the last frame? | | No | Yes | | | | |
| A1 | Advance to next frame | | ✓ | | | | | |
| A2 | Call Load Check (920) | ✓ | ✓ | | | | | |
| A3 | Call Request Scanner (910) | ✓ | | | | | | |
| A4 | Jump back to frame 1 | | | ✓ | ✓ | | | |
| | D I S P O S I T I O N | C2 | C2 | C1 | C1 | | | |

Fig. 80 – Idle Loop 901

| 910 | Request Scanner | | | | | | |
|---|---|---|---|---|---|---|---|
| C1 | Enter | Yes | | | | | |
| C2 | Are there requests to process? | | No | Yes | | | |
| L3 | Loop through all scheduled requests | | | Ent | Loop | Exit | |
| C4 | More to process? | | | | Yes | No | |
| A1 | Call Scheduler (930) | ✓ | | | | | |
| A2 | Pick Request | | | | ✓ | | |
| A3 | Process Request (911) | | | | ✓ | | |
| | DISPOSITION | C2 | Done | L3 Loop | L3 Loop | L3 Exit | Done |

Fig. 81 – Request Scanner 910

| 911 | Request Scanner - continued<br>Process Request | | | | | | | | |
|---|---|---|---|---|---|---|---|---|---|
| C1 | General request type? | Reg | Load | Play | Posn | State | Loc Vol | Glob Vol | Other |
| A1 | Call Registration Request Processor (940) | ✓ | | | | | | | |
| A2 | Call Load Request Processor (950) | | ✓ | | | | | | |
| A3 | Call Play Request Processor (960) | | | ✓ | | | | | |
| A4 | Call Position Request Processor (970) | | | | ✓ | | | | |
| A5 | Call State Request Processor (980) | | | | | ✓ | | | |
| A6 | Call Local Volume Request Processor (990) | | | | | | ✓ | | |
| A7 | Call Global Volume Request Processor (1000) | | | | | | | ✓ | |
| A8 | Return error response to requestor | | | | | | | | ✓ |
| | DISPOSITION | Done | Done | Done | Done | Done | Done | Done | Done |

Fig. 82 – Process Request 911

| 920 | Load Check | | | | | | | |
|---|---|---|---|---|---|---|---|---|
| L1 | Loop through all clips being loaded | Ent | Loop | | | Exit | | |
| C2 | More clips to check? | | Yes | No | | | | |
| C3 | Are all frames loaded? | | | | Yes | No | | |
| A1 | Pick clip | | ✓ | | | | | |
| A2 | Get frames loaded for clip | | ✓ | | | | | |
| A3 | Set slot identification into clip | | | | ✓ | | | |
| A4 | Mark clip load finished in check list | | | | ✓ | | | |
| A5 | Set clip state to loaded | | | | ✓ | | | |
| A6 | Remove finished clips from check list | | | | | ✓ | | |
| | DISPOSITION | L1 Loop | C3 | L1 Exit | L1 Loop | L1 Loop | Done | |

Fig. 83 – Load Check 920

| 930 | Scheduler | | | |
|---|---|---|---|---|
| C1 | Enter | Yes | | |
| C2 | Are intensive task(s) in progress? | | Yes | No |
| A1 | Transfer requests from reschedule list to schedule list | ✓ | | |
| A2 | Set reschedule list empty | ✓ | | |
| A3 | Schedule Intensive Task Request (931) | | ✓ | |
| A4 | Process Request List (932) | | | ✓ |
| A5 | Empty request list | | | ✓ |
| | DISPOSITION | C2 | Done | Done |

Fig. 84 – Scheduler 930

| 931 | Scheduler<br>Schedule Intensive Task Request | | | | | | | |
|---|---|---|---|---|---|---|---|---|
| C1 | Is there an internal request for an intensive task? | Yes | No | | | | | |
| C2 | Is there a request from an intensive task? | | Yes | No | | | | |
| A1 | Add Intensive Task request to schedule list | ✓ | ✓ | | | | | |
| | DISPOSITION | Done | Done | Done | | | | |

Fig. 85 – Schedule Intensive Task 931

| 932 | Scheduler<br>Process Request List | | | | | | | | |
|---|---|---|---|---|---|---|---|---|---|
| L1 | Loop through request list | Ent | | Loop | | | | Exit | |
| C2 | More slots in request list? | | Yes | No | | | | | |
| C3 | Is there an internal request in the slot? | | | | Yes | No | | | |
| C4 | Is there an external request in the slot? | | | | | | Yes | No | |
| A1 | Pick slot | | ✓ | | | | | | |
| A2 | Add request to schedule list | | | | ✓ | ✓ | | | |
| | DISPOSITION | L1 Loop | C3 | L1 Exit | L1 Loop | L1 Loop | L1 Loop | Done | |

Fig. 86 – Process Request List 932

| 940 | Registration Request Processor | | | | | | | |
|---|---|---|---|---|---|---|---|---|
| C1 | Request type? | Reg | Re reg | Un reg | Query Reg | No Req | Oth | |
| A1 | Process Register (941) | ✓ | | | | | | |
| A2 | Process Reregister (942) | | ✓ | | | | | |
| A3 | Process Unregister (943) | | | ✓ | | | | |
| A4 | Process Query Register (944) | | | | ✓ | | | |
| A5 | Ignore No Request | | | | | ✓ | | |
| A6 | Return error response to requestor | | | | | | ✓ | |
| | DISPOSITION | Done | Done | Done | Done | Done | Done | |

Fig. 87 – Registration Request Processor 940

| 941 | Registration Request Processor Process Register | | | | |
|---|---|---|---|---|---|
| C1 | Enter | Yes | | | |
| C2 | Any argument errors? | | No | Yes | |
| A1 | Assign slot and initialize it | ✓ | | | |
| A2 | Get arguments | ✓ | | | |
| A3 | Assign arguments to the slot including: name, type, URL, instance name, attributes, permissions, parent, obey, URLs for cycle and bandwidth | | ✓ | | |
| A4 | Set status as registered | | ✓ | | |
| A5 | Return OK response to requestor | | ✓ | | |
| A6 | Return error response to requestor | | | ✓ | |
| | DISPOSITION | C2 | Done | Done | |

Fig. 88 – Process Register 941

| 942 | Registration Request Processor Process Reregister | | | | | | | |
|---|---|---|---|---|---|---|---|---|
| C1 | Is clip currently registered? | Yes | | No | | | | |
| C2 | Do permissions allow reregistration? | No | Yes | | | | | |
| C3 | Any argument errors? | | | No | Yes | | | |
| A1 | Assign slot and initialize it | | | ✓ | | | | |
| A2 | Get arguments | | ✓ | ✓ | | | | |
| A3 | Assign arguments to the slot including: name, type, URL, instance name, attributes, permissions, parent, | | | ✓ | | | | |
| A4 | Set status as registered | | | ✓ | | | | |
| A5 | Return OK response to requestor | | | ✓ | | | | |
| A6 | Return error response to requestor | ✓ | | | ✓ | | | |
| | D I S P O S I T I O N | Done | C3 | C3 | Done | Done | | |

Fig. 89 – Process Reregister 942

| 943 | Registration Request Processor Process Unregister | | | | | | | |
|---|---|---|---|---|---|---|---|---|
| C1 | Is clip currently registered? | Yes | | | No | | | |
| C2 | Do permissions allow unregistration? | No | Yes | | | | | |
| C3 | Is clip playing? | | No | Yes | | | | |
| C4 | Is clip loaded? | | No | Yes | | | | |
| A1 | Stop clip play | | | ✓ | | | | |
| A2 | Unload clip | | | ✓ | ✓ | | | |
| A3 | Set status as unregistered | | ✓ | ✓ | ✓ | | | |
| A4 | Return OK response to requestor | | ✓ | ✓ | ✓ | | | |
| A5 | Return error response to requestor | ✓ | | | ✓ | | | |
| | D I S P O S I T I O N | Done | Done | Done | Done | Done | | |

Fig. 90 – Process Unregister 943

| 944 | Registration Request Processor Process Query Register | | | | | | | |
|---|---|---|---|---|---|---|---|---|
| C1 | Query by slot? | Yes | No | | | | | |
| C2 | Query by name? | | Yes | No | | | | |
| C3 | Query by instance name? | | | Yes | No | | | |
| C4 | Query by URL? | | | | Yes | No | | |
| C5 | Was clip found? | | | | | | Yes | No |
| C6 | Is clip registered? | | | | | | Yes | No |
| A1 | Find slot | ✓ | | | | | | |
| A2 | Find clip by name | | ✓ | | | | | |
| A3 | Find clip by instance name | | | ✓ | | | | |
| A4 | Find clip by URL | | | | ✓ | | | |
| A5 | Return slot and True response to requestor | | | | | | ✓ | |
| A6 | Return False response to requestor | | | | | | | ✓ |
| A7 | Return error response to requestor | | | | | ✓ | | ✓ |
| | DISPOSITION | C5 | C5 | C5 | C5 | Done | Done | Done | Done |

Fig. 91 – Process Query Register 944

| 950 | Load Request Processor | | | | | | | |
|---|---|---|---|---|---|---|---|---|
| C1 | Request type? | Load | Un load | Query Load | Query Frm | Oth | | |
| A1 | Process Load (951) | ✓ | | | | | | |
| A2 | Process Unload (952) | | ✓ | | | | | |
| A3 | Process Query Load (953) | | | ✓ | | | | |
| A4 | Process Query Frames Loaded (954) | | | | ✓ | | | |
| A5 | Return error response to requestor | | | | | ✓ | | |
| | D I S P O S I T I O N | Done | Done | Done | Done | Done | | |

Fig. 92 – Load Request Processor 950

| 951 | Load Request Processor<br>Process Load | | | | | | | | |
|---|---|---|---|---|---|---|---|---|---|
| C1 | Is target clip registered? | Yes | | No | | | | | |
| C2 | Is bandwidth hogging in effect? | Yes | | No | | | | | |
| C3 | Is requestor clip a bandwidth hog? | Yes | No | | | | | | |
| C4 | Any argument errors? | | | | Yes | No | | | |
| C5 | Do permissions allow load? | | | | | | Yes | | No |
| C6 | Requestor supplying destination instance? | | | | | | No | Yes | |
| A1 | Get arguments | ✓ | | ✓ | | | | | |
| A2 | Put request onto reschedule list | | ✓ | | | | | | |
| A3 | Create local instance at specified depth on the specified level | | | | | | ✓ | | |
| A4 | Pick target clip variant (if any) based on cycle and bandwidth environment (Cycle Category and Bandwidth | | | | | | ✓ | ✓ | |
| A5 | Initiate target clip load | | | | | | ✓ | ✓ | |
| A6 | Add target clip to load list for Load Check (920) | | | | | | ✓ | ✓ | |
| A7 | Return OK response to requestor | | | | | | ✓ | ✓ | |
| A8 | Return error response to requestor | | | | ✓ | ✓ | | | ✓ |
| | DISPOSITION | C4 | Done | C4 | Done | Done | Done | Done | Done |

Fig. 93 – Process Load 951

| 952 | Load Request Processor<br>Process Unload | | | | | | | |
|---|---|---|---|---|---|---|---|---|
| C1 | Is clip loaded? | Yes | | | No | | | |
| C2 | Do permissions allow load? | Yes | | No | | | | |
| C3 | Is clip playing? | Yes | No | | | | | |
| A1 | Stop clip play | ✓ | | | | | | |
| A2 | Propagate unload to clip's children that obey | ✓ | ✓ | | | | | |
| A3 | Initiate target clip unload | ✓ | ✓ | | | | | |
| A4 | Set clip state as unloaded | ✓ | ✓ | | | | | |
| A5 | Return OK response to requestor | ✓ | ✓ | | | | | |
| A6 | Return error response to requestor | | | ✓ | ✓ | | | |
| | D I S P O S I T I O N | Done | Done | Done | Done | | | |

Fig. 94 – Process Unload 952

| 953 | Load Request Processor<br>Process Query Load | | | | | | | |
|---|---|---|---|---|---|---|---|---|
| C1 | Is clip loaded? | Yes | No | | | | | |
| A1 | Return True response to requestor | ✓ | | | | | | |
| A2 | Return False response to requestor | | ✓ | | | | | |
| | D I S P O S I T I O N | Done | Done | | | | | |

Fig. 95 – Process Query Load 953

| 954 | Load Request Processor<br>Process Query Load Frame | | | | | | | |
|---|---|---|---|---|---|---|---|---|
| C1 | Is clip loading or loaded? | Yes | No | | | | | |
| A1 | Return frames loaded count to requestor | ✓ | | | | | | |
| A2 | Return error response to requestor | | ✓ | | | | | |
| | DISPOSITION | Done | Done | | | | | |

Fig. 96 – Process Query Frames Loaded 954

| 960 | Play Request Processor | | | | | | | |
|---|---|---|---|---|---|---|---|---|
| C1 | Request type? | Play | Paus | Stop | Query Play | Query Frm | Oth | |
| A1 | Process Play (961) | ✓ | | | | | | |
| A2 | Process Pause (962) | | ✓ | | | | | |
| A3 | Process Stop (963) | | | ✓ | | | | |
| A4 | Process Query Play (964) | | | | ✓ | | | |
| A5 | Process Query Frame (965) | | | | | ✓ | | |
| A6 | Return error response to requestor | | | | | | ✓ | |
| | DISPOSITION | Done | Done | Done | Done | Done | Done | |

Fig. 97 – Play Request Processor 960

| 961 | Play Request Processor<br>Process Play | | | | | | | |
|---|---|---|---|---|---|---|---|---|
| C1 | Is clip loaded? | Yes | No | | | | | |
| C2 | Do permissions allow play? | Yes | No | | | | | |
| A1 | Call clip's play routine | ✓ | | | | | | |
| A2 | Propagate play to clip's children that obey | ✓ | | | | | | |
| A3 | Set clip state as playing | ✓ | | | | | | |
| A4 | Return OK response to requestor | ✓ | | | | | | |
| A5 | Return error response to requestor | | ✓ | ✓ | | | | |
| | DISPOSITION | Done | Done | Done | | | | |

Fig. 98 – Process Play 961

| 962 | Play Request Processor<br>Process Pause | | | | | | | |
|---|---|---|---|---|---|---|---|---|
| C1 | Is clip playing? | Yes | No | | | | | |
| C2 | Do permissions allow pause? | Yes | No | | | | | |
| A1 | Call clip's pause routine | ✓ | | | | | | |
| A2 | Propagate pause to clip's children that obey | ✓ | | | | | | |
| A3 | Set clip state as paused | ✓ | | | | | | |
| A4 | Return OK response to requestor | ✓ | | | | | | |
| A5 | Return error response to requestor | | ✓ | ✓ | | | | |
| | DISPOSITION | Done | Done | Done | | | | |

Fig. 99 – Process Pause 962

| 963 | Play Request Processor Process Stop | | | | | | | | |
|---|---|---|---|---|---|---|---|---|---|
| C1 | Is clip playing or paused? | Yes | No | | | | | | |
| C2 | Do permissions allow stop? | Yes | No | | | | | | |
| A1 | Call clip's stop routine | ✓ | | | | | | | |
| A2 | Propagate stop to clip's children that obey | ✓ | | | | | | | |
| A3 | Set clip state as stopped | ✓ | | | | | | | |
| A4 | Return OK response to requestor | ✓ | | | | | | | |
| A5 | Return error response to requestor | | ✓ | ✓ | | | | | |
| | D I S P O S I T I O N | Done | Done | Done | | | | | |

Fig. 100 – Process Stop 963

| 964 | Play Request Processor Process Query Play | | | | | | | | |
|---|---|---|---|---|---|---|---|---|---|
| C1 | Is clip playing? | Yes | No | | | | | | |
| A1 | Return True response to requestor | ✓ | | | | | | | |
| A2 | Return False response to requestor | | ✓ | | | | | | |
| | D I S P O S I T I O N | Done | Done | | | | | | |

Fig. 101 – Process Query Play 964

| 965 | Play Request Processor<br>Process Query Play Frame | | | | | | | |
|---|---|---|---|---|---|---|---|---|
| C1 | Is clip playing, paused or stopped? | Yes | No | | | | | |
| A1 | Return current play frame to requestor | ✓ | | | | | | |
| A2 | Return OK response to requestor | ✓ | | | | | | |
| A3 | Return zero as play frame to requestor | | ✓ | | | | | |
| A4 | Return error response to requestor | | ✓ | | | | | |
| | DISPOSITION | Done | Done | | | | | |

Fig. 102 – Process Query Play Frame 965

| 970 | Position Request Processor | | | | | | | |
|---|---|---|---|---|---|---|---|---|
| C1 | Request type? | FF | Rewind | Query Rew | Oth | | | |
| A1 | Process Fast Forward (971) | ✓ | | | | | | |
| A2 | Process Rewind (972) | | ✓ | | | | | |
| A3 | Process Query Rewound (973) | | | ✓ | | | | |
| A4 | Return error response to requestor | | | | ✓ | | | |
| | DISPOSITION | Done | Done | Done | Done | | | |

Fig. 103 – Position Request Processor 970

| 971 | Position Request Processor<br>Process Fast Forward | | | | | | | |
|---|---|---|---|---|---|---|---|---|
| C1 | Is clip loaded? | Yes | | No | | | | |
| C2 | Do permissions allow fast forward? | Yes | No | | | | | |
| A1 | Call clip's fast forward routine | ✓ | | | | | | |
| A2 | Propagate fast forward to clip's children that obey | ✓ | | | | | | |
| A3 | Return OK response to requestor | ✓ | | | | | | |
| A4 | Return error response to requestor | | ✓ | ✓ | | | | |
| | D I S P O S I T I O N | Done | Done | Done | | | | |

Fig. 104 – Process Fast Forward 971

| 972 | Position Request Processor<br>Process Rewind | | | | | | | |
|---|---|---|---|---|---|---|---|---|
| C1 | Is clip loaded? | Yes | | No | | | | |
| C2 | Do permissions allow rewind? | Yes | No | | | | | |
| A1 | Call clip's rewind routine | ✓ | | | | | | |
| A2 | Propagate rewind to clip's children that obey | ✓ | | | | | | |
| A3 | Return OK response to requestor | ✓ | | | | | | |
| A4 | Return error response to requestor | | ✓ | ✓ | | | | |
| | D I S P O S I T I O N | Done | Done | Done | | | | |

Fig. 105 – Process Rewind 972

| 973 | Position Request Processor<br>Process Query Rewound | | | | | | | | |
|---|---|---|---|---|---|---|---|---|---|
| C1 | Is clip at first frame? | Yes | No | | | | | | |
| A1 | Return True response to requestor | ✓ | | | | | | | |
| A2 | Return False response to requestor | | ✓ | | | | | | |
| | DISPOSITION | Done | Done | | | | | | |

Fig. 106 – Process Query Rewound 973

| 987 | State Request Processor | | | | | | | | |
|---|---|---|---|---|---|---|---|---|---|
| C1 | Request type? | Cyc Pig On | Cyc Pig Off | BW Hog On | BW Hog Off | Query State | Qry Cyc Pig | Qry BW Hig | Oth |
| A1 | Process Cycle Pig On (981) | ✓ | | | | | | | |
| A2 | Process Cycle Pig Off (982) | | ✓ | | | | | | |
| A3 | Process Bandwidth Hog On (983) | | | ✓ | | | | | |
| A4 | Process Bandwidth Hog Off (984) | | | | ✓ | | | | |
| A5 | Process Query State (985) | | | | | ✓ | | | |
| A5 | Process Query Cycle Pig (986) | | | | | | ✓ | | |
| A5 | Process Query Bandwidth Hog (987) | | | | | | | ✓ | |
| A6 | Return error response to requestor | | | | | | | | ✓ |
| | DISPOSITION | Done | Done | Done | Done | Done | Done | Done | Done |

Fig. 107 – State Request Processor 980

| 981 | State Request Processor<br>Process Cycle Pig On | | | | | | | | |
|---|---|---|---|---|---|---|---|---|---|
| C1 | Is clip loaded? | Yes | No | | | | | | |
| C2 | Any argument errors? | | | Yes | No | | | | |
| C3 | Are sufficient cycles available? | | | | Yes | No | | | |
| A1 | Get arguments | ✓ | | | | | | | |
| A2 | Deduct clip requirements from cycles available | | | | ✓ | | | | |
| A3 | Add clip to intensive task list | | | | ✓ | | | | |
| A4 | Return OK response to requestor | | | | ✓ | | | | |
| A5 | Return error response to requestor | | ✓ | ✓ | | ✓ | | | |
| | D I S P O S I T I O N | C2 | Done | Done | Done | Done | | | |

Fig. 108 – Process Cycle Pig On 981

| 982 | State Request Processor<br>Process Cycle Pig Off | | | | | | | |
|---|---|---|---|---|---|---|---|---|
| C1 | Is clip loaded? | | Yes | No | | | | |
| C3 | Is clip on intensive task list? | Yes | No | | | | | |
| A1 | Remove clip from intensive task list | ✓ | | | | | | |
| A2 | Restore clip requirements to cycles available | ✓ | | | | | | |
| A3 | Return OK response to requestor | ✓ | | | | | | |
| A4 | Return error response to requestor | | ✓ | ✓ | | | | |
| | D I S P O S I T I O N | Done | Done | Done | | | | |

Fig. 109 – Process Cycle Pig Off 982

| 983 | State Request Processor  Process Bandwidth Hog On | | | | | | | | |
|---|---|---|---|---|---|---|---|---|---|
| C1 | Is clip loaded? | Yes | No | | | | | | |
| C2 | Any argument errors? | | | Yes | No | | | | |
| C3 | Is sufficient bandwidth available? | | | | Yes | No | | | |
| A1 | Get arguments | ✓ | | | | | | | |
| A2 | Deduct clip requirements from bandwidth available | | | | ✓ | | | | |
| A3 | Add clip to high bandwidth task list | | | | ✓ | | | | |
| A4 | Return OK response to requestor | | | | ✓ | | | | |
| A5 | Return error response to requestor | | ✓ | ✓ | | ✓ | | | |
| | D I S P O S I T I O N | C2 | Done | Done | Done | Done | | | |

Fig. 110 – Process Bandwidth Hog On 983

| 984 | State Request Processor  Process Bandwidth Hog Off | | | | | | | |
|---|---|---|---|---|---|---|---|---|
| C1 | Is clip loaded? | Yes | | No | | | | |
| C3 | Is clip on high bandwidth list? | Yes | No | | | | | |
| A1 | Remove clip from high bandwidth task list | ✓ | | | | | | |
| A2 | Restore clip requirements to bandwidth available | ✓ | | | | | | |
| A3 | Return OK response to requestor | ✓ | | | | | | |
| A4 | Return error response to requestor | | ✓ | ✓ | | | | |
| | D I S P O S I T I O N | Done | Done | Done | | | | |

Fig. 111 – Process Bandwidth Hog Off 984

| 985 | State Request Processor<br>Process Query State | | | | | | |
|---|---|---|---|---|---|---|---|
| C1 | Is clip loaded? | Yes | No | | | | |
| C2 | Is clip on intensive task list? | | | Yes | No | | |
| C3 | Is clip on high bandwidth task list? | | | | | Yes | No |
| A1 | Return clip state to requestor | ✓ | | | | | |
| A2 | Return Intensive Task True response to requestor | | | ✓ | | | |
| A3 | Return Intensive Task False response to requestor | | | | ✓ | | |
| A4 | Return High Bandwidth Task True response to requestor | | | | | ✓ | |
| A5 | Return High Bandwidth Task False response to requestor | | | | | | ✓ |
| A6 | Return OK response to requestor | | | | | ✓ | ✓ |
| A7 | Return error response to requestor | | ✓ | | | | |
| | D I S P O S I T I O N | C2 | Done | C3 | C3 | Done | Done |

Fig. 112 – Process Query State 985

| 986 | State Request Processor<br>Process Query Cycle Pig | | |
|---|---|---|---|
| C1 | Is any clip on intensive task list? | Yes | No |
| A1 | Return True response to requestor | ✓ | |
| A2 | Return cycles available to requestor | ✓ | |
| A3 | Return False response to requestor | | ✓ |
| | D I S P O S I T I O N | Done | Done |

Fig. 113 – Process Query Cycle Pig 986

| 987 | State Request Processor Process Query Bandwidth Hog | | | | | | | |
|---|---|---|---|---|---|---|---|---|
| C1 | Is any clip on high bandwidth task list? | Yes | No | | | | | |
| A1 | Return True response to requestor | ✓ | | | | | | |
| A2 | Return bandwidth available to requestor | ✓ | | | | | | |
| A3 | Return False response to requestor | | ✓ | | | | | |
| | D I S P O S I T I O N | Done | Done | | | | | |

Fig. 114 – Process Query Bandwidth Hog 987

| 990 | Local Volume Request Processor | | | | | | | |
|---|---|---|---|---|---|---|---|---|
| C1 | Request type? | Set Loc Vol | Loc Vol On | Loc Vol Off | Query Loc Vol | Oth | | |
| A1 | Process Set Local Volume (991) | ✓ | | | | | | |
| A2 | Process Turn Local Volume On (992) | | ✓ | | | | | |
| A3 | Process Turn Local Volume Off (993) | | | ✓ | | | | |
| A4 | Process Query Local Volume (994) | | | | ✓ | | | |
| A5 | Return error response to requestor | | | | | ✓ | | |
| | D I S P O S I T I O N | Done | Done | Done | Done | Done | | |

Fig. 115 – Local Volume Request Processor 990

| 991 | Local Volume Request Processor<br>Process Set Local Volume | | | | | | |
|---|---|---|---|---|---|---|---|
| C1 | Is clip loaded? | Yes | No | | | | |
| C2 | Do permissions allow local volume control? | Yes | No | | | | |
| C3 | Is Global Volume ON? | | | | Yes | Yes | No |
| C4 | Is Local Volume ON? | | | | Yes | No | |
| A1 | Get volume argument | ✓ | | | | | |
| A2 | Call clip's set sound volume routine | | | | ✓ | | |
| A3 | Save sound volume in clip's slot | | | | ✓ | ✓ | ✓ |
| A5 | Return OK response to requestor | | | | ✓ | ✓ | ✓ |
| A6 | Return error response to requestor | | ✓ | ✓ | | | |
| | D I S P O S I T I O N | C3 | Done | Done | Done | Done | Done |

Fig. 116 – Process Set Local Volume 991

| 992 | Local Volume Request Processor<br>Process Turn Local Volume On | | | | |
|---|---|---|---|---|---|
| C1 | Is clip loaded? | Yes | Yes | Yes | No |
| C2 | Do permissions allow local volume control? | Yes | Yes | No | |
| C3 | Is Global Volume ON? | Yes | No | | |
| A1 | Call clip's set sound volume routine | ✓ | | | |
| A2 | Set volume ON in clip's slot | ✓ | ✓ | | |
| A3 | Propagate volume ON to clip's children that obey | ✓ | ✓ | | |
| A4 | Return OK response to requestor | ✓ | ✓ | | |
| A5 | Return error response to requestor | | | ✓ | ✓ |
| | D I S P O S I T I O N | Done | Done | Done | Done |

Fig. 117 – Process Local Volume On 992

| 993 | Local Volume Request Processor Process Turn Local Volume Off | | | | | | | | |
|---|---|---|---|---|---|---|---|---|---|
| C1 | Is clip loaded? | Yes | | No | | | | | |
| C2 | Do permissions allow local volume control? | Yes | | No | | | | | |
| C3 | Is Global Volume ON? | Yes | No | | | | | | |
| A1 | Call clip's set sound volume routine | ✓ | | | | | | | |
| A2 | Set volume OFF in clip's slot | ✓ | ✓ | | | | | | |
| A3 | Propagate volume OFF to clip's children that obey | ✓ | ✓ | | | | | | |
| A4 | Return OK response to requestor | ✓ | ✓ | | | | | | |
| A5 | Return error response to requestor | | | ✓ | ✓ | | | | |
| | DISPOSITION | Done | Done | Done | Done | | | | |

Fig. 118 – Process Local Volume Off 993

| 994 | Local Volume Request Processor Process Query Local Volume | | | | | | | | |
|---|---|---|---|---|---|---|---|---|---|
| C1 | Is clip loaded? | Yes | No | | | | | | |
| A1 | Return clip's local sound volume to requestor | ✓ | | | | | | | |
| A2 | Return clip's on/off status to requestor | ✓ | | | | | | | |
| A3 | Return OK response to requestor | ✓ | | | | | | | |
| A4 | Return error response to requestor | | ✓ | | | | | | |
| | DISPOSITION | Done | Done | | | | | | |

Fig. 119 – Process Query Local Volume 994

| 1000 | Global Volume Request Processor | | | | | |
|---|---|---|---|---|---|---|
| C1 | Request type? | Set Gbl Vol | Gbl Vol On | Gbl Vol Off | Query Gbl Vol | Oth |
| A1 | Process Set Global Volume (1001) | ✓ | | | | |
| A2 | Process Turn Global Volume On (1002) | | ✓ | | | |
| A3 | Process Turn Global Volume Off (1003) | | | ✓ | | |
| A4 | Process Query Global Volume (1004) | | | | ✓ | |
| A5 | Return error response to requestor | | | | | ✓ |
| | D I S P O S I T I O N | Done | Done | Done | Done | Done |

Fig. 120 – Global Volume Request Processor 1000

| 1001 | Global Volume Request Processor<br>Process Set Global Volume | | | | |
|---|---|---|---|---|---|
| C1 | Do permissions allow global volume control? | Yes | No | | |
| C2 | Is Global Volume ON? | | | Yes | No |
| A1 | Get volume argument and convert to the fraction of the maximum volume (between 0.0 and 1.0) | ✓ | | | |
| A2 | Save global volume and fraction | ✓ | | | |
| A3 | Process Turn Global Volume On (1002) to invoke new volume level | | | ✓ | |
| A4 | Return OK response to requestor | | | ✓ | ✓ |
| A5 | Return error response to requestor | | ✓ | | |
| | D I S P O S I T I O N | C2 | Done | Done | Done |

Fig. 121 – Process Set Global Volume 1001

| 1002 | Global Volume Request Processor<br>Process Turn Global Volume On | | | | | | | | |
|------|---|---|---|---|---|---|---|---|---|
| C1 | Do permissions allow global volume control? | Yes | No | | | | | | |
| L2 | Loop through all clips | | | Ent | | Loop | | | Exit |
| C3 | More clips? | | | | Yes | No | | | |
| C4 | Is clip local volume ON? | | | | | | Yes | No | |
| A1 | Set global sound volume ON | ✓ | | | | | | | |
| A2 | Get next clip | | | | ✓ | | | | |
| A3 | Call clip's set sound volume routine (with clip's volume level argument) | | | | | | ✓ | | |
| A4 | Return OK response to requestor | | | | | | | | ✓ |
| A5 | Return error response to requestor | | ✓ | | | | | | |
| | DISPOSITION | L2 Ent | Done | L2 Loop | C4 | L2 Exit | L2 Loop | L2 Loop | Done |

Fig. 122 – Process Global Volume On 1002

| 1003 | Global Volume Request Processor<br>Process Turn Global Volume Off | | | | | | | | |
|------|---|---|---|---|---|---|---|---|---|
| C1 | Do permissions allow global volume control? | Yes | No | | | | | | |
| L2 | Loop through all clips | | | Ent | | Loop | | | Exit |
| C3 | More clips? | | | | Yes | No | | | |
| C4 | Is clip local volume ON? | | | | | | Yes | No | |
| A1 | Set global sound volume OFF | ✓ | | | | | | | |
| A2 | Get next clip | | | | ✓ | | | | |
| A3 | Call clip's set sound volume routine (with zero argument) | | | | | | ✓ | | |
| A4 | Return OK response to requestor | | | | | | | | ✓ |
| A5 | Return error response to requestor | | ✓ | | | | | | |
| | DISPOSITION | L2 Ent | Done | L2 Loop | C4 | L2 Exit | L2 Loop | L2 Loop | Done |

Fig. 123 – Process Global Volume Off 1003

| 1004 | Global Volume Request Processor<br>Process Query Global Volume | | | | | | | | |
|---|---|---|---|---|---|---|---|---|---|
| C1 | Global Volume? | ON | OFF | | | | | | |
| A1 | Return global sound ON status to requestor | ✓ | | | | | | | |
| A2 | Return global sound OFF status to requestor | | ✓ | | | | | | |
| A3 | Return global volume level to requestor | ✓ | ✓ | | | | | | |
| A4 | Return OK response to requestor | ✓ | ✓ | | | | | | |
| | D I S P O S I T I O N | Done | Done | | | | | | |

Fig. 124 – Process Query Global Volume 1004

| 1100 | Load Asset Manager Components | | | | | | | | |
|---|---|---|---|---|---|---|---|---|---|
| C1 | Enter | Yes | | | | | | | |
| A1 | Process Dup List (1101) | ✓ | | | | | | | |
| A2 | Load Network Bandwidth Speedometer (1102) | ✓ | | | | | | | |
| A3 | Process Level List (1103) | ✓ | | | | | | | |
| A4 | Process Swf List (1104) | ✓ | | | | | | | |
| A5 | Process Speedo List (1105) | ✓ | | | | | | | |
| | D I S P O S I T I O N | Done | | | | | | | |

Fig. 125 – Load Asset Manager Components 1100

| 1101 | Load Asset Manager Components Process Dup List | | | | | | | |
|---|---|---|---|---|---|---|---|---|
| L1 | Loop over Dup List entries | Ent | Loop | Exit | | | | |
| C2 | More entries? | | Yes | No | | | | |
| A1 | Extract info about container | | ✓ | | | | | |
| A2 | Create Container (1106) | | ✓ | | | | | |
| | D I S P O S I T I O N | L1 Loop | L1 Loop | L1 Exit | Done | | | |

Fig. 126 – Process Dup List 1101

| 1102 | Load Asset Manager Components Load Network Bandwidth Speedometer | | | | | | | |
|---|---|---|---|---|---|---|---|---|
| C1 | Enter | Yes | | | | | | |
| C2 | Is load finished? | | No | Yes | | | | |
| A1 | Extract Network Bandwidth Speedometer from 1st entry of Speedo List | ✓ | | | | | | |
| A2 | Create Container (1106) | ✓ | | | | | | |
| A3 | Load Clip (1107) | ✓ | | | | | | |
| A4 | Start Network Bandwidth Speedometer (1120) | ✓ | | | | | | |
| | D I S P O S I T I O N | C2 | C2 | Done | | | | |

Fig. 127 – Load Network Bandwidth Speedometer 1102

| 1103 | Load Asset Manager Components Process Level List | | | | | | | |
|---|---|---|---|---|---|---|---|---|
| L1 | Loop over Level List entries | Ent | Loop | Exit | | | | |
| C2 | More entries? | | Yes | No | | | | |
| A1 | Extract info about level | | ✓ | | | | | |
| A2 | Create Container (1106) | | ✓ | | | | | |
| A3 | Load Clip (1107) | | ✓ | | | | | |
| | DISPOSITION | L1 Loop | L1 Loop | L1 Exit | Done | | | |

Fig. 128 – Process Level List 1103

| 1104 | Load Asset Manager Components Process Swf List | | | | | | | |
|---|---|---|---|---|---|---|---|---|
| L1 | Loop over Swf List entries | Ent | Loop | Exit | | | | |
| C2 | More entries? | | Yes | No | | | | |
| A1 | Extract info about .swf file | | ✓ | | | | | |
| A2 | Create Container (1106) | | ✓ | | | | | |
| A3 | Load Clip (1107) | | ✓ | | | | | |
| | DISPOSITION | L1 Loop | L1 Loop | L1 Exit | Done | | | |

Fig. 129 – Process Swf List 1104

| 1105 | Load Asset Manager Components  Process Speedo List | | | | | | | |
|---|---|---|---|---|---|---|---|---|
| L1 | Loop over Speedo List entries | Ent | Loop | Exit | | | | |
| C2 | More entries? | | Yes | No | | | | |
| A1 | Extract info about speedometer or spy file | | ✓ | | | | | |
| A2 | Create Container (1106) | | ✓ | | | | | |
| A3 | Load Clip (1107) | | ✓ | | | | | |
| | D I S P O S I T I O N | L1 Loop | L1 Loop | L1 Exit | Done | | | |

Fig. 130 – Process Speedo List 1105

| 1106 | Load Asset Manager Components  Create Container | | | | | | | |
|---|---|---|---|---|---|---|---|---|
| C1 | Is load at a level? | Yes | No | | | | | |
| C2 | Is a container supplied? | | Yes | No | | | | |
| C3 | Are coordinates supplied? | | | | Yes | No | | |
| A1 | Set up level args for Load Clip | ✓ | | | | | | |
| A2 | Create container with name and depth on level specified in args | | | ✓ | | | | |
| A3 | Set coordinates | | | | ✓ | | | |
| A4 | Set up container args for Load Clip | | | | ✓ | ✓ | | |
| | D I S P O S I T I O N | Done | C3 | C3 | Done | Done | | |

Fig. 131 – Create Container 1106

| 1107 | Load Asset Manager Components Load Clip | | | | | | | | |
|---|---|---|---|---|---|---|---|---|---|
| C1 | Is Network Bandwidth Speedometer to be notified of this load? | Yes | No | | | | | | |
| C2 | Is clip load to be monitored? | | | Yes | No | | | | |
| A1 | Force monitor target to clip Playing | ✓ | | | | | | | |
| A2 | Add clip to monitor list with start time and load state of Inited | | | ✓ | | | | | |
| A3 | Start Load Monitor (1110) (may already be running--and that's | | | ✓ | | | | | |
| A4 | Load clip into level/container specified | | | ✓ | ✓ | | | | |
| | D I S P O S I T I O N | C2 | C2 | Done | Done | | | | |

Fig. 132 – Load Clip 1107

| 1110 | Load Monitor | | | | | | | |
|---|---|---|---|---|---|---|---|---|
| C1 | Are there entries in the monitor list? | No | | Yes | | | | |
| L2 | Loop through loads to be monitored | | Ent | Loop | | Exit | | |
| C3 | More entries to process? | | | Yes | No | | | |
| C4 | Has load reached monitor target? | | | Yes | No | | | |
| A1 | Stop until restarted | ✓ | | | | | | |
| A2 | Process Monitor State (1111) | | | | ✓ | | | |
| A3 | Wait until next frame | | | | | | ✓ | |
| | D I S P O S I T I O N | Stop C1 | L2 Loop | L2 Loop | L2 Loop | L2 Exit | Wait C1 | |

Fig. 133 – Load Monitor 1110

| 1111 | Load Monitor<br>Process Monitor State | | | | | | | | |
|---|---|---|---|---|---|---|---|---|---|
| C1 | Current monitor state? | Initied | Loading | Loaded | Playing | Stopped | Done | | |
| C2 | Has monitor target been reached? | | | | | | | Yes | No |
| A1 | Check Loading Started (1112) | ✓ | | | | | | | |
| A2 | Check Loading Complete (1113) | | ✓ | | | | | | |
| A3 | Check Playing Started (1114) | | | ✓ | | | | | |
| A4 | Check Playing Stopped (1115) | | | | ✓ | | | | |
| A5 | Call callback routine, if any | | | | | | | ✓ | |
| A6 | Mark entry done | | | | | | | ✓ | |
| | D I S P O S I T I O N | C3 | C3 | C3 | C3 | Done | Done | Done | Done |

Fig. 134 – Process Monitor State 1111

| 1112 | Load Monitor<br>Check Loading Started | | | | | | | | |
|---|---|---|---|---|---|---|---|---|---|
| C1 | Is current load frame greater than 0? | Yes | No | | | | | | |
| C2 | Has timeout expired? | | No | Yes | | | | | |
| A1 | Set monitor state to Loading | ✓ | | | | | | | |
| A2 | Increment time for timeout test | | ✓ | | | | | | |
| A3 | Set load state to Done | | | ✓ | | | | | |
| | D I S P O S I T I O N | Done | Done | Done | | | | | |

Fig. 135 – Check Loading Started 1112

| 1113 | Load Monitor Check Loading Complete | | | | | | | | |
|---|---|---|---|---|---|---|---|---|---|
| C1 | Is current load frame at total frames? | Yes | No | | | | | | |
| C2 | Has timeout expired? | | No | Yes | | | | | |
| A1 | Set monitor state to Loaded | ✓ | | | | | | | |
| A2 | Increment time for timeout test | | ✓ | | | | | | |
| A3 | Set load state to Done | | | ✓ | | | | | |
| | D I S P O S I T I O N | Done | Done | Done | | | | | |

Fig. 136 – Check Loading Compete 1113

| 1114 | Load Monitor Check Playing Started | | | | | | | | |
|---|---|---|---|---|---|---|---|---|---|
| C1 | Is current frame greater than 0? | Yes | No | | | | | | |
| C2 | Has timeout expired? | | No | Yes | | | | | |
| C3 | Is Network Bandwidth Speedo to be informed? | | | | Yes | No | | | |
| A1 | Set monitor state to Playing | ✓ | | | | | | | |
| A2 | Increment time for timeout test | | ✓ | | | | | | |
| A3 | Set load state to Done | | | ✓ | | | | | |
| A4 | Report clip to Network Bandwidth Speedo (1120) | | | | ✓ | | | | |
| | D I S P O S I T I O N | C3 | Done | Done | Done | Done | | | |

Fig. 137 – Check Playing Started 1114

| 1115 | Load Monitor Check Playing Stopped | | | | | | | | |
|---|---|---|---|---|---|---|---|---|---|
| C1 | Is current frame same as last check? | Yes | No | | | | | | |
| C2 | Has timeout expired? | | No | Yes | | | | | |
| A1 | Set monitor state to Stopped | ✓ | | | | | | | |
| A2 | Increment time for timeout test | | ✓ | | | | | | |
| A3 | Set load state to Done | | | ✓ | | | | | |
| | DISPOSITION | Done | Done | Done | | | | | |

Fig. 138 – Check Playing Stopped 1115

| 1120 | Network Bandwidth Speedometer | | | | | | | | |
|---|---|---|---|---|---|---|---|---|---|
| C1 | Is speedo on? | No | Yes | | | | | | |
| C2 | Has average changed bandwidth category? | | Yes | No | | | | | |
| A1 | Get current time as clip's finish time | ✓ | | | | | | | |
| A2 | Compute load time from start and finish | ✓ | | | | | | | |
| A3 | Compute instantaneous rate for that clip (in bytes per second) | ✓ | | | | | | | |
| A4 | Accumulate load time and size into a new running average rate (in bytes | ✓ | | | | | | | |
| A5 | Set new Bandwidth Category (used for clip variant choice (see | | ✓ | | | | | | |
| A6 | Set new Bandwidth Available value (used for Bandwidth Hog processing) | | ✓ | | | | | | |
| | DISPOSITION | Done | C2 | Done | Done | | | | |

Fig. 139 – Network Bandwidth Speedometer 1120

| 1121 | Network Bandwidth Speedometer Turn On Speedo | | | | | | | | |
|---|---|---|---|---|---|---|---|---|---|
| C1 | Is speedo on? | No | Yes | | | | | | |
| A1 | Set ON flag | ✓ | | | | | | | |
| | DISPOSITION | Done | Done | | | | | | |

Fig. 140 – Turn On Speedo 1121

| 1122 | Network Bandwidth Speedometer Turn Off Speedo | | | | | | | |
|---|---|---|---|---|---|---|---|---|
| C1 | Is speedo on? | No | Yes | | | | | |
| A1 | Clear ON flag | | ✓ | | | | | |
| | DISPOSITION | Done | Done | | | | | |

Fig. 141 – Turn Off Speedo 1122

| 1130 | CPU Cycles Speedometer | | | | | | | |
|---|---|---|---|---|---|---|---|---|
| C1 | Enter at frame 1 | Yes | | | | | | |
| C2 | Is speedometer on? | No | Yes | | | | | |
| C3 | Has average changed cycles category? | | | Yes | No | | | |
| C4 | Has control variable frame number been reached? | | | | | | No | Yes |
| C5 | Is this the last frame? | | | | | No | Yes | |
| A1 | Get start time | | ✓ | | | | | |
| A2 | Run measured loop | | ✓ | | | | | |
| A3 | Get finish time | | ✓ | | | | | |
| A4 | Compute loop time from start and finish | | ✓ | | | | | |
| A5 | Compute instantaneous rate for loop (in operations per second) | | ✓ | | | | | |
| A6 | Accumulate loop time and size into a new running average rate (in ops per | | ✓ | | | | | |
| A7 | Set new Cycles Category (used for clip variant choice (see | | | ✓ | | | | |
| A8 | Set new Cycles Available value (used for Cycle Pig processing) | | | ✓ | | | | |
| A9 | Set new control variable | | | ✓ | | | | |
| A10 | Advance to next frame | | | ✓ | ✓ | ✓ | | |
| A11 | Jump back to frame 1 | | | | | | ✓ | ✓ |
| | DISPOSITION | Stop C1 | C3 | C4 | C4 | C4 | C1 | C1 |

Fig. 142 – CPU Cycles Speedometer 1130

| 1131 | CPU Cycles Speedometer<br>Turn On Speedo | | | | | | | | |
|---|---|---|---|---|---|---|---|---|---|
| C1 | Is speedometer on? | Yes | No | | | | | | |
| A1 | Set loop enable flag | | ✓ | | | | | | |
| A2 | Start loop (1130) | | ✓ | | | | | | |
| | D I S P O S I T I O N | Done | Done | | | | | | |

Fig. 143 – Turn On Speedo 1131

| 1132 | CPU Cycles Speedometer<br>Turn Off Speedo | | | | | | | | |
|---|---|---|---|---|---|---|---|---|---|
| C1 | Is speedometer on? | Yes | No | | | | | | |
| A1 | Clear loop enable flag | ✓ | | | | | | | |
| | D I S P O S I T I O N | Done | Done | | | | | | |

Fig. 144 – Turn Off Speedo 1132

| 1140 | Frame Rate Speedometer | | | | | | | |
|---|---|---|---|---|---|---|---|---|
| C1 | Enter at frame 1 | Yes | | | | | | |
| C2 | Is speedometer on? | No | Yes | | | | | |
| C3 | Does frame number equal control variable? | | | No | Yes | | | |
| C4 | Has average changed frame rate category? | | | | | Yes | No | |
| A1 | Get start time | | ✓ | | | | | |
| A2 | Advance to next frame | | ✓ | ✓ | | | | |
| A3 | Get finish time | | | | ✓ | | | |
| A4 | Compute frame time from start and finish | | | | ✓ | | | |
| A5 | Compute instantaneous frame rate (in frames per second) | | | | ✓ | | | |
| A6 | Accumulate frame time and count into a new running average rate (in frames | | | | ✓ | | | |
| A7 | Set new Frame Rate Category | | | | | ✓ | | |
| A8 | Adjust Cycles Category and Cycles Available for Frame Rate Category (used for clip variant choice (see | | | | | ✓ | | |
| A9 | Jump back to frame 1 | | | | | ✓ | ✓ | |
| | DISPOSITION | Stop C1 | C3 | C3 | C4 | C1 | C1 | |

Fig. 145 – Frame Rate Speedometer 1140

| 1141 | Frame Rate Speedometer<br>Turn On Speedo | | | | | | | |
|---|---|---|---|---|---|---|---|---|
| C1 | Is speedometer on? | Yes | No | | | | | |
| A1 | Set loop enable flag | | ✓ | | | | | |
| A2 | Start loop (1140) | | ✓ | | | | | |
| | DISPOSITION | Done | Done | | | | | |

Fig. 146 – Turn On Speedo 1141

| 1142 | Frame Rate Speedometer Turn Off Speedo | | | | | | | |
|---|---|---|---|---|---|---|---|---|
| C1 | Is speedometer on? | Yes | No | | | | | |
| A1 | Clear loop enable flag | ✓ | | | | | | |
| | DISPOSITION | Done | Done | | | | | |

Fig. 147 – Turn Off Speedo 1142

| 1200 | Bootstrap<br>RunTime Bootstrap | | | | | | | | |
|---|---|---|---|---|---|---|---|---|---|
| C1 | Starting? | Yes | | | | | | | |
| A1 | Site URL access causes bootstrap to be loaded<br>Bootstrap performs remaining operations | ✓ | | | | | | | |
| A2 | Set startup flag | ✓ | | | | | | | |
| A3 | Load Preloader (1210) | ✓ | | | | | | | |
| A4 | Load Asset Manager/Active Content Loader (1220) | ✓ | | | | | | | |
| A5 | Load Session (1230) | ✓ | | | | | | | |
| A6 | Load Tables (1240) | ✓ | | | | | | | |
| | DISPOSITION | Done | | | | | | | |

Fig. 148 – Bootstrap 1200

| 1210 | Load Preloader<br>RunTime Bootstrap | | | | | | | | |
|---|---|---|---|---|---|---|---|---|---|
| C1 | Entry? | Yes | | | | | | | |
| C2 | Preloader loaded? | | No | Yes | | | | | |
| C3 | Was preloader load fast or slow? | | | | Fast | Slow | | | |
| A1 | Load Preloader<br>Get load start time | ✓ | | | | | | | |
| A2 | Get load finish time<br>Compute total load time<br>Save load time and size for later | | | ✓ | | | | | |
| A3 | Preloader starts playing automatically | | | | | ✓ | | | |
| A4 | Preloader sets its pointer in the /vars block | | | | | ✓ | | | |
| | DISPOSITION | C2 | C2 | C3 | Done | Done | | | |

Fig. 149 – Load Preloader 1210

| 1220 | Load Asset Manager / Active Content Loader RunTime Bootstrap | | | | | | | | |
|---|---|---|---|---|---|---|---|---|---|
| C1 | Entry? | Yes | | | | | | | |
| C2 | AM / ACL loaded? | | No | Yes | | | | | |
| A1 | Load AM / ACL<br>Get load start time | ✓ | | | | | | | |
| A2 | Get load finish time<br>Compute total load time<br>Save load time and size for later | | | ✓ | | | | | |
| A3 | AM initializes itself | | | ✓ | | | | | |
| A4 | AM sets its /vars block pointer to indicate it is initialized and ready to operate | | | ✓ | | | | | |
| A5 | ACL initializes itself | | | ✓ | | | | | |
| A6 | ACL sets its /vars block pointer to indicate it is initialized and ready to operate | | | ✓ | | | | | |
| | DISPOSITION | C2 | C2 | Done | | | | | |

Fig. 150 – Load Asset Manager / Active Content Loader 1220

| 1230 | Load Session RunTime Bootstrap | | | | | | | | |
|---|---|---|---|---|---|---|---|---|---|
| C1 | Entry? | Yes | | | | | | | |
| C2 | Is Session loaded? | | No | Yes | | | | | |
| A1 | Register with AM for Session<br>Save Session Slot pointer | ✓ | | | | | | | |
| A2 | Set Session info into its slot<br>Mark slot urgent | ✓ | | | | | | | |
| A3 | Issue load request to AM via slot | ✓ | | | | | | | |
| A4 | Session starts playing automatically (1300) | | | ✓ | | | | | |
| | DISPOSITION | C2 | C2 | Done | | | | | |

Fig. 151 – Load Session 1230

| 1240 | Load Tables RunTime Bootstrap | | | | | | | | |
|---|---|---|---|---|---|---|---|---|---|
| C1 | Entry? | Yes | | | | | | | |
| C2 | Is startup flag still set? | | Yes | No | | | | | |
| C3 | Are Tables loaded? | | | | No | Yes | | | |
| A1 | Register with AM for Tables Save Tables Slot pointer | ✓ | | | | | | | |
| A2 | Set Tables info into its slot Mark slot normal | | | ✓ | | | | | |
| A3 | Issue load request to AM via slot | | | ✓ | | | | | |
| A4 | Tables starts playing automatically | | | | | ✓ | | | |
| A5 | Tables sets its /vars block pointer to indicate it is initialized and ready to operate | | | | | ✓ | | | |
| | DISPOSITION | C2 | C2 | C3 | C3 | Done | | | |

Fig. 152 – Load Tables 1240

| 1300 | Init Projects<br>Session Operation | | | | | | | | |
|---|---|---|---|---|---|---|---|---|---|
| C1 | Is Session completely loaded? | No | Yes | | | | | | |
| L2 | For each project | | | Ent | Loop | Exit | | | |
| C3 | More projects? | | | | Yes | No | | | |
| C4 | Is first project loaded? | | | | | | No | Yes | |
| A1 | Session starts playing automatically | ✓ | ✓ | | | | | | |
| A2 | Set ready flag | | ✓ | | | | | | |
| A3 | Set pointer for base of persistent data blocks | | ✓ | | | | | | |
| A4 | Dup container for project file<br>Set project pointer array in /vars block | | | | ✓ | | | | |
| A5 | Register with AM for first project<br>Save project Slot pointer | | | | | | ✓ | | |
| A6 | Set first project info into its slot<br>Mark slot urgent | | | | | | ✓ | | |
| A7 | Issue load request to AM via slot<br>Set current project index to 1 | | | | | | ✓ | | |
| A8 | First Project starts playing automatically (1400) | | | | | | | | ✓ |
| A9 | Init Projects - continued (1310) | | | | | | | | ✓ |
| | DISPOSITION | C1 | L2 | L2 Loop | L2 Loop | L2 Exit | C4 | C4 | Done |

Fig. 153 – Play Session 1300

| 1310 | Init Projects - continued<br>Session Operation | | | |
|---|---|---|---|---|
| L1 | For each remaining project after the first | Ent | Loop | Exit |
| C3 | More projects? | | Yes | No |
| A1 | Register with AM for project<br>Save project Slot pointer | | ✓ | |
| A2 | Set project info into its slot<br>Mark slot urgent | | ✓ | |
| | DISPOSITION | L1 Loop | L1 Loop | L1 Exit | Done |

Fig. 154 – Init Projects 1310

| 1320 | doDone() Session Routine | | | | | | | |
|---|---|---|---|---|---|---|---|---|
| C1 | Entry? | Yes | | | | | | |
| C2 | Project index valid? | | Yes | No | | | | |
| A1 | Increment current project index | ✓ | | | | | | |
| A2 | Select slot for new current project | | ✓ | | | | | |
| A3 | Issue load request to AM via slot | | ✓ | | | | | |
| A4 | Project starts playing automatically (1400) | | ✓ | | | | | |
| A5 | Web site finished | | | ✓ | | | | |
| | DISPOSITION | C2 | Done | Done | | | | |

Fig. 155 – Session doDone( ) 1320

| 1400 | Play Project<br>Project Operation | | | | | | | | |
|---|---|---|---|---|---|---|---|---|---|
| C1 | Is Project completely loaded? | No | Yes | | | | | | |
| A1 | Project starts playing automatically | ✓ | ✓ | | | | | | |
| A2 | Set ready flag | | ✓ | | | | | | |
| A3 | Initialize project variables<br>Set current project pointer in /vars block | | ✓ | | | | | | |
| A4 | Dup container for Scene 1 | | ✓ | | | | | | |
| A5 | Register with AM for Scene 1<br>Save project Slot pointer | | ✓ | | | | | | |
| A6 | Set Scene 1 info into its slot<br>Mark slot urgent | | ✓ | | | | | | |
| A7 | Issue prep, stage, load and play requests<br>to AM via slot<br>Set current scene index to 1 | | ✓ | | | | | | |
| A8 | Dup container for Scene 2 | | ✓ | | | | | | |
| A9 | Register with AM for Scene 2<br>Save project Slot pointer | | ✓ | | | | | | |
| A10 | Set Scene 2 info into its slot<br>Mark slot normal | | ✓ | | | | | | |
| A11 | Issue prep and stage requests to AM via slot | | ✓ | | | | | | |
| A12 | Wait Scene 1 Play (1410) | | ✓ | | | | | | |
| | DISPOSITION | C1 | Done | | | | | | |

Fig. 156 – Play Project 1400

| 1410 | Wait Scene 1 Play Project Operation | | | | | | | | |
|---|---|---|---|---|---|---|---|---|---|
| C1 | Is Scene 1 playing? | No | Yes | | | | | | |
| C2 | Are Tables ready? | | | No | Yes | | | | |
| A1 | Clear startup flag | | ✓ | | | | | | |
| A2 | Request new table for Scene Table<br>Save table pointer | | | | ✓ | | | | |
| A3 | Request new table for Scene 2 Quicklink Table<br>Save table pointer in Scene 2 slot | | | | ✓ | | | | |
| A4 | Init Scene Table | | | | ✓ | | | | |
| A5 | Init Scene 2 Quicklink Table | | | | ✓ | | | | |
| A6 | Request new table for Scene 1 Quicklink Table<br>Save table pointer in Scene 1 slot | | | | ✓ | | | | |
| A7 | Init Scene 1 Quicklink Table | | | | ✓ | | | | |
| A8 | Add all quicklinkable Scene 1 components<br>to the Scene 1 Quicklink Table | | | | ✓ | | | | |
| A9 | Set current Quicklink Table pointer to<br>Scene 1's Quicklink Table | | | | ✓ | | | | |
| A10 | Build Scene Table (1420) | | | | ✓ | | | | |
| | DISPOSITION | C1 | C2 | C2 | Done | | | | |

Fig. 157 – Wait Scene 1 Play 1410

| 1420 | Build Scene Table Project Operation | | | | | | | | |
|---|---|---|---|---|---|---|---|---|---|
| C1 | Entry? | Yes | | | | | | | |
| L2 | Create remaining scenes | | Entry | Loop | Exit | | | | |
| C3 | More scenes? | | | Yes | No | | | | |
| A1 | Add Scene 1 to Scene Table | ✓ | | | | | | | |
| A2 | Add Scene 2 to Scene Table | ✓ | | | | | | | |
| A3 | Duplicate container for scene | | | ✓ | | | | | |
| A4 | Register scene with AM<br>Save scene slot pointer | | | ✓ | | | | | |
| A5 | Set scene info in slot<br>Mark slot normal | | | ✓ | | | | | |
| A6 | Request new table for scene's Quicklink Table | | | ✓ | | | | | |
| A7 | Add scene to Scene Table | | | ✓ | | | | | |
| A8 | Finish Scene Init (1430) | | | | ✓ | | | | |
| | DISPOSITION | L2 Entry | L2 Loop | L2 Loop | L2 Exit | Done | | | |

Fig. 158 – Build Scene Table 1420

| 1430 | Finish Scene Init Project Operation | | | | | | | | |
|---|---|---|---|---|---|---|---|---|---|
| L1 | For scenes after Scene 2 | Entry | Loop | Exit | | | | | |
| C2 | More scenes? | | Yes | No | | | | | |
| A1 | Init Scene's Quicklink Table | | ✓ | | | | | | |
| A2 | Set project table pointer to indicate that project tables are available | | | ✓ | | | | | |
| | DISPOSITION | L1 Loop | L1 Loop | L1 Exit | Done | | | | |

Fig. 159 – Finish Scene Init 1430

| 1440 | doDone() Project Routine | | | | | | | | |
|---|---|---|---|---|---|---|---|---|---|
| C1 | Are tables available? | No | Yes | | | | | | |
| C2 | Looping enabled? | | | Yes | No | | | | |
| C3 | Scene index too large? | | | Yes | No | | | | |
| A1 | Ignore request | ✓ | | | | | | | |
| A2 | Call doOldScene() (1490) | | ✓ | | | | | | |
| A3 | Increment current scene index | | ✓ | | | | | | |
| A4 | Reset current scene index to 1 | | | ✓ | | | | | |
| A5 | Call doNewScene() (1500) | | | ✓ | ✓ | ✓ | | | |
| A6 | Call doNextScene() (1510) | | | ✓ | ✓ | ✓ | | | |
| | DISPOSITION | Done | C2 | Done | Done | Done | | | |

Fig. 160 – Project doDone( ) 1440

| 1450 | doJump() Project Routine | | | | | | | | | |
|---|---|---|---|---|---|---|---|---|---|---|
| C1 | Are tables available? | No | Yes | | | | | | | |
| C2 | Scene Found? | | | No | Yes | | | | | |
| A1 | Ignore request | ✓ | | | | | | | | |
| A2 | Extract destination scene ID | | ✓ | | | | | | | |
| A3 | Look up ID in Scene Table | | ✓ | | | | | | | |
| A4 | Call doOldScene() (1490) | | | ✓ | ✓ | | | | | |
| A5 | Call Session doDone() (1310) | | | ✓ | | | | | | |
| A6 | Set new destination scene ID | | | | ✓ | | | | | |
| A7 | Mark new scene's slot urgent | | | | ✓ | | | | | |
| A8 | Issue prep, stage, and load requests to AM via slot | | | | ✓ | | | | | |
| A9 | Call doNewScene() (1500) | | | | ✓ | | | | | |
| A10 | Call doNextScene() (1510) | | | | ✓ | | | | | |
| | DISPOSITION | Done | C2 | Done | Done | | | | | |

Fig. 161 – Project doJump( ) 1450

| 1460 | doForceDone() Project Routine | | | | | | | |
|---|---|---|---|---|---|---|---|---|
| C1 | Entry? | Yes | | | | | | |
| A1 | Set force flag true | ✓ | | | | | | |
| A2 | Call doDone() (1440) | ✓ | | | | | | |
| | DISPOSITION | Done | | | | | | |

Fig. 162 – Project doForceDone( ) 1460

| 1470 | doHold()<br>Project Routine | | | | | | | | |
|---|---|---|---|---|---|---|---|---|---|
| C1 | Entry? | Yes | | | | | | | |
| A1 | Increment hold count | ✓ | | | | | | | |
| | DISPOSITION | Done | | | | | | | |

Fig. 163 – Project doHold( ) 1470

| 1480 | doRelease()<br>Project Routine | | | | | | | | |
|---|---|---|---|---|---|---|---|---|---|
| C1 | Entry? | Yes | | | | | | | |
| A1 | Decrement hold count | ✓ | | | | | | | |
| | DISPOSITION | | | | | | | | |

Fig. 164 – Project doRelease( ) 1480

| 1490 | doOldScene()<br>Project Routine | | | | | | | | |
|---|---|---|---|---|---|---|---|---|---|
| C1 | Are tables available? | No | Yes | | | | | | |
| C2 | More than 1 scene? | | | No | Yes | | | | |
| C3 | More than 2 scenes? | | | | | No | Yes | | |
| A1 | Ignore request | ✓ | | | | | | | |
| A2 | Save current scene index as old index | | ✓ | | | | | | |
| A3 | Clear current Quicklink table pointer in /vars block | | | | | ✓ | ✓ | | |
| A4 | Retrieve scene entry in Scene Table | | | | | ✓ | ✓ | | |
| A5 | Call scene doEnd() (to hide scene) | | | | | ✓ | ✓ | | |
| A6 | Issue unload request to AM via scene's slot | | | | | | ✓ | | |
| | DISPOSITION | Done | C2 | Done | C3 | Done | Done | | |

Fig. 165 – Project doOldScene( ) 1490

| 1500 | doNewScene() Project Routine | | | | | | | |
|---|---|---|---|---|---|---|---|---|
| C1 | Are tables available? | No | Yes | | | | | |
| C2 | More than 1 scene? | | No | Yes | | | | |
| C3 | More than 2 scenes? | | | | No | Yes | | |
| A1 | Ignore request | ✓ | | | | | | |
| A2 | Retrieve scene entry in Scene Table | | | ✓ | | | | |
| A3 | Restart scene timeline | | | ✓ | | | | |
| A4 | Issue play request to AM via scene's slot | | | | ✓ | | | |
| A5 | Set current scene pointer in /vars<br>Set current quicklink table pointer in /vars | | | | ✓ | ✓ | | |
| | DISPOSITION | Done | Done | C3 | Done | Done | | |

Fig. 166 – Project doNewScene( ) 1500

| 1510 | doNextScene() Project Routine | | | | | | | |
|---|---|---|---|---|---|---|---|---|
| C1 | Entry? | Yes | | | | | | |
| C2 | Is Scene ID valid? | | Yes | No | | | | |
| C3 | Looping enabled? | | | No | Yes | | | |
| C4 | More than 2 scenes? | | | | No | Yes | | |
| A1 | Set next scene index to current index + 1 | ✓ | | | | | | |
| A2 | Ignore request | | | ✓ | | | | |
| A3 | Reset scene index to 1 | | | | ✓ | | | |
| A4 | Issue prep, stage, and load requests to AM via scene's slot | | | | | ✓ | | |
| | DISPOSITION | C2 | C4 | Done | C4 | Done | Done | |

Fig. 167 – Project doNextScene( ) 1510

| 1600 | Play Scene Scene Operation | | | | | | | | |
|---|---|---|---|---|---|---|---|---|---|
| C1 | Is Scene completely loaded? | No | Yes | | | | | | |
| A1 | Scene starts playing automatically | ✓ | ✓ | | | | | | |
| A2 | Set ready flag | | ✓ | | | | | | |
| A3 | Init scene time variables | | ✓ | | | | | | |
| A4 | Initialize other scene variables | | ✓ | | | | | | |
| A5 | Stop and wait for Begin Scene (1610) | | ✓ | | | | | | |
| | DISPOSITION | C1 | Done | | | | | | |

Fig. 168 – Play Scene 1600

| 1610 | Begin Scene Scene Operation | | | | | | | | |
|---|---|---|---|---|---|---|---|---|---|
| C1 | Play at frBegin? | No | Yes | | | | | | |
| A1 | Stopped, waiting for play | ✓ | | | | | | | |
| A2 | Call doShow() on each component's control to turn it on | | ✓ | | | | | | |
| A3 | Set scene start time to current timer time | | ✓ | | | | | | |
| A4 | Init for (re)play of scene "Needed" Done count set to component count | | ✓ | | | | | | |
| A5 | Wait for scene timeout (1620) | | ✓ | | | | | | |
| | DISPOSITION | C1 | Done | | | | | | |

Fig. 169 – Begin Scene 1610

| 1620 | Wait Scene Timeout Scene Operation | | | | | | | |
|---|---|---|---|---|---|---|---|---|
| C1 | Has scene timeout elapsed? | No | Yes | | | | | |
| C2 | Is scene being held? | | | Yes | No | | | |
| C3 | Done flag? | | | | | Set | Clr | |
| C4 | Is scene being forced done? | | | | | | Yes | No |
| A1 | Set Done Flag | | ✓ | | | | | |
| A2 | Call project doRelease() (1480) | | | | | ✓ | ✓ | |
| A3 | Call project doDone() (1440) | | | | | ✓ | ✓ | |
| A4 | Clear Done Flag | | | | | ✓ | ✓ | |
| | DISPOSITION | C2 | C2 | C4 | Done | C4 | Done | C1 |

Fig. 170 – Wait Scene Timeout 1620

| 1630 | doDone() Scene Routine | | | |
|---|---|---|---|---|
| C1 | Entry? | Yes | | |
| C2 | Does "done" count equal or exceed "needed" | | Yes | No |
| A1 | Increment "done" count | ✓ | | |
| A2 | Set Done Flag | | ✓ | |
| | DISPOSITION | C2 | Done | Done |

Fig. 171 – Scene doDone() 1630

| 1640 | doForceDone() Scene Routine | | | | | | | |
|---|---|---|---|---|---|---|---|---|
| C1 | Entry? | Yes | | | | | | |
| A1 | Set "force" flag | ✓ | | | | | | |
| A2 | Call project doRelease() (1480) for each "hold" | ✓ | | | | | | |
| | DISPOSITION | Done | | | | | | |

Fig. 172 – Scene doForceDone( ) 1640

| 1650 | doHold() Scene Routine | | | | | | | |
|---|---|---|---|---|---|---|---|---|
| C1 | Entry? | Yes | | | | | | |
| A1 | Increment hold count | ✓ | | | | | | |
| A2 | Call project doHold() (1470) | ✓ | | | | | | |
| | DISPOSITION | Done | | | | | | |

Fig. 173 – Scene doHold( ) 1650

| 1660 | doRelease() Scene Routine | | | | | | | |
|---|---|---|---|---|---|---|---|---|
| C1 | Entry? | Yes | | | | | | |
| A1 | Decrement hold count | ✓ | | | | | | |
| A2 | Call project doRelease() (1480) | ✓ | | | | | | |
| | DISPOSITION | Done | | | | | | |

Fig. 174 – Scene doRelease( ) 1660

| 1670 | doJump()<br>Scene Routine | | | | | | | |
|---|---|---|---|---|---|---|---|---|
| C1 | Entry? | Yes | | | | | | |
| A1 | Pass Jump ID to project | ✓ | | | | | | |
| A2 | Call project doJump() (1450) | ✓ | | | | | | |
| | DISPOSITION | Done | | | | | | |

Fig. 175 – Scene doJump( ) 1670

| 1680 | doEnd()<br>Scene Routine | | | | | | | |
|---|---|---|---|---|---|---|---|---|
| C1 | Entry? | Yes | | | | | | |
| A2 | Call doHide() on each component's control to turn it off | ✓ | | | | | | |
| | DISPOSITION | Done | | | | | | |

Fig. 176 – Scene doEnd( ) 1680

| 1700 | Asset Manager (56KB bandwidth version) Initialization and Startup | | | | | | | | |
|---|---|---|---|---|---|---|---|---|---|
| C1 | Entry? | Yes | | | | | | | |
| C2 | Is network bandwidth high? | | Yes | No | | | | | |
| A1 | Initialize Asset Manager | ✓ | | | | | | | |
| A2 | Initialize Active Content Loader (1900) | ✓ | | | | | | | |
| A3 | Initialize Urgent queue | ✓ | | | | | | | |
| A4 | Initialize Normal queue | ✓ | | | | | | | |
| A5 | Load high bandwidth Asset Manager | | ✓ | | | | | | |
| A6 | Set AM pointer in /vars block to indicate ready to operate | | ✓ | ✓ | | | | | |
| A7 | Start Operation Processing Loop (1800) | | ✓ | ✓ | | | | | |
| A8 | Wait for User Request Calls (1710) | | ✓ | ✓ | | | | | |
| | DISPOSITION | C2 | Done | Done | | | | | |

Fig. 177 – AM Init and Startup 1700

| 1710 | Asset Manager (56KB bandwidth version) User Request Calls | | | | | | | | |
|---|---|---|---|---|---|---|---|---|---|
| C1 | User request? | Reg | Prep | Stg | Load | Play | Unld | Other | No ne |
| A1 | Process Registration request (1720) | ✓ | | | | | | | |
| A2 | Process Scene Prep request (1730) | | ✓ | | | | | | |
| A3 | Process Scene Stage request (1740) | | | ✓ | | | | | |
| A4 | Process Load request (1750) | | | | ✓ | | | | |
| A5 | Process Play request (1760) | | | | | ✓ | | | |
| A6 | Process Unload request (1770) | | | | | | ✓ | | |
| A7 | Set error response | | | | | | | ✓ | |
| | DISPOSITION | C1 | C1 | C1 | C1 | C1 | C1 | C1 | C1 |

Fig. 178 – AM User Request Calls 1710

| 1720 | Asset Manager (56KB bandwidth version) Process Registration request | | |
|---|---|---|---|
| C1 | Entry? | Yes | |
| A1 | Create "slot" timeline | ✓ | |
| A2 | Initialize variables in slot | ✓ | |
| A3 | Initialize op list in slot | ✓ | |
| A4 | Return slot pointer | ✓ | |
| | DISPOSITION | Done | |

Fig. 179 – AM Process Registration 1720

| 1730 | Asset Manager (56KB bandwidth version) Process Scene Prep request | | |
|---|---|---|---|
| C1 | Entry? | Yes | |
| A1 | Set prep op and prep flag | ✓ | |
| A2 | Queue slot (1780) | ✓ | |
| | DISPOSITION | Done | |

Fig. 180 – AM Scene Prep 1730

| 1740 | Asset Manager (56KB bandwidth version) Process Scene Stage request | | |
|---|---|---|---|
| C1 | Entry? | Yes | |
| A1 | Set stage op and stage flag | ✓ | |
| A2 | Queue slot (1780) | ✓ | |
| | DISPOSITION | Done | |

Fig. 181 – AM Scene Stage 1740

| 1750 | Asset Manager (56KB bandwidth version) Process Load request | | |
|---|---|---|---|
| C1 | Entry? | Yes | |
| A1 | Set load op and load flag | ✓ | |
| A2 | Queue slot (1780) | ✓ | |
| | DISPOSITION | Done | |

Fig. 182 – AM Scene Load 1750

| 1760 | Asset Manager (56KB bandwidth version) Process Play request | | |
|---|---|---|---|
| C1 | Entry? | Yes | |
| A1 | Set play op and play flag | ✓ | |
| A2 | Queue slot (1780) | ✓ | |
| | DISPOSITION | Done | |

Fig. 183 – AM Process Play 1760

| 1770 | Asset Manager (56KB bandwidth version) Process Unload request | | |
|---|---|---|---|
| C1 | Entry? | Yes | |
| A1 | Set unload op | ✓ | |
| A2 | Queue slot (1780) | ✓ | |
| | DISPOSITION | Done | |

Fig. 184 – AM Process Unload 1770

| 1780 | Asset Manager (56KB bandwidth version) Queue slot | | | | | | | | | |
|---|---|---|---|---|---|---|---|---|---|---|
| C1 | Entry? | Yes | | | | | | | | |
| C2 | Is slot's urgent flag set? | | Yes | No | | | | | | |
| A1 | Add op to slot's op list | ✓ | | | | | | | | |
| A2 | Set slot busy | ✓ | | | | | | | | |
| A3 | Add slot to tail of Urgent queue | | ✓ | | | | | | | |
| A4 | Increment Urgent queue count | | ✓ | | | | | | | |
| A5 | Add slot to tail of Normal queue | | | ✓ | | | | | | |
| A6 | Increment Normal queue count | | | ✓ | | | | | | |
| A7 | Play Operation Processing Loop (1800) | | ✓ | ✓ | | | | | | |
| | DISPOSITION | C2 | Done | Done | | | | | | |

Fig. 185 – AM Queue Sot 1780

| 1790 | Asset Manager (56KB bandwidth version) Dequeue slot | | | | | | | | | |
|---|---|---|---|---|---|---|---|---|---|---|
| C1 | Is slot on urgent or normal queue? | urg | norm | oth | | | | | | |
| A1 | Remove slot from urgent queue | ✓ | | | | | | | | |
| A2 | Decrement urgent queue count | ✓ | | | | | | | | |
| A3 | Remove slot from normal queue | | ✓ | | | | | | | |
| A4 | Decrement normal queue count | | ✓ | | | | | | | |
| A5 | Set error | | | ✓ | | | | | | |
| | DISPOSITION | Done | Done | Done | | | | | | |

Fig. 186 – AM Dequeue Sot 1790

| 1800 | Asset Manager (56KB bandwidth version) Operation Processing | | | | | | | | |
|---|---|---|---|---|---|---|---|---|---|
| C1 | Entry? | Yes | | | | | | | |
| C2 | Does slot exist? | | Yes | No | | | | | |
| C3 | Does slot exist? | | | | Yes | No | | | |
| C4 | Is Urgent queue empty? | | | | No | Yes | | | |
| A1 | Select slot on Head of Urgent queue | ✓ | | | | ✓ | | | |
| A2 | Select slot on Head of Normal queue | | | | ✓ | | | | |
| A3 | Process Op(s) in selected slot (1810) | | ✓ | | ✓ | | | | |
| A4 | Select next slot on Urgent queue | | | | ✓ | | | | |
| A5 | Select next slot on Normal queue | | | | | | ✓ | | |
| NOTE | Code stops when both queues are empty. Code that adds a slot to a queue does a "play" which starts the code up again. | | | | | ✓ | | | |
| | DISPOSITION | C2 | C2 | C3 | C4 | Stop C1 | C2 | C3 | |

Fig. 187 – AM Operation Processing 1800

| 1810 | Asset Manager (56KB bandwidth version) Process Op(s) in selected slot | | | | | | | |
|---|---|---|---|---|---|---|---|---|
| C1 | Is op index zero? | Yes | No | | | | | |
| C2 | Is there an op? | | | Yes | No | | | |
| C3 | Does response index match op index? | | | Yes | No | | | |
| C4 | Is op complete? | | | Yes | No | | | |
| C5 | Is op flag still set? | | | | | | Yes | No |
| A1 | Initialize op index to one<br>Initialize response index to zero | ✓ | | | | | | |
| A2 | Increment op index | | ✓ | | | | | ✓ |
| A3 | Select op (at op index) | ✓ | ✓ | ✓ | | | | ✓ |
| A4 | Set op flag | | | | | ✓ | | |
| A5 | Process op (1820) | | | | | ✓ | | |
| A6 | Set no such op error | | | | | | ✓ | |
| A7 | Set error response | | | | | | ✓ | |
| A8 | Reset op list | | | | | | ✓ | |
| A9 | Dequeue slot from its queue (1790) | | | | | | ✓ | ✓ |
| A10 | Op still in progress | | | | ✓ | | | |
| | DISPOSITION | C2 | C2 | C2 | Done | C5 | Done | Done | C2 |

Fig. 188 – AM Process Op(s) In Slot 1810

| 1820 | Asset Manager (56KB bandwidth version) Process Op | | | | | | | | |
|---|---|---|---|---|---|---|---|---|---|
| C1 | Op? | Prep | Stg | Load | Play | Unld | Oth | | |
| A1 | Clear op flag (indicates op exists) | ✓ | ✓ | ✓ | ✓ | ✓ | | | |
| A2 | Set response index to op index | ✓ | ✓ | ✓ | ✓ | ✓ | | | |
| A3 | Set busy response | ✓ | ✓ | ✓ | ✓ | ✓ | | | |
| A4 | Process Prep operation (1830) | ✓ | | | | | | | |
| A5 | Process Stage operation (1840) | | ✓ | | | | | | |
| A6 | Process Load operation (1850) | | | ✓ | | | | | |
| A7 | Process Play operation (1860) | | | | ✓ | | | | |
| A8 | Process Unload operation (1870) | | | | | ✓ | | | |
| | DISPOSITION | Done | Done | Done | Done | Done | Done | | |

Fig. 189 – AM Process Op 1820

| 1830 | Asset Manager (56KB bandwidth version) Process Prep operation | | | | | | | | |
|---|---|---|---|---|---|---|---|---|---|
| C1 | Entry? | Yes | | | | | | | |
| A1 | Set up scene file information | ✓ | | | | | | | |
| A2 | Register with Active Content Loader for load (1920) | ✓ | | | | | | | |
| | DISPOSITION | Done | | | | | | | |

Fig. 190 – AM Process Prep Operation 1830

| 1840 | Asset Manager (56KB bandwidth version) Process Stage operation | | |
|---|---|---|---|
| C1 | Entry? | Yes | |
| A1 | Set up scene's data block files info | ✓ | |
| A2 | Register with Active Content Loader for load (1920) | ✓ | |
| | DISPOSITION | Done | |

Fig. 191 – AM Process Stage Operation 1840

| 1850 | Asset Manager (56KB bandwidth version) Process Load operation | | |
|---|---|---|---|
| C1 | Scene or clip load? | scene | clip |
| A1 | Set up scene's control, chrome, and debug files info | ✓ | |
| A2 | Set up clip's file info | | ✓ |
| A3 | Register with Active Content Loader for load (1920) | ✓ | ✓ |
| | DISPOSITION | Done | Done |

Fig. 192 – AM Process Load Operation 1850

| 1860 | Asset Manager (56KB bandwidth version) Process Play operation | | |
|---|---|---|---|
| C1 | Scene or clip? | scene | clip |
| A1 | Play scene's frBegin frame | ✓ | |
| A2 | Call clip's doPlay() function | | ✓ |
| | DISPOSITION | Done | Done |

Fig. 193 – AM Process Play Operation 1860

| 1870 | Asset Manager (56KB bandwidth version) Process Unload operation | | | | | | | | |
|------|------------------------------------------------------------------|-----|------|---|---|---|---|---|---|
| C1   | Scene or clip?                                                   | scene | clip | | | | | | |
| A1   | Call scene's doEnd() function                                    | ✓   |      | | | | | | |
| A1   | Unload scene's control and chrome files                          | ✓   |      | | | | | | |
| A2   | Call clip's doHide() function                                    |     | ✓    | | | | | | |
| A2   | Unload clip                                                      |     | ✓    | | | | | | |
|      | DISPOSITION                                                      | Done | Done | | | | | | |

Fig. 194 – AM Process Unload Operation 1870

| 1900 | Active Content Loader Initialization and Startup | | | | | | | | |
|---|---|---|---|---|---|---|---|---|---|
| C1 | Entry? | Yes | | | | | | | |
| A1 | Init ACL urgent and normal queues | ✓ | | | | | | | |
| A2 | Init ACL working pointers | ✓ | | | | | | | |
| A3 | Load Project Text file containing object parameters | ✓ | | | | | | | |
| A4 | Init ACL bandwidth algorithm variables | ✓ | | | | | | | |
| A5 | Init ACL CPU algorithm variables | ✓ | | | | | | | |
| A6 | Start CPU speedometer (2070) | ✓ | | | | | | | |
| A7 | Start frame rate speedometer (2080) | ✓ | | | | | | | |
| A8 | Set ACL pointer in /vars block to indicate ready to operate | ✓ | | | | | | | |
| A9 | Start Loader frame loop (1960) | ✓ | | | | | | | |
| A10 | Wait for Asset Manager Request Calls (1910) | ✓ | | | | | | | |
| | D I S P O S I T I O N | Done | | | | | | | |

Fig. 195 - ACL Init and Startup 1900

| 1910 | Active Content Loader Asset Manager Request Calls | | | | | | | | |
|---|---|---|---|---|---|---|---|---|---|
| C1 | Request type? | Reg | Un reg | | | | | | |
| A1 | Process Register (1920) | ✓ | | | | | | | |
| A2 | Process Unregister (1930) | | ✓ | | | | | | |
| | DISPOSITION | Done | Done | | | | | | |

Fig. 196 – ACL AM Request Calls 1910

| 1920 | Active Content Loader Process Register | | | | | | | | |
|---|---|---|---|---|---|---|---|---|---|
| C2 | Operation? | Prep | Stg | Load | Oth | | | | |
| C3 | Clip or scene? | | | clip | scene | | | | |
| A1 | Set up for load of scene file | ✓ | | | | | | | |
| A2 | Set up for load of scene data block file(s) | | ✓ | | | | | | |
| A3 | Set up for load of clip file | | | ✓ | | | | | |
| A4 | Set up for load of scene control block, chrome, and debug files | | | | ✓ | | | | |
| A5 | Queue Slot (1940) | ✓ | ✓ | ✓ | ✓ | | | | |
| A6 | Set error | | | | | ✓ | | | |
| | DISPOSITION | Done | Done | Done | Done | Done | | | |

Fig. 197 – ACL Process Register 1920

| 1930 | Active Content Loader Process Unregister | | | | | | | | |
|---|---|---|---|---|---|---|---|---|---|
| C1 | Is slot registered? | Yes | No | | | | | | |
| A1 | Dequeue slot (1950) | ✓ | | | | | | | |
| A3 | Abort loads in progress (1990) | ✓ | | | | | | | |
| A4 | Set error | | ✓ | | | | | | |
| | DISPOSITION | Done | Done | | | | | | |

Fig. 198 – ACL Process Unregister 1930

| 1940 | Active Content Loader Queue slot | | | | | | | | |
|---|---|---|---|---|---|---|---|---|---|
| C1 | Is slot's urgent flag set? | Yes | No | | | | | | |
| A1 | Add slot to tail of Urgent queue | ✓ | | | | | | | |
| A4 | Increment Urgent queue count | ✓ | | | | | | | |
| A3 | Add slot to tail of Normal queue | | ✓ | | | | | | |
| A4 | Increment Normal queue count | | ✓ | | | | | | |
| A5 | Play Loader Frame Loop (1960) | ✓ | ✓ | | | | | | |
| | DISPOSITION | Done | Done | | | | | | |

Fig. 199 – ACL Queue Slot 1940

| 1950 | Active Content Loader Dequeue slot | | | | | | | | |
|---|---|---|---|---|---|---|---|---|---|
| C1 | Is slot on urgent or normal queue? | urg | norm | oth | | | | | |
| A1 | Remove slot from urgent queue | ✓ | | | | | | | |
| A2 | Decrement urgent queue count | ✓ | | | | | | | |
| A3 | Remove slot from normal queue | | ✓ | | | | | | |
| A4 | Decrement normal queue count | | ✓ | | | | | | |
| A5 | Set error | | | ✓ | | | | | |
| | DISPOSITION | Done | Done | Done | | | | | |

Fig. 200 – ACL Requeue Slot 1950

| 1960 | Active Content Loader Loader frame loop | | | | | | | |
|------|------------------------------------------|-----|-----|-----|-----|-----|-----|-----|
| C1 | Entry? | Yes | | | | | | |
| C2 | Does slot exist? | | Yes | No | | | | |
| C3 | Does slot exist? | | | | Yes | No | | |
| C4 | Is Urgent queue empty? | | | | | | No | Yes |
| A1 | Set abort flag in slot from Normal queue | | | | | | ✓ | |
| A2 | Select slot on Head of Urgent queue | ✓ | | | | | ✓ | |
| A3 | Select slot on Head of Normal queue | | | ✓ | | | | |
| A4 | Perform load processing (1970) | | ✓ | | ✓ | | | |
| A5 | Select next slot on Urgent queue | | ✓ | | | | | |
| A6 | Select next slot on Normal queue | | | | | | | ✓ |
| NOTE | Code stops when both queues are empty. Code that adds a slot to a queue does a "play" which starts the code up again. | | | | | ✓ | | |
| | DISPOSITION | C2 | C2 | C3 | C4 | Stop C1 | C2 | C3 |

Fig. 201 – ACL Loader Frame Loop 1960

| | | | | | | | | | |
|---|---|---|---|---|---|---|---|---|---|
| 1970 | Active Content Loader<br>Perform load processing | | | | | | | | |
| C1 | Entry? | Yes | | | | | | | |
| C2 | Is load finished?? | | Yes | No | | | | | |
| C3 | Is load being aborted? | | | Yes | No | | | | |
| A1 | Check loads done (1980) | ✓ | | | | | | | |
| A2 | Abort loads (1990) | | | ✓ | | | | | |
| A3 | Set load done response | | ✓ | | | | | | |
| A4 | Dequeue slot (1950) | | ✓ | ✓ | | | | | |
| A5 | Continue load processing (2000) | | | | ✓ | | | | |
| | DISPOSITION | C2 | Done | Done | Done | | | | |

Fig. 202 – ACL Perform Load Processing 1970

| | | | | | | | | | |
|---|---|---|---|---|---|---|---|---|---|
| 1980 | Active Content Loader<br>Check loads done | | | | | | | | |
| L1 | Loop thru loads in progress | Ent | Loop | Exit | | | | | |
| C2 | Is there a load in progress to check? | | Y | N | | | | | |
| C3 | Is load in progress completed? | | Y | N | | | | | |
| A1 | Select 1st load in progress | ✓ | | | | | | | |
| A2 | Mark component loaded | | ✓ | | | | | | |
| A3 | Record load finish time | | ✓ | | | | | | |
| A5 | Report load start and end times and file size to Bandwidth Speedometer (2060) | | ✓ | | | | | | |
| A4 | Compute new percent loaded | | ✓ | ✓ | | | | | |
| A5 | Select next load in progress | | ✓ | ✓ | | | | | |
| | DISPOSITION | L1 Loop | L1 Loop | L1 Loop | L1 Exit | Done | | | |

Fig. 203 – ACL Check Loads Done 1980

| 1990 | Active Content Loader<br>Abort loads | | | | | | | |
|---|---|---|---|---|---|---|---|---|
| L1 | Loop thru loads in progress | Ent | Loop | Exit | | | | |
| C2 | Is there a load in progress to abort? | | Y | N | | | | |
| A1 | Select 1st load in progress | ✓ | | | | | | |
| A2 | Abort load in progress | | ✓ | | | | | |
| A3 | Mark item unloaded | | ✓ | | | | | |
| A4 | Select next load in progress | | ✓ | | | | | |
| | DISPOSITION | L1 Loop | L1 Loop | L1 Exit | Done | | | |

Fig. 204 – ACL Abort Loads 1990

| 2000 | Active Content Loader<br>Continue load processing | | | | | | | |
|---|---|---|---|---|---|---|---|---|
| C1 | Load operation? | Prep | Stg | Load | | | | |
| C2 | Clip or scene? | | | clip | scene | | | |
| A1 | Perform prep processing (2010) | ✓ | | | | | | |
| A2 | Perform stage processing (2020) | | ✓ | | | | | |
| A3 | Perform clip load processing (2030) | | | ✓ | | | | |
| A4 | Perform scene load processing (2040) | | | | ✓ | | | |
| | DISPOSITION | Done | Done | Done | Done | | | |

Fig. 205 – ACL Continue Load Processing 2000

| 2010 | Active Content Loader Perform prep processing | | | | | | | |
|---|---|---|---|---|---|---|---|---|
| C1 | Are there free load channels? | No | Yes | | | | | |
| A1 | Allocate load channel | | ✓ | | | | | |
| A2 | Select Matching File (2050) | | ✓ | | | | | |
| A3 | Record load start time | | ✓ | | | | | |
| A4 | Start load of scene file | | ✓ | | | | | |
| | DISPOSITION | Done | Done | | | | | |

Fig. 206 – ACL Perform Prep Processing 2010

| 2020 | Active Content Loader Perform stage processing | | | | | | | |
|---|---|---|---|---|---|---|---|---|
| C1 | Are there free load channels? | No | Yes | | | | | |
| C2 | Are there more data blocks to load? | | | Yes | No | | | |
| A1 | Allocate load channel | | ✓ | | | | | |
| A2 | Pick next data block | | ✓ | | | | | |
| A3 | Select Matching File (2050) | | ✓ | | | | | |
| A4 | Record load start time | | ✓ | | | | | |
| A5 | Start load of data block file | | ✓ | | | | | |
| | DISPOSITION | Done | C2 | C1 | Done | | | |

Fig. 207 – ACL Perform Stage Processing 2020

| 2022 | Active Content Loader<br>Perform stage processing | | | | | | | |
|------|---|---|---|---|---|---|---|---|
| C1 | Are there any objects in the scene? | No | Yes | | | | | |
| L2 | Loop through data blocks | | Ent | Loop | Exit | | | |
| C3 | More data blocks needed for this scene? | | | Yes | No | | | |
| A1 | Dup master data block | | | ✓ | | | | |
| A2 | Init new data block for object | | | ✓ | | | | |
| A3 | Copy object parameters (2025) | | | ✓ | | | | |
| A4 | Check Scene Checksums (2028) | | | | | ✓ | | |
| | D I S P O S I T I O N | Done | L2<br>Loop | L2<br>Loop | L2<br>Exit | Done | | |

Fig. 208 - ACL Perform Stage Processing 2022

| 2025 | Active Content Loader<br>Copy Object Parameters | | | | | | | |
|------|---|---|---|---|---|---|---|---|
| L1 | Loop through object parameters | Ent | Loop | | | Exit | | |
| C2 | More integer parameters? | Yes | No | | | | | |
| C3 | More string parameters? | | Yes | No | | | | |
| C4 | More floating point parameters? | | | Yes | No | | | |
| A1 | Copy parameter to data block | | ✓ | ✓ | ✓ | | | |
| A2 | Add parameter to object's integer checksum | | ✓ | | | | | |
| A2 | Add parameter to object's string checksum | | | ✓ | | | | |
| A2 | Add parameter to object's float checksum | | | | ✓ | | | |
| A5 | Save the three checksums in the data block | | | | | ✓ | | |
| | D I S P O S I T I O N | L1<br>Loop | L1<br>Loop | L1<br>Loop | L1<br>Loop | L1<br>Exit | Done | |

Fig. 209 - ACL Copy Object Parameters 2025

| 2028 | Active Content Loader<br>Check Scene Checksums | | | | | | | |
|---|---|---|---|---|---|---|---|---|
| C1 | Are there any objects in the scene? | No | Yes | | | | | |
| L2 | Loop through data blocks | | Ent | Loop | | Exit | | |
| C3 | More data blocks for this scene? | | | Yes | No | | | |
| C4 | Do check values match scene checksums? | | | | | Yes | No | |
| A1 | Init integer, string, and float checksum check values | | ✓ | | | | | |
| A2 | Add object integer checksum to integer check value | | | ✓ | | | | |
| A3 | Add object string checksum to string check value | | | ✓ | | | | |
| A4 | Add object float checksum to float check value | | | ✓ | | | | |
| A5 | Display error message dialog box | | | | | | ✓ | |
| A6 | Halt processing (project cannot be viewed) | | | | | | ✓ | |
| | DISPOSITION | Done | L2 Loop | L2 Loop | L2 Exit | Done | Done | Done |

Fig. 210 - ACL Check Scene Checksums 2028

| 2030 | Active Content Loader<br>Perform clip load processing | | | | | | | |
|---|---|---|---|---|---|---|---|---|
| C1 | Are there free load channels? | No | Yes | | | | | |
| A1 | Allocate load channel | | ✓ | | | | | |
| A2 | Select Matching File (2050) | | ✓ | | | | | |
| A3 | Record load start time | | ✓ | | | | | |
| A4 | Start load of clip file | | ✓ | | | | | |
| | DISPOSITION | Done | Done | | | | | |

Fig. 211 - ACL Perform Clip Load Processing 2030

| 2040 | Active Content Loader<br>Perform scene load processing | | | | | | | | |
|---|---|---|---|---|---|---|---|---|---|
| C1 | Are there free load channels? | No | Yes | | | | | | |
| C2 | Are there more component files to load? | | | Yes | No | | | | |
| A1 | Allocate load channel | | ✓ | | | | | | |
| A2 | Pick next component file | | ✓ | | | | | | |
| A3 | Select Matching File (2050) | | ✓ | | | | | | |
| A4 | Record load start time | | ✓ | | | | | | |
| A5 | Start load of component file | | ✓ | | | | | | |
| | DISPOSITION | Done | C2 | C1 | Done | | | | |

Fig. 212 – ACL Perform Scene Load Processing 2040

| 2050 | Active Content Loader<br>Select Matching File | | | | | | | | |
|---|---|---|---|---|---|---|---|---|---|
| C1 | Is there more than one possible file? | No | Yes | | | | | | |
| C2 | Is there an exact bandwidth and cpu match? | | Yes | No | | | | | |
| C3 | Are there files with lower bandwidth and lower cpu? | | | Yes | No | | | | |
| C4 | Are there files with lower cpu and higher bandwidth | | | | Yes | No | | | |
| A1 | Select the only file | ✓ | | | | | | | |
| A2 | Select exact match file | | ✓ | | | | | | |
| A3 | Select file with largest bandwidth <= to actual bandwidth and with largest cpu requirement <= to actual cpu capability | | | ✓ | | | | | |
| A4 | Select file with smallest bandwidth >= actual bandwidth and with largest cpu requirement <= actual cpu capability | | | | ✓ | | | | |
| A5 | Compute distances of file requirements from actual capabilities | | | | | ✓ | | | |
| A6 | Select file with smallest overall distance | | | | | ✓ | | | |
| | DISPOSITION | Done | Done | Done | Done | Done | | | |

Fig. 213 – ACL Select Matching File 2050

| 2060 | Active Content Loader Report Load to Bandwidth Speedometer | | | | | | | | |
|---|---|---|---|---|---|---|---|---|---|
| C1 | Entry? | Yes | | | | | | | |
| A1 | Compute load time | ✓ | | | | | | | |
| A2 | Compute bytes per second for this load | ✓ | | | | | | | |
| A3 | Compute running average of all loads | ✓ | | | | | | | |
| A4 | Set bandwidth selector | ✓ | | | | | | | |
| | DISPOSITION | Done | | | | | | | |

Fig. 214 – ACL Report Load to Bandwidth Speedo 2060

| 2070 | Active Content Loader CPU Speedometer | | | | | | | | |
|---|---|---|---|---|---|---|---|---|---|
| C1 | Is it time to measure the CPU again? | Yes | No | | | | | | |
| A1 | Execute timed loop | ✓ | | | | | | | |
| A2 | Compute instructions per second | ✓ | | | | | | | |
| A3 | Compute running average of CPU speed | ✓ | | | | | | | |
| A4 | Use CPU speed and frame rate to set CPU selector | ✓ | | | | | | | |
| | DISPOSITION | C1 | C1 | | | | | | |

Fig. 215 – ACL CPU Speedometer 2070

| 2080 | Active Content Loader Frame Rate Speedometer | | | | | | | |
|---|---|---|---|---|---|---|---|---|
| C1 | Is it time to measure the frame rate again? | Yes | No | | | | | |
| A1 | Execute timed frame loop | ✓ | | | | | | |
| A2 | Compute frames per second | ✓ | | | | | | |
| A3 | Compute running average of frame rate | ✓ | | | | | | |
| A4 | Use CPU speed and frame rate to set CPU selector | ✓ | | | | | | |
| | DISPOSITION | C1 | C1 | | | | | |

Fig. 216 – ACL Frame Rate Speedometer 2080

METHODS, SYSTEMS, AND PROCESSES FOR THE DESIGN AND CREATION OF RICH-MEDIA APPLICATIONS VIA THE INTERNET

CROSS REFERENCE TO RELATED APPLICATIONS

The present application is a continuation in part of and claims the benefit of, under 35 U.S.C. § 120, U.S. patent application Ser. No. 09/716,460, filed 21 Nov. 2000 now abandoned, which is expressly incorporated fully herein by reference. Further, the present application is related to and claims the benefit of, under 35 U.S.C. § 119(e), U.S. Provisional Patent Application Ser. No. 60/215,121, filed 29 Jun. 2000; U.S. Provisional Patent Application Ser. No. 60/232,078, filed 7 Sep. 2000; and U.S. Provisional Patent Application Ser. No. 60/243,399, filed 27 Oct. 2000, which are expressly incorporated fully herein by reference.

FIELD OF THE INVENTION

The present invention relates to methods, systems, and processes used in designing and creating applications utilizing rich-media content over the Internet.

BACKGROUND OF THE INVENTION

This invention relates to methods and systems for utilizing rich-media for the creation of Internet websites and other applications via the Internet.

The Internet is a rapidly expanding interconnection of computers that allows people from around the globe to interact. Internet users seek to gather information, purchase products or services, and entertain themselves by creating websites or accessing websites maintained by others on remote computer systems.

Traditionally, website designers created websites using the Hypertext Markup Language (HTML). HTML is a language used for representing in computer code the various components of a website. Initially, only website designers fluent in HTML could create websites for other users to access. As more people began to use the Internet, designers demanded quicker and easier methods for producing websites so that they could create, for example, attention-grabbing websites for companies seeking to engage in commerce over the Internet.

In order to solve this problem, software companies designed pre-packaged programs capable of more quickly producing graphics-intensive websites. Products such as SUN Microsystems' Java® and Macromedia's Shockwave Flash® allow designers to create websites that entice Internet users to visit them. Programs such as Microsoft's Visual Basic® provide website designers with the ability to create websites more quickly by allowing designers to create websites graphically instead of by coding primarily in HTML.

As a result of the advent of Java®, Shockwave Flash®, and other rich-media tools, as well as Visual Basic®, expert website designers have formed businesses for the purpose of creating websites for others. Knowledge of these programming tools is now a requirement for website design and has made website design increasingly more complicated. The average Internet user does not currently have the knowledge, ability, or tools to create a graphic-intensive website in other applications using rich-media.

Restricting website design to experts alone constrains the rapid development of new high-quality websites for two reasons. First, the number of Internet users who may design high-quality sites using rich-media technologies is limited. Second, the arduousness of designing a polished website even for an expert developer limits the overall throughput of designs for website-developing companies.

A need exists for a tool allowing developers to create rich-media websites and other applications in a more efficient manner. Furthermore, a need exists for a tool allowing individuals who are not skilled in expert design tools to produce visually appealing websites and other applications. Finally, a need exists for a tool allowing anyone who wishes to design a high-quality website or other applications to do so via the Internet.

SUMMARY OF THE INVENTION

The present invention relates to the method of providing users with the ability to create rich-media applications via the Internet. In a specific embodiment, users may access a host website supplying the ability to create rich-media applications, examine the available product set, and construct a rich-media application on the host website. In a specific embodiment, the host website enables the user to modify an existing rich-media application on the host website.

In a specific embodiment, the ability to create rich-media applications may be purchased by the user. Specifically, the user may purchase the right to use rich-media applications created on the host website, the right to design and create rich-media applications on the host website, or both. The user may also purchase the right to use more services by paying a different fee.

In a specific embodiment, the user may construct a rich-media application by using rich-media components including navigation elements, backgrounds, images, headings, sound files, text, windows, animations, e-mail clients, calculators, stock tickers, clocks, menus, movie files, and production types. Production types are customizable rich-media templates for performing specific operations such as presentations, resumes, catalogs, reports, user manuals, magazines, newspapers, photo albums, cartoons, websites, shows, movies, and invitations. The user may also upload components from other Internet locations for use in rich-media applications by listing the location of the component and the file type of the component. Applicable file types may include JPEG, MPEG, GIF, animated GIF, TIFF, EPS, PNG, SWF, MP3, and WAV. The user may be limited to a subset of all possible file types that may be uploaded depending on the level of service for which the user has paid.

In a specific embodiment, the user may create and access a customer account for the purpose of creating or modifying a rich-media application. Specifically, the user may access account and project information or save, close, delete, publish, or preview a project. The user may also create, insert, delete, save, or modify a scene of a rich-media application or add, access, edit, copy, paste, or delete components.

When editing a component, the user may modify a number of features associated with a component including, but not limited to, the volume of an acoustic component, the link between a menu entry and an associated component, the font, font size, color, or effect of a text field, or the layout, size, transparency, rotation, color, position, or level of any graphical rich-media component. The user may modify these components by means of a slider bar or a textual input field. In addition, the user may modify the volume of a sound component by means of up and down volume buttons. The user may undo modifications made to a component's parameters. The user may also modify the position of a graphical rich-media component by a graphical input field, by clicking and dragging said component, or by text fields. When the user modifies the position of a graphical rich-media component by means of clicking and dragging said component, said component may align itself to a grid point or a guide line. The user may also modify the style and the Uniform Resource Locator (URL) of a component linked to a menu entry.

The present invention further relates to the computer processes required for providing access to a host website and for providing access to the development tools for creating a rich-media application. In a specific embodiment, the computer process allows users to modify existing rich-media applications.

In a specific embodiment, the computer process charges users for the ability to create a rich-media application. Specifically, the computer process may charge the user for using a rich-media application, accessing areas of the host website, or both. The computer process may also provide more features and additional levels of service to users that pay a different fee.

In a specific embodiment, the computer process may provide rich-media components to the user including navigation elements, backgrounds, images, headings, sound files, text, windows, animations, e-mail clients, calculators, stock tickers, clocks, menus, movie files, and production types. The computer process may also allow the user to upload components from remote locations by supplying a URL and a component file type. Applicable file types may include JPEG, MPEG, GIF, animated GIF, TIFF, EPS, PNG, SWF, MP3, and WAV. The file types that the computer process allows for upload may depend on the level of service paid for by the user.

In a specific embodiment, the computer process may display available options for creating rich-media applications to the user including, but not limited to, an inventory of available production types, drag-and-drop loading of components, the component-editing graphical user interfaces (GUIs), an inventory of available components, and the ability for the user to upload components that do not reside on the host computer. In addition, the computer process may display statistics associated with rich-media application website activity including the number of user visits, the server activity, and a weekly session log. The computer process may additionally perform analysis of the above statistics over time.

In a specific embodiment, the computer process may allow for the creation and use of a customer account for the creation or modification of a rich-media application by the user. Specifically, the computer process may allow the user to access account and project information or save, close, delete, publish, or preview a project. The process may also allow the user to create, insert, delete, save, or modify a scene of a rich-media application or add, access, edit, copy, paste, or delete components.

When allowing the user to edit a component, the computer process may allow the user to modify a number of features associated with a component including, but not limited to, the volume of an acoustic component, the link between a menu entry and an associated component, the font, font size, color, or effect of a text field, or the layout, size, transparency, rotation, color, position, or level of any graphical rich-media component. The computer process may allow the user to modify these components by means of a slider bar or a textual input field. In addition, the computer process may enable the user to modify the volume of a sound component by means of up and down volume buttons. The computer process may allow the user to undo modifications to a component's parameters. The computer process may also allow the user to modify the position of a graphical rich-media component by a graphical input field, by clicking and dragging said graphical rich-media component, or by text fields. When the user moves said graphical rich-media component by clicking and dragging it, the computer process may align the component to a grid point or a guide line. The computer process may also allow the user to modify the style and the URL of a component linked to a menu entry.

The present invention further relates to the method of accessing information pertaining to rich-media components from a database. In a specific embodiment, the method includes storing and retrieving information pertaining to rich-media components from said database. In addition, the method pertains to ascribing a unique identifier to a rich-media component information block. Specifically, the method may include a unique identifier composed of 18 digits. In a specific embodiment, the process of retrieving information from the database may be used for sorting the stored rich-media components into lists based on their component type and displaying that list for the user.

The present invention further relates to the method of displaying a rich-media application via a graphical interface. In a specific embodiment, the method including the graphical interface may allow the user to access the rich-media application and display scenes from the rich-media application. Specifically, the method allows for the user to display scenes by showing the current scene, displaying either the next or the previous scene, playing scenes in succession in a forward or backward direction, jumping to the first or last scene, or selecting a specific scene. When selecting a specific scene, the method allows the user to select the scene by either using a slider bar or by entering a scene number in a textual input field.

In another embodiment of the present invention, a computer system may be used for the purpose of providing users with the ability to create rich-media applications via the Internet. This computer system may comprise a processor, memory, and a computer process. More specifically, the computer process may comprise a developer configured to develop rich-media application designs and an obtainer configured to obtain computer system specifications from a user's remote computer system via the Internet. This obtainer may be utilized independently from other facets of the present invention for other applications.

In a specific embodiment, the obtainer may comprise obtainers configured to obtain the processor type and the frequency of all central processing units (CPUs) of the user's attached computer system, the combined capacity in bytes of all random access memory systems and attached memory systems of the user's attached computer system, and the Internet connection type and speed of the user's remote computer system. More specifically, the obtainer may determine if the Internet connection type includes, e.g., a modem, a digital subscriber line, a cable modem, a T-1 line, a DS-1 line, an E-1 line, a T-3 line, a DS-3 line, an E-3 line, a 10 Mbps Ethernet line, a 100 Mbps Ethernet line, an OC-3/STS-1 line, an OC-12/STS-3 line, a 1000 Mbps Ethernet line, a OC-48/STS-16 line, or a OC-192/STS-64 line.

Furthermore, the obtainer may also comprise a calculator configured to calculate the MIPS rating of each CPU of the user's remote computer system. More specifically, the calculator may comprise an obtainer configured to obtain the frequency of each CPU of said user's computer system, an obtainer configured to obtain the number of cycles per instruction for each CPU of said user's host computer system, and a calculator configured to calculate the MIPS rating of each CPU of said user's remote computer system.

In another embodiment of the present invention, the computer process further comprises a calculator configured to calculate the number of CPU cycles available for rich-media application design. More specifically, the calculator may comprise an obtainer for the initial number of CPU cycles available for rich-media application design, a determiner of the number of CPU cycles required for a selected rich-media application component, and a calculator for the remaining number of CPU cycles available for rich-media application design.

In another embodiment of the present invention, the computer process comprises a determiner for a hierarchy of rich-media application scenes based on the available CPU cycles, and a loader of rich-media application scenes based on that hierarchy. The determiner may further comprise an obtainer for the number of CPU cycles required by an specific instance of a rich-media application, an obtainer for the available number of CPU cycles, and a determiner that chooses the instance that uses the greatest portion of the available CPU cycles without exceeding the capacity of the CPU. The obtainer that obtains the available CPU cycles may look at the CPU during previous transfers to determine the required number of CPU cycles for a previous transfer and calculate the number of CPU cycles for a specific instance of the part of the application to be transferred. Finally, the loader of the rich-media application scenes based on the determined hierarchy may load the current scene as well as potential future scenes.

For instance, the rich-media application may be a rich-media website consisting of multiple instances of an introduction page and multiple instances of other pages that may be accessed from the introduction page. The various instances of each page may require a different number of CPU cycles based on the graphics or acoustics associated with the instance. By providing multiple instances, the rich-media application designer allows users that have computers with fast processors to access resource-intensive instances while users with computers run by relatively slower processors are provided with less complex instances. After determining the speed of the computer's processor or processors, the computer process may load the instance of the introduction page that most closely matches the available number of CPU cycles. When the load of the introduction page completes, the loader may load a subsequent page based on the hierarchy and the updated determination of the number of available CPU cycles. This subsequent load may occur while the introductory page is displayed and before the user selects the next page to view. This download may preferably be interrupted if the user chooses to view another page.

In another embodiment of the present invention, a similar hierarchy for loading rich-media application scenes may be constructed based on the available Internet transmission bandwidth instead of the available CPU cycles.

In another embodiment of the present invention, when loading a scene, a data block file for a component may be copied from a master data block file. After creating the data block file, the parameters relating to the component may be loaded. In a specific embodiment, parameter types may include integer, string, and floating point. Component checksums may be computed by summing the values of all parameters of a given type for a specific component. Scene checksums may be computed by summing the component checksums for all components in a scene. If the checksum for each parameter type does not equal the expected value, the computer process may halt the loading of a user project and display an error message.

The present invention further relates to the business method of providing the user a method of designing and creating a rich-media application via the Internet by accessing a third party's host website via the Internet and constructing a rich-media application on that website. In a specific embodiment, the business method comprises the step of a user purchasing the ability to construct a rich-media application on the third party's website by either purchasing a license to use rich-media application development tools from the third party or paying a fee to the third party for the right to use the created rich-media application.

In a further embodiment of the present invention, a business method for providing rich-media application development tools to third party website maintainers comprises developing a software platform using rich-media application development tools that allow users to create rich-media applications. In a specific embodiment, the business method comprises charging the third party by requiring a one-time fee, a per-customer fee, a per-project fee, a time-based fee, or a combination thereof for the use of the rich-media application development tools.

In a further embodiment of the present invention, a business method for providing third-party website maintainers with a method of providing users the ability to create rich-media applications comprises developing a software platform using rich-media application development tools on the third party's website. In a specific embodiment, the business method comprises the third party purchasing the ability to use said rich-media application development tools by paying a one-time fee, a per-customer fee, a per-project fee, a time-based fee, or a combination thereof.

BRIEF DESCRIPTION OF THE DRAWINGS

The accompanying figures, which are incorporated in and constitute a part of the specification, illustrate embodiments of the invention and, together with the description, serve to explain the objects, advantages and principles of the invention.

FIG. 31 is a decision table 618 of the steps performed during the creation and operation of an Asset Image Upload component.

FIG. 33 is a decision table 628 of the steps performed during the creation of a navigation bar component.

FIG. 52 is a decision table 870 of the steps performed by the component browser when a component is selected or modified by the user.

FIG. 53 is a decision table 871 of the steps performed by the edit size procedure when a user elects to edit the size of a component.

FIG. 54 is a decision table 872 of the steps performed by the edit transparency procedure when a user elects to edit the transparency of a component.

FIG. 55 is a decision table 873 of the steps performed by the edit rotation procedure when a user elects to edit the rotation of a component.

FIG. 56 is a decision table 874 of the steps performed by the edit position procedure when a user elects to edit the position of a component.

FIG. 57 is a decision table 875 of the steps performed by the edit color procedure when a user elects to edit the color of a component.

FIG. 58 is a decision table 876 of the steps performed by the edit selection procedure when a user elects to edit the selected variation of a component.

FIG. 59 is a decision table 877 of the steps performed by the edit content procedure when a user elects to edit the content of a Paragraph component.

FIG. 60 is a decision table 878 of the steps performed by the edit Quicklink procedure when a user elects to edit the Quicklink assigned to a Button component.

FIG. 61 is a decision table 879 of the steps performed by the edit selection procedure when a user elects to edit the selected variation of a Button component.

FIG. 62 is a decision table 880 of the steps performed by the edit content procedure when a user elects to edit the content of a Line Effects component.

FIG. 63 is a decision table 881 of the steps performed by the edit soundtrack procedure when a user elects to edit the attributes of a Soundtrack component.

FIG. 64 is a decision table 882 of the steps performed by the edit user assets procedure when a user elects to edit the user assets loaded into a project.

FIG. 65 is a decision table 883 of the steps performed by the edit content procedure when a user elects to edit the content of a Character Effects component.

FIG. 66 is a decision table 884 of the steps performed by the edit content procedure when a user elects to edit the content of a Movie component.

FIG. 67 is a decision table 885 of the steps performed by the edit content procedure when a user elects to edit the content of a Window component.

FIG. 68 is a decision table 886 of the steps performed by the edit content procedure when a user elects to edit the content of a Header component.

FIG. 69 is a decision table 887 of the steps performed by the edit component procedure when a user elects to use icons surrounding a component to resize the component.

FIG. 70 is a decision table 888 of the steps performed by the start depth browser procedure when a user elects to examine the depth of components in the current scene.

FIG. 71 is a decision table 889 of the steps performed by the edit component procedure when a user elects to toggle a component's visibility, toggle a component's lock status, modify a component's depth, open a component GUI for a component, or add a component to the current scene.

FIG. 72 is a decision table 890 of the steps performed by the Layers Window when it is opened or closed, or a new scene is loaded into the Component Browser.

FIG. 73 is a decision table 891 of the steps performed by the Layers Window when a component is selected.

FIG. 74 is a decision table 892 of the steps performed by the Layers Window when a component's scene time is edited.

FIG. 75 is a decision table 893 of the steps performed by the Layers Window when a component is edited.

FIG. 76 is a decision table 894 of the steps performed by the Layers Window when a component's duration is modified.

FIG. 77 is a decision table 895 of the steps performed by the Layers Window when a component's visibility button is selected.

FIG. 78 is a decision table 896 of the steps performed by the Layers Window when a component's lock button is selected.

FIG. 79 is a decision table 900 of the steps performed by the Asset Manager during initialization.

FIG. 80 is a decision table 901 of the steps performed by the Asset Manager's main control loop.

FIG. 81 is a decision table 910 of the steps performed by the request scanner at the highest level of request processing.

FIG. 82 is a decision table 911 of the processes that the request scanner may schedule for an incoming request.

FIG. 83 is a decision table 920 of the steps performed by the load monitor for clips that might be loading at a given instant in time.

FIG. 84 is a decision table 930 of the steps performed by the scheduler at the highest level of request scheduling.

FIG. 85 is a decision table 931 of the steps performed by the scheduler when intensive tasks are active.

FIG. 86 is a decision table 932 of the steps performed by the scheduler during normal scheduling when no intensive tasks are active.

FIG. 87 is a decision table 940 of the processes that the registration request processor may choose from at the highest level of registration request processing.

FIG. 88 is a decision table 941 of the steps performed by the registration request processor that define the clip registration process.

FIG. 89 is a decision table 942 of the steps performed by the registration request processor that define the clip reregistration process.

FIG. 90 is a decision table 943 of the steps performed by the registration request processor that define the clip unregistration process.

FIG. 91 is a decision table 944 of the steps performed by the registration request processor for querying whether a clip has been registered.

FIG. 92 is a decision table 950 of the processes that the load request processor may choose from at the highest level of load request processing.

FIG. 93 is a decision table 951 of the steps performed by the load request processor that define the clip loading process.

FIG. 94 is a decision table 952 of the steps performed by the load request processor that define the clip unloading process.

FIG. 95 is a decision table 953 of the steps performed by the load request processor for querying whether a clip has been loaded.

FIG. 96 is a decision table 954 of the steps performed by the registration request processor for querying the number of frames loaded for a clip.

FIG. 97 is a decision table 960 of the processes that the play request processor may choose from at the highest level of play request processing.

FIG. 98 is a decision table 961 of the steps performed by the play request processor that define the clip playing process.

FIG. 99 is a decision table 962 of the steps performed by the play request processor that define the clip pausing process.

FIG. 100 is a decision table 963 of the steps performed by the play request processor that define the clip stopping process.

FIG. 101 is a decision table 964 of the steps performed by the play request processor for querying whether a clip is currently playing.

FIG. 102 is a decision table 965 of the steps performed by the play request processor for querying what frame a playing clip is currently at.

FIG. 103 is a decision table 970 of the processes that the position request processor may choose from at the highest level of position request processing.

FIG. 104 is a decision table 971 of the steps performed by the position request processor that define the clip fast forward process.

FIG. 105 is a decision table 972 of the steps performed by the position request processor that define the clip rewind process.

FIG. 106 is a decision table 973 of the steps performed by the position request processor for querying whether a clip is currently at the first frame.

FIG. 107 is a decision table 980 of the processes that the state request processor may choose from at the highest level of state request processing.

FIG. 108 is a decision table 981 of the steps performed by the state request processor that define the process for making a clip an intensive task.

FIG. 109 is a decision table 982 of the steps performed by the state request processor that define the process for restoring an intensive task back to normal.

FIG. 110 is a decision table 983 of the steps performed by the state request processor that define the process for making a clip a high bandwidth task.

FIG. 111 is a decision table 984 of the steps performed by the state request processor that define the process for restoring a high bandwidth task back to normal.

FIG. 112 is a decision table 985 of the steps performed by the state request processor for querying the state of a clip.

FIG. 113 is a decision table 986 of the steps performed by the state request processor for querying whether any intensive tasks are active.

FIG. 114 is a decision table 987 of the steps performed by the state request processor for querying whether any high bandwidth tasks are active.

FIG. 115 is a decision table 990 of the processes that the local volume request processor may choose from at the highest level of local volume request processing.

FIG. 116 is a decision table 991 of the steps performed by the local volume request processor that define the process for setting a clip's local volume level.

FIG. 117 is a decision table 992 of the steps performed by the local volume request processor that define the process for turning on a clip's local volume.

FIG. 118 is a decision table 993 of the steps performed by the local volume request processor that define the process for turning off a clip's local volume.

FIG. 119 is a decision table 994 of the steps performed by the local volume request processor for querying the local volume level of a clip.

FIG. 120 is a decision table 1000 of the processes that the global volume request processor may choose from at the highest level of global volume request processing.

FIG. 121 is a decision table 1001 of the steps performed by the global volume request processor that define the process for setting a clip's global volume level.

FIG. 122 is a decision table 1002 of the steps performed by the global volume request processor that define the process for turning on a clip's global volume.

FIG. 123 is a decision table 1003 of the steps performed by the global volume request processor that define the process for turning off a clip's global volume.

FIG. 124 is a decision table 1004 of the steps performed by the global volume request processor for querying the global volume level of a clip.

FIG. 125 is a decision table 1100 of the steps performed when loading the code that defines the asset manager component loader.

FIG. 126 is a decision table 1101 of the steps performed when initializing duplicated containers.

FIG. 127 is a decision table 1102 of the steps performed when loading the network bandwidth speedometer.

FIG. 128 is a decision table 1103 of the steps performed when loading the managed levels for clips.

FIG. 129 is a decision table 1104 of the steps performed when loading the asset manager components.

FIG. 130 is a decision table 1105 of the steps performed when loading other measuring tools.

Figure 1:
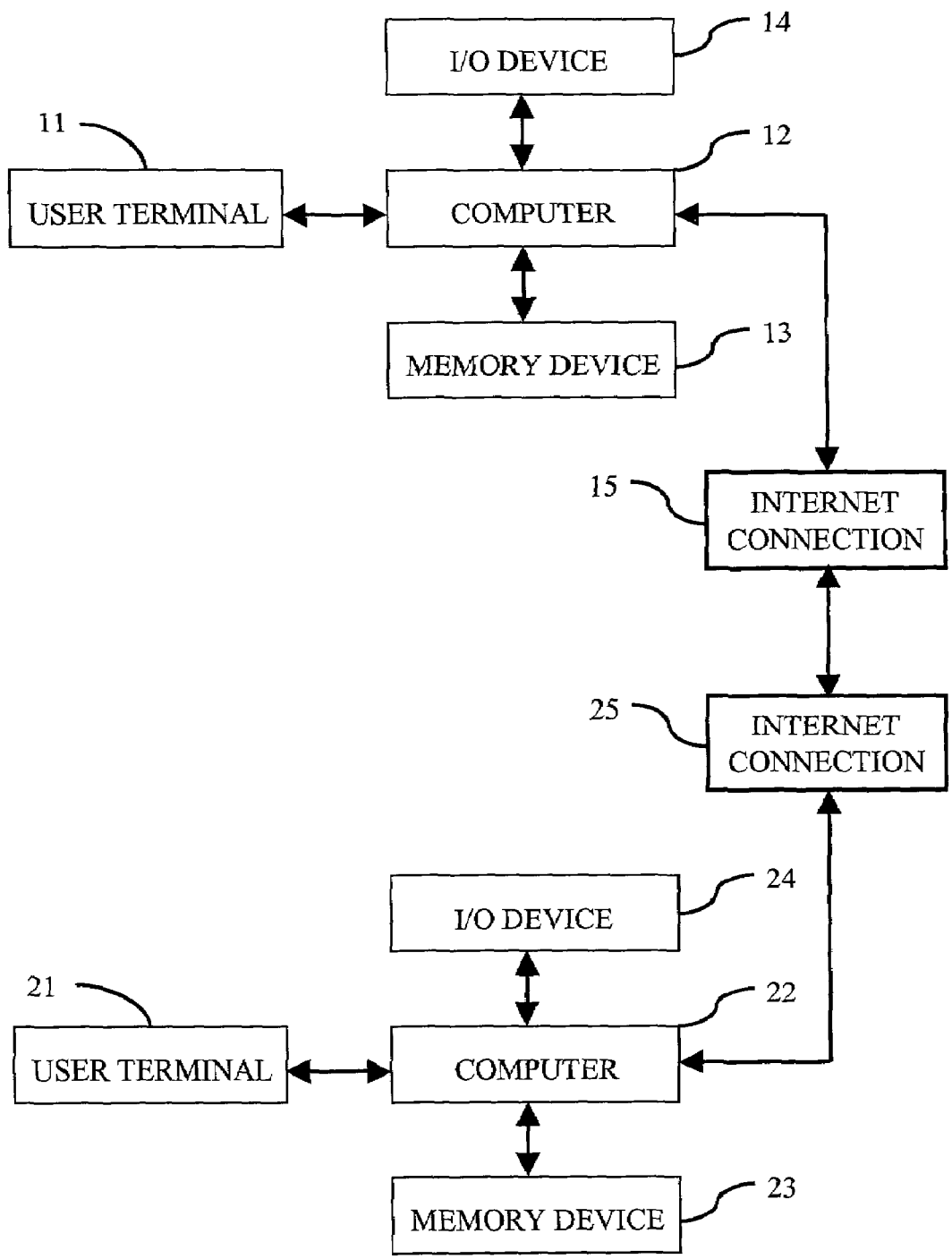
FIG. 1 is a schematic block diagram 10 of a computer system that may be used to practice the present invention.

FIG. 131 is a decision table 1106 of the steps performed when creating containers in which clips may be stored.

FIG. 132 is a decision table 1107 of the steps performed by the utility routine that loads the asset manager components, measuring tools, and rich-media application clips.

FIG. 133 is a decision table 1110 of the steps performed by the load monitor that monitors the load of clips.

FIG. 134 is a decision table 1111 of the processes that may be chosen by the state monitor during the clip loading process based on the state of the target clip.

FIG. 135 is a decision table 1112 of the steps performed by the state monitor when querying whether a clip has started loading.

FIG. 136 is a decision table 1113 of the steps performed by the state monitor when querying whether a clip has completed loading.

FIG. 137 is a decision table 1114 of the steps performed by the state monitor when querying whether a clip has started playing.

FIG. 138 is a decision table 1115 of the steps performed by the state monitor when querying whether a clip has stopped playing.

FIG. 139 is a decision table 1120 of the steps performed by the network bandwidth speedometer to determine the network bandwidth used by the previous transfer, the average network bandwidth used by a set of previous transfers, and a category of variant clips that may be suitable for future transfers based on the network bandwidth used by previous transfers.

FIG. 140 is a decision table 1121 of the steps performed by the asset manager to turn on the network bandwidth speedometer.

FIG. 141 is a decision table 1122 of the steps performed by the asset manager to turn off the network bandwidth speedometer.

FIG. 142 is a decision table 1130 of the steps performed by the CPU cycle speedometer to determine the number of CPU cycles used by the previous transfer, the average number of CPU cycles used by a set of previous transfers, and a category of variant clips that may be suitable for future transfers based on the number of CPU cycles used by previous transfers.

FIG. 143 is a decision table 1131 of the steps performed by the asset manager to turn on the CPU cycle speedometer FIG. 144 is a decision table 1132 of the steps performed by the asset manager to turn off the CPU cycle speedometer FIG. 145 is a decision table 1140 of the steps performed by the frame rate speedometer to determine the current frame rate of a clip, the average frame rate of a clip, and a category of variant clips that may be suitable for future transfers based on the frame rate of a clip.

FIG. 146 is a decision table 1141 of the steps performed by the asset manager to turn on the frame rate speedometer FIG. 147 is a decision table 1142 of the steps performed by the asset manager to turn off the frame rate speedometer FIG. 148 is a decision table 1200 of the steps performed during the initialization of the bootstrap procedure.

FIG. 149 is a decision table 1210 of the steps performed by the bootstrap procedure during the load of the Preloader.

FIG. 150 is a decision table 1220 of the steps performed by the bootstrap procedure during the load of the asset manager and active content loader.

FIG. 151 is a decision table 1230 of the steps performed by the bootstrap procedure during the load of the session procedure.

FIG. 152 is a decision table 1240 of the steps performed by the bootstrap procedure during the load of the tables used by the bootstrap procedure.

FIG. 153 is a decision table 1300 of the steps performed by the session procedure after the session procedure has been loaded.

FIG. 154 is a decision table 1310 of the steps performed by the session procedure when projects are initialized.

FIG. 155 is a decision table 1320 of the steps performed by the session procedure when a project has completed.

FIG. 156 is a decision table 1400 of the steps performed by the session procedure when a project is played.

FIG. 157 is a decision table 1410 of the steps performed by the project procedure when scene 1 is playing.

FIG. 158 is a decision table 1420 of the steps performed by the project procedure when a scene table is built.

FIG. 159 is a decision table 1430 of the steps performed by the project procedure when a scene table is initialized.

FIG. 160 is a decision table 1440 of the steps performed by the project procedure when a scene has completed.

FIG. 161 is a decision table 1450 of the steps performed by the project procedure when a non-sequential scene is requested to be played next.

FIG. 162 is a decision table 1460 of the steps performed by the project procedure when a scene is terminated.

FIG. 163 is a decision table 1470 of the steps performed by the project procedure when a project is held.

FIG. 164 is a decision table 1480 of the steps performed by the project procedure when a project is released from being held.

FIG. 165 is a decision table 1490 of the steps performed by the project procedure when an old scene is removed.

FIG. 166 is a decision table 1500 of the steps performed by the project procedure when a new scene is selected.

FIG. 167 is a decision table 1510 of the steps performed by the project procedure when the next sequential scene is to be played.

FIG. 168 is a decision table 1600 of the steps performed by the project procedure when a scene has been loaded and is ready to be played.

FIG. 169 is a decision table 1610 of the steps performed by the scene procedure when the scene is started.

FIG. 170 is a decision table 1620 of the steps performed by the scene procedure when a threshold period of time for a scene to play has been crossed.

FIG. 171 is a decision table 1630 of the steps performed by the scene procedure when a component has been loaded.

FIG. 172 is a decision table 1640 of the steps performed by the scene procedure when a component forces a scene to complete.

FIG. 173 is a decision table 1650 of the steps performed by the scene procedure when a scene is held.

FIG. 174 is a decision table 1660 of the steps performed by the scene procedure when a scene is released from being held.

FIG. 175 is a decision table 1670 of the steps performed by the scene procedure when a non-sequential scene has been selected to be played next.

FIG. 176 is a decision table 1680 of the steps performed by the scene procedure when the scene is terminated.

FIG. 177 is a decision table 1700 of the steps performed by the Asset Manager when the Asset Manager is initialized and started.

FIG. 178 is a decision table 1710 of the steps performed by the Asset Manager to determine the type of user request initiated by the user.

FIG. 179 is a decision table 1720 of the steps performed by the Asset Manager to process a Registration request call by the user.

FIG. 180 is a decision table 1730 of the steps performed by the Asset Manager to process a Scene Prep request call by the user.

FIG. 181 is a decision table 1740 of the steps performed by the Asset Manager to process a Scene Stage request call by the user.

FIG. 182 is a decision table 1750 of the steps performed by the Asset Manager to process a Scene Load request call by the user.

FIG. 183 is a decision table 1760 of the steps performed by the Asset Manager to process a Scene Play request call by the user.

FIG. 184 is a decision table 1770 of the steps performed by the Asset Manager to process a Scene Unload request call by the user.

FIG. 185 is a decision table 1780 of the steps performed by the Asset Manager to determine if a request slot has a request available.

FIG. 186 is a decision table 1790 of the steps performed by the Asset Manager to determine if a request from a request slot has completed.

FIG. 187 is a decision table 1800 of the steps performed by the Asset Manager to determine which request slot will be processed next.

FIG. 188 is a decision table 1810 of the steps performed by the Asset Manager to process all operations assigned to a given request slot.

FIG. 189 is a decision table 1820 of the steps performed by the Asset Manager to determine the type of operation to be processed next.

FIG. 190 is a decision table 1830 of the steps performed by the Asset Manager when a Prep operation is processed.

FIG. 191 is a decision table 1840 of the steps performed by the Asset Manager when a Stage operation is processed.

FIG. 192 is a decision table 1850 of the steps performed by the Asset Manager when a Load operation is processed.

FIG. 193 is a decision table 1860 of the steps performed by the Asset Manager when a Play operation is processed.

FIG. 194 is a decision table 1870 of the steps performed by the Asset Manager when an Unload operation is processed.

FIG. 195 is a decision table 1900 of the steps performed by the Active Content Loader when the Active Content Loader is initialized and started.

FIG. 196 is a decision table 1910 of the steps performed by the Active Content Loader to determine the type of request call to be processed.

FIG. 197 is a decision table 1920 of the steps performed by the Active Content Loader when a Register request call is processed.

FIG. 198 is a decision table 1930 of the steps performed by the Active Content Loader when an Unregister request call is processed.

FIG. 199 is a decision table 1940 of the steps performed by the Active Content Loader when a request call is queued.

FIG. 200 is a decision table 1950 of the steps performed by the Active Content Loader when a request call is dequeued.

FIG. 201 is a decision table 1960 of the steps performed by the Active Content Loader when the Loader Frame Loop is run.

FIG. 202 is a decision table 1970 of the steps performed by the Active Content Loader when it processes Load operations.

FIG. 203 is a decision table 1980 of the steps performed by the Active Content Loader when it determines if one or more loads have completed.

FIG. 204 is a decision table 1990 of the steps performed by the Active Content Loader when it determines if one or more loads have requested to be aborted.

FIG. 205 is a decision table 2000 of the steps performed by the Active Content Loader when the Loader Frame Loop processes Load operations.

FIG. 206 is a decision table 2010 of the steps performed by the Active Content Loader when a Scene Prep request is processed.

FIG. 207 is a decision table 2020 of the steps performed by the Active Content Loader when a Scene Stage request is processed.

FIG. 208 is an alternate decision table 2022 of the steps performed by the Active Content Loader when a Scene Stage request is processed.

FIG. 209 is a decision table 2025 of the steps performed by the Active Content Loader when Copy Component Parameters request is processed.

FIG. 210 is a decision table 2028 of the steps performed by the Active Content Loader when a Check Scene Checksums request is processed.

FIG. 211 is a decision table 2030 of the steps performed by the Active Content Loader when a Clip Load request is processed.

FIG. 212 is a decision table 2040 of the steps performed by the Active Content Loader when a Scene Load request is processed.

FIG. 213 is a decision table 2050 of the steps performed by the Active Content Loader when a file is selected that matches the current bandwidth, CPU cycles, and frame rates available to the Active Content Loader.

FIG. 214 is a decision table 2060 of the steps performed by the Active Content Loader when determining the amount of available bandwidth.

FIG. 215 is a decision table 2070 of the steps performed by the Active Content Loader when determining the amount of available CPU cycles.

FIG. 216 is a decision table 2080 of the steps performed by the Active Content Loader when determining the available frame rate.

DETAILED DESCRIPTION OF THE INVENTION

The following definitions are not meant to be limiting in nature and serve to provide a clearer understanding of certain aspects of the present invention.

Definitions:

Rich-media—Rich-media relates to the integration of multimedia components into Internet content such as websites, advertisements, and online editorial content (news, sports, etc.).

Rich-media applications—Rich-media applications include applications composed of one or more rich-media components.

Rich-media components—Rich-media components include 3D graphics, video clips, animation, special effects (including, but not limited to, zooms, wipes, fades, and spinning text), sound effects, and stereo music. Rich-media components may include WAV sound files, MP3 sound files, MPEG movie files, JPEG graphic files, GIF graphic files, SWF Shockwave Flash® files, and Java® applets.

CPU—A Central Processing Unit may be used to refer to a single processor, microprocessor, server, or other computer processor, or a group of processors, microprocessors, servers, or other computer processors that controls a computer-based system.

Internet—The Internet may be used as a generic term referring to any network of interconnected computers. The Internet includes terms such as, but not limited to, the Internet, the Internet 2, the World Wide Web, and Intranets.

GUI—A Graphical User Interface may be a means for a user to interact with a computer-based application. The GUI may be a graphical window that allows a user to input text, press buttons, move slider bars, or otherwise modify components that are used to effect the underlying application's parameters.

Cycle Pig—Cycle Pig may be used to refer to a clip that may use a large proportion of the CPU cycles. The Asset Manager may keep a dynamic cycle availability value for handling Cycle Pig processing.

Bandwidth Hog—Bandwidth Hog may be used to refer to a clip that may use a large proportion of the network transmission bandwidth. The Asset Manager may keep a dynamic bandwidth availability value for handling Bandwidth Hog processing.

Child—A child may be a component that performs part of an operation performed by a parent component. The child may be modified by a request made to its parent component. For example, a rich-media component that displays an animated movie may contain both a graphical child component and an acoustic child component.

Parent—A parent may be a component that contains child components.

Local Volume—Local volume may be a variable assigned to a single rich-media component. The local volume may determine a rich-media component's volume in relation to other rich-media components in a scene.

Global Volume—Global volume may be a variable assigned to a rich-media application as a whole. If the global volume is set to zero, the rich-media application may not produce any sound. Otherwise, the global volume may be used as a scaling factor from 0–100% of the maximum volume.

Chrome File—A chrome file may contain both the visible portion of a component and programs that may control the operation of the chrome file or may report mouse events to the control file.

Control File—A control file may contain programs that operate the component. Such programs may include ones that assign data from the component's data block file to the component's attributes, respond to reports of mouse events from the chrome file, and control the underlying function of the component.

Data Block File—A data block file may contain the data that comprises a component's attributes.

Atomic—An atomic may be a chrome file that is shared by one or more components. For instance, an atomic may be an image that is used for a scene background and for a window background simultaneously.

Mouse Event—A mouse event may comprise one or more actions that are performed by the user with the user's mouse. Examples of mouse events may include rollovers, rollouts, presses, releases, dragovers, dragouts, and clicks.

Grid—A grid may comprise a series of horizontal and vertical lines that are evenly spaced. The distance between two horizontal lines or two vertical lines in the grid may be controlled by user input.

Grid Point—A grid point may comprise an intersection between a horizontal and a vertical line in a grid that may be used to align one or more components.

Guide Line—A guide line may comprise a horizontal line or a vertical line that may be used to align one or more components.

Snap—A component may snap to a grid point or a guide line when the snapping function is enabled. Snapping involves the computer process determining the nearest grid point or guide line and moving the center of the component to the grid point or the guide line.

Reference will now be made in detail to implementations of the present invention as illustrated in the accompanying drawings. Wherever possible, the same reference numbers will be used throughout the drawings and the following description to refer to the same or like parts.

The present invention embodies systems and methods for allowing a user to create rich-media applications via the Internet. Presentation of content using rich-media is a new Internet paradigm. Rich-media enables Internet application designers to engage and hold application viewers' attention by attracting, transacting, and communicating with viewers online. It simplifies the presentation of complex information with much greater sensory and communicative impact than previous Internet design methods, such as coding in HTML.

Rich-media productions are programmed and edited using powerful and complex tools designed for this purpose. Such productions are a recent phenomenon to the Internet and have only been made possible by the introduction of multimedia tools and technologies for the creation of high-production Internet content. None of these multimedia tools and technologies, however, allows for the creation of rich-media applications via the Internet.

Users of the present invention may design visually enticing websites containing three-dimensional graphics that expand, contract, move across the screen, or fade from view instead of simply presenting a page of text. The website may use rotating logos or symbols for access to other pages instead of blue, underlined hyperlinks. The website may have symphonic quality sound or incorporate movie clips as well. Alternatively, a rich-media application might encompass an Internet cartoon, a magazine, a movie, an advertisement, or other applications that focus on providing entertainment rather than information.

In a specific embodiment of the present invention, a business method relating to providing a user with a method of designing and creating a rich-media application via the Internet may be implemented by accessing the rich-media application development tools on a third party website and using them to create the rich-media application. In a specific embodiment, the third party may charge a fee from the user. In a specific embodiment, the fee may be charged for using the rich-media application development tools. In a specific embodiment, the fee may be charged for using the created rich-media application.

In a specific embodiment of the present invention, a business method relating to providing the rich-media application development tools to a third party website maintainer includes the step of assisting in the development of a software platform to allow the use of the rich-media application development tools on the third party's website. In a specific embodiment, the right to use the rich-media application development tools may be licensed for a fee to the third party. In a specific embodiment, this fee may be collected from the third party as one or more of the following a one-time fee, a per-customer fee, a per-project fee, a time-based fee (e.g., daily, weekly, monthly, yearly).

In a specific embodiment of the present invention, a business method relating to providing third party website maintainers with a method of providing users the ability to create rich-media applications via the Internet by assisting in the development of a software platform using rich-media application development tools on said third party's website. In a specific embodiment of the present invention, the third party purchases the right to use said software platform containing rich-media application development tools. In a specific embodiment of the present invention, the purchase of the right to use the rich-media application development tools includes the third party paying a fee on a one-time basis, a per-customer basis, a per-project basis, and/or a time-based manner.

FIG. 1 illustrates an exemplary computer system 10 that may be modified in accordance with the principles of the present invention. The exemplary computer system comprises a computer subsystem for the user and a computer subsystem on which the present invention may reside.

On the user side, one or more user interface devices, such as a terminal 11, a keyboard, and a monitor may be connected to a computer 12, such as a main frame computer, minicomputer, microprocessor, server, etc. The computer 12 may include a mass-storage memory device and other memories 13, and also other input or output devices 14. The computer 12 may be connected to the Internet via an Internet connection 15. The mass-storage memory device may include one or more of the following, but is not limited to, a server-based computer system, a hard drive, RAM, or ROM.

On the host side, one or more user interface devices, such as a terminal 21, a keyboard, and a monitor may be connected to a computer 22, such as a main frame computer, minicomputer, microprocessor, server, etc. The computer 22 may include a mass-storage memory device and other memories 23, and also other input or output devices 24. The computer 22 may be connected to the Internet via an Internet connection 25. The mass-storage memory device may include one or more of the following, but is not limited to, a server-based computer system, a hard drive, RAM, or ROM.

The user and host computer systems may be connected to each other through the Internet via their respective Internet connections 15 and 25.

A computer program for creating rich-media applications resides in the host memory device 23 for operation on the host computer 22. This computer program presents the user with a variety of options including, but not limited to, the ability to view the functionality of the computer program, the ability to create, modify, or delete accounts designed by a user, the ability to enter or leave a restricted area of the program, the ability to access account and project information, and the ability to access the part of the program designed for the creation of rich-media applications.

Host Webpage Design

Figure 2:
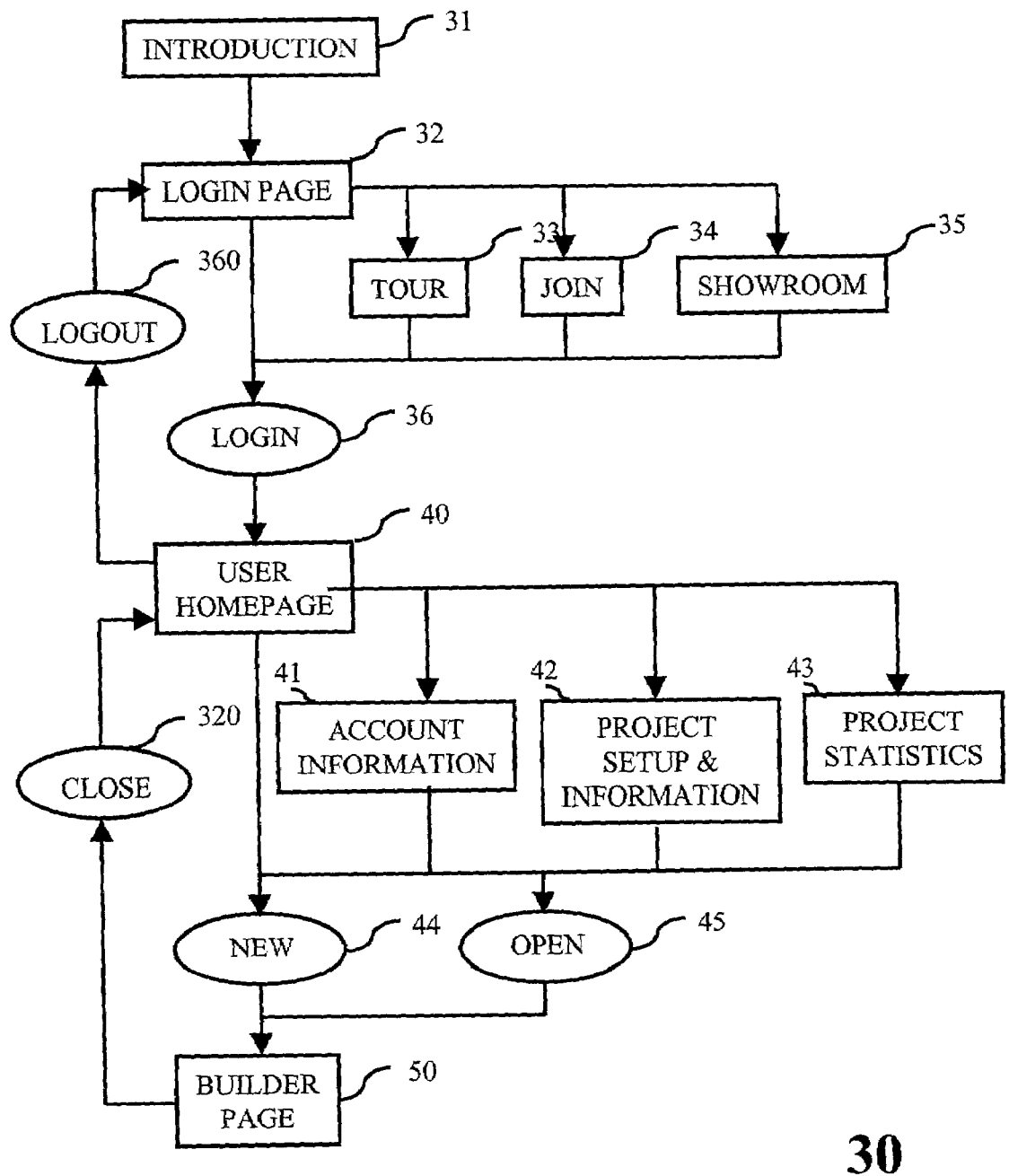
FIG. 2 is a flow diagram 30 of the sequence of web pages that the user of the present invention may encounter when accessing the modified computer system.

FIG. 2 shows a specific embodiment of the present invention where the user may be presented with a series of Internet browser windows upon accessing the underlying program. First, the user views the Introduction page 31, which displays a rendering of the present invention's graphic and acoustic capabilities. The program automatically loads the Login page 32 upon completion of the Introduction page. The Login page 32 offers a menu of pages to access. These pages may include the Tour page 33, the Join page 34, and the Showroom page 35. If no links are selected, the program may automatically load these pages in sequence before returning the user to the Login page 32. If the user enters a username and password (collectively 36), the program verifies the combination and either accepts or denies access to the User Homepage 40. If the user is denied access to the User Homepage 40, then the user may be returned to the Login page 32 to attempt to enter a valid username/password combination.

In this embodiment, the Tour page 33 may be an automated series of scenes designed to highlight the present invention's functionality and features. The features that the page displays may include an inventory of production types, component drag-and-drop loading, component-editing GUIs, an inventory of components, and user-image uploads. The Join page 34 allows new users to register to use the present invention. The page includes a series of dialog boxes that ask for pertinent information from the user such as name, address, e-mail address, telephone numbers, and other contact information. The Showroom page 35 shows the user examples of rich-media applications that were created using the present invention.

The User Homepage 40 provides access to a user's account profile and allows the user to select options to, e.g., create a new rich-media application or modify an existing rich-media application. The page contains an Open Project list 45 of the user's currently open applications listed with name, date of most recent modification, and a brief description. The user may directly select an application to modify by clicking on the appropriate application in the Open Project list 45. In the alternative, the user may select from a menu accessing, e.g., the following pages: Account Information 41; Project Setup & Information 42; Project Statistics 43; and New Project 44. Each of the first three links loads its respective page. The New Project link 44 opens the Builder page 50.

The Account Information page 41 allows a user to review user data, such as registration information, billing information and status, project summaries, account preferences, and user terms.

The Project Setup & Information page 42 allows a user to review and modify project-specific information and settings, such as the project description, objectives, site type, site map, site assets (graphic files and uploads, etc.), site performance, and e-commerce and publishing specifications. This link may display a list of projects, from which the user may make a selection. A user may also load the Project Setup & Information page 42 by selecting Settings from the global command menu on the Builder page 50 when a project is loaded.

The Project Statistics page 43 allows a user to review aggregate and specific information on project activities including a weekly session log, server activity, and an access record for published projects. A user may load an overall statistics report screen that displays site activities relevant to specific sites, such as e-commerce traffic. Statistics are presented in graph and bar chart formats.

Figure 3:
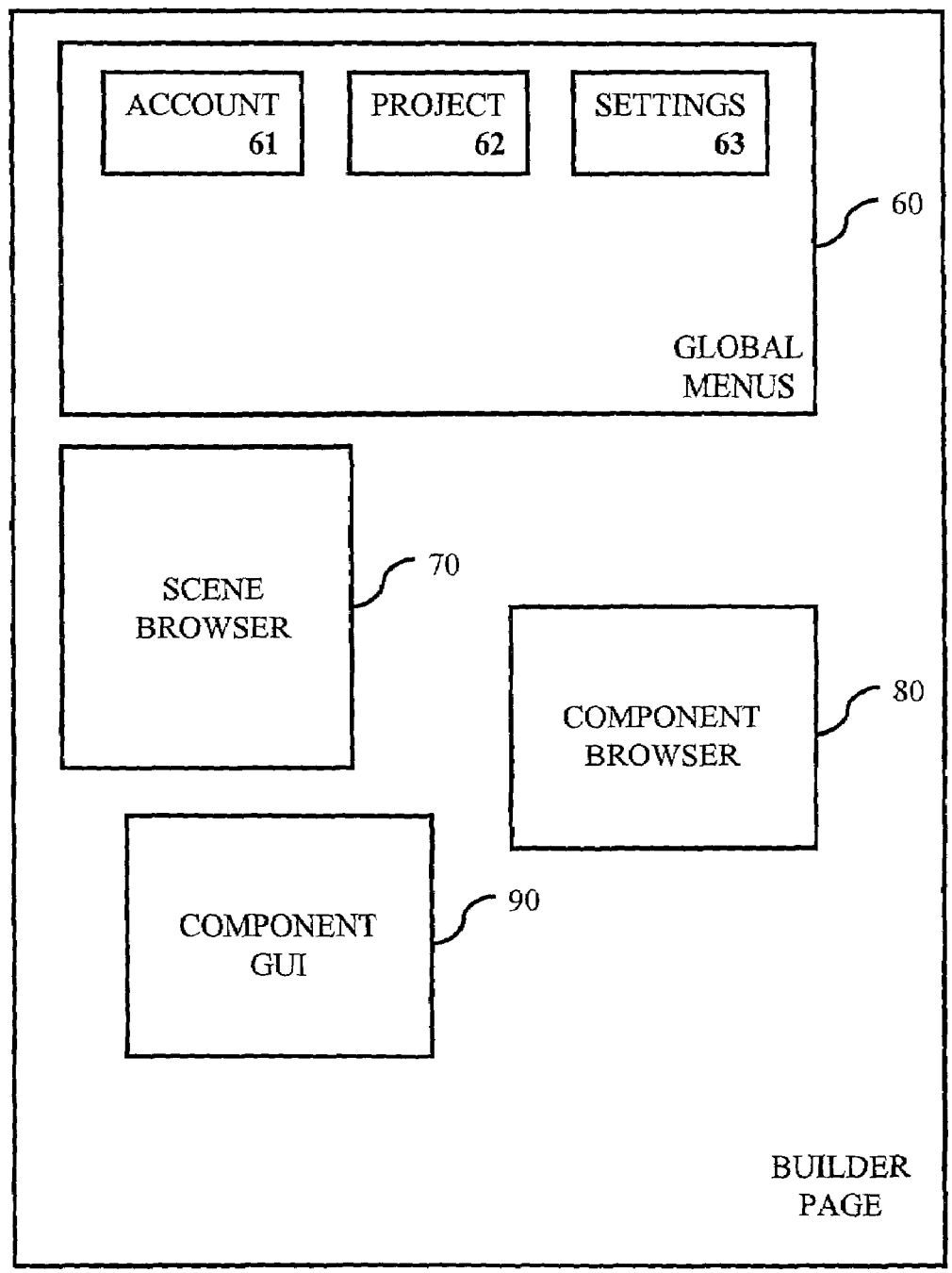
FIG. 3 is a schematic 50 of the components of the present invention's browser window in which the user designs and creates rich-media applications.
Figure 4:
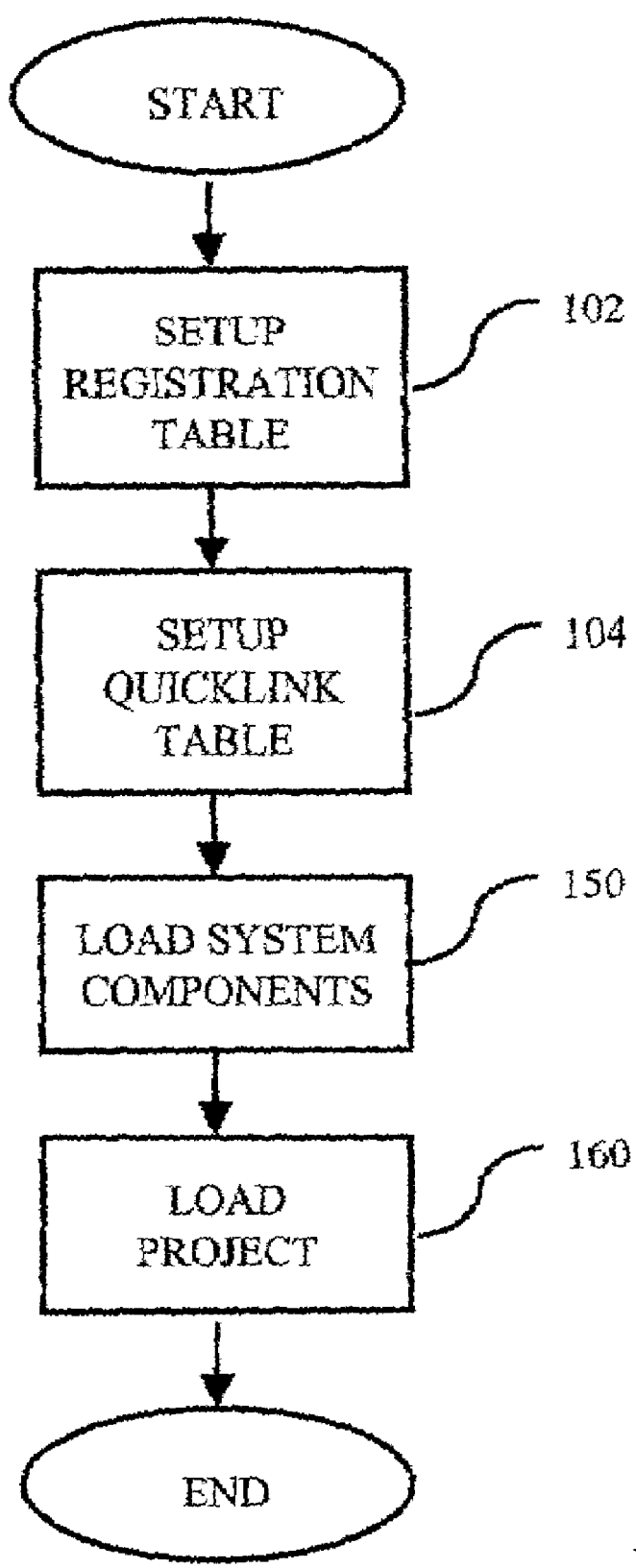
FIG. 4 is a flow diagram 100 of the initialization of the design application for the present invention.

The Builder page 50, as illustrated in FIG. 3, comprises the functional center of a specific embodiment of the present invention, and may be where a user creates new projects or modifies existing projects. The page may be accessed from the User Homepage 40 either from the New Project link or directly from the Open Project list 45. Access from the New Project link 44 loads the Builder page 50 with a New Project window overlay, where the user names and briefly describes the new project before starting work. Access from the Open Project list 45 loads the Builder page 50 with the selected project ready for review and modification.

A specific embodiment of the present invention for designing and creating rich-media applications includes allowing a user to access a Builder page 50. In this embodiment, the Builder page 50 features a work area, builder component browsers docked and closed along the right margin, global menus extending along the top margin, and the project title at the left end of the top margin. The user may move the tabs and otherwise customize the layout of the Builder page 50, as desired, through simple cursor dragging. For a new project, the work area may appear black. With an existing project loaded for revision, the work area may contain the first scene of the project. The functional elements of the Builder page 50 may include Global Menus 60, the Scene Browser 70, the Component Browser 80, and Component GUIs 90.

The Global Menus 60 allow the user to perform many of the basic functions of the Login page 32 and User Homepage 41 from within the Builder page 50, as well as perform basic project functions, such as saving, closing, or previewing a project. The menus may be arranged under three main headings listed along the top page margin. When the cursor is placed over a main heading, the heading may illuminate and a corresponding drop-down menu may appear below. The cursor may then be brought down to the desired item and the item selected. The user may reposition the menus along the top margin by cursor dragging. Menus included in the Global Menus 60 may include the Account menu 61, the Project menu 62, and the Settings menu 63.

The Account menu 61 allows the user to access basic account information 41, create a new account 34, login to a different account 36, or logout 360. Selecting a menu item loads an appropriate dialog box that verifies the user's intent with simple cancel and accepts options. An "accept" selection loads the appropriate page.

The Project menu 62 allows the user to Start a New Project 44, Open an Existing Project 45, Save Project 310, Close Project 320, Delete Project 330, Publish Project 340, or Preview Project 350 for the current project showing on the Builder page 50.

The Settings menu 63 links to the Project Setup & Information page 43 where project specifications for a project loaded into the Builder page 50 may be reviewed.

The Scene Browser 70 may be opened when the user selects the Scene tab located on the right margin. The tab may then extend into the page and display the scenes as "thumb-nail" images that comprise the production. A user may scroll the scenes using the arrows on the bottom bar of the browser window. Selecting a scene image immediately loads that scene into the Builder page 50. Selecting the title bar below the image displays a scene command menu with the following options: Modify Scene 800, Insert New Scene 810, Edit Scene Info 820, Delete a Scene 830, and Reorder Scenes 840. These commands may be used at any time when the user may be in the Builder page 50.

The Component Browser 80 enables the user to review and select from the components available in the project. Such components may include backgrounds, text fields, headers, soundtracks, images, and navigation elements. The Component Browser 80 opens when the user selects its tab. The tab then may extend into the page and display the first-level component folders.

The contents of the Component Browser 80 may be organized by type in a hierarchy of folders, subfolders, and files. The design of the Component Browser 80 preferably allows this hierarchical data to be organized and displayed in a variety of ways without compromising functionality.

The lowest file level within the Component Browser 80 preferably contains the component files themselves, designated by a component icon. At this level, the user may add a component to the project. To perform this function, the item from the file display area may be selected, dragged, and dropped into the Builder page 50. When this procedure is completed, the Builder page 50 may display the added component and its Component GUI 90.

In a specific embodiment of the present invention, a component may be comprised of a number of files. For example, the component may be comprised of three files, which may include a chrome file, a control file, and a data block file.

The chrome file may contain data relating to the visible portion of the component (the "chrome") and may be either an atomic or a specific, unique file. The chrome file may contain one or more programs. These programs may include programs that may control how the component may be displayed or may report mouse events to the control file.

The control file may contain one or more programs that may control the operation of the component. The control file may perform a number of functions, which may include making the component visible and invisible at appropriate times and setting the component attributes (x position, y position, rotation, etc.) based on information from the data block file. The control file may apply the component attributes to the chrome. It may handle other functionality of the component as well. For instance, the majority of the program for a component that may perform a calculator operation may reside in the control file, while the chrome for such a component may contain only the numeric display and input buttons. As another example, a chrome for a component that may operate as a button may access its control file so that it may report when the mouse may have rolled over the component or when a mouse press may have occurred within the component's location in the Scene Browser. The action that may be taken as a result of one of these events may be programmed in the component's control file.

The data block file may contain data such as the component's attribute list (x position, y position, rotation, x-scale, y-scale, etc.). The data block file may operate as a communication point between the chrome file and the control file. If the user chooses to move to a new scene, the current state of a component may be stored in the data block file so that the component's chrome file and control file may restore the component to its previous state if the user moves back to the initial scene.

In a specific embodiment, a control file may be shared between unanimated atomics of the same component type. For instance, if five background components are used in a project, only one control file may be used to control all of the backgrounds. Likewise, a separate control file may be used for text paragraph components, but all text paragraph components may access the same control file.

In a specific embodiment of the Component Browser, the user may be able to access a subset of all available atomics by entering a keyword into a textfield. Each keyword may be used to represent a category with which that atomic may be associated. A user may assign one or more keywords to an atomic that may be uploaded by the user. In addition, pre-defined components may have one or more keywords with which they may be associated.

When a component is installed, an editing Component GUI 90 specific to that component preferably appears as an overlay on the Builder page 50. Each installed component preferably displays its own editing window. Examples of types of components that may be edited preferably includes production types, backgrounds 600, images 610, navigation elements 620, sounds 630, text fields 640, text headers 650, and e-mail windows 660.

A Component GUI 90 functions as a component control panel, and allows the user to find, review, and change relevant component attributes, such as size 692, transparency 693, rotation 694, position 695, color 654, and layout 661. In a specific embodiment, each editing window displays several attribute panes. Each attribute pane preferably contains selectable arrows used to display or hide the control feature for the attribute. When an attribute is altered, the component in the work area may immediately display the change. Each editing window also includes Delete 696, Undo 698, and Save 697 functions, with "delete" and "undo" specific to the component and "save" a global project command. The user may drag the Component GUIs 90 freely on the page, and minimize or restore them using the command button on the top bar of the Component GUI.

In a specific embodiment, the Builder may provide an Undo function 698. Component modifications including, but not limited to, modifications made to component properties, component selection, component relocation, and component deletion may be reversed via the Undo function. In a specific embodiment, the Undo function may create a "chain" of actions that were previously performed and may be undone. In a specific embodiment, the Undo chain may be deleted when a new scene is selected. The Undo chain may also be deleted when a Save, Preview, or Publish operation is performed.

A specific embodiment of the present invention includes a method for designing and creating a rich-media application. This method may preferably include a program that resides in a host memory device 23 for operation on the host computer 22 designed to perform these functions. The program may include code that provides the user, e.g., the ability to create new rich-media applications, the ability to modify existing rich-media applications, the ability to access account information, the ability to access project information, and the ability to allow the user to upload new components for use in the creation or modification of a rich=media application. The user may perform all of these functions by accessing the program via the Internet from the user's computer 12.

Rich-Media Application Builder

FIGS. 4–10 illustrate a high-level example of the initialization procedure that takes place prior to allowing the user to design and create a rich-media application. In a specific embodiment of the present invention, the initialization of the Builder page 100 may require that a Registration Table Setup 102 takes place. This Registration Table may be used by the Builder to hold component information. This information may include component attributes and a unique identifier, which contains 18 digits in a specific embodiment of the present invention. The identifier may be used to access the component from a database maintained in a memory device 23 on the host computer 22.

Additionally, a Quicklink Table Setup 104 preferably takes place during the initialization of the Builder page 100. The Quicklink Table preferably contains a registration of linkable components that may be easily accessed from a navigation window. A possible use of this feature may include placing a Quicklink in a menu in order to access a component or scene with a single mouse click. The Quicklink Table preferably maintains an identifier for the linked object, which may include a URL, a unique component identifier, or a unique scene identifier.

Figure 5:
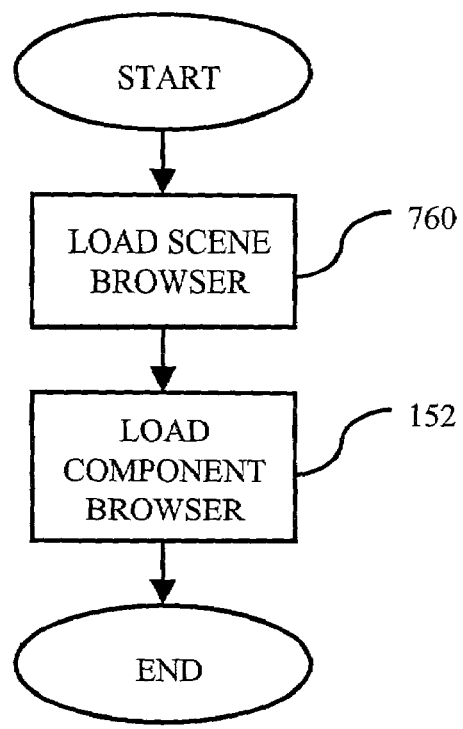
FIG. 5 is a flow diagram 150 of the loading of the two Internet browser windows for the design application.

Next, the initialization sequence Loads the System Components 150. FIG. 5 shows this process for a specific embodiment of the present invention. Two browser windows are loaded into the Builder page 50: the Scene Browser 760 and the Component Browser 152.

In the specific embodiment of the present invention, the Scene Browser Load process 760 loads the Scene Browser 70 which allows the user to create, modify, insert, reorder, and delete scenes of the rich-media application. A scene represents an individual time slice of the rich-media application. The user may add components to a series of scenes in order to create the rich-media application.

In the specific embodiment of the present invention, the Component Browser Load 152 loads the Component Browser 80, which preferably contains a list of all components that are available to the user who may be maintaining the project. This component list may include components that the user has previously uploaded to the system, as well as a base set of components offered by the host website maintainer. Because different users may upload different components, the contents of the Component Browser 80 may vary among users.

Figure 6:
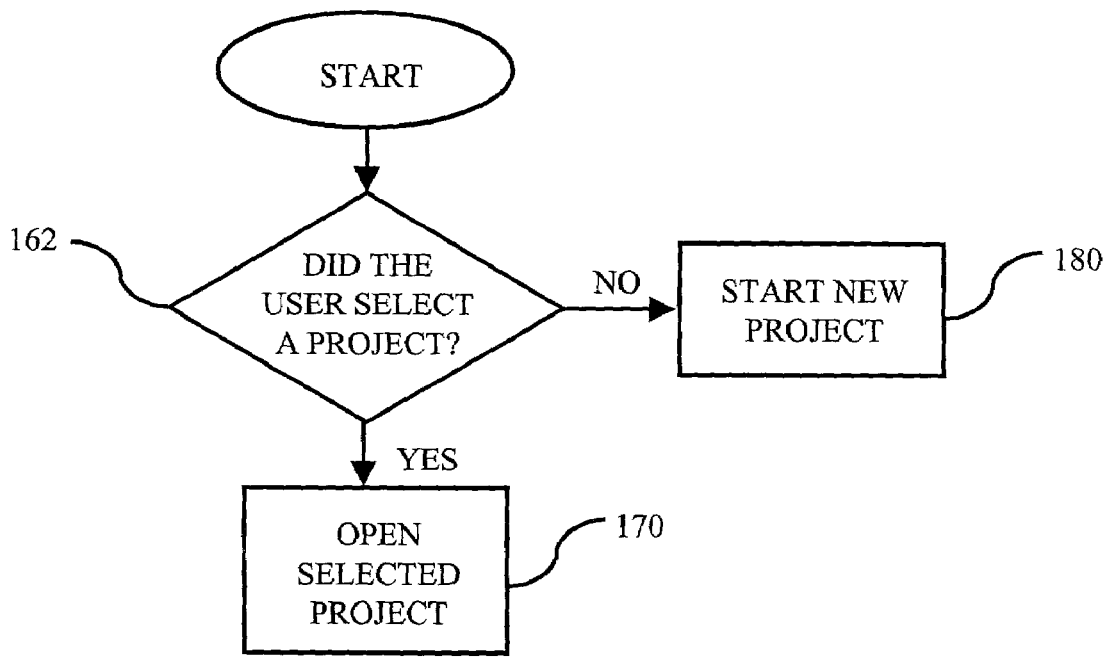
FIG. 6 is a flow diagram 160 of the user selection of a new or existing project.

FIG. 6 illustrates two possible methods for initializing the Builder page 100. The user may choose to open an existing project 170 by accessing a project from the Open Project list 45 on the User Homepage 40. Alternatively, the user may choose to start a new project 180 by selecting the New Project link 44 on the User Homepage 40.

Figure 7:
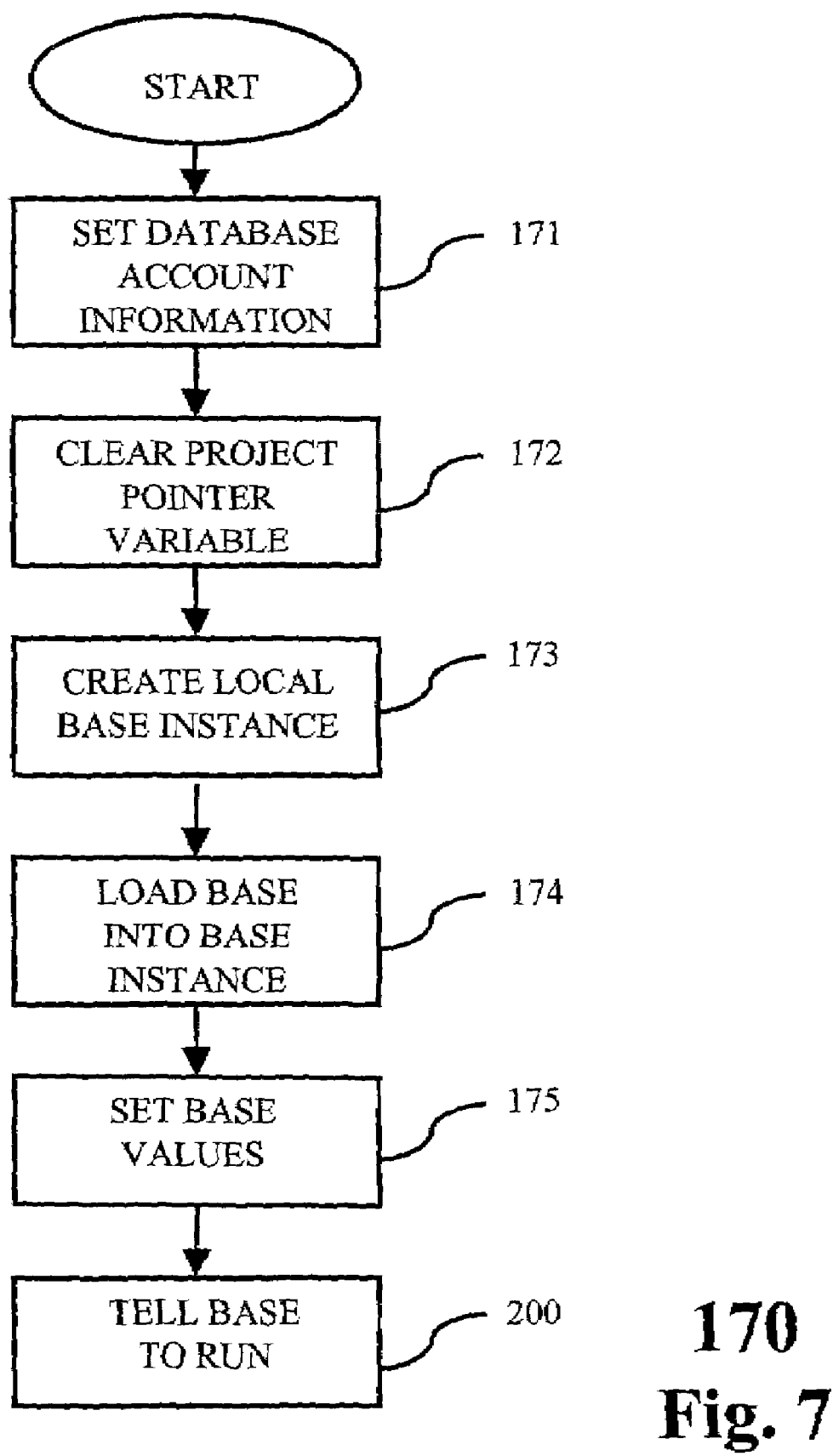
FIG. 7 is a flow diagram 170 of the initialization of the design application based on the user selection of an existing project.

FIG. 7 illustrates the steps that are taken when an existing project is opened 170 in a specific embodiment of the present invention. First, account information may be updated in the project database noting that the user has selected the project 171. The specific embodiment then clears the project pointer variable 172. At this point, the specific embodiment accesses the host memory device 23 that stores project information in order to retrieve the project information for the selected project. An instance may be created for the project 173, and attributes and properties previously assigned to the project are retrieved from the database and loaded into the instance. The specific embodiment then accesses the host memory device to load the project data into the base instance 174. Finally, the identifier information may be set for all components, including the project, in the Registration Table 175. This identifier may be used to uniquely identify every component, scene, and project in the system. The identifier may be numeric and, in this example, may comprise an 18-digit identifier.

Figure 8:
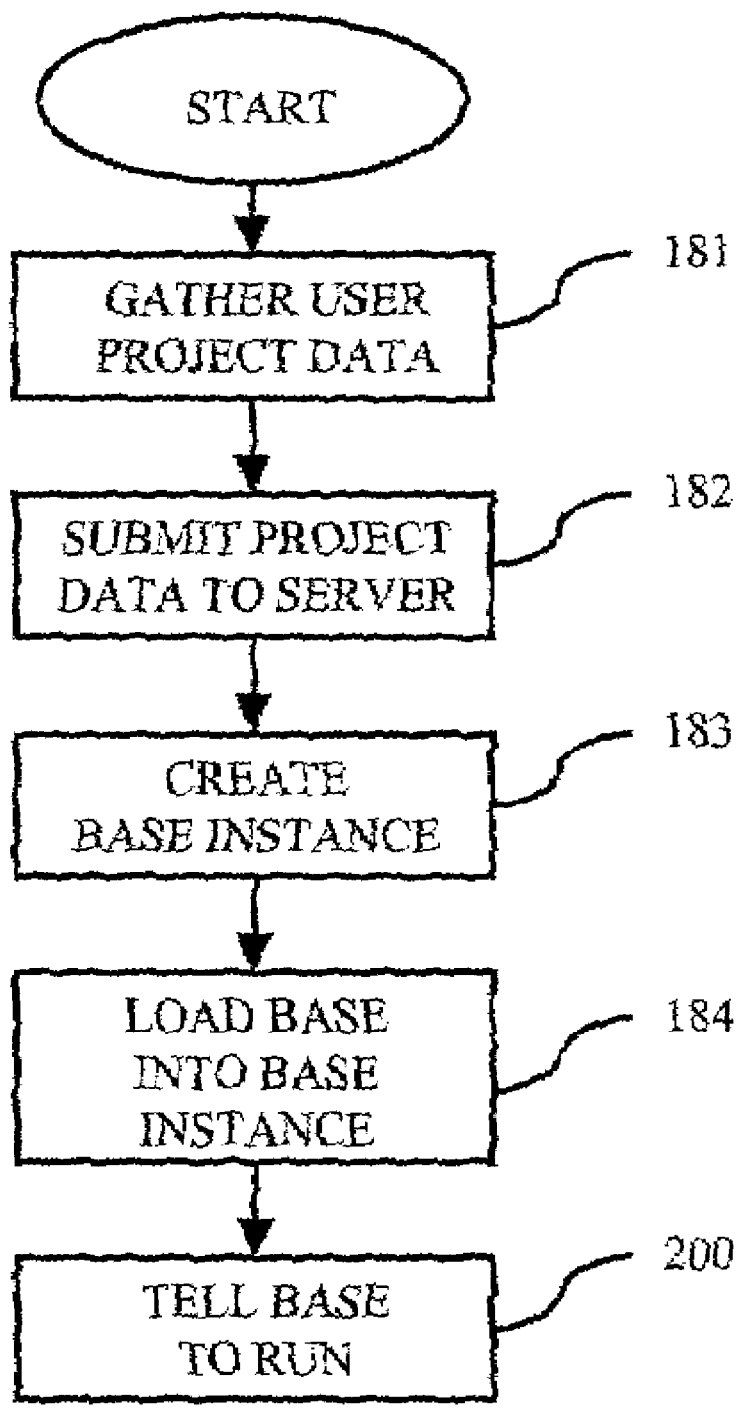
FIG. 8 is a flow diagram 180 of the initialization of the design application based on the user selection of a new project.

FIG. 8 shows the steps taken when a new project may be created 180. This specific embodiment of the present invention gathers user project information 181 including, but not limited to, the title of the project and the user account number. Then, the project information may be sent to the host memory device 23 in order to create a new project information entry in the resident database 182. The specific embodiment then creates a new base instance 183 and loads a blank project into the instance. In a specific embodiment, the database may be a flat file.

Figure 9:
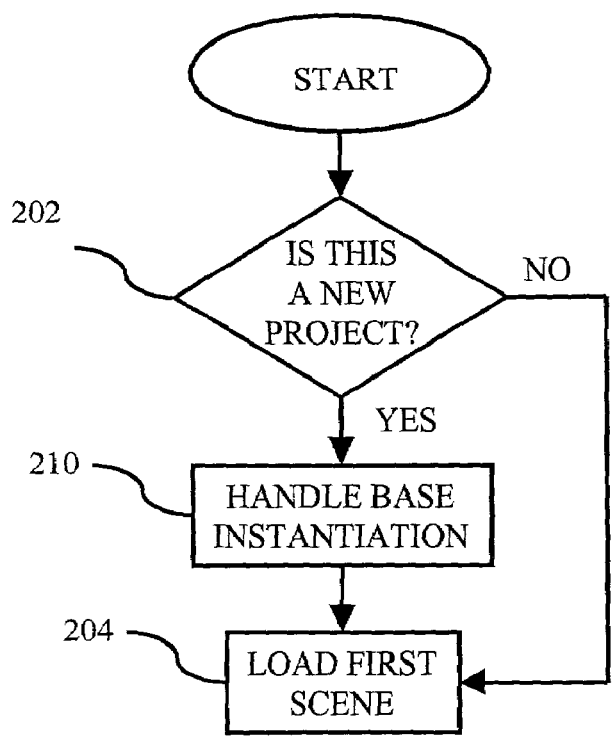
FIG. 9 is a flow diagram 200 of the initialization of variables assigned to the selected project.
Figure 10:
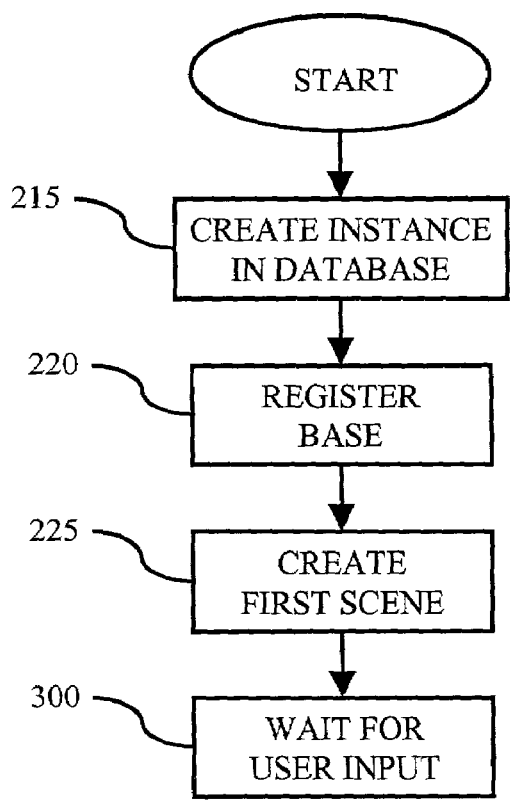
FIG. 10 is a flow diagram 210 of the registration of the project with the host system.

After opening an existing project 170 or creating a new project 180, the project begins to execute 200. FIGS. 9 and 10 illustrate the steps taken to open the first scene in the Scene Browser 70. After initializing some local variables, a specific embodiment of the present invention again determines whether the project was newly created 202. If the project is an existing project, the specific embodiment may load the first scene of the project 204 and may wait for the user to select a function 300.

If the project is a new project, the specific embodiment may handle the instantiation of the base instance 210, as illustrated in FIG. 10. The process of instantiating a new base instance begins by requesting a unique identifier for the project 215. This identifier may then be registered in the Registration Table. The Scene Browser 70 then creates a blank scene for the first scene in the project 225, and the program waits for the user to select a function 300.

Figure 11:
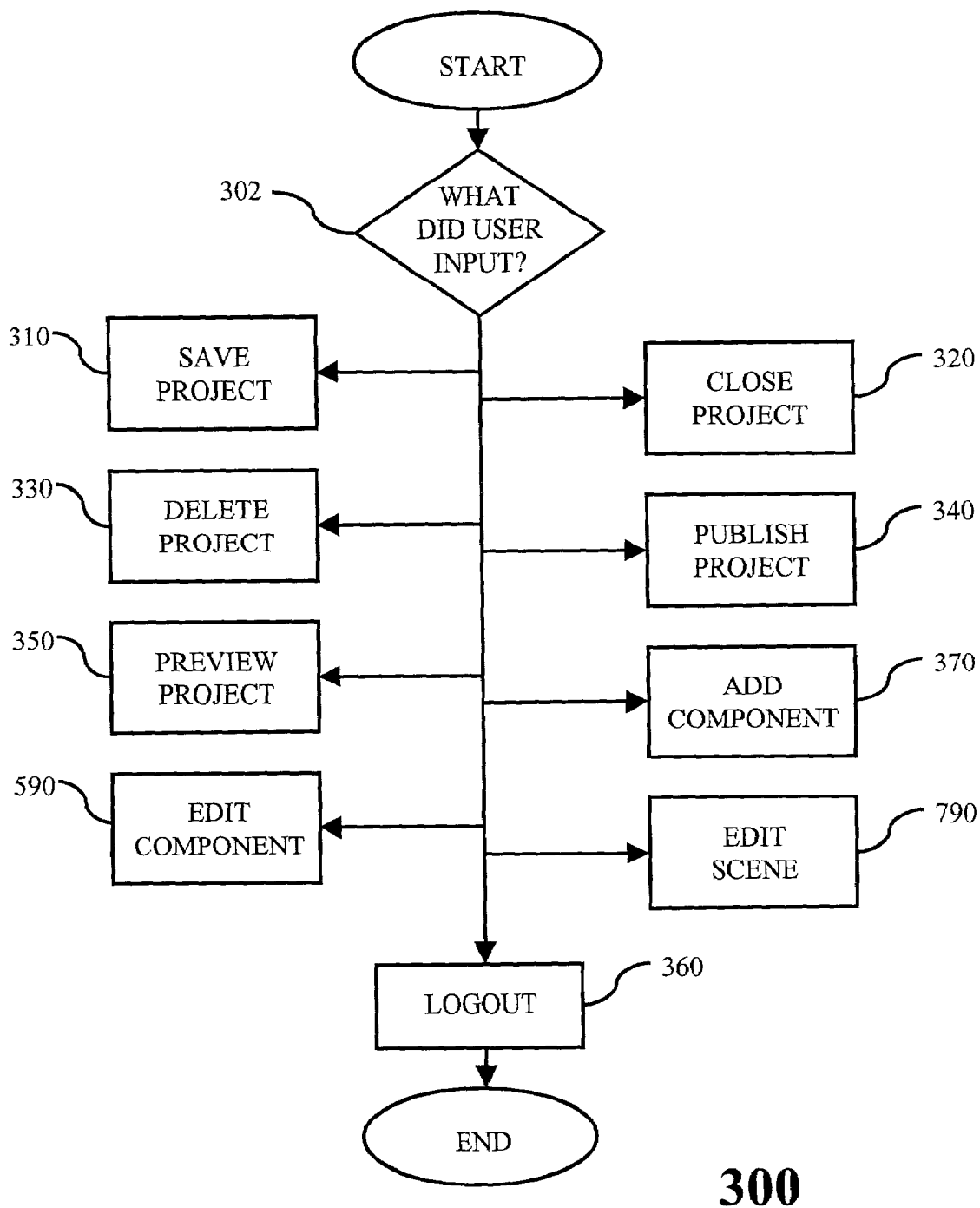
FIG. 11 is a flow diagram 300 of the tasks that a user of the present invention may effect upon the selected project.

After the initialization process, the user may modify the rich-media application. FIG. 11 illustrates the main tasks that the user may perform by providing the proper input. These tasks may include Saving 310, Closing 320, Deleting 330, Publishing 340, or Previewing 350 a project by accessing the Project menu 62, Adding a component 370 by selecting a component from the Component Browser 80, Editing a component 590 by modifying information in the Component GUI 90 associated with that component, and Editing a scene 790 by accessing the Scene Browser 70. Additionally, the user may Logout 360 from the system by accessing the Account menu 61.

Figure 12:
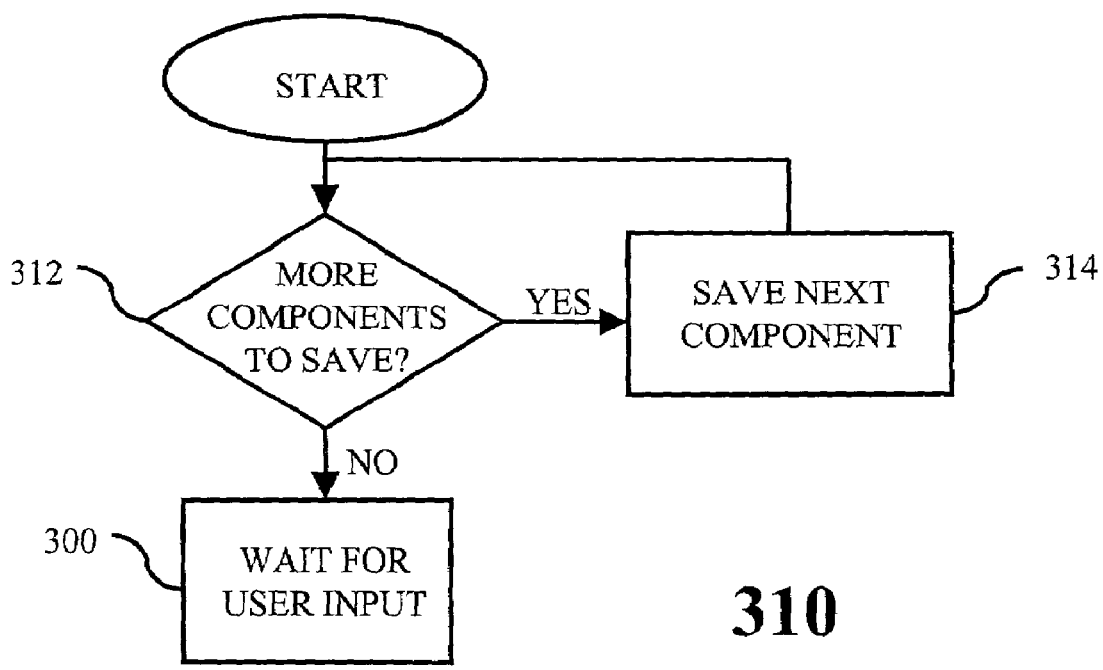
FIG. 12 is a flow diagram 310 of the steps performed by the save project procedure when a user elects to save the current project.
Figure 13:
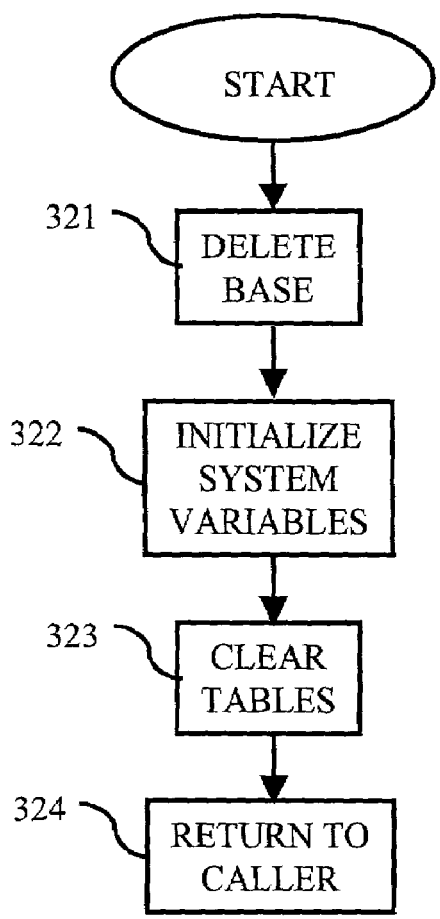
FIG. 13 is a flow diagram 320 of the steps performed by the close project procedure when a user elects to close the current project.
Figure 14:
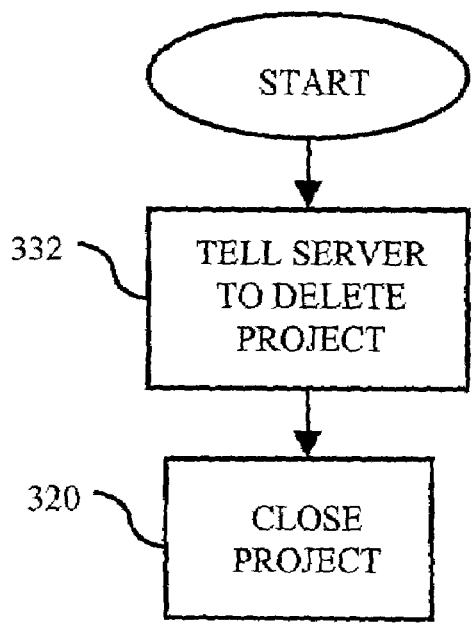
FIG. 14 is a flow diagram 330 of the steps performed by the delete project procedure when a user elects to delete the current project.
Figure 15:
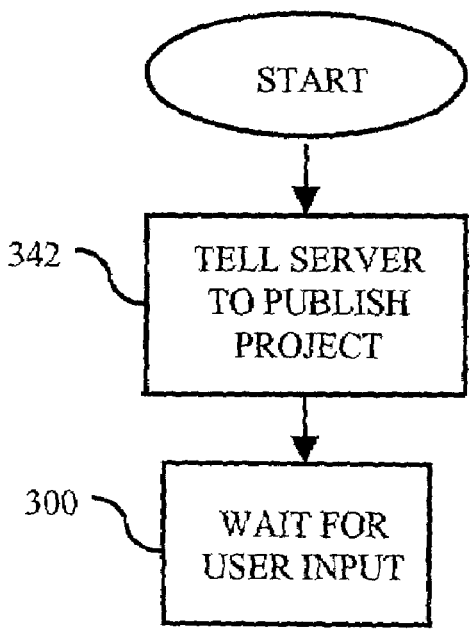
FIG. 15 is a flow diagram 340 of the steps performed by the publish project procedure when a user elects to download the current project from the present invention's host server to the user's local server.
Figure 16:
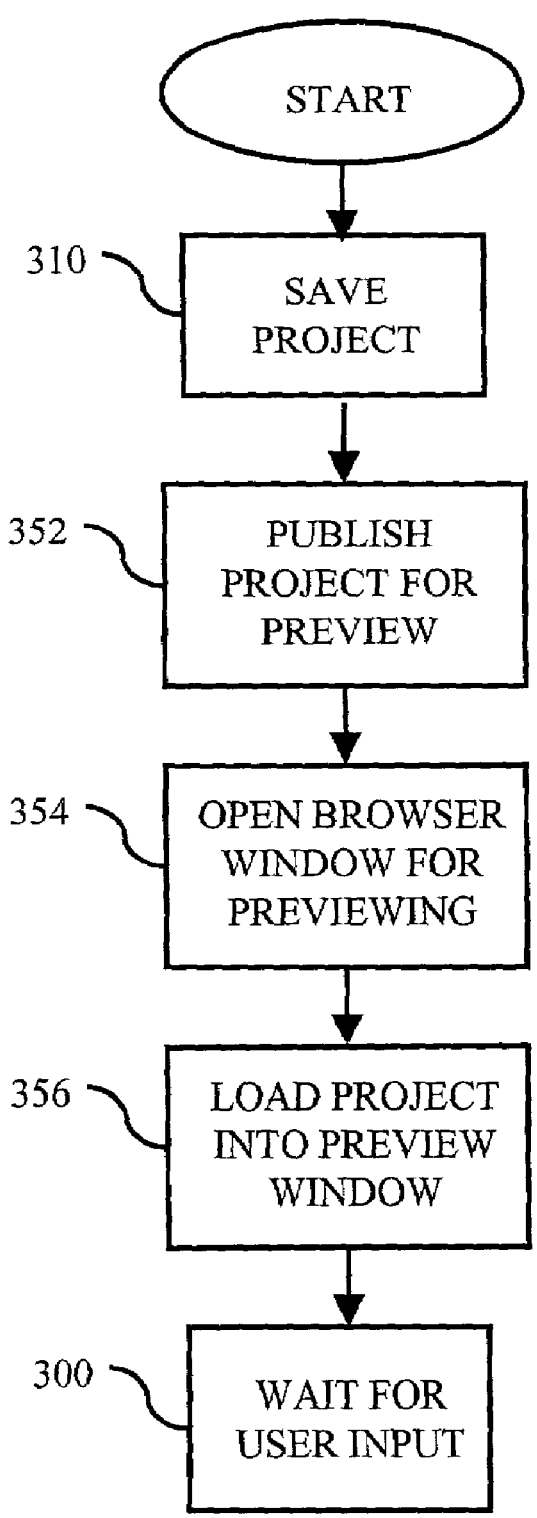
FIG. 16 is a flow diagram 350 of the steps performed by the preview project procedure when a user elects to preview the current project on the present invention's host server.

If the user chooses Save Project 310, as illustrated in FIG. 12, a specific embodiment saves each component's information into the project database 314. When all components have been saved 312, the specific embodiment completes and waits for further input from the user 300. If the user selects Close Project 320, as shown in FIG. 13, the specific embodiment deletes the base 321, initializes the system variables 322, clears the Registration and Quicklink tables 323, and returns to the User Homepage 40. Clearing tables may prevent new projects from receiving incorrect information when another project might be opened. FIG. 14 illustrates the procedure followed when the user selects Delete Project 330. Delete Project tells the host memory device 23 to delete the current project and project information from its database. The project then follows the same procedure as Close Project 320. The Publish Project command 340 allows the user to issue a command to the server to copy the project from the host computer 23 to the user's computer 13, as illustrated in FIG. 15. In the case of revised projects, this function replaces the old Internet version with the new version. The Preview Project command 350, as shown in FIG. 16, saves the current project 310 on the host memory device 23, opens a browser window 354, and tells the server to run the rich-media application inside the new browser window 356. The Preview Project function 350 loads a real-time generation of the project in its current form, facilitating the easy review of the project state whenever desired. After the rich-media application completes, the program waits for further input from the user 300.

Figure 17:
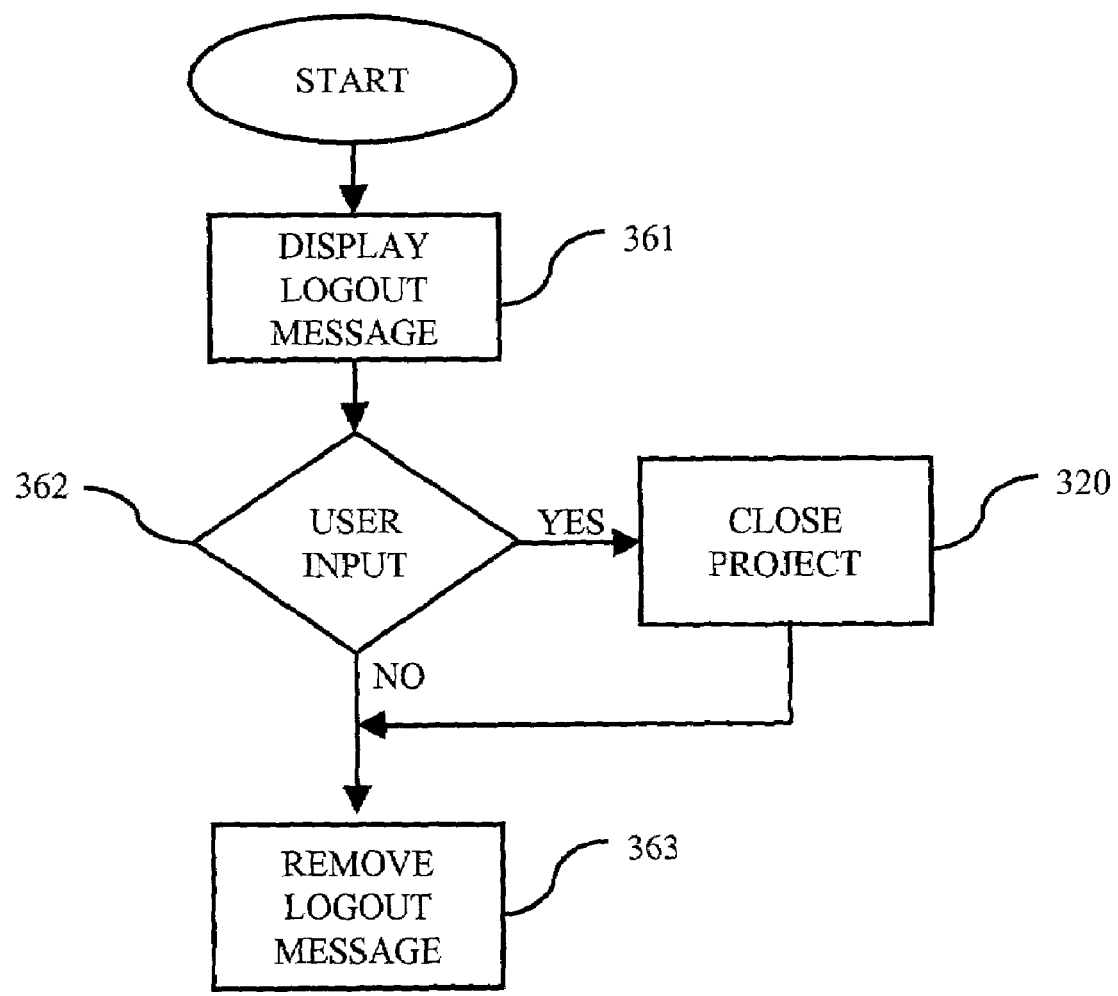
FIG. 17 is a flow diagram 360 of the steps performed by the logout procedure.

When Logout 360 is chosen from the Account menu 61, as illustrated in FIG. 17, a message may be displayed asking the user to verify the command 361. An "accept" response causes the message to be removed 363 and the project to be closed 320. If the user chooses to cancel the command, the message may be withdrawn 363, and the project may not be affected.

In creating and designing a rich-media application, the user preferably has the ability to add components to the application. In addition, the user requires the ability to modify components.

Figure 18:
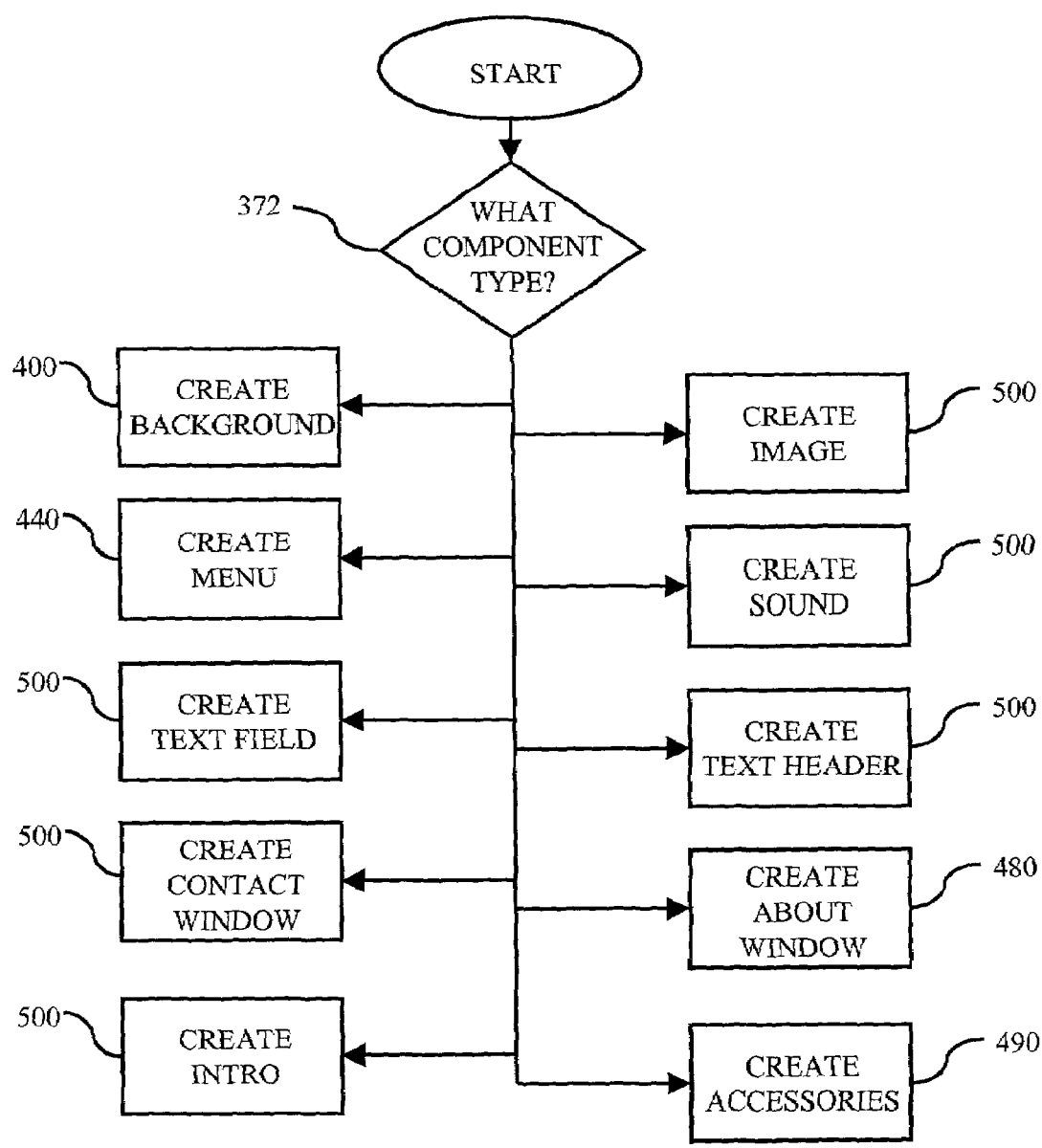
FIG. 18 is a flow diagram 370 of the steps performed by the add component procedure when a user elects to add a component to the current scene.

In a specific example, if a user adds a component 370 to a project, as illustrated in FIG. 18, the component type may be one of, but is not limited to, a background 400, a menu 440, an about window 480, an accessory 490, or a text field, contact window, introduction, image, sound, or text header 500. The depth may be assigned to certain specific components such as backgrounds, which may be placed on the bottom level of a scene, and menus, which may be placed on the topmost level. Other components are loaded dynamically to different depths as part of the component start up procedure 500.

Figure 19:
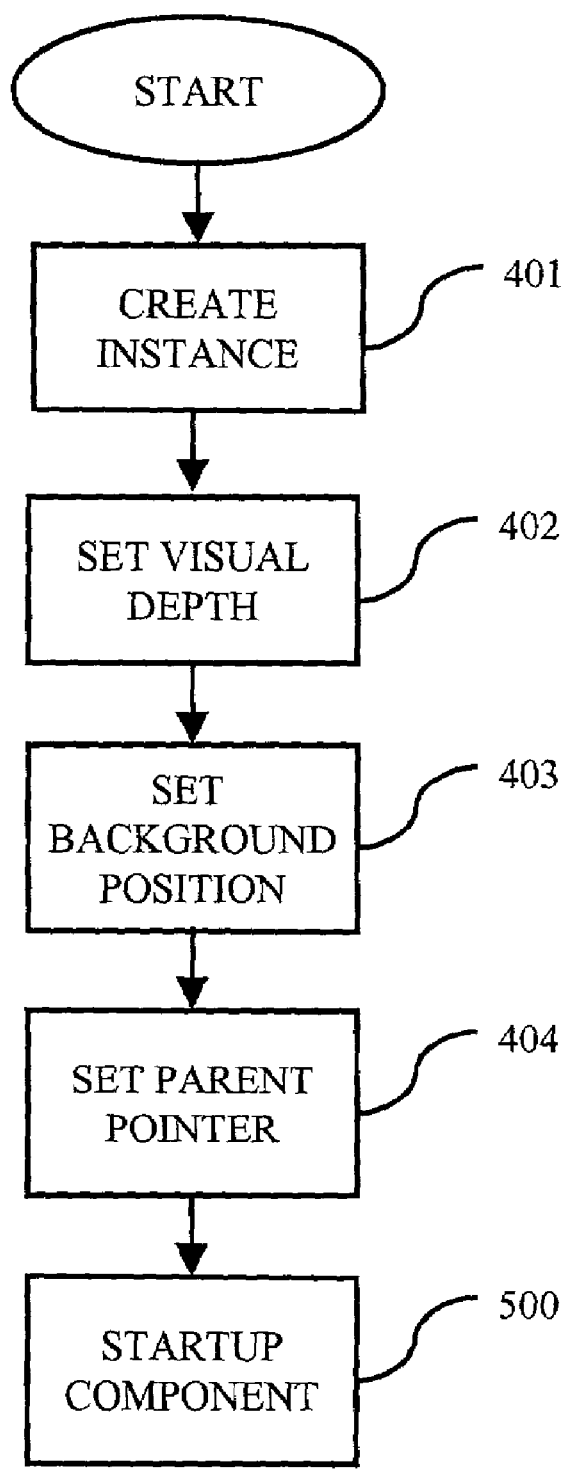
FIG. 19 is a flow diagram 400 of the steps performed by the add background component procedure when a user elects to add a background to the current scene.

FIG. 19 illustrates a process for creating a background component 400. First, an instance of a background 401 may be selected from the Component Browser 80. Next, the depth of the background may be set to the greatest depth 402 so that the background may always be behind all other components. The background may then be positioned on the screen 403, and a pointer may be set to its parent scene identifier so that the two are linked together 404. The process then continues with the normal component setup 500.

Figure 20:
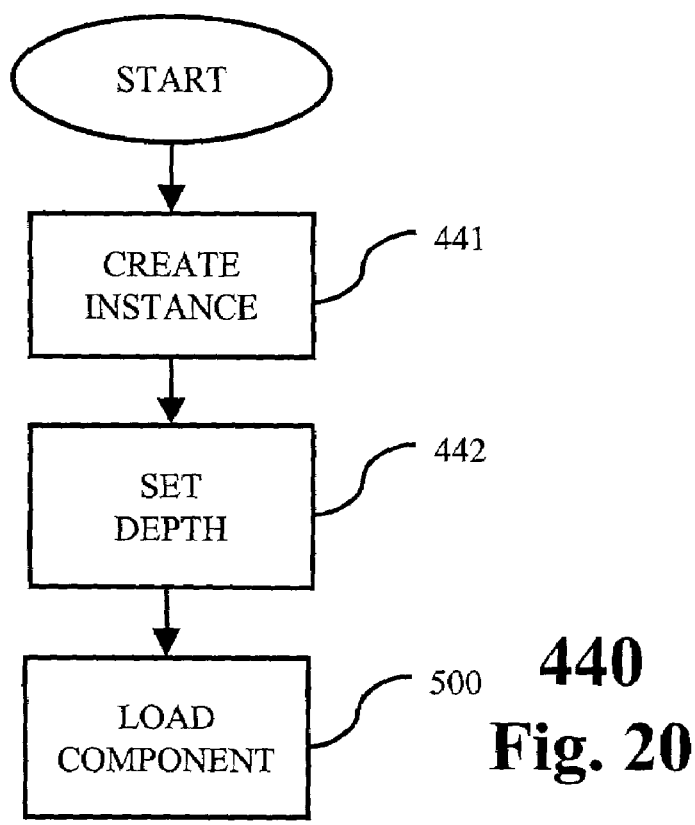
FIG. 20 is a flow diagram 440 of the steps performed by the add menu component procedure when a user elects to add a menu to the current scene.

FIG. 20 illustrates a process for creating a menu component 440. First, an instance of a menu 441 may be selected from the Component Browser 80. Next, the depth of the menu may be set to the highest depth 442 so that the menu may always be in front of all other components. The process then continues with the normal component setup 500.

Figure 21:
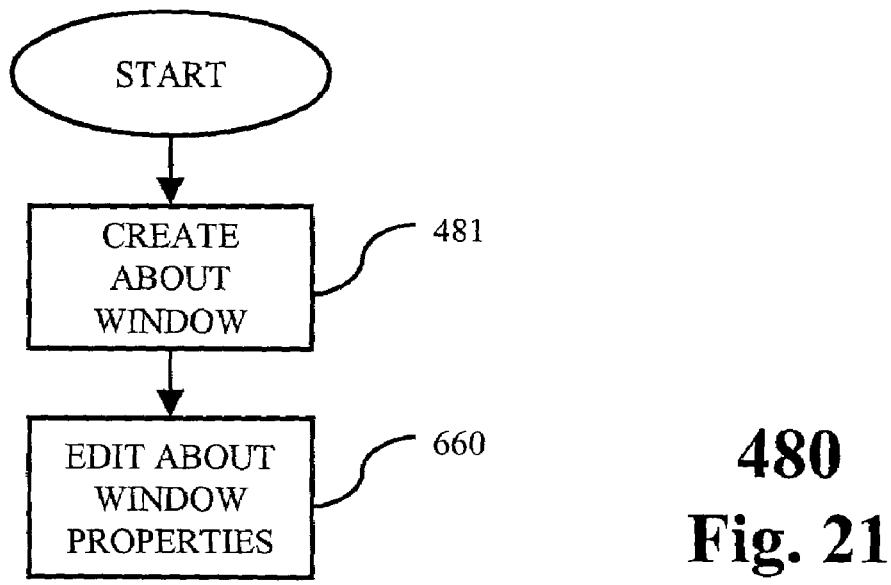
FIG. 21 is a flow diagram 480 of the steps performed by the add about window component procedure when a user elects to add an about window to the current scene.

FIG. 21 shows a process for creating an about window 480. In a specific embodiment of the present invention, an about window may be used to provide information concerning the rich-media application to someone viewing the application when it runs. When the user creates an about window, a new component appears on the screen or contact window 481 and the Component GUI 90 for the about window appears as well to allow the user to modify the about window 660.

Figure 22:
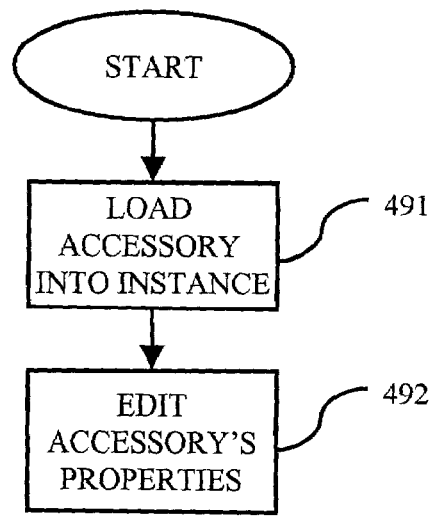
FIG. 22 is a flow diagram 490 of the steps performed by the add accessory component procedure when a user elects to add an accessory to the current scene.
Figure 23:
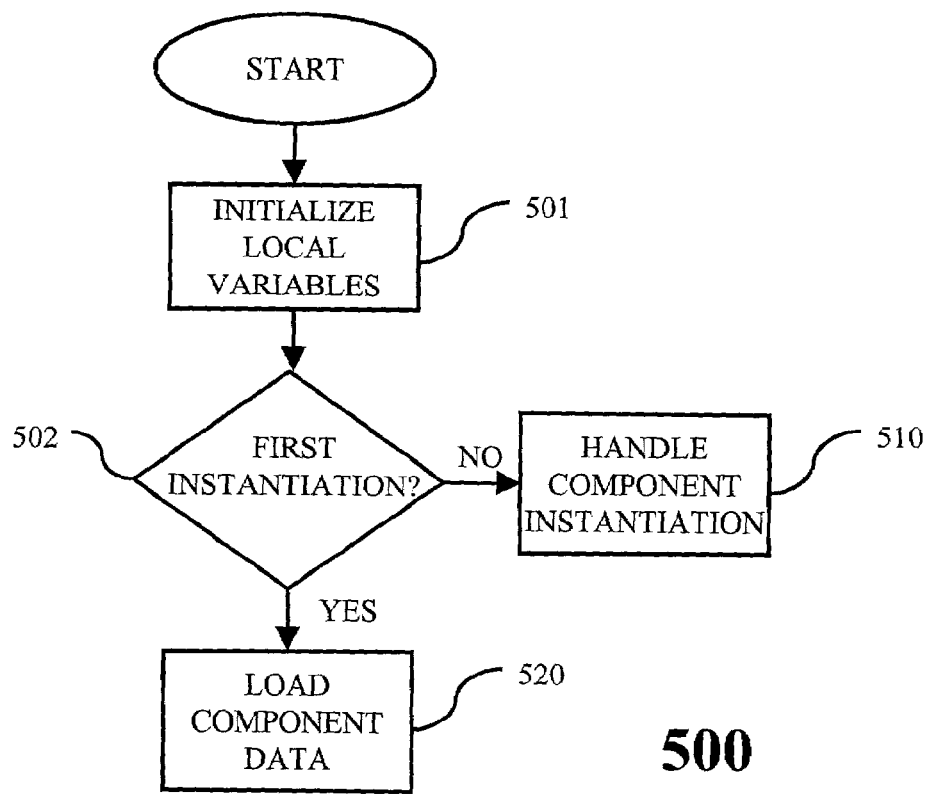
FIG. 23 is a flow diagram 500 of the steps performed by the startup component procedure when the present invention creates an instance of a component.
Figure 24:
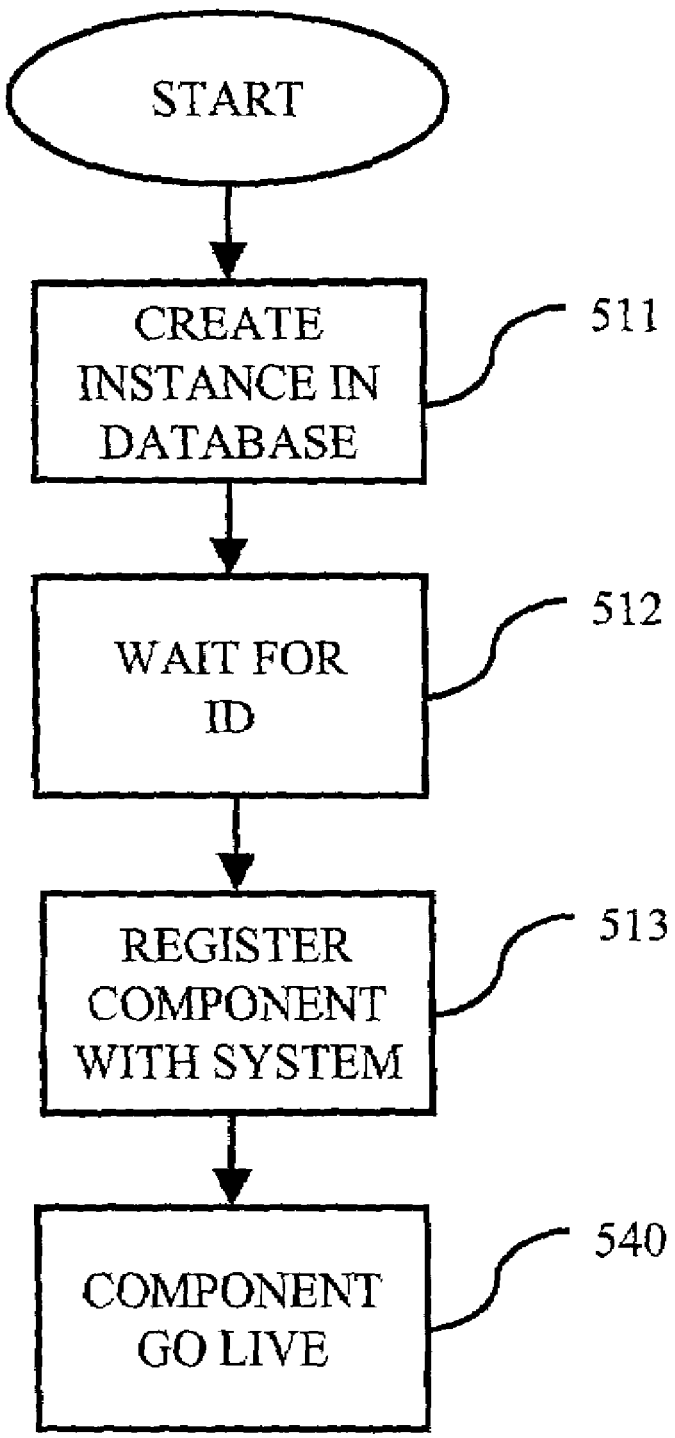
FIG. 24 is a flow diagram 510 of the steps performed by the handle component instantiation procedure when the present invention assigns an identification variable to an instance of a component.
Figure 25:
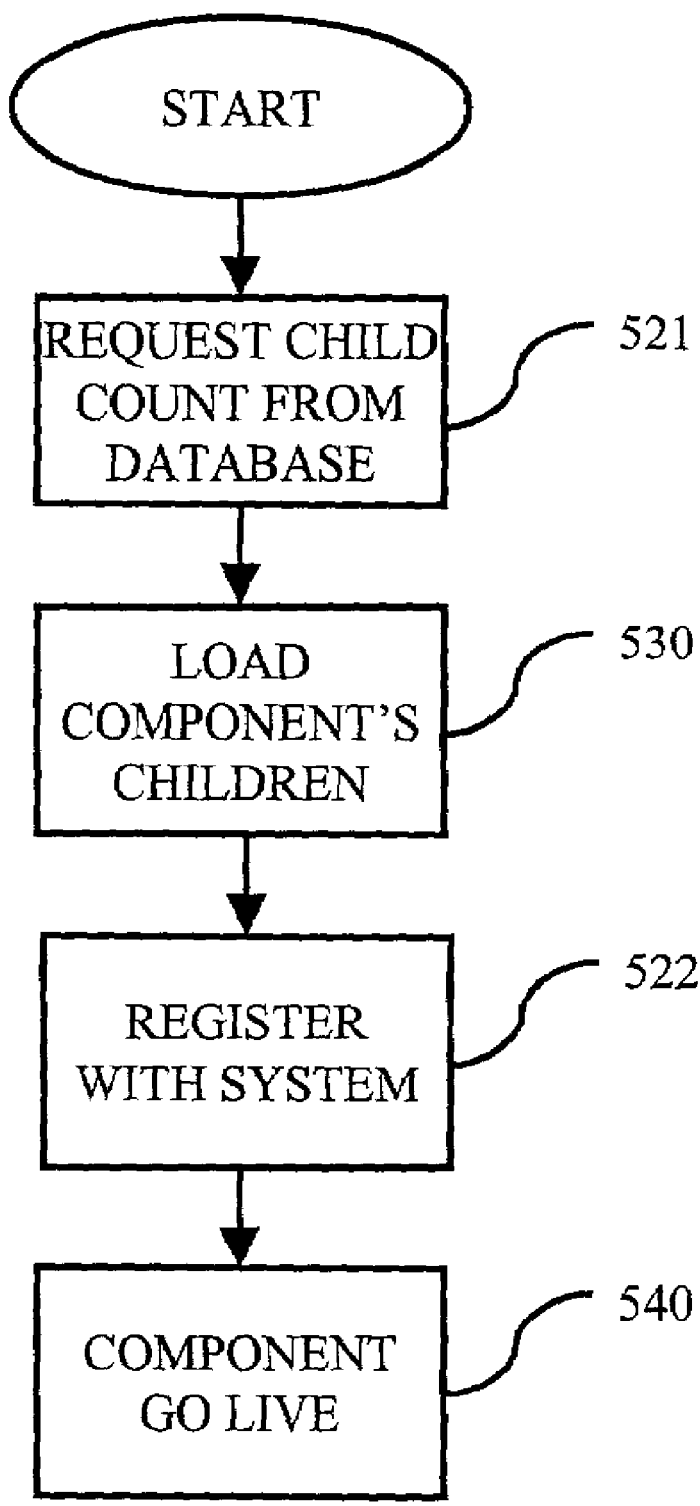
FIG. 25 is a flow diagram 520 of the steps performed by the load component data procedure when the present invention searches for subcomponents assigned to a specific component and registers the component in the project database after loading the subcomponents.
Figure 26:
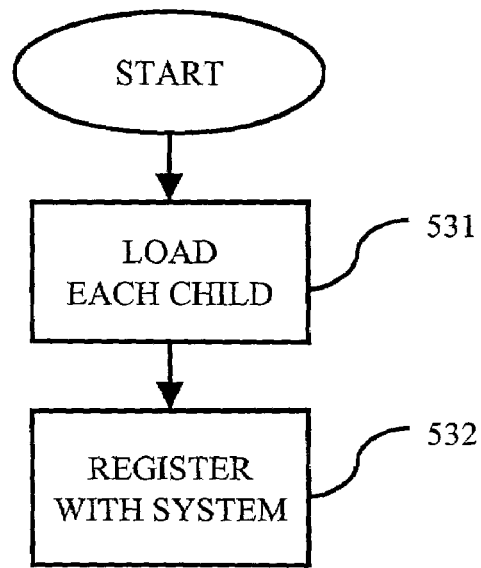
FIG. 26 is a flow diagram 530 of the steps performed by the load subcomponents procedure when an added component is determined to have subcomponents and each subcomponent is loaded and registered in the project database.
Figure 27:
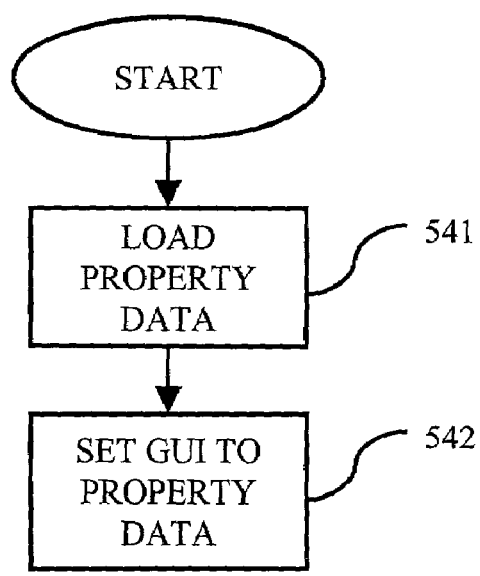
FIG. 27 is a flow diagram 540 of the steps performed by the activate component procedure when the present invention assigns initial property values to an instance of a component and opens a component GUI used for editing those property values.

FIG. 22 shows the creation of an accessory component 490. An accessory component may include such things as a calculator, a clock, or a notepad. The accessory component may be created and loaded into a scene 491. After being loaded, the properties of the accessory component may be modified by the user 492.

FIGS. 23–27 illustrate the process of creating other components. When the component is not a background or a menu, the depth of the component is preferably a variable that the user may modify. Other variables may also be initialized which map to the editable properties of the component 501. If the user has not used the component in the project, the component may be initialized by creating an instance of the component in the project's Registration Table 510 including, in a specific embodiment of the present invention, a unique 18-digit identifier, which may allow a user to search for the component in the project database. If the user has already added the component to the project, but wishes to create a second copy, then the component's data may be loaded into the project 520. This data includes any subcomponents of the component. To retrieve this information, the component's subcomponent count may be retrieved from the database 521, and the subcomponents may then be loaded from the database 531 and registered with the project 532 as well. Once all of the subcomponents are registered with the system, the component may be registered with the system 522. In either case, the component may then be activated 540 by loading all of its property information from the database 541 and setting the component's GUI to the property data as defined 542. The component may then be ready to receive user input and be edited.

The modifiable properties of a component may depend on the component type of the modified component. If a component is purely acoustic in nature, the component's modifiable properties may relate to acoustic measurements such as volume, tempo, and key. For a purely graphical component, the modifiable properties may relate to graphical measurements such as size, color, and shape. A mixed graphical and acoustic component may contain mixed properties.

Figure 30:
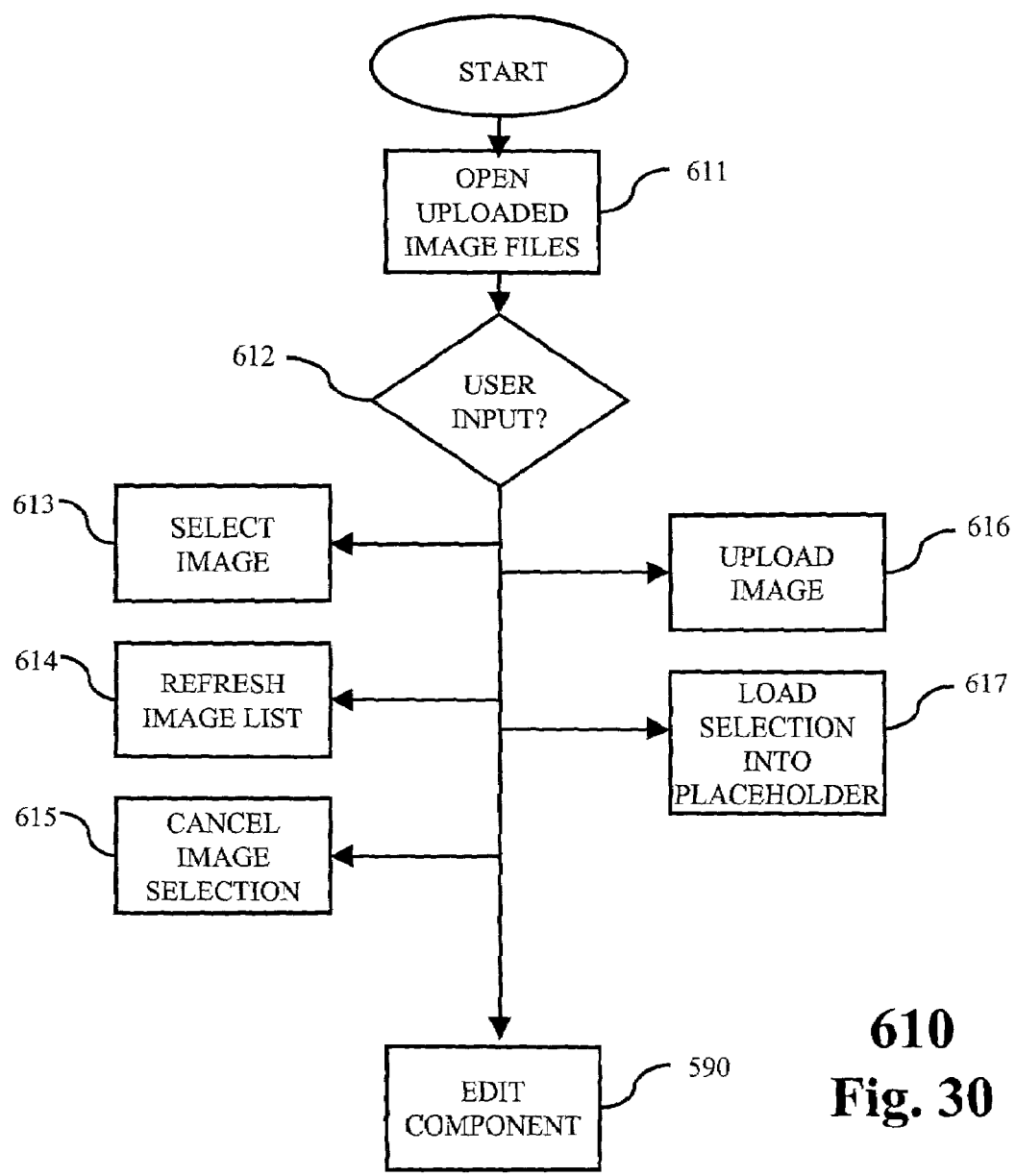
FIG. 30 is a flow diagram 610 of the steps performed by the edit image properties procedure when a user elects to edit property values specific to an image component in the current scene.

An onscreen component, such as an image, heading, text, may be selected with the cursor to display its GUI and/or other control features such as image selection or a Quicklink. For example, when an image component is loaded, an outlined field labeled "image placeholder" may be displayed in the work area, along with the image component GUI. A user may then select the placeholder to load the image selection feature, as shown in FIG. 30, and select a specific graphic. The selected image then loads into the placeholder and may be edited in the image GUI. Multiple images may be loaded in this manner, each of which may display its own placeholder and GUI. When a loaded image is selected, its GUI and the Image Selection Feature may be redisplayed and the image may be re-edited or replaced. Positioning the cursor over the component may display targeting frames that indicate the ability to select the component.

Figure 28:
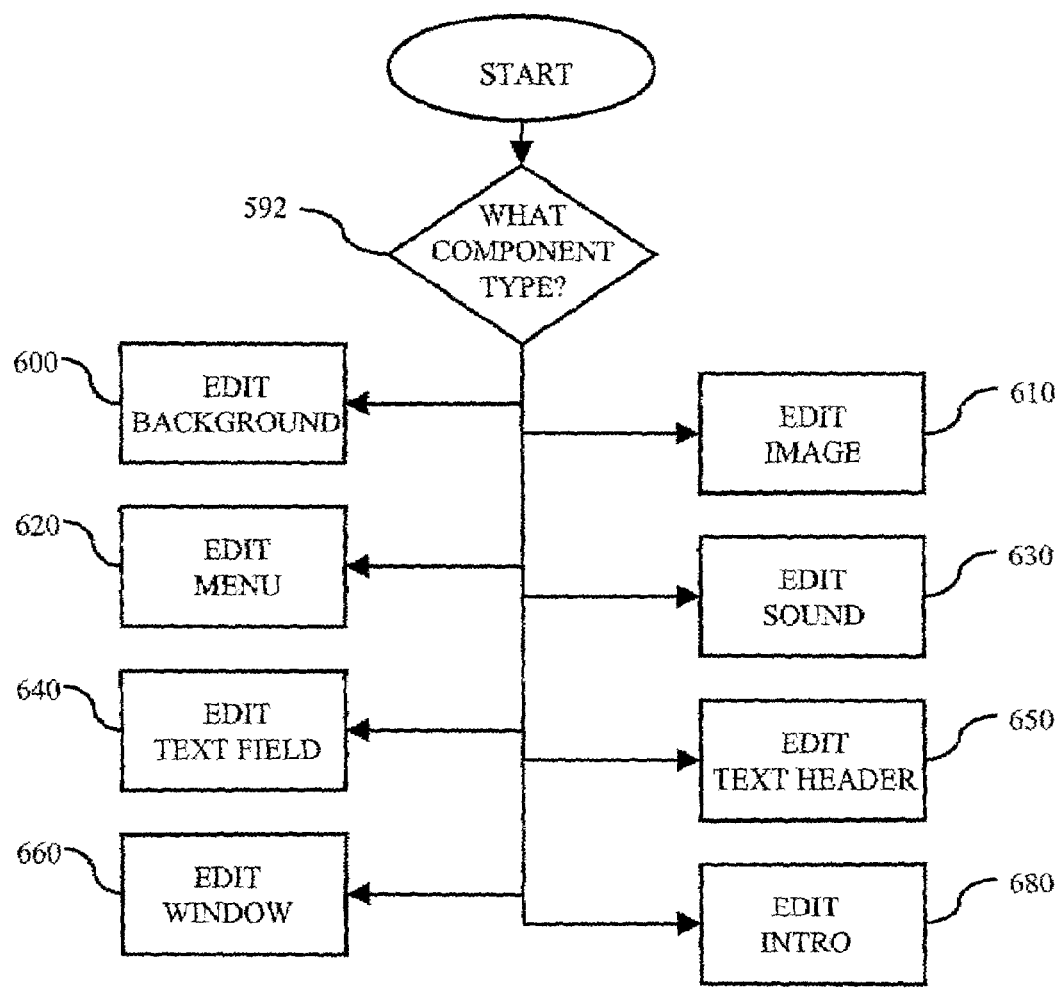
FIG. 28 is a flow diagram 590 of the steps performed by the edit component procedure when a user elects to edit a component in the current project.

In a specific embodiment of the present invention, FIG. 28 illustrates eight exemplary classifications of modifiable components 590. These classifications are generally dependent upon the properties associated with each component class. The user may modify the applicable properties by accessing the Component GUI 90 assigned to a specific component. The eight classifications shown are Backgrounds 600, Images 610, Menus 620, Sounds 630, Text Fields 640, Text Headers 650, Windows 660, and Intros 680.

Figure 29:
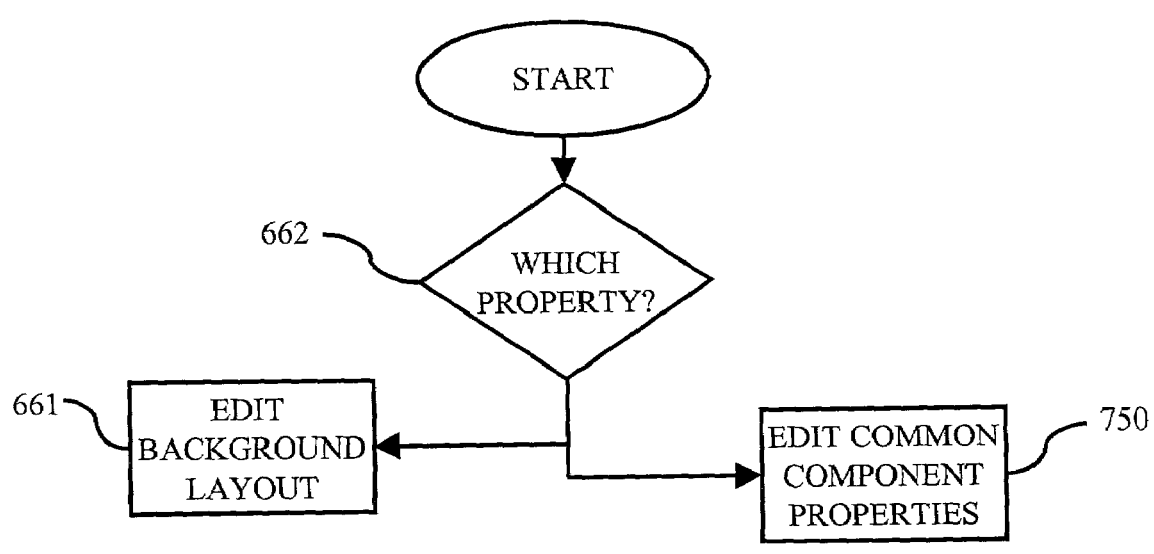
FIG. 29 is a flow diagram 600 of the steps performed by the edit background properties procedure when a user elects to edit property values specific to a background component in the current scene.

FIG. 29 illustrates the process of editing a background component 600. The Background layout 661 is a property specific to background components, where the user may select a background from a list of available images. The program then may transfer the selected background from the database into the background instance. The user may also add additional effects to the background through layout editing. Finally, the user may also modify the common component properties 690.

A user may also load images into components using the Image selection feature, as illustrated in FIG. 30. Working as an extension of certain GUIs, this feature incorporates an on-screen file browser (Select Image Window) enabling the selection of individual image files. To insert a graphic file into a component, the user may find files using the scroll arrows 613 and then select the accept command. The selected image may be displayed immediately in the work area and may be edited using the appropriate GUI. The cancel command 615 closes the window, while the refresh command 614 reloads the window with any newly uploaded files. The user may also upload files 616 for placement in components using the User Asset Upload feature, which functions as an extension of the Image Selection Feature, described above. The User Asset Upload form loads when the user selects the upload command from the Image Selection window. The user enters file specifications in the designated fields, then selects the upload command. The file may then be copied to the Image selection window where it may be loaded into components. A wide variety of file formats may be uploaded in this way, including GIF, animated GIF, TIFF, EPS, PNG, Flash Movie, music (MP3), etc.

In an alternative embodiment of the present invention, an Asset Image Upload component 618, as shown in FIG. 31, may be created at the time of image upload. The Asset Image Upload component may consist of one or more dynamically generated images, including images stored in GIF, JPEG, PNG, or SWF files, that are combined into a SWF file for use as an image by the rich-media application. This component may include the ability to select from a number of introduction animations ("intros"), a number of middle sections ("loops"), and a number of exit animations ("outros"). In a specific embodiment of the present invention, eight intros, eight loops, and eight outros may be provided. The loops may allow for further variations including playing the loop once, not playing the loop, playing the loop forever, or playing the loop a user-specified number of times.

Figure 32:
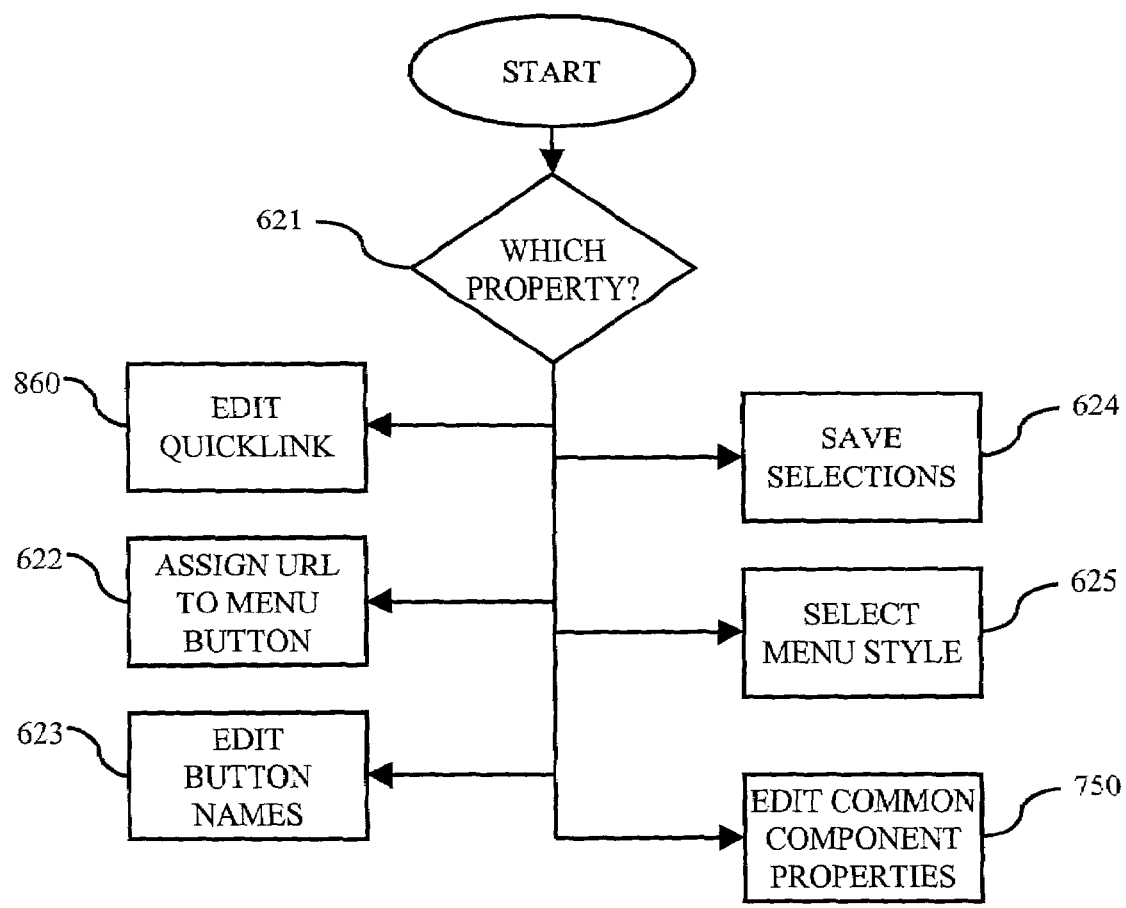
FIG. 32 is a flow diagram 620 of the steps performed by the edit menu properties procedure when a user elects to edit property values specific to a menu component in the current scene.

FIG. 32 shows the available choices for editing a menu (navigation) component 620. The Edit Menu Properties function allows the user to assign and edit Quicklink information to specific buttons within the menu 860. This information allows the user to navigate between scenes and URLs outside of the published project. In addition, the user may assign a URL to a menu button 622, edit a button name 623, save the changes made to the menu 624, and select a different menu style 625. The user may also modify the common component properties 690.

The Navigation component GUI's Quicklink feature connects the component's activation buttons installed on the Builder page 50, as illustrated in FIG. 3, to other Internet locations including, but not limited to other scenes, soundtracks, websites, and folders. To establish a Quicklink, the user may first select a button from the button menu. The title of the button preferably immediately displays on the GUI's linking control pane, where the user may then select the link type, and select or enter the link specifications in the corresponding text field. Link types include connections to other scenes and projects within the user's account, external web pages, and other file folders.

In a specific embodiment of the present invention, a navigation bar component 628, as shown in FIG. 33, may be created. When the navigation bar component is created in the Builder page, the component may receive information regarding the number of buttons the component may contain from the project database. The navigation bar may then create each button consecutively by performing one or more of the following steps: duplicating a button element, positioning the button element, selecting an icon for the button element, generating text for the button element's text field, calculating the size of the button element, and scaling and positioning the user-accessible portion of the button element. The navigation bar component may contain at least one button element for each Quicklink.

Figure 34:
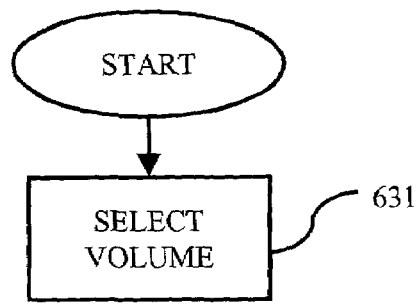
FIG. 34 is a flow diagram 630 of the steps performed by the edit sound properties procedure when a user elects to edit property values specific to an acoustic component in the current scene.

Edit Sound Properties 630 allows the user to select the volume level 631 of the selected acoustic component, as shown in FIG. 34.

Figure 35:
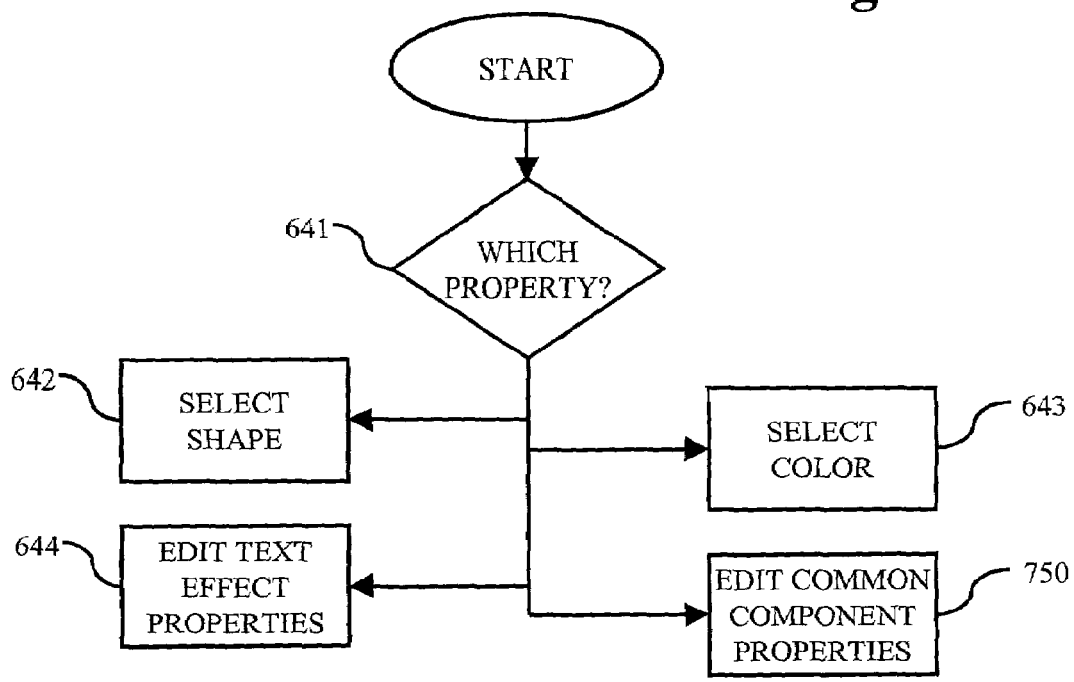
FIG. 35 is a flow diagram 640 of the steps performed by the edit text field properties procedure when a user elects to edit property values specific to text in the current scene.
Figure 36:
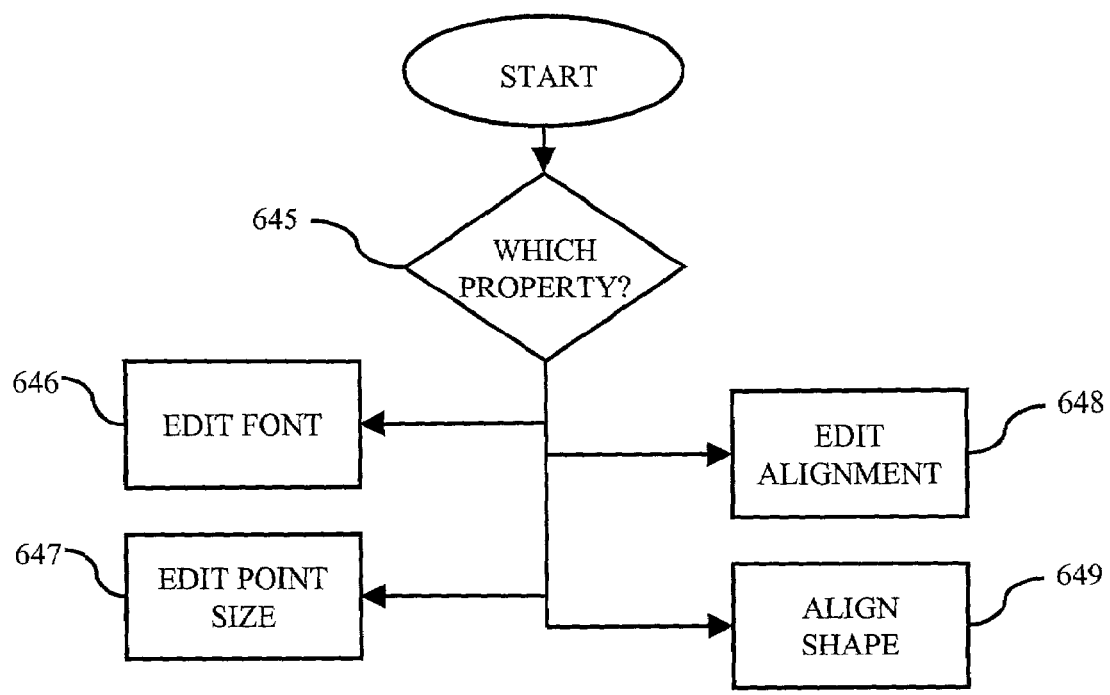
FIG. 36 is a flow diagram 644 of the steps performed by the edit text effect properties procedure when a user elects to edit text effect property values specific to text in the current scene.

FIGS. 35 and 36 illustrate the modifiable properties for text fields 640. These properties may include the shape of the text field 642, the color of an editable field of text 643, and the text effect of an editable field of text 644. The color selector feature allows the user to choose from the available colors. The available colors scroll horizontally across four boxes when the user selects the right and left arrows. The color selector feature also includes a scale with a sliding marker that allows the user to adjust the color saturation. The user may load a desired color by selecting it with the cursor. The text effect may be the common set of properties specific to text including the font 646, the font size 647, the alignment 648, and layout 649. The user may also modify the common component properties 690.

Figure 37:
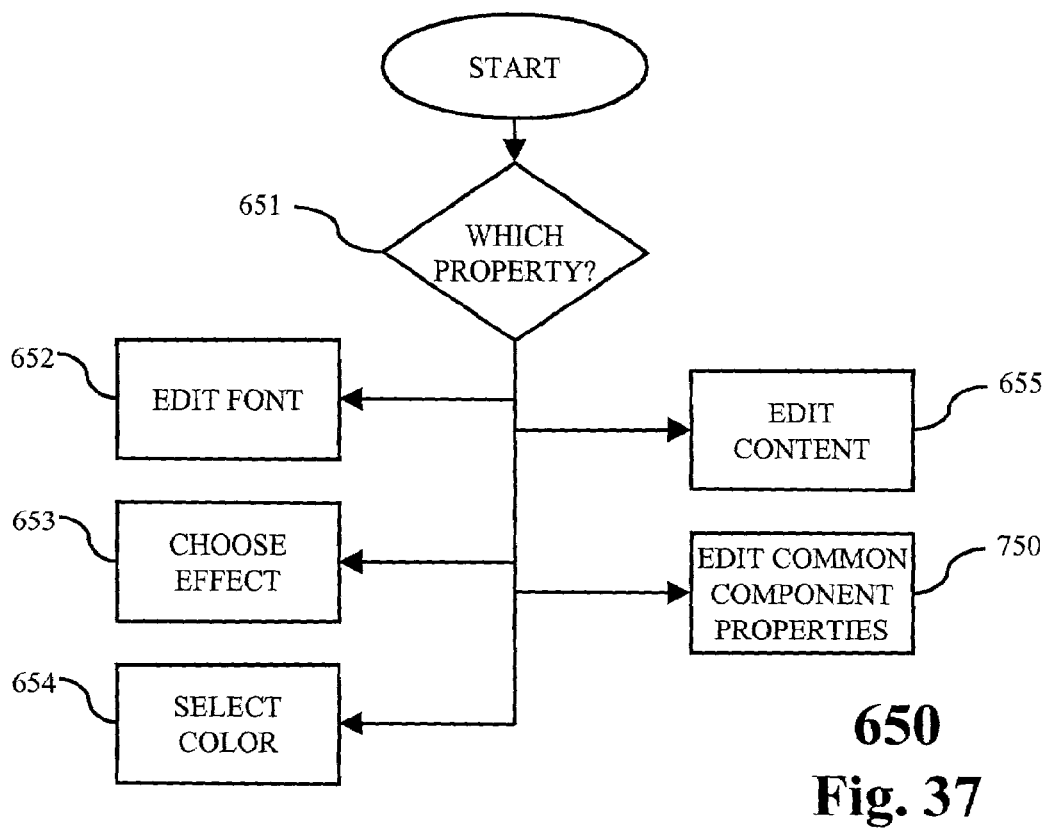
FIG. 37 is a flow diagram 650 of the steps performed by the edit text header properties procedure when a user elects to edit property values specific to a text header component in the current scene.

The process of editing Text Headers 650, as shown in FIG. 37, applies to what may usually be referred to as the "headline," or text that may be used to call attention to an image or a block of text. The user may preferably edit attributes of the headline, including the font 652, the effect 653, the color 654, and the content 655 of the headline. The user may also modify the common component properties 690. The color selector feature may allow the user to choose from the available colors. In the depicted embodiment, the available colors may scroll horizontally across four boxes when the user selects the right and left arrows. The color selector feature may also include a scale with a sliding marker that allows the user to adjust the color saturation. The user may load a desired color by selecting it, e.g., with the cursor.

Figure 38:
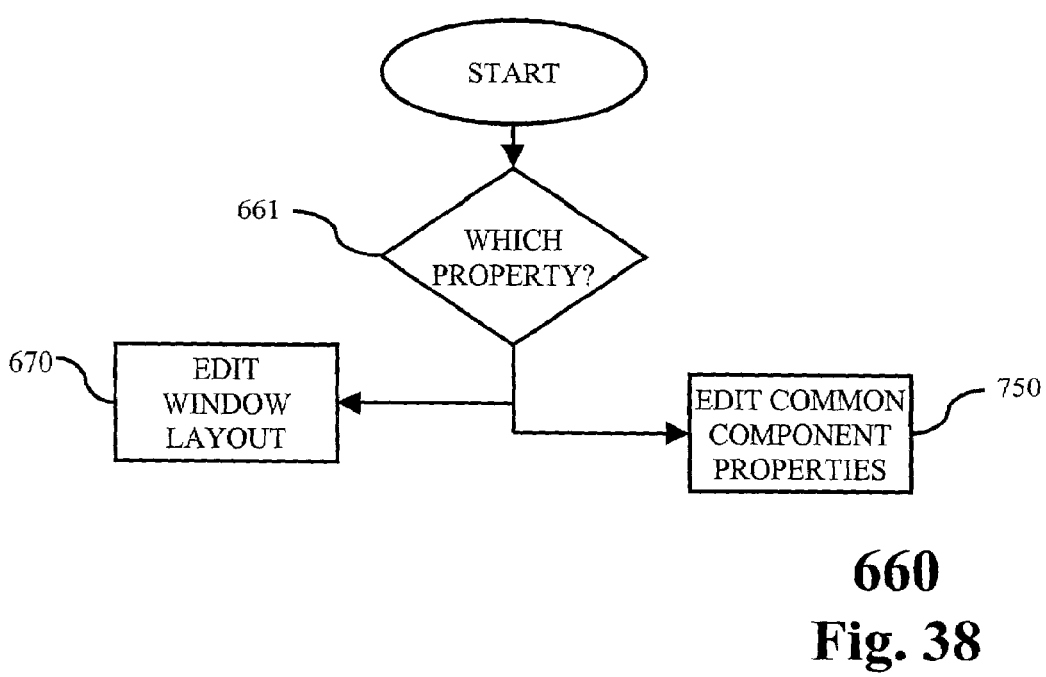
FIG. 38 is a flow diagram 660 of the steps performed by the edit window properties procedure when a user elects to edit property values specific to a window component in the current scene.
Figure 39:
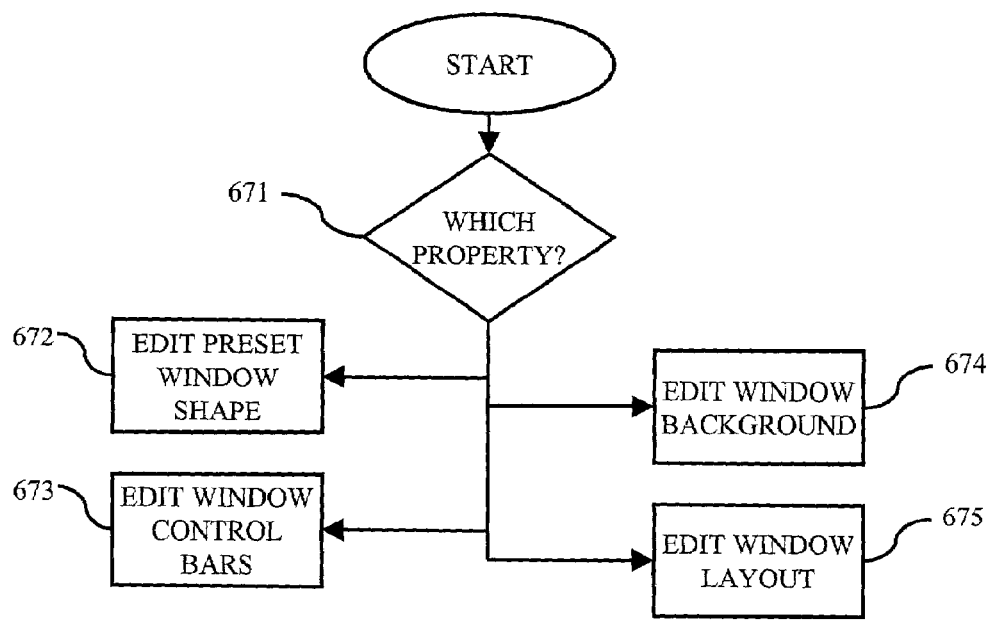
FIG. 39 is a flow diagram 670 of the steps performed by the edit window layout properties procedure when a user elects to edit property values specific to the layout of a window component in the current scene.

The process of editing windows is shown in FIGS. 38 and 39. Windows are components, which may frame further blocks of text, such as information specific to the client, or further details about the project. The user may either elect to modify specific properties associated with window components 670 or common component properties 690. Specific properties concerning Windows include preset shapes 672, control bars specific to the window 673, backgrounds within the windows 674, and the general layout of the window 675.

Figure 40:
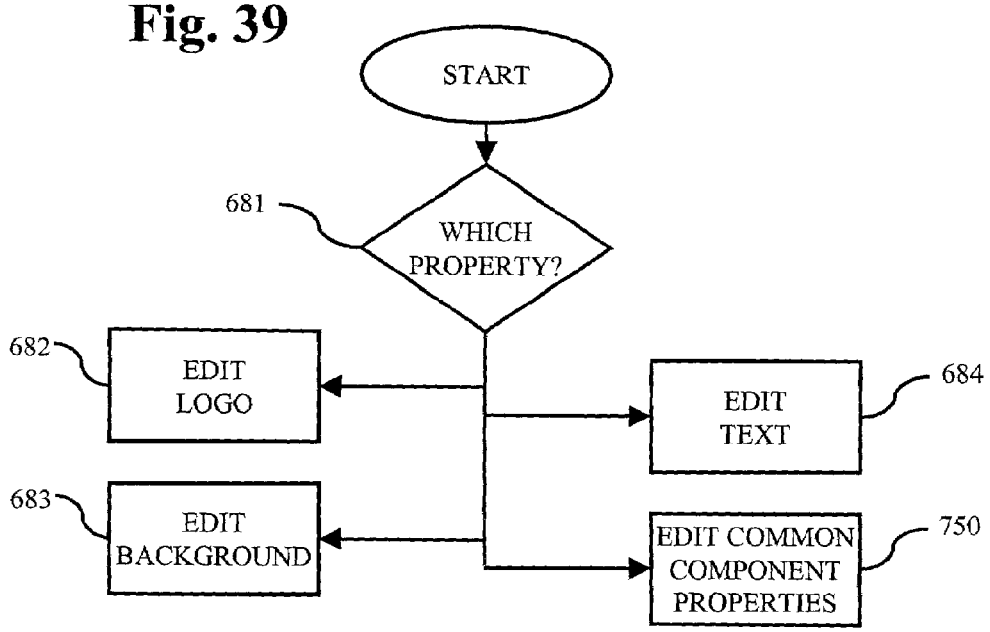
FIG. 40 is a flow diagram 680 of the steps performed by the edit intro properties procedure when a user elects to edit property values specific to an intro component in the current scene.

FIG. 40 demonstrates the process of editing an Intro 680. An Intro may be a short movie used to introduce a section of the published project. Specific attributes that may be edited by the user include logos 682, backgrounds 600, and text 640. The user may also modify the common component properties 690.

Figure 41:
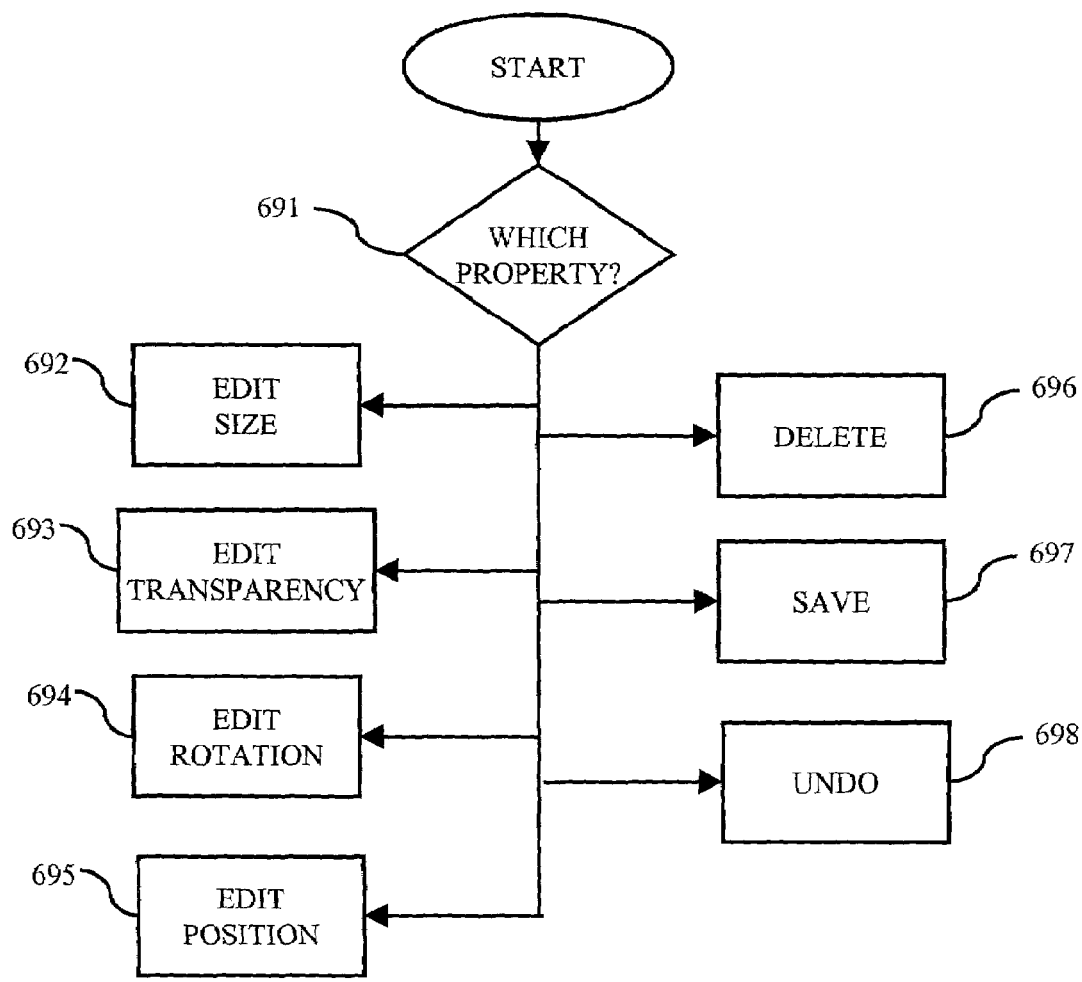
FIG. 41 is a flow diagram 690 of the steps performed by the edit common properties procedure when a user elects to edit property values of a component in the current scene that are not specific to a single component type.

FIG. 41 lists the common component properties that the user may modify for all components possessing a graphical nature at least in part. The properties that the user may edit include the size 692, the transparency 693, the rotation 694, and the position 695 of the component. The size, transparency, and rotation attribute control functions may incorporate slider bars that allow the user to adjust the attribute by moving a marker (bar) along a scale. The slider bar control panes also display numerical values corresponding to the marker's position. A user may manually enter specifications as an alternative to using the slider bar. The GUI shows the work area page as a grid with the component represented by a small square on the grid. The position feature 695 also shows the component position by the component's "X" and "Y" axis coordinates. The user may reposition the component by moving the square on the grid with the cursor or by typing in numerical coordinates. Fine position adjustments may be made using the arrow keys on the keyboard. The common component properties GUI may also allow the user to delete the specified component 696 or undo a change to a specified component 698. Finally, the user may save the project 697 from within the common component properties GUI.

In an alternative embodiment of the present invention, a unified GUI may be used to modify a component selected by the user. The unified GUI may allow the user to alter component variables. The component variables that may be altered may depend on the component type of the selected component. In addition, the unified GUI may allow a Quicklink to be created for the selected component.

If the user selects a different component, the unified GUI may be updated to reflect the component attributes of the newly selected component. This unified GUI may be used instead of the individual component GUIs described in the previous embodiment.

Rich-media applications may generally comprise one or more scenes. Each scene may be built with components on the Builder page 50 as defined above. For example, a basic production for a corporate Internet rich-media website application might involve an introduction, a homepage, and links off the homepage to access company information, contact the personnel department, view a company profile, and examine product information. In a specific embodiment of the present invention, each of these pages may be created separately on the Builder page 50 and designated as a scene. The present invention incorporates a Scene Browser 70 that allows the easy organization, review, and addition of production scenes.

Figure 42:
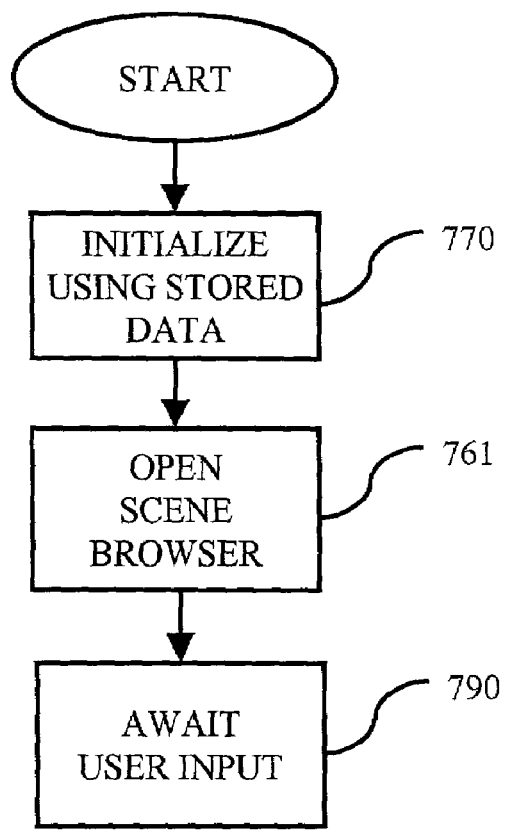
FIG. 42 is a flow diagram 760 of the steps performed by the load scene browser procedure when a user opens a project.
Figure 43:
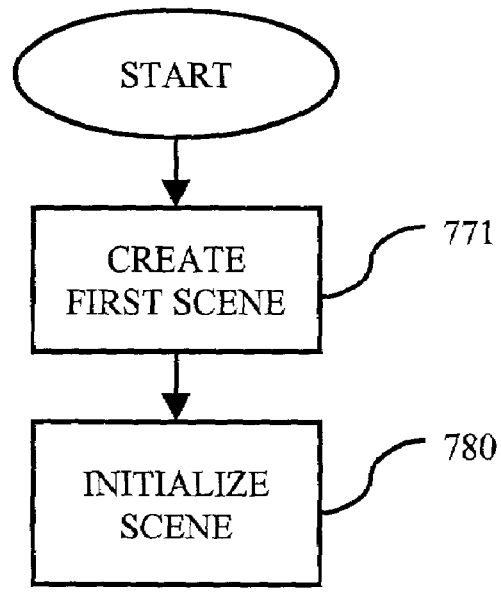
FIG. 43 is a flow diagram 770 of the steps performed by the initialize scene browser procedure when the scene browser loads the first scene of a selected project or a blank scene for a new project.
Figure 44:
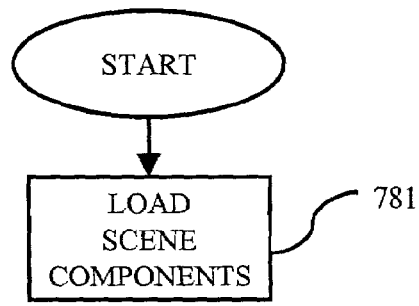
FIG. 44 is a flow diagram 780 of the steps performed by the initialize scene procedure when the scene browser loads the components contained in the first scene.

The Scene Browser provides a mechanism for dividing a project into scenes. The project creator may individually edit these scenes. When the project is opened, the Scene Browser may be initialized 760 using data from the host system's database, as illustrated in FIGS. 42–44. When the Scene Browser has completed its initialization, it creates 765 and initializes 768 the first scene. The Scene Browser sends a command to the scene, causing it to load its components 769. After the components are loaded, the Scene Browser may be prepared for user input 790.

Figure 45:
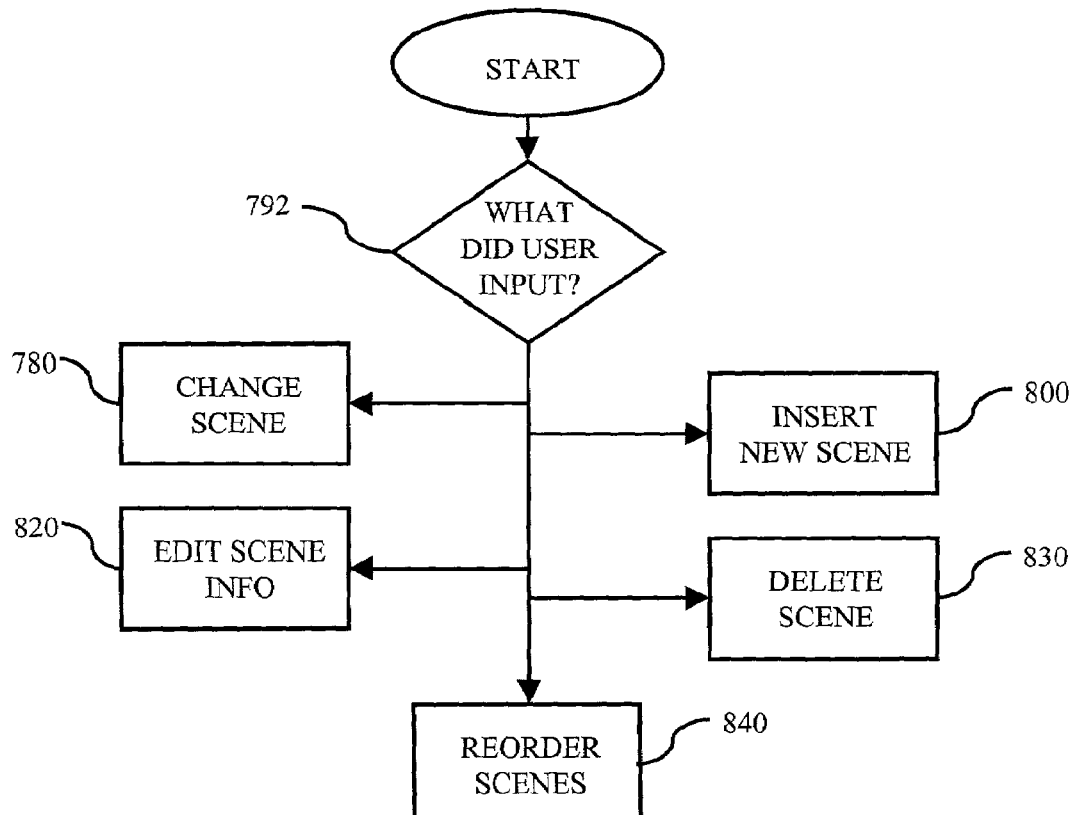
FIG. 45 is a flow diagram 790 of the steps performed by the edit scene procedure when a user elects to edit the current scene.

FIG. 45 lists options for a user to edit a scene of a project 790. In a specific embodiment of the present invention, the list includes changing to another scene 768, inserting a new scene 810, editing information about the scene 820, deleting a scene 830, and reordering scenes 840.

When changing to another scene 768, as illustrated in FIG. 44, if the selected scene is not loaded into the project, the selected scene may be loaded from the database. The Change Scene command loads the scene into the Builder page 50, allowing it to be modified. It performs the same function as selecting the scene image directly from the browser.

Figure 46:
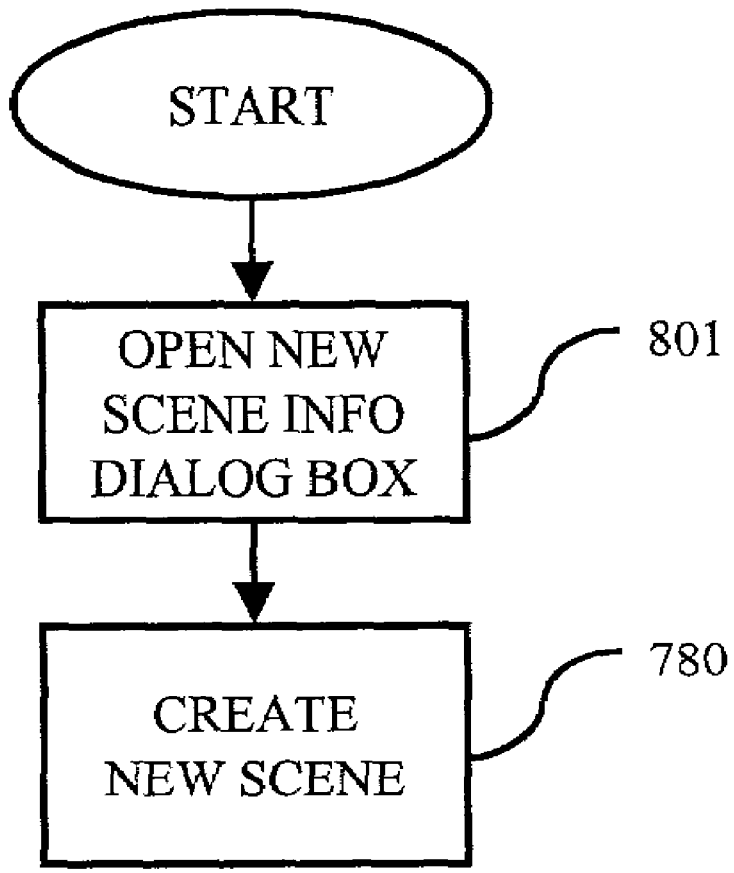
FIG. 46 is a flow diagram 800 of the steps performed by the insert new scene procedure when a user elects to add a scene to the current project.
Figure 47:
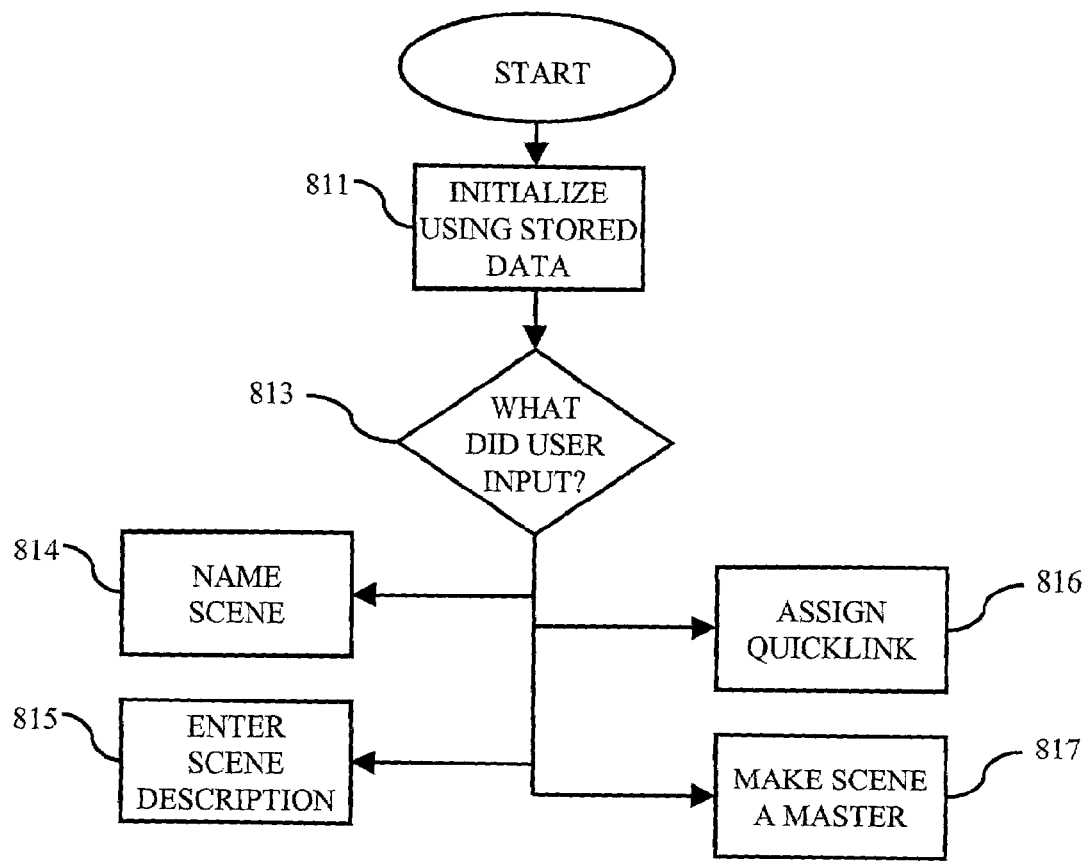
FIG. 47 is a flow diagram 810 of the steps performed by the open scene information dialog GUI procedure when the present invention requests that the user supply information pertaining to a newly added scene.

When a new scene is inserted 810, as demonstrated in FIG. 46, a scene information dialog GUI may open 811 allowing the user to enter new scene properties. The scene may then be initialized 768. The Insert New Scene command allows the user to establish a new scene. The command loads the Insert New Scene window, as illustrated in FIG. 47, where the user enters the name 814 and description 815 of the new scene and designates whether the new scene may be linkable via a Quicklink 816 or whether the new scene may be a "master scene" 817. The linkable designation puts the scene on the link menu available through the Quicklink attribute control pane of the Navigation GUI. The master scene designation makes the scene available as an element of other scenes. When the Insert New Scene window is completed, the user may select the accept command, and the new scene may be designated by title in the Scene Browser 70. The Builder page 50 then displays the new scene as a blank work area ready for the installation of components.

Figure 48:
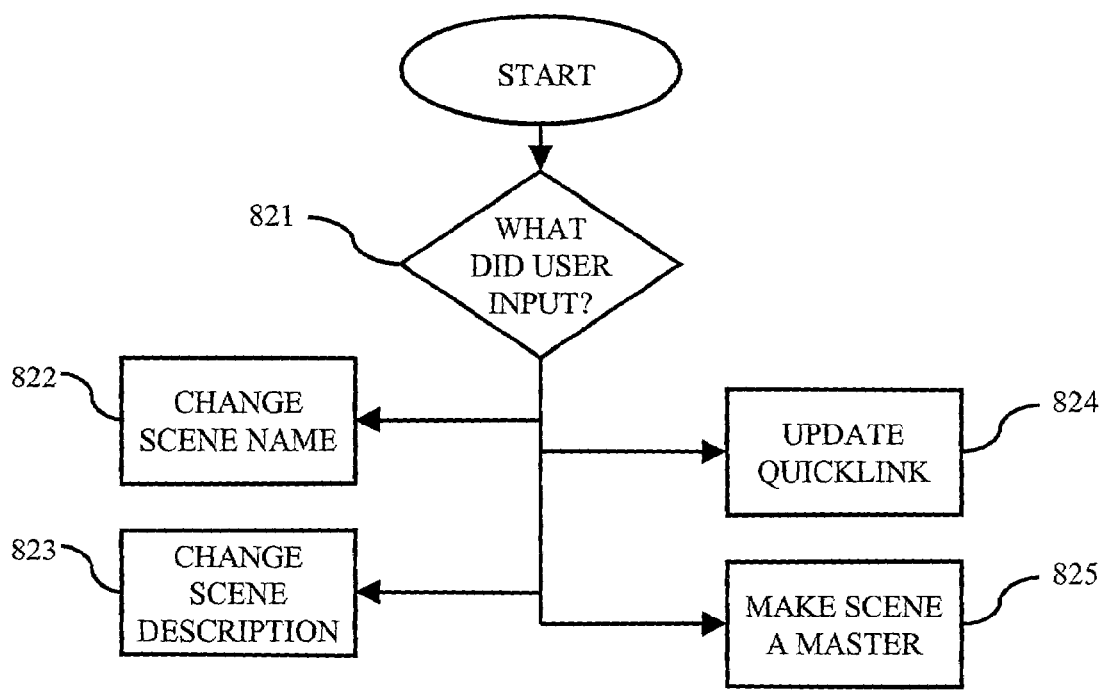
FIG. 48 is a flow diagram 820 of the steps performed by the edit scene information procedure when a user elects to edit the scene information pertaining to the current scene.

Similarly, when an existing scene's information is edited 820, as illustrated in FIG. 48, a scene information dialog GUI may open 811, allowing the user to enter new scene properties. The scene may then be re-initialized 768. The Edit Scene Info command allows the user to, e.g., update the scene information that was originally requested in the New Scene window, including scene title 822, description 823, Quicklink 824, and master scene status 825. In this embodiment, the command loads a scene information window that includes the latest scene information as editable text. When finished, the user selects the accept command. Any change in scene title may immediately be displayed on the Scene Browser 70.

Figure 49:
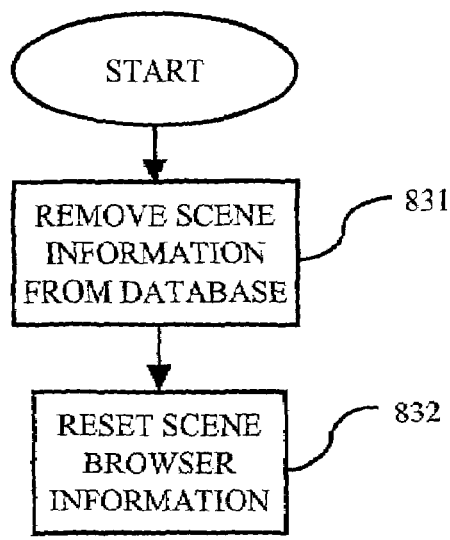
FIG. 49 is a flow diagram 830 of the steps performed by the delete scene procedure when a user elects to delete the current scene.

When a scene is deleted 830, as illustrated in FIG. 49, its scene information may be removed from the database 831, and the scene browser information may be reset 833.

Figure 50:
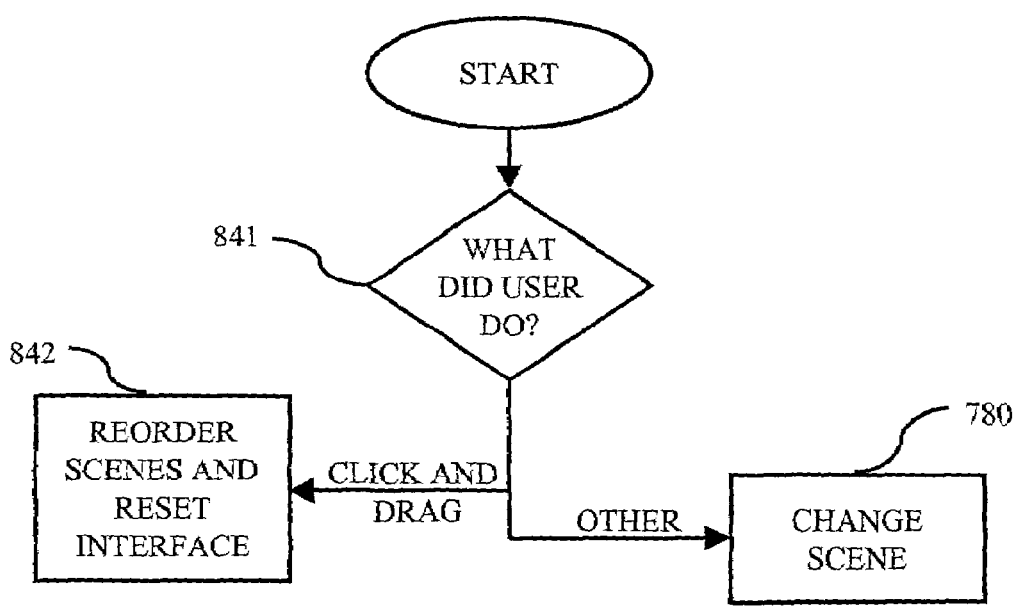
FIG. 50 is a flow diagram 840 of the steps performed by the reorder scenes procedure when a user elects to reorder scenes in the current project.

FIG. 50 illustrates an exemplary process for reordering scenes 840. In order to reorder scenes, the user may click on a thumbnail scene set inside the Scene Browser, and drag the scene to the desired position in the scene queue 842. The new scene information may be processed by the database, the scenes may be reordered, and the scene browser may be updated to reflect the new order. If the thumbnail has been selected but not moved to a new position, the button may trigger a Change Scene command 768.

Figure 51:
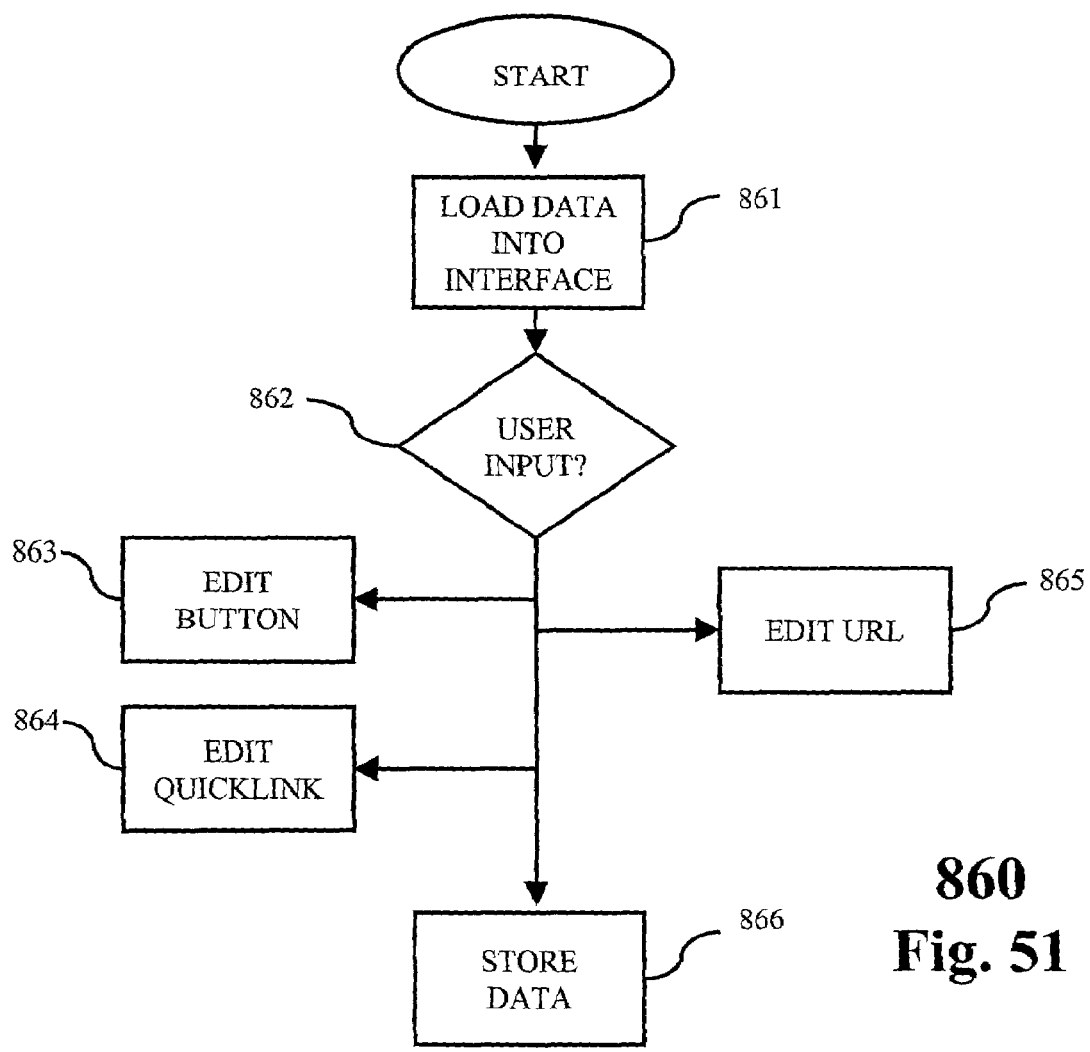
FIG. 51 is a flow diagram 860 of the steps performed by the edit Quicklink procedure when a user elects to alter the property values of a Quicklink.

In order to provide a convenient method for retrieving a previously created scene or component, the user may wish to create a link between the scene or component and an icon or menu entry. In a specific embodiment of the present invention, a Quicklink feature provides such a link by creating a menu entry that points to the requested scene or component. FIG. 51 illustrates a specific embodiment of the process and the options available to the user when the user elects to edit a Quicklink 860. First, the Quicklink Table may be loaded to display the list of links. Then, the user may edit the name associated with a Quicklink button 863, whether a Quicklink may be operational 864, and the destination for a Quicklink 865. This information may be stored back to the Quicklink Table when the user closes the edit Quicklink GUI.

In a specific embodiment of the present invention, the Component Browser 80 may comprise a GUI system resource that may be used to catalog and display components, as illustrated in FIG. 52. The structure of the Component Browser 870 may be hierarchical with directories and sub-directories of components that may be displayed via graphical folders and icons. Clicking on a closed folder may cause the folder to open and display the sub-folders and icons that it may contain. Clicking on an open folder may cause the folder to close and hide the sub-folders and icons that it may contain. If the user clicks on an icon from the Component Browser and drags it into the current scene, the action may create a new component in the current scene.

The Component Browser may load icons and folders based upon database queries. These queries may be used by the Component Browser to create lists of system resource URLs for component types, component names, and relevant display icons for components. A user may access the Component Browser by clicking on a tab. When the tab is clicked, the Component Browser may open and reveal folders, which may list the component types. Clicking on a folder may add the name of the folder to the header for a new Component Browser window, hide the old list of folders and icons, and display a new list comprised of the folders and object icons contained within the selected folder. Icons may be dragged and dropped into the workspace. Performing this operation may instantiate a new component.

The Component Browser may utilize a list-building program that may display information received from a database query. The information may be used to populate the Component Browser graphically. Information that may be received by the query may be stored. This information may be accessed by performing a specified action with the user's mouse.

The Edit Size interface 871, as illustrated in FIG. 53, may comprise a number of preset size buttons, a slider bar, and a textfield box. The preset button values may be set to any desired values, and the values may be modified. For instance, six preset buttons may be used. These buttons may include, for example, preset percentage values of 25%, 50%, 75%, 100%, 200%, and 300% of the original size. Additionally, a slider bar may be used to modify the size of a component. The size of a component may also be set by inputting a percentage value in the textfield box, which may be applied when the Return/Enter key is pressed. The default size of a component may be set to any percentage value. For instance, the default size may be set to 100%. Components may be limited to values greater than or equal to 0%. Modifications that may be made through this interface may affect the selected component in the Builder environment in real time.

The Edit Transparency interface 872, as illustrated in FIG. 54, may comprise preset transparency buttons, a slider bar, and a textfield box. The preset button values may be set to any desired values, and the values may be modified. For instance, five preset value buttons may be used. These buttons may include, for example, preset percentage values of 0%, 25%, 50%, 75%, and 100% of the original transparency. Additionally, a slider bar may be used to modify the transparency of a component. The transparency of a component may also be set by inputting a percentage value in the textfield box, which may be applied when the Return/Enter key is pressed. The default transparency of a component may be set to any valid percentage value. For instance, the default transparency may be set to 100%. The Edit Transparency interface may limit the selected component's transparency to a specific range of values such as the values between 0% and 100%. Modifications that may be made through this interface may affect the selected component in the Builder environment in real time.

The Edit Rotation interface 873, as demonstrated in FIG. 55, may comprise preset buttons, a slider bar, and a textfield box. The preset button values may be set to any desired values, and the values may be modified. For instance, five preset value buttons may be used. These buttons may include, for example, preset values of 90°, 180°, 270°, −90°, and −270° from the default rotation. Additionally, a slider bar may be used to modify the rotation of a component. The rotation of a component may also be set by inputting a percentage value in the textfield box, which may be applied when the Return/Enter key is pressed. The default rotation of a component may be set to any degree measurement. For instance, the default transparency may be set to 0°. The interface may allow for the rotation to be set to a range of values, such as the range of values from 360° clockwise, which may be denoted by positive values, to 360° counter-clockwise, which may be denoted by negative values. Modifications that may be made through this interface may affect the selected component in the Builder environment in real time.

The Edit Position interface 874, as shown in FIG. 56, may comprise a graphical grid with a small icon that may represent the component's position in the Builder environment. The interface may also contain textfield boxes that may display the absolute x and y coordinates of the component's position; and a button that may reset the component's position to its default x and y coordinates. The user may position the selected component in the Builder environment by, for example, clicking and dragging the small icon on the grid, by nudging it with the arrow keys, or by entering x and y coordinate values in the textfield boxes which may then be applied to the component when the Return/Enter key is pressed. Modifications that may be made through this interface may affect the selected component in the Builder environment in real time.

The Edit Color interface 875, as illustrated in FIG. 57, may comprise preset color swatches, a preview color swatch, and a brightness/darkness slider bar. By clicking on one of the preset color swatches, the user may set the preview color swatch and the selected component's color. Moving the brightness/darkness slider bar may adjust the selected component color's tint. The color's brightness/darkness value may be expressed as a percentage value and may also be set numerically in a textfield box. The tint may be set to any percentage value. For instance, the brightest color (white) may correspond to a value of 100%, and the darkest color (black) may correspond to a value of 0%. The selected color tab may be set to a default value of, for example, 50%. Modifications that may be made through this interface may affect the selected component in the Builder environment in real time.

The Edit Selection interface 876, as illustrated in FIG. 58, may comprise icon preview windows that may contain navigation arrows that may allow the user to view component variations. An icon preview window may contain a button that may allow the user to zoom in or out on the selected component. Using the navigation arrows may allow the user to access different variations of a component. If the user clicks on one of the icon windows, the selection may be made active in the Builder environment. Modifications that may be made through this interface may affect the component in the Builder environment in real time.

The Edit Content interface for the Paragraph component 877, as shown in FIG. 59, may comprise an editable textfield, which may have, for example, a 999 character limit, and pulldown menus. The pulldown menus may include menus that may be used to set, for example, the Font, Size, Align, and Shape attributes. The user-selected attributes and textfield content may be displayed in the Builder environment by clicking on the Apply button.

The Edit Quicklink interface for Button components 878, as demonstrated in FIG. 60, may comprise a Quicklink/URL toggle button and an Accept button. When the Quicklink/URL toggle button is toggled to Quicklink, the interface may display a list of all scenes in the project and all components that may have Quicklinks in the current scene. The user may select the item to which the selected button component will link and then may press the Accept button to apply the link to the button component. When the Quicklink/URL button is toggled to URL, the interface may display a textfield which may allow the user to input a URL and buttons which may allow the user to link to the URL in the Same Window or in a New Window. The default setting for the buttons may be, for example, the New Window button.

The Edit Selection interface for Button components 879, as shown in FIG. 61, may comprise icon preview windows, navigation arrows for viewing component variations, a Button Label textfield box, and an Accept button. The icon preview windows may allow users to view icons for the Button components. Using the navigation arrows may allow the user to access Button variations. If the user clicks on an icon window, that icon may be activated in the Builder environment. Users may modify text content for the Button component in the Button Label textfield box. If the user clicks on the Accept button, the textfield content may be applied to the Button component in the Builder environment.

The Edit Content interface for the Line Effects Component 880, as shown in FIG. 62, may comprise an editable textfield, which may have, for example, a 999 character limit, and a pulldown menu, which may contain, for example, Font settings. The user-selected Font and textfield content may be displayed in the Builder environment if the user presses the Apply button.

The Edit Soundtrack interface 881, as illustrated in FIG. 63, may comprise a menu of Soundtrack variations, a Volume Level slider bar, and a sound on/off button. Volume Levels may include a number of levels. For instance, four levels may be used with level 1 being the softest and level 4 being the loudest. When a user loads and previews a new Soundtrack variation, the Volume toggle may default to ON, and the user-selected Volume Level may be applied to the new Soundtrack variation. If no Soundtrack is selected, the Soundtrack interface may default to either a random or an application-specified variation. In addition, the Volume may default, for example, to ON, and the Volume Level may default, for example, to level 2. Modifications that may be made through this interface may affect the component in the Builder environment in real time.

The Edit User Assets interface 882, as demonstrated in FIG. 64, may comprise a listing of all uploaded user assets; a preview icon; an Asset Data button; and Asset management buttons. The Asset management buttons may include buttons that, for example, Remove, Upload, Refresh, and Accept assets. The preview icon may display the selected user asset and may list attributes, such as the filename, file type, file size, width and height attributes that may be associated with the user asset. If the user clicks on the Asset Data button, the interface may display detailed file information, which may have been previously entered by the user in an Upload Assets pop-up window. This information may include, for example, a Description, a Category, a Subcategory, a Version, and Keywords. If the user clicks on the Remove button, the interface may remove the selected user asset from the user assets component. If the user clicks on the Upload button, the Upload Assets pop-up window may be launched. If the user clicks on the Refresh button, the content of the User Assets interface may be reloaded. If the user clicks on the Accept button, the selected user asset may be displayed in the Builder environment in real-time.

The Edit Content interface for Character Effects components 883, as shown in FIG. 65, may comprise a textfield box, a pulldown menu for Font selection, and an Apply button. The textfield box may be limited to, for example, twenty characters. The pulldown menu may allow the user to select a Font that may be applied to the inputted characters. User-defined changes may not be displayed in the Builder environment until the Apply button has been pressed.

The Edit Content interface for Movie components 884, as illustrated in FIG. 66, may comprise textfield boxes, a movie playback controller, a Search Speed controller, and an Apply button. The movie playback controller may include buttons that Play, Stop, Rewind, and Fast-Forward buttons. The user may control the playback of each Movie in real time in the Builder environment by selecting the Play and Stop buttons. The Fast-Forward and Rewind buttons may be independent of the Play and Stop buttons and may control the Movie accordingly when pressed. The speed of the Rewind and Fast-Forward controls may include a number of settings that may set the speed with which those controls may operate. For instance, the Rewind and Fast Forward controls may use three settings ranging from slow to fast that may be selected when the user accesses the Search Speed controller. The default Search Speed may be set, for example, to medium. If the user releases the Fast-Forward or Rewind button, the Movie may Play or Stop depending on whether Play or Stop may have been previously selected. The user may also modify the movie by editing the content of the textfields and pressing the Apply button to set the content of the textfields in the Builder environment. The user may then view the selected movie by using the playback controls.

The Edit Content interface for the Window component 885, as shown in FIG. 67, may comprise a Window Title textfield and a content textfield, which may be limited, for example, to 999 characters. If the user presses the Apply button, the Window Title textfield and content textfield may be displayed in the Builder environment.

The Edit Content interface for Header components 886, as illustrated in FIG. 68, may comprise an editable textfield, which may be limited, for example, to 999 characters, and two pulldown menus, which may be used to set the Font and Size attributes for the text in the textfield. If the user presses the Apply button, the user-selected attributes and textfield content may be displayed in the Builder environment.

The Scale/Position Handles 887, as demonstrated in FIG. 69, may comprise corner handles, side handles, a hit area, and a pop-up display that may show Quicklink information. When the user selects a component from the Depth Browser, the hit area may be altered so that it may surround the entire selected component, corner handles may be placed at the corners of the component, and side handles may be placed at each of the midpoints of the component's sides. If the user clicks and drags a corner handle, the user may re-size the component in real-time. The x-coordinate value may be changed by this process in a manner that may be proportional to the y-coordinate value, and vice versa. If the user clicks and drags a side handle, the user may re-position either the x scale or the y scale depending on which of the side handles may have been selected. The user may also reposition the component by clicking and dragging anywhere within the hit area. Also, if the component may have a Quicklink associated with it, the Quicklink information may be displayed in a small window when the user moves the mouse over the hit area and may disappear when the user moves the mouse outside of the hit area.

The Depth Browser 888, as shown in FIG. 70, may be accessed when the user may select the open tab for the Depth Browser. For instance, this tab may be labeled "Layers" and may be located on the lower left side of the Builder screen. When opened, the Depth Browser may load a list of components from the current scene and may display the list in top (front) to bottom (back) order. Each component entry may have a visibility button and a lock button associated with it.

User input to the Depth Browser 889, as illustrated in FIG. 71, may comprise several different operations. The user may drag (add) a new component into the scene. When a new component is added, the Depth Browser may place the new component, for example, on top of (in front of) all other components in the scene and may place an entry for that component at the beginning of the Depth Browser's list. If the User drags a component entry up or down in the Depth Browser's list, the depth of that component may be changed in the scene appropriately. If a Visibility button associated with a component is clicked, the visibility of the component may be toggled. This feature may be used to limit the number of components in view so that a subset of the current scene's components may be worked on independently. If the Lock button associated with a component is clicked, the lock status of the component may be toggled. A locked component's attributes may not be changed whether the component entry may be moved in the Depth Browser's list or the component may be edited in the Unified GUI. If a non-locked component is selected in the Depth Browser Panel, the selected component may become accessible via the Unified GUI. This may allow any editable property of the component to be modified. Finally, if the user clicks on the close tab, the Depth Browser may be closed.

An alternative embodiment to the Depth Browser is the Layers Window 890, as shown in FIGS. 72 through 78. The Layers Window may be used to manipulate the components in a scene in various ways. For example, the Layers Window may implement drag and drop paradigms for component display order and for component timing.

In a particular embodiment, when a scene is loaded, the Layers Window may be populated with information about the components in that scene, preferably one line per component. A component line may be divided left to right into controls, a description of the component, and a timeline area. The top to bottom order in the window may represent the top to bottom display order at run-time and in the builder. A component may be dragged up or down in the window to change this top to bottom order. There may be a numeral or other indicator associated with the component line that represents its order from the top to the bottom.

Referring to a particular embodiment as shown in FIG. 73, when a component is selected in the Layers Window, the Component Browser 80 then may become associated with that component and allow various attributes of that component to be edited 891. A component may be selected by clicking, for example, anywhere on its component line except, for example, in instances where buttons are associated with the component line that provide for visibility and/or locking of a component. See FIG. 75. In those instances, the buttons may not be clicked to select that component.

The description area associated with the component line may contain a description of the component and its general component type. Associated with the description area may be a graphical timeline area, as shown in FIG. 74. For example, a heading in the window may show the scene time, for example, in seconds from 0 at the left to the total scene time at the right, with tick marks showing time subdivisions. The scene time may be modified, for example, by rolling over the time at the right with the mouse and entering a new scene duration. In addition, a window may pop up in which one may enter a new scene time (e.g., in a range from 0.01 second to 999 seconds). The window preferably remains open until a valid value is entered. As the scene time is changed, the tick marks that mark off units of time may change, and so may, for example, component "life" bars change. These tick marks may be used as guides for timing components.

As shown in FIG. 76, each component may have associated with it a bar in the graphical timeline area that shows its life during a scene. In a particular embodiment, one end of the bar may be at the start time (when the component appears). The other end of the bar may be at the end time (when the component disappears). The length of the bar thus may represent the duration of that component in the scene and the location along the timeline represents its relative life within the scene. The start and end times may be relative to the beginning of the scene. In a specific embodiment, bars from multiple components may be aligned for simultaneity of appearance and/or disappearance. When a component is selected, its timeline bar may show, for example, arrows at each end. Dragging one arrow may change the start time of that component and its duration. Dragging the other arrow may change the end time of that component and its duration. Dragging the whole bar (e.g., from its center) may change the start and end times without, for example, changing the duration. In a specific embodiment, flags may appear above the window that may show the start and end times numerically (with, for example, guide lines on the tick marks). The total duration of the component may be shown numerically, for example in a window header between the flags.

Additionally, for example, there may be buttons associated with the component description on the component line. In a particular embodiment, as shown in FIG. 77, one button may, for example, control visibility in the builder. If a component is interfering with the positioning of another component, clicking the left button of the interfering component may toggle it on or off. In addition, for example, another button may control locking, as shown in FIG. 78. A locked component cannot be selected, for example, when it has particular use and a user does not want to accidentally edit or reorder a component.

Referring to the embodiment shown in FIG. 77, when a component is not selected, its life bar may have a particular shading or color; for instance, gray. When a component is selected, its life bar visibility may change and have a different visibility, embodied by shading or color, for instance, green, and may have, for example, arrow shapes at each end. In a specific embodiment, if a mouse is rolled over an arrow shape, the arrow shape may change color, e.g., it may turn orange. By clicking and holding the mouse on the shape, one may drag that end of the life bar to a new time. Moreover, when a component is selected, information on its line may change color, e.g., it may turn green. When a component is not selected, information on its line may be another color, for example, gray. When a mouse is rolled over an unselected component line, the component line may turn color, e.g., it may turn orange. The component line may be selected if the user clicks the mouse on the component line when it is orange. In a specific embodiment, only one component may preferably be selected at a time.

In a specific embodiment, the Builder may allow a number of components to be copied to a "clipboard." Each component in the clipboard may be identified by the component's name and the component's type. The user may "paste" any component currently in the clipboard into the same project or a different project. In a specific embodiment, a pasted component may occupy the same location and possess the same properties as the component when it was copied to the clipboard. Once the component has been pasted, the user may modify the component's location and other properties to meet the requirements of the current project.

In a specific embodiment, the Builder may only allow up to a specific number of components to reside in the clipboard at one time. If all component slots in the clipboard are filled and another component is copied to the clipboard, a component may be deleted from the clipboard to allow the new component to be copied. In a further embodiment, the oldest component may be deleted from the clipboard. The user may also delete a component from the clipboard individually or collectively.

In a specific embodiment, the Builder may provide a grid, which may be used to align components. The user may be allowed to "grid snap" a component to the grid, and the user may enable or disable the grid snap function. When grid snapping is enabled, a component may "snap" to the nearest grid point once it is placed or moved in a scene. In a specific embodiment, the user may control the grid functions via a menu comprising the grid on/off, grid size, and grid snap on/off commands. In a specific embodiment, one grid may be used for a project.

In a specific embodiment, the Builder may provide "guides" that may be used to align components. Guides may be vertical or horizontal lines. In a specific embodiment, each scene may possess an independent set of guides. The guides may be saved in the project database. In a specific embodiment, guides may be snapped to grid lines. If guide snapping is enabled, components may snap to the nearest guide when placed or moved in a scene. In a specific embodiment, the user may control guide line functions via a menu comprising the guide on/off, add guide, guide snap on/off, and clear guides commands.

When the cursor touches a guide, the guide may display its x-coordinate for vertical guides or y-coordinate for horizontal guides. A guide may also display a number of control buttons when the cursor touches it. In a specific embodiment, a control button may be used to toggle the guide between horizontal and vertical orientation. In a specific embodiment, a control button may be used to delete the guide. A guide may be moved by clicking and dragging the guide to a new position in the scene.

In a specific embodiment, neither the grid nor the guide lines may appear in previewed or published projects.

Asset Manager

The Asset Manager 900 may provide obtainers to obtain information from its environment and use that information to control subsequent processing. Exemplary obtainers may include obtainers that obtain the processor type, frequency, and MIPS (millions of instructions per second) rating of each processor in the central processing unit of the user's remote computer system, the capacity in bytes of all random access memories or attached memory units of the user's remote computer system, and the network connection type and network transmission bandwidth of the user's remote computer system. This may allow the Asset Manager to dynamically adjust processing to match the CPU speed, the processing load of each timeline frame, the network transmission bandwidth, and the server response time for any appropriate Internet application, including the rich-media applications of the present invention. Dynamic adjustments may include using a determiner to determine which variant rich-media component may use resource requirements most closely matched to the available resources. Other dynamic adjustments may include load leveling of components using a large number of CPU cycles and load leveling of high network bandwidth components. This may be done by implementing calculators that may calculate the number of CPU cycles or the amount of network transmission bandwidth used by all components or a subset of components that meet a set of requirements. Because the Asset Manager may continually monitor these aspects of the environment, it may continually adjust processing to provide the smoothest playback of rich-media components individually and as a whole.

The Asset Manager may internally make requests on behalf of a clip without destroying or otherwise interfering with any requests the clip may be making. This may allow the clip to make complex (multi-step) requests and the Asset Manager to translate each complex request into a set of single-step requests. A specific implementation of the Asset Manager uses an internal request variable in each slot to provide this capability.

The Asset Manager may comprise a control program for loading and controlling clips, which may include movie clips, animations, sound clips, scripts, programs, database requests, and variable definition files. In addition, the Asset Manager may provide a safe mechanism for passing arguments and receiving responses. Each clip known to the Asset Manager may be assigned its own "slot." Each slot may comprise a number of uniquely named variables in which information about each request by the assigned clip may be placed. As the Asset Manager loads a clip, its assigned slot may be placed in a standard variable in the clip itself. Thus, each clip may know the proper slot to use for its requests.

A specific implementation of the Asset Manager 900 assigns a slot to a clip when the clip is "registered" with the Asset Manager. Typically, a control clip may perform the registration on behalf of the clip of interest. Then either the control clip or another clip may request that the Asset Manager load the clip of interest by placing a load request in the clip's slot. Identification of clips and slot assignment may occur outside of a registration mechanism. The Asset Manager may load clips not associated with the current scene of the rich-media application.

In a specific embodiment of the present invention, the Asset Manager 900 loads component files 1100 specified by a list of available components from the user's account and a master component list based on the user's selected level of service, as illustrated in the decision table depicted in FIG. 79. Three exemplary features may arise from the dynamic loading of these component files. First, the Asset Manager configuration (component set) may be modified each time that the Asset Manager starts up to accommodate files pertaining only to specific users. Second, upgrades and bug fixes may be incorporated by replacing the files containing the Asset Manager components. Third, the loading of Asset Manager components may provide an opportunity to measure the network bandwidth and server response. After the Asset Manager loads the component files, the rich-media components may then be initialized. Each component file has an initialization routine that may be called so that each component may initialize itself. Finally, when the Asset Manager is ready to commence operation, the Idle Loop 901, the main control loop for the Asset Manager, may be started.

In a specific embodiment of the present invention, a different version of the Asset Manager may be loaded based on the number of scenes for a given project. In a preferred embodiment, different versions of the Asset Manager may be loaded if the current project contains 1, 2, 3, or more than 3 scenes.

In a specific embodiment of the present invention, the Idle Loop 901, as shown in FIG. 80, calls the Request Scanner 910 and the Load Check 920. The length of the Idle Loop may be dynamically variable. The length of the Idle Loop may control how often the Request Scanner may be called because the Request Scanner may only be called from the first frame of the Idle Loop timeline. In a specific embodiment of the present invention, the Load Check 920 may be called from every Idle Loop frame since its operation may be more time critical than the Request Scanner.

In a specific embodiment of the present invention, each frame checks the control variable. If the frame number is less than the control variable, control may pass to the next frame. If the frame number is greater than or equal to the control variable, control may jump to the first frame of the Idle Loop. The control variable may be changed at any time and may take effect no later than the start of the next frame. Its value may be set to the length of the Idle Loop in frames.

A specific embodiment of the present invention may limit the Idle Loop 901 to a maximum cycle of, e.g., 30 frames. This specific embodiment has a nominal playback rate of 30 frames per second. Thus, the Idle Loop may last from 1/30th of a second to 1 second in this specific embodiment. In turn, the Request Scanner 910 may be called every 1/30th of a second to every second depending on the value of the control variable. The maximum number of cycles may be changed to a value other than 30 if the user desires.

As illustrated in FIG. 81, the Request Scanner 910 may function as the primary control routine for processing requests for a specific embodiment of the present invention. The Request Scanner may call the Scheduler 930 to determine which request to schedule. The Request Scanner may then cycle through the available requests to determine the general type of each request. Finally, the Request Scanner may forward each request to a processor devoted to processing that request type 911, as illustrated in FIG. 82. The general types of requests preferably include registration requests 940, load requests 950, play requests 960, position requests 970, state requests 980, local volume requests 990, and global volume requests 1000.

FIG. 83 demonstrates a process for determining whether the Asset Manager 900 has completed the load of each outstanding clip. As the load of each clip completes, the Load Check 920 may place that clip's slot into the special slot identifier variable associated with that clip. By doing so, the clip may send requests to the Asset Manager. The Asset Manager may remove loaded clips from the list and may set the clip's state to "loaded."

In a specific embodiment of the present invention, the Scheduler 930 examines the available requests and schedules them as illustrated in FIG. 84. Each scheduled request may be placed in a schedule list. Each slot may have both an internal request and an external request. In the specific embodiment, the internal request is given precedence. Any previously scheduled request that was not processed may be retrieved from the reschedule list and placed in the schedule list for rescheduling. If any CPU intensive tasks are in progress, only the CPU intensive tasks may have new requests added to the schedule list 931, as shown in FIG. 85. If an intensive task has an internal request, it may be scheduled. Otherwise, if an intensive task has an external request, it may be scheduled. In the specific embodiment, no other requests are scheduled if any intensive tasks are in progress. FIG. 86 illustrates the process that may be performed when no intensive tasks are in progress 932. If no intensive tasks exist, the normal schedule list may be processed. In a specific embodiment of the present invention, an internal request may be scheduled for each slot that has an internal request. If a slot does not have an internal request, its external request, if one exists, may be scheduled. The request list may then be emptied in anticipation of new requests.

In a specific embodiment of the Scheduler 930, the Scheduler may schedule requests from the reschedule list and from any clips that requires a large proportion of the CPU bandwidth for their own processing. If no intensive tasks exist, all other requests may be scheduled. The Asset Manager may implement other scheduling protocols including round robin, priority-based, and time-slice. Additionally, more than one protocol may be implemented and the choice of which scheduler protocol to use for a specific request may be made based on the system conditions at that time.

The Registration Request Processor 940, as demonstrated in FIG. 87, may control the registration of a clip. In a specific embodiment of the present invention, each clip may be registered with the Asset Manager 900. When a clip is registered, information may be provided to the Asset Manager to allow it to function more efficiently. Registration may also create a slot so that each clip may send requests to the Asset Manager. The Registration Request Processor may examine the registration request to verify that it is a legitimate request. If the request is legitimate, the Registration Request Processor may call a particular processing routine for that request. These processing routines preferably include registering a request 941, reregistering a request 942, unregistering a request 943, and querying a clip to determine if it is registered 944. If the request is not legitimate, the Registration Request Processor may return an error to the requester.

In a specific embodiment, Register Request 941 may receive the arguments for the request and check them to verify that no errors exist, as shown in FIG. 88. If no error is discovered, a new slot may be created, and the arguments may be assigned to the slot. These arguments preferably include the following: a clip name; the instance name and depth to use internally; the URL so that the clip may be retrieved from the network; various clip attributes such as whether the clip represents a background or an overlay; permission sets including what can be done to the clip, what the clip can do to itself, and what the clip can do to other clips; the designator for its parent clip; and which of its parent clip's commands it may obey. The arguments may also include multiple URLs for cycle and bandwidth variants. The clip's state may then be set to "registered" so that it may participate in subsequent operations. A response may then be returned to the requesting clip signifying that the request completed normally or that the request completed with an error.

In a specific embodiment, Reregister Request 942, as shown in FIG. 89, is similar to Register Request. Reregistration may be used to allow characteristics of the clip to be changed. A clip requesting reregistration may already have a slot and may have permissions to be satisfied. If the permissions allow reregistration, the arguments may be checked and assigned to the slot as in normal registration. The clip's state may then be set to "registered" so it may participate in subsequent operations. A response may then be returned to the requesting clip.

In a specific embodiment, Unregister Request 943 may undo the registration process without destroying the clip's slot, as illustrated in FIG. 90. Unregistration may stop the clip if it is playing and unload the clip if it is loaded. Stop and Unload requests via the internal slot request may perform these operations.

FIG. 91 demonstrates the Query Register process 944. In a specific embodiment, Query Register may allow one clip to find out whether another clip is registered and, if so, to which slot the target clip belongs. Because a slot may generally not be known or may not exist if the target clip is not registered, the clip name, its instance name, or its URL may be used to identify the clip. The arguments passed with the Query request may determine which identification mechanism may be used. If the clip is found and is registered, its slot number may be returned to the requester.

The Load Request Processor 950 may examine a load request to see if it is a legitimate request, as shown in FIG. 92. If the request is not legitimate, the processor may return an error to the requester. Otherwise, the processor may call a processing routine for that request. The processing routines preferably include Load 951, Unload 952, Query Load 953, and Query Frames Loaded 954.

As shown in FIG. 93, Load 951 may verify that a clip has been registered and may return an error to the requestor if the clip is not registered. If bandwidth hogging is in effect, only active bandwidth hogs may initiate clip loads, see 983 and 984. Other load requests may be placed on the reschedule list for processing when bandwidth hogging is not in effect. Processing may proceed if loading the clip is permitted. If the requestor supplies an existing instance in which to load the clip, the existing instance may be used. Otherwise, Load may duplicate an empty container and supply the specified instance name and depth to hold the clip. If cycle and/or bandwidth variants of the clip were registered, a variant that matches the current cycle and bandwidth environment may be picked. This choice may be based on a Cycle Category value and a Bandwidth Category value. The load may then be initiated, and the target clip may be placed on the load list for Load Check 920 to monitor. A response may then be returned to the requester.

Unload 952 may verify that the clip is loaded and may return an error to the requester if it is unloaded, as illustrated in FIG. 94. Processing may proceed if unloading the clip is permitted. If the clip is playing, the internal slot request may be used to issue a Stop request 963, which may be propagated to the clip's children. If the clip has children, an Unload request may be issued to each child process by using the internal slot request. Finally, the target clip unload may be performed, and the clip's state may be set to "unloaded." A response may be returned to the requester.

Query Load 953 may return a True or False response depending on whether the target clip is loaded or unloaded, as illustrated in FIG. 95. Query Load Frame 954 may return the number of frames loaded at the time of the request, as shown in FIG. 96. If the clip is not loaded or is being loaded, an error response may be returned.

As demonstrated in FIG. 97, the Play Request Processor 960 may examine the play request to see if it is a legitimate request. If the request is not legitimate, the processor may return an error to the requestor. Otherwise, the processor may call a processing routine for that request. The processing routines preferably include Play 961, Pause 962, Stop 963, Query Play 964, and Query Frame 965.

In a specific embodiment of the present invention, Play 961 may verify that the clip is loaded and may return an error to the requester if it is not, as illustrated in FIG. 98. Processing may proceed if playing the clip is permitted. Each clip may supply a play routine if the steps necessary to play a given clip are not known to the system. If the clip has children, Play may be issued for each child using the internal slot request. The clip's state may then be set to "playing," and a response may be returned to the requester.

As shown in FIG. 99, Pause 962 may verify that the clip is playing and may return an error to the requestor if it is not. Processing may proceed if pausing the clip is permitted. Each clip may supply a pause routine if the steps necessary to pause a given clip are not known to the system. If the clip has children, Pause may be issued for each child using the internal slot request. The clip's state may then be set to "paused," and a response may be returned to the requester.

Stop 963 may verify that the clip is playing or paused and, if not, returns an error to the requester, as demonstrated in FIG. 100. Processing may proceed if stopping the clip is permitted. Each clip may supply a stop routine if the steps necessary to stop a given clip are not known to the system. If the clip has children, Stop may be issued for each child using the internal slot request. The clip's state may then be set to "stopped," and a response may be returned to the requester.

Query Play 964 may return a True or False response depending on whether the target clip is playing or not, as illustrated in FIG. 101. FIG. 102 shows the Query Play Frame processor 965. Query Play Frame may return the frame number executed at the time of the request. If the clip is not playing, a frame number of zero and an error response may be returned.

In a specific embodiment of the present invention, the Position Request Processor 970 may examine a position request to verify that it is a legitimate request, as illustrated in FIG. 103. A position request may be a request to change from one frame to another in the current clip. If the request is not legitimate, the processor may return an error to the requester. Otherwise, the processor may call a processing routine to satisfy that request. The processing routines preferably include Fast Forward 971, Rewind 972, and Query Rewound 973.

As shown in FIG. 104, Fast Forward 971 may verify that the target clip is loaded and may return an error to the requestor if it is not. Processing may proceed if the fast forward process is permitted. Each clip may supply a fast forward routine if the steps necessary to fast forward a given clip are not known to the system. If the clip has children, Fast Forward may be issued for each child using the internal slot request. A response may be returned to the requestor.

As illustrated in FIG. 105, Rewind 972 may verify that the target clip is loaded and may return an error to the requester if it is not. Processing may proceed if the rewind process is permitted. Each clip may supply a rewind routine if the steps necessary to rewind a given clip are not known to the system. If the clip has children, Rewind may be issued for each child using the internal slot request. A response may be returned to the requestor.

Query Rewound 973 may return a True or False response depending on whether the target clip is at its first frame or not. This process is illustrated in FIG. 106.

The State Request Processor 980, as shown in FIG. 107, may examine the state request to verify that it is legitimate. If the request is not legitimate, the processor may return an error to the requester. Otherwise, the processor may call a processing routine to satisfy that request. The processing routines preferably include Cycle Pig On 981, Cycle Pig Off 982, Bandwidth Hog On 983, Bandwidth Hog Off 984, Query State 985, Query Cycle Pig 986, and Query Bandwidth Hog 987.

As illustrated in FIG. 108, Cycle Pig On 981 may verify that a clip is loaded and that an argument describing its CPU cycle needs is legitimate. An error may be returned to the requester if these requirements are not met. If the current cycle availability is greater than or equal to the cycle needs of the clip, the clip may be added to the intensive task list and its cycle needs may be deducted from the cycle availability. A response may be returned to the requestor.

Cycle Pig Off 982 may verify that a clip is loaded and that the clip is on the intensive task list, as shown in FIG. 109. An error may be returned to the requestor if these requirements are not met. The cycle needs of the clip may then be restored to the current cycle availability, and the clip may be removed from the intensive task list. A response may be returned to the requestor.

As illustrated in FIG. 110, Bandwidth Hog On 983 may verify that a clip is loaded and that an argument describing its bandwidth needs is legitimate. An error may be returned to the requester if these requirements are not met. If the current bandwidth availability is greater than or equal to the bandwidth needs of the clip, the clip may be added to the high bandwidth task list and its bandwidth needs may be deducted from the bandwidth availability. A response may be returned to the requester.

Bandwidth Hog Off 984 may verify that a clip is loaded and that the clip is on the high bandwidth task list, as shown in FIG. 111. An error may be returned to the requestor if these requirements are not met. The bandwidth needs of the clip may then be restored to the current bandwidth availability, and the clip may be removed from the high bandwidth task list. A response may be returned to the requester.

As shown in FIG. 112, Query State 985 may verify that a clip is loaded and may return an error to the requester if it is not. A character string containing one character for each state attribute may be returned to the requester. In addition, information that pertains to whether the clip is on the intensive task list and the high bandwidth task list may be returned to the requester.

Query Cycle Pig 986 may return a True response if any clips are on the intensive task list, as illustrated in FIG. 113. If no clips are on the in intensive task list, Query Cycle Pig may return a response of False.

Query Bandwidth Hog 987 may return a True response if any clips are on the high bandwidth task list, as demonstrated in FIG. 114. If no clips are on the in high bandwidth task list, Query Bandwidth Hog may return a response of False.

The Local Volume Request Processor 990 may examine the local volume request to verify that it is legitimate, as shown in FIG. 115. If the request is not legitimate, the processor may return an error to the requestor. Otherwise, the processor may call a processing routine to satisfy that request. The processing routines preferably include Set Local Volume 991, Turn Local Volume On 992, Turn Local Volume Off 993, and Query Local Volume 994.

Set Local Volume 991 may verify that a clip is loaded and may return an error to the requestor if it is not, as shown in FIG. 116. Processing may proceed if the clip permits local volume changes. The local volume level of each clip may be set regardless of whether the clip's local volume or the global volume are turned on or off. The level may take effect when the local and global volumes are turned on. Each clip may supply a set local volume routine if the steps necessary to set the local volume for a given clip are not known to the system. If the clip has children, Set Local Volume may be issued for each child using the internal slot request. The clip's local volume may then be saved in the slot and a response may be returned to the requestor.

FIG. 117 demonstrates the Local Volume On processor 992. Local Volume On may verify that a clip is loaded and may return an error to the requester if it is not. Processing may proceed if the clip permits local volume changes. Each clip may supply a routine to turn on the local volume if the steps necessary to turn on the local volume for a given clip are not known to the system. The clip volume level may not be affected by this processing. The clip volume ON state may be saved in the slot. If the clip has children, Local Volume On may be issued for each child using the internal slot request. Finally, a response may be returned to the requestor.

Local Volume Off 993 may verify that a clip is loaded and may return an error to the requestor if it is not, as shown in FIG. 118. Processing may proceed if the clip permits local volume changes. Each clip may supply a routine to turn off the local volume if the steps necessary to turn off the local volume for a given clip are not known to the system. The clip volume level may not be affected by this processing. The clip volume OFF state may be saved in the slot. If the clip has children, Local Volume Off may be issued for each child using the internal slot request. Finally, a response may be returned to the requestor.

Query Local Volume 994 may verify that a clip is loaded and may return an error to the requester if it is not, as shown in FIG. 119. Otherwise, it may return the clip's local volume level and ON/OFF state to the requestor.

As illustrated in FIG. 120, the Global Volume Request Processor 1000 may examine the global volume request to verify that it is legitimate. If the request is not legitimate, the processor may return an error to the requester. Otherwise, the processor may call a processing routine to satisfy that request. The processing routines preferably include Set Global Volume 1001, Turn Global Volume On 1002, Turn Global Volume Off 1003, and Query Global Volume 1004.

Set Global Volume 1001 may verify that the global volume may be permitted to change and may return an error to the requester if it is not, as shown in FIG. 121. In a specific embodiment of the present invention, the volume level argument may be retrieved and converted into a percentage of the maximum volume. This value may eventually be used to multiply each clip's local volume level to determine that clip's precise volume setting. The global volume level may be set whether or not the global volume is turned on or off. The global volume level may take effect when the global volume is turned on. The global volume and the percentage of the maximum value may be saved. If the global volume is currently on, the internal slot request may be used to issue a Turn Global Volume On request 1002 to set new volume levels for each clip. A response may be returned to the requestor.

Turn Global Volume On 1002 may verify that the global volume may be permitted to change and may return an error to the requestor if it is not allowed to change, as demonstrated in FIG. 122. Each clip may supply a routine to turn on the local volume if the steps necessary to turn on the local volume for a given clip are not known to the system. Processing may proceed by looping through all clips. In a specific embodiment of the present invention, if the clip's local volume state is set to ON, the clip's Set Local Volume routine 991 preferably executes using the product of the clip's local volume level and the global volume percentage as the local volume level argument for that routine. In the specific embodiment, the clip's local volume level and ON state are not affected. Finally, a response may be returned to the requester.

Turn Global Volume Off 1003 may verify that the global volume may be permitted to change and may return an error to the requestor if it is not allowed to change, as shown in FIG. 123. Each clip may supply a routine to turn off the local volume if the steps necessary to turn off the local volume for a given clip are not known to the system. Processing may proceed by looping through all clips. In a specific embodiment of the present invention, if the clip's local volume state is set to ON, the clip's Set Local Volume routine 991 preferably executes using zero as the local volume level argument for that routine. In the specific embodiment, the clip's local volume level and ON state are not affected. Finally, a response may be returned to the requester.

FIG. 124 illustrates the processing for the Query Global Volume processor 1004. Query Global Volume may return the global volume level ON/OFF state to the requester.

The Asset Manager Component Loader 1100 may work from lists of items to be created or loaded, as shown in FIG. 125. An exemplary set of lists that may be loaded may include the Dup List 1101, the Level List 1103, the Swf List 1104, and the Speedo List 1105. Additionally, the Loader may run the Load Network Bandwidth Speedometer routine 1102, in order to allow the Network Bandwidth Speedometer 1120 to run.

The Dup List 1101, as shown in FIG. 126, may specify the creation of containers to hold such items as global symbols, slots, and speedometer measurements. The process may loop over the list and may extract information about the instance name and the level for each container. The process may then call the Create Container utility 1106 to initialize the new containers.

The Load Network Bandwidth Speedometer process 1102 may receive information regarding the target speedometer file from the first entry of the Speedo List, as illustrated in FIG. 127. The process may call the Create Container utility 1106 and the Load Clip utility 1107 in order to install the speedometer. When the load is complete, it may start the Network Bandwidth Speedometer 1120.

The Level List 1103 preferably defines a list of levels that may be managed by the Asset Manager 900, as shown in FIG. 128. All web site clips may be loaded into one of these levels. In a specific embodiment, levels for backgrounds, normal clips, overlays, spies, and speedometers may be defined. Other levels may be defined in other embodiments. Speedometers may be defined as measuring tools for different system variables such as CPU cycles, network bandwidth, and frame rate. Spies may be used for debugging and examining the internal state of the Asset Manager while the rich-media application executes. Examples of spies may include variables, states, clips, and errors.

As illustrated in FIG. 129, the Swf List 1104 preferably defines a list of Asset Manager components that may be loaded from SWF (Shockwave Flash®) files. The process may loop over the list and may extract information that may include the URL, the instance name, and the level for each component. The process may call the Create Container 1106 and Load Clip 1107 utilities to load the components. A specific embodiment of the present invention may include the following exemplary components: argument extraction and checking; clip attribute access; clip permission access; clip state access; clip management; load request processing; play request processing; local and global sound processing; error processing; the scheduler; and the idle loop. Other sets of components may additionally be provided.

The Speedo List 1105, as shown in FIG. 130, preferably defines a list of speedometers and spies. The process may loop over the list and may extract information that may include the URL, the instance name, and the level for each speedometer or spy. The process may then call the Create Container utility 1106 and Load Clip utility 1107 in order to load a speedometer or a spy.

In a specific embodiment, Create Container 1106 is a utility routine that may be used to create empty containers in which clips may be loaded, as demonstrated in FIG. 131. If the load may be performed directly to a level, a container may not be used, and Create Container may modify arguments for Load Clip 1107 accordingly. The requester may also supply a container obviating the need to create one. If neither of these conditions occurs, a container may be created on the specified level, at the specified depth, with the specified instance name. If position arguments are supplied, the container's X-axis and Y-axis positions may be set accordingly. Create Container may define arguments for Load Clip 1107 regarding the container.

In a specific embodiment, Load Clip 1107, as shown in FIG. 132, is a utility routine that may perform the load of a target clip and handle the process of alerting the load monitor. If the target clip is a clip used to monitor the network bandwidth, the monitoring may continue until the clip begins playing. If the load of the clip is monitored, the clip and its monitoring information may be added to a monitor list, which may contain the clip's start time and initial state, and the Load Monitor 1110 may be started if it is not already running. Finally, the clip may be loaded into the level or container specified in the arguments.

The Load Monitor 1110 may be used to track the state of loading of each clip, as illustrated in FIG. 133. If no clips reside in the monitor list, the Load Monitor may stop its execution. The Load Monitor may be restarted when a new clip is added to the monitor list 1107. Otherwise, the Load Monitor may loop through the monitor list entries. Each clip may have a target state that may terminate the monitoring of that clip when the target state is reached. If the clip is still being monitored, the Process Monitor State routine 1111 may check the clip. When the monitor list has been traversed, the Load Monitor may wait for the next frame in order to allow the clip loads to progress.

As shown in FIG. 134, the Process Monitor State routine 1111 may monitor the current state of the clip load and use the current state to call a routine that may determine whether the next load stage has been reached. An initialized clip may be checked by the Check Loading Started routine 1112. A loading clip may be checked by the Check Loading Complete routine 1113. A loaded clip may be checked by the Check Playing Started routine 1114. A playing clip may be checked by the Check Playing Stopped routine 1115. Once the clip has been checked, the clip may be examined to determine if monitoring might be terminated. If monitoring may be ended, a callback routine for the clip may be called. Finally, the clip may be marked as "done" in the monitor list.

The Check Loading Started routine 1112 may check the frames loaded attribute of an initialized clip, as illustrated in FIG. 135. In a specific embodiment, if this is greater than zero, the loading has actually started and the clip's state may be set to "loading." Otherwise, a timeout value may be incremented. If the timeout value exceeds a threshold value, the specific embodiment may assume that the load has failed, set the clip's state to "done," and terminate its monitoring of the clip.

As shown in FIG. 136, the Check Loading Complete routine 1113 may check the frames loaded attribute of loading clips. In a specific embodiment, if the frames loaded attribute is equal to the total number of frames in the clip, the loading has finished and the clip's state may be set to "loaded." Otherwise, a timeout value may be incremented. If the timeout value exceeds a threshold value, the specific embodiment may assume that the load has failed, set the clip's state to "done," and terminate its monitoring of the clip.

The Check Playing Started routine 1114 may check the current frame attribute of loaded clips, as demonstrated in FIG. 137. In a specific embodiment, if the current frame attribute is greater than zero, the clip has started to play and the clip's state may be set to "playing." If the target clip measures the network bandwidth, the Network Bandwidth Speedo 1120 may be informed. Otherwise, a timeout value may be incremented. If the timeout value exceeds a threshold value, the specific embodiment may assume that the load has failed, set the clip's state to "done," and terminate its monitoring of the clip.

FIG. 138 shows the Check Playing Stopped routine 1115. The Check Playing Stopped routine may check the current frame attribute of playing clips. In a specific embodiment, if the current frame attribute contains the same value on successive checks, the playing may be assumed to have stopped and the clip's state may be set to "stopped." Otherwise, a timeout value may be incremented. If the timeout value exceeds a threshold value, the specific embodiment may assume that the load has failed, set the clip's state to "done," and terminate its monitoring of the clip.

The Network Bandwidth Speedometer 1120 may obtain the current time and record it as the finish time of the clip load when a clip load is reported to it, as demonstrated in FIG. 139. The Network Bandwidth Speedometer may compute the total load time for the clip from the start and finish times and calculate an "instantaneous" load rate in bytes per second for the clip load. Each clip may have a built-in variable set to its size in bytes. The clip size and load time may then be used to compute a running average. This running average may be checked against a table of bandwidth categories to determine if a threshold might have been crossed. If a threshold has been reached, the new Bandwidth Category may be recorded for use by the Load Request processor 951 in order to choose a clip variant matching the network bandwidth environment. In addition, the Bandwidth Available value may be updated for use in Bandwidth Hog processing 983 and 984. The Turn Speedo On 1121 may set the ON flag if the speedometer was off, as shown in FIG. 140. The Turn Speedo Off 1122 may clear the ON flag if the speedometer was on, as illustrated in FIG. 141.

The CPU Cycles Speedometer 1130 may comprise a number of frames that may constitute a variable length loop, as illustrated in FIG. 145. In the first frame, a start time may be obtained. Then a measured script loop may be executed before the finish time may be obtained. The start and finish times may be used to compute an instantaneous rate and may be rolled into a running average. This running average may be checked against a table of cycle categories to determine if a threshold might have been crossed. If a threshold has been crossed, the new Cycle Category may be recorded for use in the Load Request processor 951 in order to choose a clip variant that matches the CPU cycle environment. Also, a new Cycles Available value that matches the category may be recorded for use in Cycle Pig processing 981 and 982. Furthermore, the frame loop control variable may be modified to reflect the new CPU cycle environment. For instance, in slow CPU environments, the loop may be lengthened. Conversely, the loop may be shortened in fast CPU environments. Intermediate frames in the loop may check to determine whether the control variable frame number might have been reached. If it has been reached, processing may jump back to frame 1 of the speedometer loop. The Turn Speedo On 1131 may set the ON flag and start the speedometer loop if the speedometer was off, as shown in FIG. 143. The Turn Speedo Off 1132 may clear the ON flag if the speedometer was on, as demonstrated in FIG. 144. In a specific embodiment, the speedometer loop does not stop until it executes its first frame.

As shown in FIG. 145, the Frame Rate Speedometer 1140 may comprise a number of frames that may constitute a variable length loop. In the first frame, a start time may be obtained. Frames may advance until the frame number equals a control variable at which point a finish time may be obtained. The start and finish time may be used to compute an instantaneous frame rate and may be rolled into a running average. This average may be checked against a table of frame rate categories to determine if a threshold might have been crossed. If a threshold has been crossed, the new Frame Rate Category may be recorded. Also, the new Frame Rate category may be used to adjust the Cycles Category and Cycles Available values to reflect the Frame Rate overhead. When the control variable frame number has been reached, processing may jump back to frame 1 of the speedometer loop. The Turn Speedo On 1141 may set the ON flag and start the speedometer loop if the speedometer was off, as demonstrated in FIG. 146. The Turn Speedo Off 1142 may clear the ON flag if the speedometer was on, as illustrated in FIG. 147. In a specific embodiment, the speedometer loop does not stop until it executes its first frame.

In an alternative embodiment of the present invention, the Asset Manager may be implemented by an alternate method.

The run time procedure may be separated into several program files so that an image may be made visible on the screen at the earliest possible time. The Bootstrap program file 1200, as shown in FIG. 148, may be loaded in response to a user access to the present invention. The Bootstrap may set a special startup variable that may remain set until Scene 1 may have been loaded and may start playing. This variable may prevent less critical runtime operations until the web site may be displayed. First, the Bootstrap may load the Preloader program file 1210, as illustrated in FIG. 149, which may be the first visible element. The Bootstrap may then load the Asset Manger and Active Content Loader 1220, as illustrated in FIG. 150. Bootstrap may use the Asset Manager and Active Content Loader to load the Session 1230, as shown in FIG. 151, and the Tables 1240, as demonstrated in FIG. 152.

The Bootstrap may directly load the Preloader. It may record the start time of the load and may monitor the load until the load may complete. It may record the load time and the Preloader file size so that it may report these values to the network speedometer. If the Preloader is loaded quickly enough, it may not be turned on. If the load passes a threshold, then the Preloader may automatically start playing. This may occur because the Bootstrap may assume that subsequent loads may take an equally long period of time. The Preloader may set a pointer in the /vars block.

The Bootstrap may then directly load the Asset Manager and Active Content Loader. It may record the start time of the load and may monitor the load until it may complete. It may record the load time and the Asset Manager and Active Content Loader file size so that it may report these values to the network speedometer. The Asset Manager may initialize itself and may place its pointer into the /vars block, which may signal that it may be ready to accept requests. The Active Content Loader may also initialize itself and may place its pointer into the /vars block, which may signal that it may be ready to accept requests.

The Bootstrap may use the Asset Manager and Active Content Loader for all subsequent load operations. It may register the Session with the Asset Manager and may retrieve the Session's slot. It may set information regarding the Session in its slot and may request that the Session may be Loaded via the Asset Manager. When the Session is loaded, it may function as the master control program for the rich-media application and may start playing the rich-media application automatically.

The Bootstrap may load the Tables at the same time that the Session may be loading. It may register the Tables with the Asset Manager and may retrieve the Tables'slot. It may then wait until the startup variable's value may be cleared, which may mean that Scene 1 of the first project may be up and running. It may place the Tables'information into the Tables'slot and may request that the Tables may be Loaded via the Asset Manager. The Tables may start playing automatically when loaded, may initialize themselves, and may put their pointer in the /vars block indicating that they may be ready for operation.

The Session may load completely, as illustrated in FIG. 153, before it initializes 1300. Since data blocks for all components may be persistent throughout the playing of a project, they may all be created as children of the Session. The Session may loop through all of its projects, may create their containers, and may save its pointers to them in the /vars block. The Session may register the first project with the Asset Manager, and may retrieve its slot. The Session may set information for the first project into its slot and may request that the project may be Loaded via the Asset Manager. The first project may start playing automatically.

Meanwhile, the Session may initialize the remaining projects 1310, as shown in FIG. 154. This may be performed by registering the subsequent projects with the Asset Manager and by configuring their information so that they may be ready to request that they may be loaded when their sequence for playing may occur.

The Session may have a doDone( ) routine 1320, as demonstrated in FIG. 155, which may be called by each project when it completes. If more projects exist, the Session may step to the next project, may retrieve its slot, and may request that it may be Loaded via the Asset Manager. That project may start playing automatically. If no more projects exist, the web site may have completed its playing operation.

A Project may play automatically when loaded 1400, as shown in FIG. 156. The project may completely load and may then initialize itself. This initialization process may include setting its own pointer as the current project in the /vars block. It may duplicate a container for Scene 1, may register Scene 1 with the Asset Manager and may retrieve its slot. It may place Scene information into the slot and may set a variable that may denote an urgent state because the first Scene may be loaded. This may make the Asset Manager and Active Content Loader process the Project's requests in advance of other requests. The Project may issue Prep, Stage, Load, and Play requests for Scene 1 via the Asset Manager. These requests may cause the Asset Manager and Active Content Loader to load all files for this scene before other requests which may allow the Scene to play as soon as it may be ready. At the same time, the Project may duplicate a container for Scene 2, may register Scene 2 with the Asset Manager, may retrieve its slot, and may issue Prep and Stage requests at a normal priority level via the Asset Manager. This may start the preloading of Scene 2 in anticipation that Scene 2 may be the next scene to play after Scene 1 may complete.

The Project now may wait until Scene 1 may actually be playing 1410, as shown in FIG. 157. It may clear the startup variable, which may allow other operations that may have been halted because of the high priority access given to Scene 1 to proceed. An example of such a process may include loading the Tables. The Project may wait until the Tables are ready for operation. It may then request that new tables be created for use as the Project's Scene Table and for Scene 2's Quicklink Table. It may then initialize the Scene Table and Scene 2's Quicklink Table before it requests that Scene 1's Quicklink Table is created. Special code may be used to initialize Scene 1's Quicklink Table so that it can complete more quickly. The Project then may add Scene 1's Quicklink entries to its Quicklink Table and may set the table as the current Quicklink Table. At this point, all buttons may be operational since they may access their referent in the Quicklink Table.

Finally, the Project may build its Scene Table 1420, as illustrated in FIG. 158. Because Scene 1 and Scene 2 may have been specially created so that the project may be allowed to begin playing as quickly as possible, these two scenes may have to be added separately to the Scene Table. The Project may then loop through its remaining scenes, may duplicate their containers, may register them with the Asset Manager, may retrieve their slots, may create a Quicklink Table for each of them, and may add them to the Scene Table.

Because of the timing considerations for tables, a separate processing loop may be used to finish the initialization of the remaining scenes 1430, as shown in FIG. 159. The Project setup may have now been completed, so it may set a table pointer that may be used to indicate that the project may be filly operational.

Each Project may have a doDone( ) routine 1440, as shown in FIG. 160, which may be called by each scene when it completes. A Project may remove the old scene via doOldScene( ) 1490, as shown in FIG. 165. If scenes remain to be played, the Project may move to the next scene and request its Load via doNewScene( ) 1500, as illustrated in FIG. 166. The project may then call doNextScene( ) 1510, as demonstrated in FIG. 167, so that it can start preloading the scene after the new scene.

If a button in the current scene jumps to another scene, the doJump( ) routine 1450 may be called, as shown in FIG. 161. The Project may extract the destination scene ID and attempt to find the destination scene ID in the Scene Table. If the ID is found, the Project may remove the old scene via doOldScene( ) 1490. It may request the Load of the new scene via doNewScene( ) 1500. It may then call doNextScene( ) 1510 so that it starts preloading the scene after the new scene. If the destination scene is not found, the Project may terminate operation by calling the Session's doDone( ) routine 1320.

Some components, like intro movies, may need to force the scene to finish when they are finished playing. This may be accomplished by calling the Project's doForceDone( ) routine 1460, as shown in FIG. 162. This routine may set a variable that denotes that the Project may be forced to complete and may call the Project's doDone( ) routine 1440.

Some components, like intro movies, may need to prevent the scene from finishing before the component may have finished playing. The Project's doHold( ) routine 1470, as demonstrated in FIG. 163, may be used to provide this capability. A scene whose hold count may be greater than zero may not terminate when the scene times out. The component may release its hold via the Project's doRelease( ) routine 1480, as shown in FIG. 164.

The Project's doOldScene( ) routine 1490, as shown in FIG. 165, may be used to terminate execution of the current scene. If the Project has only one scene, it may continue to play. If the Project has more than 1 scene, the doEnd( ) function of the terminating scene 1680 may be called so that it hides each of its components. The old scene's Quicklink Table pointer may then be cleared from the /vars block. If the Project has 3 or more scenes, the current scene may be unloaded by a request to the Asset Manager.

The Project doNewScene( ) routine 1500, as illustrated in FIG. 166, may be used to initiate execution of a new scene. If the Project has only one scene, the routine may perform no operation since no scene is available for it to execute. If the Project has only 2 scenes, the new scene may be restarted. This may cause the scene to make each of its components visible. If the Project has 3 or more scenes, the new scene may be started by a request to the Asset Manager. The scene may already have been preloaded, so only a Play command need be issued. The new scene may set its pointer, as the current scene, and its Quicklink table pointer in the /vars block.

The Project doNextScene( ) routine 1510, as shown in FIG. 167, may be used to preload the next sequential scene, i.e. the scene after the current scene. If the current scene is the last scene in the Project and looping is enabled, the next scene may be the first scene. If the Project only has 1 or 2 scenes, no operation may be performed since no next scene exists. If the Project has at least 3 scenes, the Prep, Stage, and Load commands may be issued via the Asset Manager so that the desired scene is preloaded.

A Scene may play automatically when it is loaded 1600, as shown in FIG. 168. It may wait until it finishes loading and then may initialize itself. It may then wait until the Scene is ready to begin.

A Scene may be started 1610, as illustrated in FIG. 169, by beginning execution of the Scene's timeline at its frBegin label. It may then call doShow( ) for each of its component's control blocks so that the components are made visible and can begin playing. The routine may record the Scene's start time, may initialize the Scene for the current (re)play, and may wait for the scene timeout.

The Scene may wait for its timeout to occur 1620, as demonstrated in FIG. 170. When the timeout occurs, the Scene may remain active if the scene is currently being held. The scene may be forced to finish at any time, however. When the scene does finally complete, it may call its Project's doRelease( ) routine 1480 and doDone( ) routine 1440 and clears a variable that signals that it has completed.

Each Scene may have a doDone( ) routine 1630, as shown in FIG. 171, which may be called by each component when the component finishes. The routine may increment its Done count variable. When the done count equals or exceeds the required Done count, a value that is equal to the number of components in the Scene, the routine may set the variable that signifies that the scene may be done.

Each Scene may have a doForceDone( ) routine 1640, as shown in FIG. 172, which may be called by a component to force the Scene to terminate. It may set the Scene's force variable and calls the Project's doRelease( ) routine 1480 once for each unreleased scene hold.

Each Scene may have a doHold( ) routine 1650, as illustrated in FIG. 173, which may be used to hold the scene longer than its timeout. The routine may increment the Scene's hold count and calls its Project's doHold( ) routine 1470.

Each Scene may have a doRelease( ) routine 1660, as demonstrated in FIG. 174, which may be called to release a scene hold. The routine may decrement the Scene's hold count and calls its Project's doRelease( ) routine 1480.

Each Scene may have a doJump( ) routine 1670, as shown in FIG. 175, which may normally be used by buttons that may jump to a scene out of the normal scene sequence. It may pass the Jump ID, i.e., the destination Scene ID, to its Project and calls its Project's doJump( ) routine 1450.

Each Scene may have a doEnd( ) routine 1680, as illustrated in FIG. 176, which may be called when a Scene may be terminated. This routine may cause the Scene to call its doHide( ) routine for each of its component's control blocks so that they can be made invisible.

The Asset Manager, as shown in FIG. 177, may initialize itself 1700, the Active Content Loader 1900, as illustrated in FIG. 195, and its two working queues. The Bootstrap may examine the network bandwidth to determine which version of the Asset Manager to load. The Asset Manager may set its pointer in the /vars block, which indicates that it is ready to process requests. It may then start its Operation Processing Loop 1800 and may wait for User Request Calls to be made.

When a user request call is made 1710, as shown in FIG. 178, the Asset Manager may process the user request according to its request type. Registrations 1720, Scene Prep 1730, Scene Stage 1740, Scene Load 1750, Scene Play 1760, and Scene Unload 1770 requests may be handled by the Asset Manager.

A Registration request 1720 may create a timeline called a "slot," as shown in FIG. 179, to which all future Asset Manager requests for a given Component, Table, Scene, or Project may be assigned. The request may initialize variables assigned to the slot, initialize an operation list in the slot, and return a pointer to the slot.

A Scene Prep request 1730, as demonstrated in FIG. 180, may be used to load the scene file. A "prep" operation may be added to the slot's operation list. Then, the prep variable may be set. The slot may then be placed on one of the Asset Manager's queues 1780.

A Scene Stage request 1740, as illustrated in FIG. 181, may be used to load the Scene's component data block files. A "stage" operation may be added to the slot's operation list and the stage variable may be set. The slot may then be placed on one of the Asset Manager's queues 1780.

A Scene Load request 1750, as shown in FIG. 182, may be used to load a clip or may be used to load the Scene's other component files. A "load" operation may be added to the slot's operation list and may set the load variable. The slot may then be queued on one of the Asset Manager's queues 1780.

A Scene Play request 1760 may be used to play a clip or to play a scene, as demonstrated in FIG. 183. A "play" operation may be added to the slot's operation list and may set the play variable. The slot may then be placed on one of the Asset Manager's queues 1780.

An Unload request 1770 may be used to unload a clip or a Scene, as shown in FIG. 184. An "unload" operation may be added to the slot's operation list. The slot may then be placed on one of the Asset Manager's queues 1780.

The Asset Manager may process requests by slots 1780, as shown in FIG. 185. The slots may be placed on either a normal queue or an urgent queue. A slot on the urgent queue may be accessed before slots on the normal queue. Slots may be added to the end of the queue. The processing loop 1800 may then be executed to ensure that the newly queued request is processed. When a request has been completely processed, it may be dequeued 1790, as illustrated in FIG. 186.

Operation Processing 1800, as shown in FIG. 187, may examine the urgent queue so that the Asset Manager can determine if any slots have requests. If one or more slots have a request, the slot and its request may be processed, and the next slot, if any remaining slots contain requests, may be examined. When the urgent queue is exhausted or when no urgent requests exist, the normal queue may be processed in the same fashion. When both queues are empty, the Operation Processing routine may halt so that CPU loading is minimized. Queuing any requests may restart the processing loop.

Operations may be processed from the operation list in a slot 1810, as demonstrated in FIG. 188. When all operations have been processed, the operation list may be reset and the slot dequeued. Processing an operation may set an operation variable and call a routine for the operation. Legitimate operations may have a routine that clears the operation variable. If the operation variable is still set after the routine completes, the operation may be determined to be illegal. If an operation is determined to be illegal, an error may be set, and the slot may be dequeued.

Processing operations 1820, as shown in FIG. 189, may clear the operation variable, may set a response index to the operation index so that the operation response may be stored with the op, and may set the response to busy. The response may be set to non-busy when the operation is completed. Special routines may exist to process, for example, Prep 1830, Stage 1840, Load 1850, Play 1860, and Unload 1870 requests.

The Prep operation 1830, as illustrated in FIG. 190, may set up the Scene file information and pass the slot to the Active Content Loader for loading.

The Stage operation 1840, as shown in FIG. 191, may set up information for each component's data block files for the Scene and pass the slot to the Active Content Loader for loading.

As demonstrated in FIG. 192, the Load operation 1850 may set a clip's file information or may set the component chrome and control files'information for the Scene. It may then pass the slot to the Active Content Loader for loading.

The Play operation 1860 may either call a clip's doPlay( ) routine or execute a Scene's frBegin frame to start playing the clip, as shown in FIG. 193.

The Unload operation 1870, as illustrated in FIG. 194, may call a clip's doHide( ) routine and then unload the clip. A Scene's doEnd( ) routine 1680 may be called to hide the Scene's components and unload the component chrome and control files.

The Active Content Loader, as shown in FIG. 195, may initialize itself and its working queues 1900. The Active Content Loader may load a project text file, which may contain parameters for components in a project. It may initialize variables for the speedometers and start the CPU speedometer 2070 and the Frame Rate speedometer 2080. The Bandwidth Speedometer may be designed as part of the load processing. The Active Content Loader may set its pointer in the /vars block to indicate that it is ready for processing. It may start its Loader Frame Loop 1960 and wait for Asset Manager requests to be made.

Asset Manager requests 1910 to the Active Content Loader, as illustrated in FIG. 196, may be used to register a slot so that a new request may be processed or to unregister a slot if no more operations are outstanding.

The Registration process 1920, as shown in FIG. 197, may examine the outstanding request and organize processing to handle the request. Prep, Stage, or Load operations for a Scene or a Load operation for a clip may be performed. The slot may be placed on one of the Active Content Loader's queues 1940.

The Unregistration process 1930, as demonstrated in FIG. 198, may dequeue the slot from its Active Content Loader queue 1950 and may abort any Load operations that are in process 1990.

The Active Content Loader may process requests by slots 1940, as shown in FIG. 199. The slots may be placed on either a normal queue or an urgent queue. A slot on the urgent queue may be accessed before slots on the normal queue. Slots may be added to the end of a queue. The Loader Frame Loop may then be played to process the queued request. When a request has been completely processed, it may be dequeued from its queue 1950, as illustrated in FIG. 200.

Active Content Loader processing may occur in its Loader Frame Loop 1960, as demonstrated in FIG. 201. The Loader Frame Loop may examine the urgent queue to see if any slots with requests are present. If slots with requests exist, the slot and request may be processed, and, if any remaining slots contain requests, the next slot is examined. When the urgent queue is exhausted or no urgent requests remain, the normal queue may be processed in the same fashion. When both queues are empty, the Loader Frame Loop routine may halt so that CPU loading is minimized. Queuing any requests may restart the processing loop.

The Active Content Loader may perform Load Processing 1970, as shown in FIG. 202. The Load Processing routine may determine if any Load operations have completed. If a Load operation has completed 1980, the routine may set the load response and may dequeue the slot. If not, it may determine whether a Load requests to be aborted 1990. If a Load operation requests that it be aborted, it may abort the Load and dequeue the slot 1950. Otherwise, it may continue to process Load operations 2000.

The Active Content Loader may check for completed Load operations 1980 by examining the loads in progress and determining if the Load has completed, as demonstrated in FIG. 203. If a Load operation has completed, the routine may mark the component as loaded, record the Load operation's finishing time, and report the load times and size to the Bandwidth Speedometer 2060. Regardless of whether a Load has completed, the routine may compute a value for the percentage of the load that is completed.

If Loads are to be aborted 1990, as shown in FIG. 204, the target load may be stopped and the item that is in the process of being loaded may be marked as unloaded so it can be processed at a later time.

Load processing may be continued 2000, as shown in FIG. 205, by determining the load operation and choosing the correct method of processing the specific operation. Scene prep processing 2010, scene stage processing 2020, scene load processing 2030, or clip load processing 2040 may be performed.

Scene Prep loading 2010, as shown in FIG. 206, may determine if any load channels are available for loading. If one or more load channels are available for loading, a load channel may be allocated, a matching file selected 2050, and loading commenced. The load start time may be recorded when the load channel is allocated.

Scene Stage loading 2020, as demonstrated in FIG. 207, may determine if any load channels are available. If one or more load channels are available, a load channel may be allocated, a matching file selected 2050, and loading commenced. The load start time may be recorded when the load channel is allocated.

In an alternative embodiment, Scene Stage loading 2022, as shown in FIG. 208, may determine if any components exist in a scene. If components exist, a master data block file may be duplicated to create a component data block file for each component. The component data block file may then be initialized. Once the component data block file is initialized, the component's parameters may be copied to the component data block file 2025

Copy Object Parameters 2025, as demonstrated in FIG. 209, may copy a component's parameters from a project text file to a component data block for the component. While the component's parameters are copied, a number of checksums may be generated 2028. In a specific embodiment, an integer checksum may be generated for integer parameters, a string length checksum may be generated for string parameters, and a floating point checksum may be generated for floating point parameters. The floating point checksum may include up to a specific number of digits after the decimal point, e.g., four. Once all the parameters for a component are copied, the checksums may be stored in the component's data block file.

Check Scene Checksums 2028, as illustrated in FIG. 210, may sum the individual checksums stored in all component data block files. This calculation may be done based on each type of checksum, e.g., integer, string, and floating point. The checksums may then be made available to the run time procedure. Check values for a given scene may be compared with the checksum values. If the values match, processing may continue. If the values do not match, a dialog box may be displayed to indicate that an error may have occurred. Processing may also be halted so that the project may not be viewed.

Clip Load loading 2030, as shown in FIG. 211, may determine if any load channels are available. If one or more load channels are available, one may be allocated, a matching clip file selected 2050, and loading commenced. The load start time may be recorded when the load channel is allocated.

Scene Load loading 2040, as illustrated in FIG. 212, may determine if any load channels are available. If one or more load channels are available, one may be allocated, a matching component file selected 2050, and loading commenced. The load start time may be recorded when the load channel is allocated.

The Active Content Loader may use speedometer values to select a matching file that may most closely match the actual environment 2050, as shown in FIG. 213. If only one file exists, that file may be selected. If an exact match occurs, the matching file may be selected. If no exact match exists, a file that may most closely match the CPU and bandwidth requirements without exceeding those requirements may be used. If no file meeting both the CPU and bandwidth requirements exists, a file that may most closely match the CPU requirement and that requires the least bandwidth may be used. If none of these conditions may be satisfied, a distance measurement may be used to select the file that is closest to the requirement.

The Active Content Loader's Load process may report load times and file sizes to the Bandwidth Speedometer 2060, as shown in FIG. 214. This process may compute the number of bytes per second that the load may require and may include that value in a running average. The running average may be used to set the bandwidth selector.

The Active Content Loader may periodically measure the CPU speed 2070, as illustrated in FIG. 215. It may compute the number of (Flash) instructions used per second from a timed loop. The CPU Speedometer may include this value in a running average. The running average may be used with the average frame rate to set the CPU selector.

The Active Content Loader may periodically measure the display frame rate 2080, as demonstrated in FIG. 216. It may compute the number of milliseconds used per frame from a timed loop. The Frame Rate Speedometer may include this value in a running average. The running average may be used with the average CPU speed to set the CPU selector.

The invention has been described in detail with particular reference to preferred embodiment thereof. However, it will be appreciated that those skilled in the art, upon consideration of this disclosure may make variations and modifications within the spirit and scope of the invention.

I claim:

1. A method for users to create and maintain a rich-media application on said host website via the Internet comprising:
creating a user account; accessing a user account; and viewing available options for creating rich-media applications,
wherein said accessing a user account comprises one or more of the following: accessing account information; creating a new rich-media application; modifying an existing rich-media application; and accessing statistics from an existing rich-media application;
wherein accessing a user account comprises modifying an existing rich-media application and wherein said modifying an existing rich-media application comprises one or more of the following: accessing account information; accessing rich-media application information; accessing rich-media application specification information; saving said rich-media application; closing said rich-media application; deleting said rich-media application; publishing said rich-media application; previewing said rich-media application; accessing components used in the construction of said rich-media application; accessing component-editing graphical user interfaces; and accessing a scene of said rich-media application; and
wherein said modifying an existing rich-media application comprises publishing said rich-media application and wherein said publishing said rich-media application comprises downloading said rich-media application from said host computer to the user's remote computer system.

2. method for users to create and maintain a rich-media application on said host website via the Internet comprising:
creating a user account; accessing a user account; and viewing available options for creating rich-media applications,
wherein said accessing a user account comprises one or more of the following: accessing account information; creating a new rich-media application; modifying an existing rich-media application; and accessing statistics from an existing rich-media application;
wherein accessing a user account comprises modifying an existing rich-media application and wherein said modifying an existing rich-media application comprises one or more of the following: accessing account information; accessing rich-media application information; accessing rich-media application specification information; saving said rich-media application; closing said rich-media application; deleting said rich-media application; publishing said rich-media application; previewing said rich-media application; accessing components used in the construction of said rich-media application; accessing component-editing graphical user interfaces; and accessing a scene of said rich-media application; and
wherein said modifying an existing rich-media application comprises accessing said scene of said rich-media application and wherein said accessing said scene of said rich-media application comprises one or more of modifying said scene of said rich-media application;

inserting a new scene into said rich-media application; editing scene information for said scene of said rich-media application; deleting said scene from said rich-media application; reordering said scene in said rich-media application; and selecting said scene from said rich-media application.

3. The method of claim 2, wherein said accessing said scene of said rich-media application comprises modifying said scene of said rich-media application and wherein said modifying said scene of said rich-media application comprises one or more of the following: editing a selected rich-media component; deleting a selected rich-media component; undoing the previous modification to a selected rich-media component; and saving said scene of said rich-media application.

4. The computer process of claim 3, wherein said modifying said scene of said rich-media application comprises editing a selected rich-media component and wherein said editing a selected rich-media component comprises; selecting said selected rich-media component from a hierarchical list of folders and rich-media components; closing graphical user interfaces used to edit non-selected rich-media components; opening a graphical user interface used to edit said selected rich-media component; and editing said selected rich-media component by means of said graphical user interface.

5. The method of claim 3, wherein said modifying said scene of said rich-media application comprises editing a selected rich-media component and wherein said editing a selected rich-media component comprises editing one or more of the following: the display of said rich-media component; the volume of said selected rich-media component; the link between said selected rich-media component and an associated menu entry; the text field of said selected rich-media component; the layout of said selected rich-media component; the size of said selected rich-media component; the transparency of said selected rich-media component; the timing of said selected rich-media component; the rotation of said selected rich-media component; the color of said selected rich-media component; the level of said selected rich-media component; and the position of said selected rich-media component.

6. The method of claim 5, wherein said editing a selected rich-media component comprises editing said display of said selected rich-media component and wherein said editing said display of said selected rich-media component comprises one or more of the following: selecting an introduction animation; selecting a loop animation; and selecting an exit animation.

7. The method of claim 6, wherein said editing said display of said selected rich-media component comprises selecting a loop animation and wherein said selecting a loop animation comprises one or more of the following: playing said loop animation a selected number of times; playing said loop animation no times; and playing said loop animation continuously.

8. The method of claim 7, wherein said editing said level of said selected rich-media component comprises modifying the level of said selected rich-media component by means of an ordered list representing the relative level of all components in the current scene and wherein said ordered list representing the relative level of all components in the current scene comprises one or more of the following: a list of all components in said current scene ordered by the depth of the components; a means of toggling the visibility of each component; and a means of toggling the ability to modify the depth of each component.

9. The method of claim 5, wherein said editing a selected rich-media component comprises editing said volume of said selected rich-media component and wherein said editing said volume of said selected rich-media component comprises modifying the volume of said selected rich-media component by means of one or more of the group consisting of: a slider bar; a textual input field; an up-volume button; and a down-volume button.

10. The method of claim 5, wherein said editing a selected rich-media component comprises editing said link between said selected rich-media component and said associated menu entry and wherein said editing said link between said selected rich-media component and said associated menu entry comprises one or more of the following: selecting the style of said associated menu entry; creating said link between said selected rich-media component and said associated menu entry; and selecting the uniform resource locator of said associated menu entry.

11. The method of claim 5, wherein said editing a selected rich-media component comprises editing said layout of said selected rich-media component and wherein said editing said layout of said selected rich-media component comprises; selecting a component type; and selecting from all preset and uploaded components matching said selected rich-media component's component type.

12. The method of claim 5, wherein said editing a selected rich-media component comprises editing said text field of said selected rich-media component and wherein said editing said text field of said selected rich-media component comprises one or more from the group consisting of: selecting a layout for said text field; selecting a font for the selected text; selecting a font size for the selected text; selecting a font color for the selected text; and selecting an alignment for said text field.

13. The method of claim 5, wherein said editing a selected rich-media component comprises editing said size of said selected rich-media component and wherein said editing said size of said selected rich-media component comprises: modifying the size of said selected rich-media component by means of a slider bar; modifying the size of said selected rich-media component by means of a textual input field; modifying the size of said selected rich-media component by means of corner handles; modifying the size of said selected rich-media component by means of side handles; and viewing a display of the current size of said selected rich-media component.

14. The method of claim 5, wherein said editing a selected rich-media component comprises editing said transparency of said selected rich-media component and wherein said editing said transparency of said selected rich-media component comprises: modifying the transparency of said selected rich-media component by means of a slider bar; modifying the transparency of said selected rich-media component by means of a textual input field; and viewing a display of the current transparency of said selected rich-media component.

15. The method of claim 5, wherein said editing a selected rich-media component comprises editing said timing of said selected rich-media component and wherein said editing said timing of said selected rich-media component comprises: modifying the timing of said selected rich-media component by means of a textual input field; modifying the timing of said selected rich-media component by means of a component start marker; modifying the timing of said selected rich-media component by means of a component end marker; modifying the timing of said selected rich-media component by means of a life bar; and viewing a display of the current duration of said selected rich-media component.

16. The method of claim 5, wherein said editing a selected rich-media component comprises editing said rotation of said selected rich-media component and wherein said editing said rotation of said selected rich-media component comprises: modifying the rotation of said selected rich-media component by means of a slider bar; modifying the rotation of said selected rich-media component by means of a textual input field; and viewing a display of the current rotation of said selected rich-media component.

17. The method of claim 5, wherein said editing a selected rich-media component comprises editing said color of said selected rich-media component and wherein said editing said color of said selected rich-media component comprises: modifying the color of said selected rich-media component by means of a slider bar; modifying the color of said selected rich-media component by means of a textual input field; and viewing a display of the current color of said selected rich-media component.

18. The method of claim 5, wherein said editing a selected rich-media component comprises editing said level of said selected rich-media component and wherein said editing said level of said selected rich-media component comprises: modifying the level of said selected rich-media component by means of a slider bar; modifying the level of said selected rich-media component by means of an ordered list representing the relative level of all components in the current scene; modifying the level of said selected rich-media component by means of a textual input field; and viewing a display of the current level of said selected rich-media component.

19. The method of claim 5, wherein said editing a selected rich-media component comprises editing said position of said selected rich-media component and wherein said editing said position of said selected rich-media component comprises: modifying the vertical position of said selected rich-media component by means of a textual input field; modifying the horizontal position of said selected rich-media component by means of a textual input field; modifying the position of said selected rich-media component by means of a hit area associated with said selected rich-media component; and modifying the position of said selected rich-media component by means of a graphical input field.

20. The method of claim 19, wherein said editing said position of said selected rich-media component comprises modifying the position of said selected rich-media component by means of a hit area associated with said selected rich-media component and wherein said modifying the position of said selected rich-media component by means of a hit area associated with said selected rich-media component comprises: moving said selected rich-media component by means of said hit area associated with said selected rich-media component; placing said selected rich-media component by releasing said hit area associated with said selected rich-media component; and centering said selected rich-media component on the nearest grid point.

21. The method of claim 19, wherein said editing said position of said selected rich-media component comprises modifying the position of said selected rich-media component by means of a hit area associated with said selected rich-media component and wherein said modifying the position of said selected rich-media component by means of a hit area associated with said selected rich-media component comprises: moving said selected rich-media component by means of said hit area associated with said selected rich-media component; placing said selected rich-media component by releasing said hit area associated with said selected rich-media component; and aligning said selected rich-media component to the nearest guide line.

22. A method for users to create and maintain a rich-media application on said host website via the Internet comprising:
creating a user account; accessing a user account; and viewing available options for creating rich-media applications;
wherein said accessing a user account comprises one or more of the following: accessing account information; creating a new rich-media application; modifying an existing rich-media application; and accessing statistics from an existing rich-media application;
wherein said creating a new rich-media application comprises one or more of the following: accessing account information; accessing rich-media application information; accessing rich-media application specification information; saving said rich-media application; closing said rich-media application; deleting said rich-media application; publishing said rich-media application; previewing said rich-media application; accessing components used in the construction of said rich-media application; accessing component-editing graphical user interfaces; and accessing a scene of said rich-media application; and
wherein said creating a new rich-media application comprises publishing said rich-media application and wherein said publishing said rich-media application comprises downloading said rich-media application to the user's remote computer system from said host computer.

23. A method for users to create and maintain a rich-media application on said host website via the Internet comprising:
creating a user account; accessing a user account; and viewing available options for creating rich-media applications,
wherein said accessing a user account comprises one or more of the following: accessing account information; creating a new rich-media application; modifying an existing rich-media application; and accessing statistics from an existing rich-media application;
wherein said creating a new rich-media application comprises one or more of the following: accessing account information; accessing rich-media application information; accessing rich-media application specification information; saving said rich-media application; closing said rich-media application; deleting said rich-media application; publishing said rich-media application; previewing said rich-media application; accessing components used in the construction of said rich-media application; accessing component-editing graphical user interfaces; and accessing a scene of said rich-media application; and
wherein said creating a new rich-media application comprises accessing said scene of a rich-media application and wherein said accessing said scene of a rich-media application comprises one or more of modifying said scene of said rich-media application; inserting a new scene into said rich-media application; editing scene information for said scene of said rich-media application; deleting said scene from said rich-media application; reordering said scene in said rich-media application; and selecting said scene from said rich-media application.

24. The method of claim 23, wherein said accessing said scene of a rich-media application comprises modifying said scene of said rich-media application and wherein said modifying said scene of said rich-media application comprises one or more of the following: editing a selected rich-media component; deleting a selected rich-media component; undoing the previous modification to a selected rich-media component; and saving said rich-media application scene.

25. The method of claim 24, wherein said modifying said scene of said rich-media application comprises editing a selected rich-media component and wherein said editing a selected rich-media component comprises: selecting said selected rich-media component from a hierarchical list of folders and rich-media components; closing graphical user interfaces used to edit non-selected rich-media components; opening a graphical user interface used to edit said selected rich-media component; and editing said selected rich-media component by means of said graphical user interface.

26. The method of claim 24, wherein said modifying said scene of said rich-media application comprises editing a selected rich-media component and wherein said editing a selected rich-media component comprises editing one or more of the following: the display of said selected rich-media component; the volume of said selected rich-media component; the link between said selected rich-media component and said associated menu entry; the text field of said selected rich-media component; the layout of said selected rich-media component; the size of said selected rich-media component; the transparency of said selected rich-media component; the timing of said selected rich-media component; the rotation of said selected rich-media component; the color of said selected rich-media component; the level of said selected rich-media component; and the position of said selected rich-media component.

27. The method of claim 26, wherein said editing a selected rich-media component comprises editing said display of said selected rich-media component and wherein said editing said display of said selected rich-media component comprises one or more of the following: selecting an introduction animation; selecting a loop animation; and selecting an exit animation.

28. The method of claim 27, wherein said editing said display of said selected rich-media component comprises selecting a loop animation and wherein said selecting a loop animation comprises one or more of the following: playing said loop animation a selected number of times; playing said loop animation no times; and playing said loop animation continuously.

29. The method of claim 26, wherein said editing a selected rich-media component comprises editing said volume of said selected rich-media component and wherein said editing said volume of said selected rich-media component comprises modifying the volume of said selected rich-media component by means of one or more of the group consisting of: a slider bar; a textual input field; an up-volume button; and a down-volume button.

30. The method of claim 26, wherein said editing a selected rich-media component comprises editing said link between said selected rich-media component and said associated menu entry and wherein said editing said link between said selected rich-media component and said associated menu entry comprises one or more of the following: selecting the style of said associated menu entry; creating said link between said rich-media component and said associated menu entry; and selecting the uniform resource locator of said associated menu entry.

31. The method of claim 26, wherein said editing a selected rich-media component comprises editing said text field of said selected rich-media component and wherein said editing said text field of said selected rich-media component comprises one or more from the group consisting of: selecting a layout for said text field; selecting a font for the selected text; selecting a font size for the selected text; selecting a font color for the selected text; and selecting an alignment for said text field.

32. The method of claim 26, wherein said editing a selected rich-media component comprises editing said layout of said selected rich-media component and wherein said editing said layout of said selected rich-media component comprises: selecting a component type; and selecting from all preset and uploaded components matching said selected rich-media component's component type.

33. The method of claim 26, wherein said editing a selected rich-media component comprises editing said size of said selected rich-media component and wherein said editing said size of said selected rich-media component comprises: modifying the size of said selected rich-media component by means of a slider bar; modifying the size of said selected rich-media component by means of a textual input field; modifying the size of said selected rich-media component by means of corner handles; modifying the size of said selected rich-media component by means of side handles; and viewing a display of the current size of said selected rich-media component.

34. The method of claim 26, wherein said editing a selected rich-media component comprises editing said transparency of said selected rich-media component and wherein said editing said transparency of said selected rich-media component comprises: modifying the transparency of said selected rich-media component by means of a slider bar; modifying the transparency of said selected rich-media component by means of a textual input field; and viewing a display of the current transparency of said selected rich-media component.

35. The method of claim 26, wherein said editing a selected rich-media component comprises editing said timing of said selected rich-media component and wherein said editing said timing of said selected rich-media component comprises: modifying the timing of said selected rich-media component by means of one or more textual input fields; modifying the timing of said selected rich-media component by means of a component start marker; modifying the timing of said selected rich-media component by means of a component end marker; modifying the timing of said selected rich-media component by means of a life bar; and viewing a display of the current timing of said selected rich-media component.

36. The method of claim 26, wherein said editing a selected rich-media component comprises editing said rotation of said selected rich-media component and wherein said editing said rotation of said selected rich-media component comprises: modifying the rotation of said selected rich-media component by means of a slider bar; modifying the rotation of said selected rich-media component by means of a textual input field; and viewing a display of the current rotation of said selected rich-media component.

37. The method of claim 26, wherein said editing a selected rich-media component comprises editing said color of said selected rich-media component and wherein said editing said color of said selected rich-media component comprises: modifying the color of said selected rich-media component by means of a slider bar; modifying the color of said selected rich-media component by means of a textual input field; and viewing a display of the current color of said selected rich-media component.

38. The method of claim 26, wherein said editing a selected rich-media component comprises editing said level of said selected rich-media component and wherein said editing said level of said selected rich-media component comprises: modifying the level of said selected rich-media component by means of a slider bar; modifying the level of said selected rich-media component by means of an ordered list representing the relative level of all components in the current scene; modifying the level of said selected rich-media component by means of a textual input field; and viewing a display of the current level of said selected rich-media component.

39. The method of claim 38, wherein said editing said level of said selected rich-media component comprises modifying the level of said selected rich-media component by means of an ordered list representing the relative level of all components in the current scene and wherein said ordered list representing the relative level of all components in the current scene comprises one or more of the following: a list of all components in said current scene ordered by the depth of the components; a means of toggling the visibility of each component; and a means of toggling the ability to modify the depth of each component.

40. The method of claim 26, wherein said editing a selected rich-media component comprises editing said position of said selected rich-media component and wherein said editing said position of said selected rich-media component comprises: modifying the vertical position of said selected rich-media component by means of a textual input field; modifying the horizontal position of said selected rich-media component by means of a textual input field; modifying the position of said selected rich-media component by means of a hit area associated with said selected rich-media component; and modifying the position of said selected rich-media component by means of a graphical input field.

41. The method of claim 40, wherein said editing said position of said selected rich-media component comprises modifying the position of said selected rich-media component by means of a hit area associated with said selected rich-media component and wherein said modifying the position of said selected rich-media component by means of a hit area associated with said selected rich-media component comprises: moving said selected rich-media component by means of said hit area associated with said selected rich-media component; placing said selected rich-media component by releasing said hit area associated with said selected rich-media component; and centering said selected rich-media component on the nearest grid point.

42. The method of claim 40, wherein said editing said position of said selected rich-media component comprises modifying the position of said selected rich-media component by means of a hit area associated with said selected rich-media component and wherein said modifying the position of said selected rich-media component by means of a hit area associated with said selected rich-media component comprises: moving said selected rich-media component by means of said hit area associated with said selected rich-media component; placing said selected rich-media component by releasing said hit area associated with said selected rich-media component; and aligning said selected rich-media component to the nearest guide line.

43. A computer process allowing a user to interactively create and maintain a rich-media application on a host website via the Internet comprising:
allowing the creation of a user account; allowing access to a user account; and displaying available options for creating rich-media applications,
wherein said allowing access to a user account comprises one or more of displaying user account information; allowing said user to create a new rich-media application; allowing said user to modify an existing rich-media application; and displaying statistics from an existing rich-media application;
wherein said allowing access to a user account comprises displaying statistics from an existing rich-media application and
wherein said displaying statistics from an existing rich-media application comprises one or more of the following: displaying a weekly session log, displaying a server activity log; displaying a record of user accesses for a published rich-media application; analyzing said weekly session log; analyzing said server activity log; and analyzing said record of user accesses for said published rich-media application.

44. A computer process allowing a user to interactively create and maintain a rich-media application on a host website via the Internet comprising:
allowing the creation of a user account; allowing access to a user account; and displaying available options for creating rich-media applications,
wherein said allowing access to a user account comprises one or more of displaying user account information; allowing said user to create a new rich-media application; allowing said user to modify an existing rich-media application; and displaying statistics from an existing rich-media application; and
wherein said allowing access to a user account comprises allowing said user to modify an existing rich-media application and wherein said allowing said user to modify an existing rich-media application comprises one or more of the following: providing account information; providing rich-media application information; providing rich-media application specification information; allowing said user to save said rich-media application; allowing said user to close said rich-media application; allowing said user to delete said rich-media application; allowing said user to publish said rich-media application; allowing said user to preview said rich-media application; providing access to components used in the construction of said rich-media application; providing component-editing graphical user interfaces; and allowing said user to access a scene of said rich-media application.

45. The computer process of claim 44, wherein said allowing said user to modify an existing rich-media application comprises allowing said user to publish said rich-media application and wherein said allowing said user to publish said rich-media application comprises: downloading said rich-media application from said host computer to said user's remote computer system.

46. The computer process of claim 44, wherein said allowing said user to modify an existing rich-media application comprises allowing said user to access a scene of said rich-media application and wherein said allowing said user to access a scene of said rich-media application comprises one or more of the following: modifying said scene of said rich-media application; inserting a new scene of said rich-media application; editing scene information of said rich-media application; deleting said scene of said rich-media application; reordering said scene in said rich-media application; and selecting said scene of said rich-media application.

47. The computer process of claim 46, wherein said allowing said user to access a scene of said rich-media application comprises modifying said scene of said rich-media application and wherein said modifying said scene of said rich-media application comprises one or more of the following: editing a selected rich-media component; deleting a selected rich-media component; undoing the previous modification to a selected rich-media component; and saving said scene of said rich-media application.

48. The computer process of claim 47, wherein said modifying said scene of said rich-media application comprises editing a selected rich-media component and wherein said editing a selected rich-media component comprises: selecting said selected rich-media component from a hierarchical list of folders and rich-media components; closing graphical user interfaces used to edit non-selected rich-media components; opening a graphical user interface used to edit said selected rich-media component; and editing said selected rich-media component by means of said graphical user interface.

49. The computer process of claim 47, wherein said modifying said scene of said rich-media application comprises editing a selected rich-media component and wherein said editing a selected rich-media component comprises one or more of the group consisting of: an editor configured to edit the display of said selected rich-media component; an editor configured to edit the volume of said selected rich-media component; an editor configured to edit the link between said selected rich-media component and an associated menu entry; an editor configured to edit the text field of said selected rich-media component; an editor configured to edit the layout of said selected rich-media component; an editor configured to edit the size of said selected rich-media component; an editor configured to edit the transparency of said selected rich-media component; an editor configured to edit the timing of said selected rich-media component; an editor configured to edit the rotation of said selected rich-media component; an editor configured to edit the color of said selected rich-media component; an editor configured to edit the level of said selected rich-media component; and an editor configured to edit the position of said selected rich-media component.

50. The computer process of claim 49, wherein said editing a selected rich-media component comprises an editor configured to edit the display of said selected rich-media component and wherein said editor configured to edit said display of said selected rich-media component comprises one or more of the following: a displayer configured to display an introduction animation; a displayer configured to display a loop animation; and a displayer configured to display an exit animation.

51. The computer process of claim 50, wherein said editor configured to edit said display of said selected rich-media component comprises a displayer configured to display a loop animation and wherein said displayer configured to display a loop animation comprising one or more of the following: a player configured to play said loop animation a selected number of times; a player configured to play said loop animation no times; and a player configured to play said loop animation continuously.

52. The computer process of claim 49, wherein said editing a selected rich-media component comprises an editor configured to edit the volume of said selected rich-media component and wherein said editor configured to edit the volume of said selected rich-media component comprises the group consisting of one or more of the following methods for modifying the volume; a slider bar; a textual input field; an up-volume button; and a down-volume button.

53. The computer process of claim 49, wherein said editing a selected rich-media component comprises an editor configured to edit the link between said rich-media component and an associated menu entry and wherein said editor configured to edit the link between said rich-media component and said associated menu entry comprises one or more of the group consisting of: an obtainer that obtains the style of said associated menu entry; a developer that develops said link between said rich-media component and said associated menu entry; and an obtainer that obtains the uniform resource locator of said associated menu entry.

54. The computer process of claim 49, wherein said editing a selected rich-media component comprises an editor configured to edit the text field of said selected rich-media component and wherein said editor configured to edit the text field of said selected rich-media component comprises one or more of the group consisting of: a menu for selecting a layout for said text field; a menu for selecting a font for the selected text; a menu for selecting a font size for the selected text; a menu for selecting a font color for the selected text; and a menu for selecting an alignment for said text field.

55. The computer process of claim 49, wherein said editing a selected rich-media component comprises an editor configured to edit the layout of said selected rich-media component and wherein said editor configured to edit the layout of said selected rich-media component comprises: a menu for selecting a component type; and a graphical display of all preset and uploaded components matching said selected rich-media component's component type.

56. The computer process of claim 49, wherein said editing a selected rich-media component comprises an editor configured to edit the size of said selected rich-media component and wherein said editor configured to edit the size of said selected rich-media component comprises one or more of the group consisting of: a slider bar for modifying said size of said selected rich-media component; a textual input field for modifying said size of said selected rich-media component; corner handles for modifying the size of said selected rich-media component; side handles for modifying the size of said selected rich-media component; and a display of the current size of said selected rich-media component.

57. The computer process of claim 49, wherein said editing a selected rich-media component comprises an editor configured to edit the transparency of said selected rich-media component and wherein said editor configured to edit the transparency of said selected rich-media component comprises one or more of the group consisting of: a slider bar for modifying said transparency of said selected rich-media component; a textual input field for modifying said transparency of said selected rich-media component; and a display of the current transparency of said selected rich-media component.

58. The computer process of claim 49, wherein said editing a selected rich-media component comprises an editor configured to edit the timing of said selected rich-media component and wherein said editing said timing of said selected rich-media component comprises: one or more textual input fields for modifying said timing of said selected rich-media component; a component start marker for modifying the timing of said selected rich-media component; a component end marker for modifying the timing of said selected rich-media component; a life bar for modifying the timing of said selected rich-media component by means of; and a display of the current duration of said selected rich-media component.

59. The computer process of claim 49, wherein said editing a selected rich-media component comprises an editor configured to edit the rotation of said selected rich-media component and wherein said editor configured to edit the rotation of said selected rich-media component comprises one or more of the group consisting of: a slider bar for modifying said rotation of said selected rich-media component; a textual input field for modifying said rotation of said selected rich-media component; and a display of the current rotation of said selected rich-media component.

60. The computer process of claim 49, wherein said editing a selected rich-media component comprises an editor configured to edit the color of said selected rich-media component and wherein said editor configured to edit the color of said selected rich-media component comprises one or more of the group consisting of: a slider bar for modifying said color of said selected rich-media component; a textual input field for modifying said color of said selected rich-media component; and a display of the current color of said selected rich-media component.

61. The computer process of claim 49, wherein said editing a selected rich-media component comprises an editor configured to edit the level of said selected rich-media component and wherein said editor configured to edit the level of said selected rich-media component comprises one or more of the group consisting of: a slider bar for modifying said level of said selected rich-media component; an ordered list representing the relative level of all components in the current scene for modifying said level of said selected rich-media component; a textual input field for modifying said level of said selected rich-media component; and a display of the current level of said selected rich-media component.

62. The computer process of claim 61, wherein said editor configured to edit the level of said selected rich-media component comprises an ordered list representing the relative level of all components in the current scene for modifying said level of said selected rich-media component and wherein said ordered list representing the relative level of all components in the current scene comprises one or more of the following: a list of all components in said current scene ordered by the depth of the components; a means of toggling the visibility of each component; and a means of toggling the ability to modify the depth of each component.

63. The computer process of claim 49, wherein said editing a selected rich-media component comprises an editor configured to edit the position of said selected rich-media component and wherein said editor configured to edit the position of said selected rich-media component comprises one or more of the group consisting of: a textual input field for modifying the vertical position of said selected rich-media component; a textual input field for modifying the horizontal position of said selected rich-media component; a hit area for modifying the position of said selected rich-media component; and a graphical input field for modifying said position of said selected rich-media component.

64. A computer process allowing a user to interactively create and maintain a rich-media application on a host website via the Internet comprising:
 allowing the creation of a user account; allowing access to a user account; and displaying available options for creating rich-media applications,
 wherein said allowing access to a user account comprises one or more of displaying user account information; allowing said user to create a new rich-media application; allowing said user to modify an existing rich-media application; and displaying statistics from an existing rich-media application; and
 wherein said allowing access to a user account comprises allowing said user to create a new rich-media application and wherein said allowing said user to create a new rich-media application comprises one or more of the following: providing account information; providing rich-media application information; providing rich-media application specification information; allowing said user to save said rich-media application; allowing said user to close said rich-media application; allowing said user to delete said rich-media application; allowing said user to publish said rich-media application; allowing said user to preview said rich-media application; providing access to components used in the construction of said rich-media application; providing component-editing graphical user interfaces; and allowing said user to access a scene of said rich-media application.

65. The computer process of claim 64, wherein said allowing said user to create a new rich-media application comprises allowing said user to publish said rich-media application and wherein said allowing said user to publish said rich-media application comprises: downloading said rich-media application to said user's remote computer system from said host computer.

66. The computer process of claim 64, wherein said allowing said user to create a new rich-media application comprises allowing said user to access a scene of said rich-media application and wherein said allowing said user to access a scene of said rich-media application comprises one or more of the following: modifying said scene of said rich-media application; inserting a new scene of said rich-media application; editing scene information of said rich-media application; deleting said scene of said rich-media application; reordering said scene in said rich-media application; and selecting said scene of said rich-media application.

67. The computer process of claim 66, wherein said allowing said user to access a scene of said rich-media application comprises modifying said scene of said rich-media application and wherein said modifying said scene of said rich-media application comprises one or more of the following: editing a selected rich-media component; deleting a selected rich-media component; undoing the previous modification to a selected rich-media component; and saving said scene of said rich-media application.

68. The computer process of claim 67, wherein said modifying said scene of said rich-media application comprises editing a selected rich-media component and wherein said editing a selected rich-media component comprises: selecting said selected rich-media component from a hierarchical list of folders and rich-media components; closing graphical user interfaces used to edit non-selected rich-media components; opening a graphical user interface used to edit said selected rich-media component; and editing said selected rich-media component by means of said graphical user interface.

69. The computer process of claim 67, wherein said modifying said scene of said rich-media application comprises editing a selected rich-media component and wherein said editing a selected rich-media component comprises one or more of the group consisting of: an editor configured to edit the display of said selected rich-media component; an editor configured to edit the volume of said selected rich-media component; an editor configured to edit the link between said selected rich-media component and an associated menu entry; an editor configured to edit the text field of said selected rich-media component; an editor configured to edit the layout of said selected rich-media component; an editor configured to edit the size of said selected rich-media component; an editor configured to edit the transparency of said selected rich-media component; an editor configured to edit the timing of said selected rich-media component; an editor configured to edit the rotation of said selected rich-media component; an editor configured to edit the color of said selected rich-media component; an editor configured to edit the level of said selected rich-media component; and an editor configured to edit the position of said selected rich-media component.

70. The computer process of claim 69, wherein said editing a selected rich-media component comprises an editor configured to edit the display of said selected rich-media component and wherein said editor configured to edit said display of said selected rich-media component comprises one or more of the following: a displayer configured to display an introduction animation; a displayer configured to display a loop animation; and a displayer configured to display an exit animation.

71. The computer process of claim 70, wherein said editor configured to edit said display of said selected rich-media component comprises a displayer configured to display a loop animation and wherein said displayer configured to display a loop animation comprising one or more of the following: a player configured to play said loop animation a selected number of times; a player configured to play said loop animation no times; and a player configured to play said loop animation continuously.

72. The computer process of claim 69, wherein said editing a selected rich-media component comprises an editor configured to edit the volume of said selected rich-media component and wherein said editor configured to edit the volume of said selected rich-media component comprises the group consisting of one or more of the following methods for modifying the volume; a slider bar; a textual input field; an up-volume button; and a down-volume button.

73. The computer process of claim 69, wherein said editing a selected rich-media component comprises an editor configured to edit the link of said selected rich-media component and wherein said editor configured to edit the link between said rich-media component and said associated menu entry comprises one or more of the group consisting of: an obtainer that obtains the style of said associated menu entry; a developer that develops said link between said rich-media component and said associated menu entry; and an obtainer that obtains the uniform resource locator of said associated menu entry.

74. The computer process of claim 69, wherein said editing a selected rich-media component comprises an editor configured to edit the text field of said selected rich-media component and wherein said editor configured to edit the text field of said selected rich-media component comprises one or more of the group consisting of: a menu for selecting a layout for said text field; a menu for selecting a font for the selected text; a menu for selecting a font size for the selected text; a menu for selecting a font color for the selected text; and a menu for selecting an alignment for said text field.

75. The computer process of claim 69, wherein said editing a selected rich-media component comprises an editor configured to edit the layout of said selected rich-media component and wherein said editor configured to edit the layout of said selected rich-media component comprises: a menu for selecting a component type; and a graphical display of all preset and uploaded components matching said selected rich-media component's component type.

76. The computer process of claim 69, wherein said editing a selected rich-media component comprises an editor configured to edit the size of said selected rich-media component and wherein said editor configured to edit the size of said selected rich-media component comprises one or more of the group consisting of: a slider bar for modifying said size of said selected rich-media component; a textual input field for modifying said size of said selected rich-media component; corner handles for modifying the size of said selected rich-media component; side handles for modifying the size of said selected rich-media component; and a display of the current size of said selected rich-media component.

77. The computer process of claim 69, wherein said editing a selected rich-media component comprises an editor configured to edit the transparency of said selected rich-media component and wherein said editor configured to edit the transparency of said selected rich-media component comprises one or more of the group consisting of: a slider bar for modifying said transparency of said selected rich-media component; a textual input field for modifying said transparency of said selected rich-media component; and a display of the current transparency of said selected rich-media component.

78. The computer process of claim 69, wherein said editing a selected rich-media component comprises an editor configured to edit the timing of said selected rich-media component and wherein said editing said timing of said selected rich-media component comprises: one or more textual input fields for modifying said timing of said selected rich-media component; a component start marker for modifying the timing of said selected rich-media component; a component end marker for modifying the timing of said selected rich-media component; a life bar for modifying the timing of said selected rich-media component by means of; and a display of the current duration of said selected rich-media component.

79. The computer process of claim 69, wherein said editing a selected rich-media component comprises an editor configured to edit the rotation of said selected rich-media component and wherein said editor configured to edit the rotation of said selected rich-media component comprises one or more of the group consisting of: a slider bar for modifying said rotation of said selected rich-media component; a textual input field for modifying said rotation of said selected rich-media component; and a display of the current rotation of said selected rich-media component.

80. The computer process of claim 69, wherein said editing a selected rich-media component comprises an editor configured to edit the color of said selected rich-media component and wherein said editor configured to edit the color of said selected rich-media component comprises one or more of the group consisting of: a slider bar for modifying said color of said selected rich-media component; a textual input field for modifying said color of said selected rich-media component; and a display of the current color of said selected rich-media component.

81. The computer process of claim 69, wherein said editing a selected rich-media component comprises an editor configured to edit the level of said selected rich-media component and wherein said editor configured to edit the level of said selected rich-media component comprises one or more of the group consisting of: a slider bar for modifying said level of said selected rich-media component; an ordered list representing the relative level of all components in the current scene for modifying said level of said selected rich-media component; a textual input field for modifying said level of said selected rich-media component; and a display of the current level of said selected rich-media component.

82. The computer process of claim 81, wherein said editor configured to edit the level of said selected rich-media component comprises an ordered list representing the relative level of all components in the current scene for modifying said level of said selected rich-media component and wherein said ordered list representing the relative level of all components in the current scene comprises one or more of the following: a list of all components in said current scene ordered by the depth of the components; a means of toggling the visibility of each component; and a means of toggling the ability to modify the depth of each component.

83. The computer process of claim 69, wherein said editing a selected rich-media component comprises an editor configured to edit the position of said selected rich-media component and wherein said editor configured to edit the position of said selected rich-media component comprises one or more of the group consisting of: a textual input field for modifying the vertical position of said selected rich-media component; a textual input field for modifying the horizontal position of said selected rich-media component; a hit area for modifying the position of said selected rich-media component; and a graphical input field for modifying said position of said selected rich-media component.

* * * * *

UNITED STATES PATENT AND TRADEMARK OFFICE
CERTIFICATE OF CORRECTION

PATENT NO. : 7,000,180 B2  Page 1 of 1
APPLICATION NO. : 09/779831
DATED : February 14, 2006
INVENTOR(S) : Balthaser, Neil It is certified that error appears in the above-identified patent and that said Letters Patent is hereby corrected as shown below:

Column 56, line 10, the word "said should be removed; line 39, the word "method" should be changed to --A method--; line 40, the word "said" should be removed.

Column 57, line 13, the word "the" should be changed to --a--; line 19, the ";" should be changed to a --:--; line 8, the number "7" should be changed to --5--.

Column 58, line 23, the first occurrence of ";" should be changed to a --:--.

Column 58, line 38, column 62, lines 11, 18, 30, 40, 53, and 62, column 63, lines 5, 28, 43, and 56, column 65, line 11, column 66, lines 26, and 58, column 68, line 50, column 69, line 66, and column 70, line 31, the phrase --one or more of the following-- should be added after the word comprises and before the colon in each instance.

Column 64, line 51, the ":" should be removed.

Column 65, line 65, the ";" should be changed to a --:--.

Column 67, line 65, a --:-- should be inserted after the word of.

Column 68, line 23, the ":" should be removed.

Column 69, line 37, the ";" should be changed to a --:--.

Signed and Sealed this

Twenty-second Day of August, 2006

JON W. DUDAS
*Director of the United States Patent and Trademark Office*